US012045364B1

(12) United States Patent
Trepetin et al.

(10) Patent No.: US 12,045,364 B1
(45) **Date of Patent: *Jul. 23, 2024**

(54) MATHEMATICAL METHOD FOR PERFORMING HOMOMORPHIC OPERATIONS

(71) Applicants: Stanley Trepetin, Hoboken, NJ (US); Mark Reston, Hillsborough, NJ (US)

(72) Inventors: Stanley Trepetin, Hoboken, NJ (US); Mark Reston, Hillsborough, NJ (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/369,935

(22) Filed: Jul. 7, 2021

Related U.S. Application Data

(60) Continuation-in-part of application No. 17/126,379, filed on Dec. 18, 2020, which is a division of application No. 15/947,796, filed on Apr. 7, 2018, now Pat. No. 10,936,744, which is a continuation-in-part of application No. 15/249,249, filed on Aug. 26, 2016, now Pat. No. 9,946,810, which is a continuation-in-part of application No. 14/277,056, filed on May 14, 2014, now Pat. No. 9,442,980, which is a continuation of application No. 14/093,499, filed on Dec. 1, 2013, now abandoned, which is a continuation of application No. 13/090,803, filed on Apr. 20, 2011, now Pat. No. 8,626,749.

(Continued)

(51) Int. Cl.

| | |
|---|---|
| ***G06F 21/62*** | (2013.01) |
| ***H04L 9/00*** | (2022.01) |
| ***H04L 9/08*** | (2006.01) |

(52) U.S. Cl.
CPC ...... *G06F 21/6227* (2013.01); *G06F 21/6254* (2013.01); *H04L 9/002* (2013.01); *H04L 9/0894* (2013.01); *G06F 2221/2107* (2013.01); *H04L 2209/42* (2013.01); *H04L 2209/60* (2013.01)

(58) Field of Classification Search
None
See application file for complete search history.

(56) References Cited

U.S. PATENT DOCUMENTS 5,963,642 A 10/1999 Goldstein
6,253,203 B1 * 6/2001 O'Flaherty ......... G06F 21/6245 707/999.102

(Continued)

OTHER PUBLICATIONS

Sweeney, "Computational Disclosure Control: A Primer on Data Privacy Protection." cambridge, MA: Massachusetts Institute of Technology Jan. 8, 2001.

(Continued)

*Primary Examiner* — Kaveh Abrishamkar
(74) *Attorney, Agent, or Firm* — Cittone Demers & Arneri LLP; Henry J. Cittone

(57) ABSTRACT

The present invention relates generally to a system and method of querying an anonymized database. More particularly, the invention provides a method and system for querying an anonymized database without the need to decrypt queried data while it's processed. Even more specifically, the invention provides a method and system of anonymizing a database such that it may be queried efficiently in near real time while still retaining the ability to not decrypt requested data while it's being processed.

10 Claims, 38 Drawing Sheets

Related U.S. Application Data

(60) Provisional application No. 61/326,405, filed on Apr. 21, 2010, provisional application No. 61/823,350, filed on May 14, 2013, provisional application No. 63/049,100, filed on Jul. 7, 2020, provisional application No. 63/049,306, filed on Jul. 8, 2020, provisional application No. 63/051,838, filed on Jul. 14, 2020.

(56) References Cited

U.S. PATENT DOCUMENTS 6,275,824 B1 8/2001 O'Flaherty
6,792,425 B2 9/2004 Yagawa
7,188,240 B1 * 3/2007 Berstis ................ G06F 21/6263 713/150
7,302,420 B2 11/2007 Aggarwal
7,500,111 B2 3/2009 Hacigumus
7,606,788 B2 10/2009 Samar
7,668,820 B2 2/2010 Zuleba
7,672,967 B2 3/2010 Fay
7,685,437 B2 3/2010 Hacigumus
7,933,909 B2 4/2011 Trepetin
7,958,162 B2 6/2011 Basile
8,112,422 B2 2/2012 Srivastava
8,626,749 B1 * 1/2014 Trepetin .............. G06F 21/6254 707/722
9,202,079 B2 * 12/2015 Kaliski, Jr. ......... G06F 21/6227
9,356,993 B1 * 5/2016 Kothari ............... H04L 63/0435
9,373,122 B2 * 6/2016 Beenau .............. G06Q 20/3829
9,442,980 B1 * 9/2016 Trepetin .............. G06F 16/2455
9,946,810 B1 * 4/2018 Trepetin .................... G06F 7/00
10,289,816 B1 * 5/2019 Malassenet ............ G06F 21/14
10,936,744 B1 * 3/2021 Trepetin .............. H04L 63/0421
2002/0169793 A1 11/2002 Sweeney
2003/0046572 A1 3/2003 Newman
2003/0220927 A1 11/2003 Iverson
2004/0243799 A1 12/2004 Hacigumus
2005/0010764 A1 * 1/2005 Collet ................... H04L 9/0819 713/165
2005/0049991 A1 3/2005 Aggarwal
2005/0147240 A1 7/2005 Agrawal
2005/0147246 A1 * 7/2005 Agrawal ............... H04L 9/0662 380/44
2005/0268094 A1 12/2005 Kohan
2005/0283621 A1 12/2005 Sato
2006/0020611 A1 1/2006 Gilbert
2007/0130106 A1 6/2007 Gadiraju
2007/0140479 A1 6/2007 Wang
2007/0233711 A1 10/2007 Aggarwal
2007/0255704 A1 11/2007 Baek
2008/0082566 A1 4/2008 Aggarwal
2008/0109459 A1 5/2008 Trepetin
2008/0114991 A1 5/2008 Jonas
2008/0133935 A1 6/2008 Elovici
2009/0018820 A1 1/2009 Sato
2009/0077378 A1 3/2009 Hacigumus
2009/0132419 A1 5/2009 Grammer
2009/0204964 A1 * 8/2009 Foley ...................... G06F 21/53 718/1
2009/0303237 A1 12/2009 Liu
2009/0327296 A1 12/2009 Francis
2009/0327748 A1 12/2009 Agrawal
2010/0058476 A1 3/2010 Isoda
2010/0077006 A1 3/2010 El Emam
2010/0114840 A1 5/2010 Srivastava
2010/0114920 A1 5/2010 Srivastava
2010/0192220 A1 7/2010 Heizmann
2010/0241641 A1 9/2010 Byun
2010/0275025 A1 * 10/2010 Parkinson ............. H04L 9/3247 713/176
2010/0281069 A1 11/2010 Stephenson
2010/0042583 A1 12/2010 Gervais
2011/0179011 A1 7/2011 Cardno
2011/0258704 A1 * 10/2011 Ichnowski .......... G06F 21/6227 726/26
2011/0277037 A1 11/2011 Burke
2014/0331062 A1 * 11/2014 Tewari ................ G06F 21/6227 713/189
2015/0013006 A1 * 1/2015 Shulman ............. H04L 63/1416 726/23
2018/0144148 A1 * 5/2018 Rattan ................... G06F 21/602

OTHER PUBLICATIONS

Menezes, "Chapter 1." Handbook of Applied Cryptography p. 1-48 Oct. 6, 1996.
Menezes, "Chapter 7." Handbook of Applied Cryptography p. 232-282 Oct. 6, 1996.
Menezes, "Chapter 8." Handbook of Applied Cryptography p. 283-319 Oct. 6, 1996.
Menezes, "Chapter 9." Handbook of Applied Cryptography p. 321-383 Oct. 6, 1996.
Fagin, "Comparing Information without Leaking It." Communications of the ACM 39(5):77-85 May 1, 1996.
Rivest, "On Data Banks and Privacy Homomorphisms." Foundations of Secure Computation p. 169-177 New York: Academic Press Oct. 16, 1978.
Wikipedia. "Deterministic Encryption." Retrieved from "http://en.wikipedia.org/w/index.php?title=Deterministic_encryption&oldid=19943764" Jul. 20, 2005.
Wikipedia "Probablistic Encryption." Retrieved from "http://en.wikipedia.org/w/index.php?title=Probabilistic_encryption&oldid=22475169" Sep. 3, 2005.
Song, "Practical Techniques for Searches on Encrypted Data." IEEE Symposium on Security and Privacy p. 44-55 May 14, 2000.
Agrawal, "Information Sharing Across Private Databases." Association for Computing Machinery, Special Interest Group on Management of Data Jun. 9-12, 2003.
Blakley, "A Database Encryption Scheme which Allows the Computation of Statistics using Encrypted Data." IEEE Symposium on Security and Privacy Apr. 22-24, 1985.
Domingo-Ferrer, "A Provably Secure Additive and Multiplicative Privacy Homomorphism." Lecture Notes in Computer Science 2433 p. 471-483 London: Springer-Verlag Sep. 5, 2002.
Chaum, "Multiparty Computations Ensuring Privacy of Each Party's Input and Correctness of the Result." Lecture Notes in Computer Science 293 p. 87-119 Aug. 16, 1987.
Chaum, "Multiparty Unconditionally Secure Protocols." Proceedings of the 20th Symposium on the Theory of Computing May 2, 1998.
Rivest, "Randomized Encryption Techniques." Advances in Cryptology: Proceedings of Crypto 82 p. 145-163 New York: Plenum Press Aug. 1, 1982.

* cited by examiner

B1 TABLE:

| first_name | last_name | city |
|---|---|---|
| Bob | Jones | Chicago |
| Sally | Smith | Tampa |
| George | Jones | Memphis |
| Sally | Lurie | Dallas |
| Sally | Jackson | Miami |
| Harry | Felix | San Diego |
| Bob | Smith | New York |
| Roger | Lurie | Newark |
| Will | Jones | Boston |

⇩

RESULTING E1 TABLE

| Column | Token | Frequency | Rows needed |
|---|---|---|---|
| first_name | Sally | 3 | 0 |
| first_name | Bob | 2 | 1 |
| first_name | George | 1 | 2 |
| first_name | Harry | 1 | 2 |
| first_name | Roger | 1 | 2 |
| first_name | Will | 1 | 0 |
| last_name | Jones | 3 | 0 |
| last_name | Smith | 2 | 1 |
| last_name | Lurie | 2 | 1 |
| last_name | Jackson | 1 | 2 |
| last_name | Felix | 1 | 2 |
| city | Chicago | 1 | 0 |
| city | Tampa | 1 | 0 |
| city | Memphis | 1 | 0 |
| city | Dallas | 1 | 0 |
| city | Miami | 1 | 0 |
| city | San Diego | 1 | 0 |
| city | New York | 1 | 0 |
| city | Newark | 1 | 0 |
| city | Boston | 1 | 0 |

Aggregate rows needed for first_name = 7

Aggregate rows needed for last_name = 6

Aggregate rows needed for city = 0

FIG. 1

B1 TABLE

| first_name | last_name | city | GpNum | RecInfo |
|---|---|---|---|---|
| Bob | Jones | Chicago | 1 | True |
| Sally | Smith | Tampa | 1 | True |
| George | Jones | Memphis | 1 | True |
| Sally | Lurie | Dallas | 2 | True |
| Sally | Jackson | Miami | 2 | True |
| Harry | Felix | San Diego | 3 | True |
| Bob | Smith | New York | 3 | True |
| Roger | Lurie | Newark | 3 | True |
| Will | Jones | Boston | 3 | True |

*Step 1: Copy random rows from B1 into C1 equaling in number to the maximum "rows needed" column value from E1, in this case 7.*

*Step 2: Create new groups in C1 (in this case groups 10 and 11 are created), and set the RecInfo values of the copied rows to False.*

RESULTING C1 TABLE

| first_name | last_name | city | GpNum | RecInfo |
|---|---|---|---|---|
| Bob | Jones | Chicago | 10 | False |
| Sally | Smith | Tampa | 10 | False |
| Sally | Lurie | Dallas | 10 | False |
| Sally | Jackson | Miami | 11 | False |
| Bob | Smith | New York | 11 | False |
| Roger | Lurie | Newark | 11 | False |
| Will | Jones | Boston | 11 | False |

FIG. 2

B1 TABLE

| first_name | other columns |
|---|---|
| Ron | ... |
| Jen | ... |
| Stu | ... |
| Jon | ... |
| Bob | ... |
| Jim | ... |
| Sal | ... |
| Roy | ... |
| Val | ... |

⇩

RESULTING F1 TABLE

| column | char. position | character | frequency | rows needed |
|---|---|---|---|---|
| first_name | 1 | J | 3 | 0 |
| first_name | 1 | R | 2 | 1 |
| first_name | 1 | S | 2 | 1 |
| first_name | 1 | B | 1 | 2 |
| first_name | 1 | V | 1 | 2 |
| first_name | 2 | o | 4 | 0 |
| first_name | 2 | a | 2 | 2 |
| first_name | 2 | e | 1 | 3 |
| first_name | 2 | i | 1 | 3 |
| first_name | 2 | t | 1 | 3 |
| first_name | 2 | e | 1 | 3 |
| first_name | 3 | n | 3 | 0 |
| first_name | 3 | l | 2 | 1 |
| first_name | 3 | y | 1 | 2 |
| first_name | 3 | m | 1 | 2 |
| first_name | 3 | b | 1 | 2 |
| first_name | 3 | u | 1 | 0 |

Aggregate rows needed for position 1 = 6

Aggregate rows needed for position 2 = 14

Aggregate rows needed for position 3 = 7

FIG. 3

B1 TABLE

| first_name | other columns | GpNum | RecInfo |
|---|---|---|---|
| Ron | ... | 1 | True |
| Jen | ... | 1 | True |
| Stu | ... | 2 | True |
| Jon | ... | 2 | True |
| Bob | ... | 2 | True |
| Jim | ... | 2 | True |
| Sal | ... | 3 | True |
| Roy | ... | 3 | True |
| Val | ... | 3 | True |

*Step 1: Copy random rows from B1 into D1 equaling in number to the maximum "rows needed" column value, in this case 14.*

*Step 2: Create new groups in D1 (in this case, groups 10-14 are created), and set the RecInfo values for those rows to False.*

RESULTING D1 TABLE

| first_name | other columns | GpNum | RecInfo |
|---|---|---|---|
| Ron | ... | 10 | False |
| Jen | ... | 10 | False |
| Stu | ... | 10 | False |
| Jon | ... | 11 | False |
| Bob | ... | 11 | False |
| Jim | ... | 11 | False |
| Sal | ... | 12 | False |
| Roy | ... | 12 | False |
| Val | ... | 12 | False |
| Ron | ... | 13 | False |
| Jen | ... | 13 | False |
| Jon | ... | 13 | False |
| Bob | ... | 14 | False |
| Sal | ... | 14 | False |

FIG. 4

E1 TABLE

| Column | Token | Frequency | Rows needed |
|---|---|---|---|
| last_name | Jones | 3 | 0 |
| last_name | Smith | 2 | 1 |
| last_name | Lurie | 2 | 1 |
| last_name | Jackson | 1 | 2 |
| last_name | Felix | 1 | 2 |

C1 TABLE

| first_name | last_name | city | GpNum | RecInfo |
|---|---|---|---|---|
| Bob | Jones | Chicago | 10 | False |
| Sally | Smith | Tampa | 10 | False |
| Sally | Lurie | Dallas | 10 | False |
| Sally | Jackson | Miami | 11 | False |
| Bob | Smith | New York | 11 | False |
| Roger | Lurie | Newark | 11 | False |
| Will | Jones | Boston | 11 | False |

FIG. 5

TRANSFORMED C1 TABLE

| first_name | last_name | city | GpNum | RecInfo |
|---|---|---|---|---|
| Bob | Smith | Chicago | 10 | False |
| Sally | Lurie | Tampa | 10 | False |
| Sally | Jackson | Dallas | 10 | False |
| Sally | Jackson | Miami | 11 | False |
| Bob | Felix | New York | 11 | False |
| Roger | Felix | Newark | 11 | False |
| Will | Jones | Boston | 11 | False |

FIG. 6

F1 TABLE

| column | char. position | character | frequency | rows needed |
|---|---|---|---|---|
| first_name | 1 | J | 3 | 0 |
| first_name | 1 | R | 2 | 1 |
| first_name | 1 | S | 2 | 1 |
| first_name | 1 | B | 1 | 2 |
| first_name | 1 | V | 1 | 2 |

D1 TABLE

| first_name | other columns | GpNum | RecInfo |
|---|---|---|---|
| Ron | ... | 10 | False |
| Jen | ... | 10 | False |
| Stu | ... | 10 | False |
| Jon | ... | 11 | False |
| Bob | ... | 11 | False |
| Jim | ... | 11 | False |
| Sal | ... | 12 | False |
| Roy | ... | 12 | False |
| Val | ... | 12 | False |
| Ron | ... | 13 | False |
| Jen | ... | 13 | False |
| Jon | ... | 13 | False |
| Bob | ... | 14 | False |
| Sal | ... | 14 | False |

FIG. 7

TRANSFORMED D1 TABLE

| first_name | other columns | GpNum | RecInfo |
|---|---|---|---|
| Ron | ... | 10 | False |
| Sen | ... | 10 | False |
| Btu | ... | 10 | False |
| Bon | ... | 11 | False |
| Vob | ... | 11 | False |
| Vim | ... | 11 | False |
| Jal | ... | 12 | False |
| Roy | ... | 12 | False |
| Sal | ... | 12 | False |
| Bon | ... | 13 | False |
| Ven | ... | 13 | False |
| Jon | ... | 13 | False |
| Rob | ... | 14 | False |
| Sal | ... | 14 | False |

| first_name | last_name | GpNum | RecInfo |
|---|---|---|---|
| Bill | Russel | 19 | True |

*Step 1. For each group, for every string column, obtain the lengths of each string value and map them to the characters representing them in the ordered V1.*

| For group 19, for column first_name: | For group 19, for column last_name: |
|---|---|
| - "Bill" has length of 4 and therefore is associated with character "d" in V1. | - "Russel" has length of 6 and therefore is associated with character "f" in V1. |

*Step 2. Permute the characters representing all the string lengths using the subkey representing those strings length columns and groups using the Private Key in memory. (Ultimately, the sub-keys are combined into one encoding file. They are divided here just for clarity). Store the encoded lengths in the RecInfo column.*

Subkey 1:

| Original char. | Permuted char. | Length_col | Group Num |
|---|---|---|---|
| d | 4 | first_name | 19 |
| *<other character length representations>* | *<other permuted character length representations>* | first_name | 19 |

Subkey 2:

| Original char. | Permuted char. | Length_col | Group Num |
|---|---|---|---|
| f | u | last_name | 19 |
| *<other character length representations>* | *<other permuted character length representations>* | last_name | 19 |

| first_name | last_name | GpNum | RecInfo |
|---|---|---|---|
| Bill | Russel | 19 | True \| 4 \| u \| |

FIG. 9

PADDED B2 TABLE

| last_name | more cols. | GpNum |
|---|---|---|
| SmithSm | ... | 1 |
| Jackson | ... | 1 |
| SmithSm | ... | 2 |
| RyanRya | ... | 2 |
| Jackson | ... | 3 |
| WilsonW | ... | 3 |

EXTRACTED X1 TABLE

| padded col. |
|---|
| SmithSm |
| Jackson |
| RyanRya |
| WilsonW |

EXPANDED X1 TABLE

| padded col. | GpNum |
|---|---|
| SmithSm | 1 |
| Jackson | 1 |
| RyanRya | 1 |
| WilsonW | 1 |
| SmithSm | 2 |
| Jackson | 2 |
| RyanRya | 2 |
| WilsonW | 2 |
| SmithSm | 3 |
| Jackson | 3 |
| RyanRya | 3 |
| WilsonW | 3 |
| SmithSm | 4 |
| Jackson | 4 |
| RyanRya | 4 |
| WilsonW | 4 |

FIG. 10

RESULT SET RECEIVED FROM SERVER

| l_name | salary | age | GpNum | RecInfo | RowNum |
|---|---|---|---|---|---|
| r7dd | [(30000-25)*578892]+1232114 | [(17-45)*578892]+872123 | 23 | d | 7831 |
| w$kZ | [(18000-96)*866311]+799001 | [(55-118)*1107932]+605532 | 72 | H | 10995 |

*Step 1: Discard all rows which belong to false groups using the Private Key file in memory showing which GpNums are false and which are true.*

| GpNum | Validity |
|---|---|
| 23 | False |
| 72 | True |
| *<Other group numbers>* | *<Other True or False indicators>* |

| l_name | salary | age | GpNum | RecInfo | RowNum |
|---|---|---|---|---|---|
| w$kZ | [(18000-96)*866311]+799001 | [(55-118)*1107932]+605532 | 72 | H | 10995 |

*Step 2: Decode the length of all string columns using the Private Key file (the encoding file) showing how each string column length in each group, represented by a character in the ODB domain, is permuted into a different character in the ODB domain. Trim the string values as required by the lengths. (In this Figure, imagine the domain includes the alphabetized lower-case letters, alphabetized capital letters, and the digits 0-9, in that specific order within V1. The encoding "H" is a permutation of the character "c" as seen in the table immediately below. The character "c", in turn, means that the string has a length of 3 characters because "c" is the 3rd character in the list of all characters in the ordered V1. The encoded l_name must therefore be trimmed to a length of 3).*

| column | length representation | permuted length representation | GpNum |
|---|---|---|---|
| l_name | c | H | 72 |
| *<Other columns>* | *<Other lengths representations>* | *<Other permuted length representations>* | *<Other group numbers>* |

| l_name | salary | age | GpNum | RecInfo | RowNum |
|---|---|---|---|---|---|
| **w$k** | [(18000-96)*866311]+799001 | [(55-118)*1107932]+605532 | 72 | H | 10995 |

FIG. 11A (REPRODUCED ROW)

| l_name | salary | age | GpNum | RecInfo | RowNum |
|---|---|---|---|---|---|
| **w$k** | [(18000-96)*866311]+799001 | [(55-118)*1107932]+605532 | 72 | H | 10995 |

*Step 3: Decode all the string columns by decoding one character position at a time using the Private Key file (the encoding file) in memory showing how each position in each column and group was originally permuted.*

| Original char. | Permuted char. | Column | Position | GpNum |
|---|---|---|---|---|
| L | w | last_name | 1 | 72 |
| e | $ | last_name | 2 | 72 |
| e | k | last_name | 3 | 72 |
| *<Other characters>* | *<Other permutations>* | *<Other string columns>* | *<Other character positions>* | *<Other group numbers>* |

| l_name | salary | age | GpNum | RecInfo | RowNum |
|---|---|---|---|---|---|
| **Lee** | [(18000-96)*866311]+799001 | [(55-118)*1107932]+605532 | 72 | H | 10995 |

*Step 4: Begin numeric decoding by re-instating the outliers. Check the RowNums returned in the result set. If any match the outlier RowNums in the Private Key file in memory, extract the original outlier value(s) and exchange it with the outlier value in the result set. (Note, in our implementation of the Private Key file, we placed all the outliers across different columns connected to a single RowNum in one row. It's also possible to have multiple rows for each RowNum rather than a single row in the Private Key file. Each such row would deal with a different column and its particular outlier value).*

| RowNum | column | original_value | *<more cols.>* | *<more orig. vals.>* |
|---|---|---|---|---|
| 10995 | salary | 89000 | *<more columns for this row>* | *<more original values for this row>* |
| *<Other row numbers>* | *<Other columns>* | *<Other original outlier values>* | *<more columns for other rows>* | *<more original values for other rows>* |

| l_name | salary | age | GpNum | RecInfo | RowNum |
|---|---|---|---|---|---|
| Lee | **89000** | [(55-118)*1107932]+605532 | 72 | H | 10995 |

FIG. 11B (REPRODUCED ROW)

| l_name | salary | age | GpNum | RecInfo | RowNum |
|---|---|---|---|---|---|
| Lee | **89000** | [(55-118)*1107932]+605532 | 72 | H | 10995 |

*Step 5: Finish numeric decoding. Compute the original values of all the numeric columns (the formula is: original value = ([encoded_value – random addend] / random multiplier) + average)) using the Private Key file in memory showing the average, random addend, and random multiplier for each numeric column for each group.*

| column | average_val | random_multiplier | random_addend | GpNum |
|---|---|---|---|---|
| age | 118 | 1107932 | 605532 | 72 |
| *<Other numeric columns>* | *<Other averages>* | *<Other random multipliers>* | *<Other random addends>* | *<Other group numbers>* |

| l_name | salary | age | GpNum | RecInfo | RowNum |
|---|---|---|---|---|---|
| Lee | 89000 | **55** | 72 | H | 10995 |

*Step 6: Present the decoded result set to the application. (Remove the GpNum, RecInfo, and RowNum columns).*

| l_name | salary | age |
|---|---|---|
| Lee | 89000 | 55 |

FIG. 11C

INTAKE TABLE

| l_name | more col. | GpNum |
|---|---|---|
| ***hf8$kL*** | ***...*** | ***1*** |
| ***TubD'p*** | ***...*** | ***1*** |
| s4gQwn | ... | 2 |
| s0ifGz | ... | 2 |
| ***Wd.bwx*** | ***...*** | ***3*** |
| pe62dd | ... | 3 |
| ***xrtQu7*** | ***...*** | ***4*** |
| hoy,r3 | ... | 4 |
| ***xrtQu7*** | ***...*** | ***4*** |

EXPANDED X1 TABLE

| l_name | GpNum |
|---|---|
| ***lj9drr*** | ***1*** |
| ***Cc3f7a*** | ***1*** |
| ***TubD'p*** | ***1*** |
| hf8$kL | 1 |
| BdB5sw | 2 |
| Dt6ac9 | 2 |
| ***hIr7dw*** | ***2*** |
| gvT7ul | 2 |
| ***Wd.bwx*** | ***3*** |
| fy5mhi | 3 |
| X4ets2 | 3 |
| ***4J.det*** | ***3*** |
| d43hit | 4 |
| 3qD'c. | 4 |
| ujwW2a | 4 |
| ***xrtQu7*** | ***4*** |

DISCHARGE TABLE

| l_name | more col. | GpNum |
|---|---|---|
| ***lj9drr*** | ***...*** | ***1*** |
| ***Cc3f7a*** | ***...*** | ***1*** |
| ***hIr7dw*** | ***...*** | ***2*** |
| ***hIr7dw*** | ***...*** | ***2*** |
| ***4J.det*** | ***...*** | ***3*** |

*Step 1: JOIN intake table to X1 on l_name and place results into J1. (This is the first component of J1).*

*Step 2: JOIN X1 to discharge table on l_name GROUPing BY frequency and place results into J1. (This is the second component of J1).*

RESULTING J1 TABLE (SENT TO CLIENT)

| l_name | more col. | GpNum | l_name | GpNum | frequency |
|---|---|---|---|---|---|
| hf8$kL | ... | 1 | *NULL* | *NULL* | *NULL* |
| TubD'p | ... | 1 | *NULL* | *NULL* | *NULL* |
| Wd.bwx | ... | 3 | *NULL* | *NULL* | *NULL* |
| xrtQu7 | ... | 4 | *NULL* | *NULL* | *NULL* |
| xrtQu7 | ... | 4 | *NULL* | *NULL* | *NULL* |
| *NULL* | *NULL* | *NULL* | lj9drr | 1 | 1 |
| *NULL* | *NULL* | *NULL* | Cc3f7a | 1 | 1 |
| *NULL* | *NULL* | *NULL* | hIr7dw | 2 | 2 |
| *NULL* | *NULL* | *NULL* | 4J.det | 3 | 1 |

J1's 1st component (first five rows)

J1's 2nd component (last four rows)

FIG. 12A (REPRODUCED J1 TABLE)

| l_name | more col. | GpNum | l_name | GpNum | frequency |
|---|---|---|---|---|---|
| hf8SkL | ... | 1 | *NULL* | *NULL* | *NULL* |
| TubD'p | ... | 1 | *NULL* | *NULL* | *NULL* |
| Wd.bwx | ... | 3 | *NULL* | *NULL* | *NULL* |
| xrtQu7 | ... | 4 | *NULL* | *NULL* | *NULL* |
| xrtQu7 | ... | 4 | *NULL* | *NULL* | *NULL* |
| *NULL* | *NULL* | *NULL* | lj9drr | 1 | 1 |
| *NULL* | *NULL* | *NULL* | Cc3f7a | 1 | 1 |
| *NULL* | *NULL* | *NULL* | hIr7dw | 2 | 2 |
| *NULL* | *NULL* | *NULL* | 4J.dct | 3 | 1 |

J1's 1st component (first five rows)

J1's 2nd component (last four rows)

*Step 3: Remove the encoding from the needed column (in this case, l_name) in both J1 components.*

DECODED J1 TABLE

| l_name | more col. | GpNum | l_name | GpNum | frequency |
|---|---|---|---|---|---|
| SmithS | ... | 1 | *NULL* | *NULL* | *NULL* |
| KellyK | ... | 1 | *NULL* | *NULL* | *NULL* |
| Russel | ... | 3 | *NULL* | *NULL* | *NULL* |
| SmithS | ... | 4 | *NULL* | *NULL* | *NULL* |
| SmithS | ... | 4 | *NULL* | *NULL* | *NULL* |
| *NULL* | *NULL* | *NULL* | Russel | 1 | 1 |
| *NULL* | *NULL* | *NULL* | JohnJo | 1 | 1 |
| *NULL* | *NULL* | *NULL* | KellyK | 2 | 2 |
| *NULL* | *NULL* | *NULL* | SmithS | 3 | 1 |

J1's 1st component (first five rows)

J1's 2nd component (last four rows)

RESULT SET

| l_name | more col. | GpNum |
|---|---|---|
| Russel | ... | 3 |
| KellyK | ... | 1 |
| KellyK | ... | 1 |
| SmithS | ... | 1 |
| SmithS | ... | 4 |
| SmithS | ... | 4 |

*Step 4. Loop over the J1 table on the client. For each row P in the second component of J1, find every matching row Q in the first component of J1. Repeat Q in the result set presented to user as many times as specified by the frequency count of P. (In this Figure, "SmithS" is repeated 3 times in the result set because it has a single occurrence in J1's second component and is found 3 times in J1's first component. "KellyK" is repeated twice in the result set because it's found with a frequency of 2 in J1's second component and has a single matching row in J1's first component. (The rest of the information in the result set comes from J1's first component because we are interested A1's rows of the INNER JOIN).*

FIG. 12B

| | | | | |
|---|---|---|---|---|
| a | bc | abb | bba | cac |
| b | ca | abc | bbb | cba |
| c | cb | aca | bbc | cbb |
| aa | cc | acb | bca | cbc |
| ab | aaa | acc | bcb | cca |
| ac | aab | baa | bcc | ccb |
| ba | aac | bab | caa | ccc |
| bb | aba | bac | cab | |

| Plaintext | Group | Plaintext | Group | Plaintext | Group | Plaintext | Group | Plaintext | Group |
|---|---|---|---|---|---|---|---|---|---|
| a | 1 | abc | 2 | bab | 3 | bcb | 1 | cba | 3 |
| aa | 2 | ac | 3 | bac | 1 | bcc | 1 | cbb | 1 |
| aaa | 3 | aca | 3 | bb | 3 | c | 2 | cbc | 1 |
| aab | 2 | acb | 3 | bba | 1 | ca | 1 | cc | 1 |
| aac | 3 | acc | 1 | bbb | 1 | caa | 2 | cca | 3 |
| ab | 3 | b | 3 | bbc | 3 | cab | 2 | ccb | 1 |
| aba | 3 | ba | 1 | bc | 2 | cac | 2 | ccc | 2 |
| abb | 2 | baa | 2 | bca | 2 | cb | 1 | | |

GROUP 1

| Plaintext | Group | Plaintext | Group |
|---|---|---|---|
| a | 1 | ca | 1 |
| acc | 1 | cb | 1 |
| ba | 1 | cbb | 1 |
| bac | 1 | cbc | 1 |
| bba | 1 | cc | 1 |
| bbb | 1 | ccb | 1 |
| bcb | 1 | | |
| bcc | 1 | | |

GROUP 2

| Plaintext | Group | Plaintext | Group |
|---|---|---|---|
| aa | 2 | caa | 2 |
| aab | 2 | cab | 2 |
| abb | 2 | cac | 2 |
| abc | 2 | ccc | 2 |
| baa | 2 | | |
| bc | 2 | | |
| bca | 2 | | |
| c | 2 | | |

GROUP 3

| Plaintext | Group | Plaintext | Group |
|---|---|---|---|
| aaa | 3 | bab | 3 |
| aac | 3 | bb | 3 |
| ab | 3 | bbc | 3 |
| aba | 3 | cba | 3 |
| ac | 3 | cca | 3 |
| aca | 3 | | |
| acb | 3 | | |
| b | 3 | | |

FIG. 16

GROUP 1

| Plaintext | Group | Encrypted | Plaintext | Group | Encrypted |
|---|---|---|---|---|---|
| a | 1 | b | ca | 1 | bbc |
| acc | 1 | ba | cb | 1 | bc |
| ba | 1 | baa | cbb | 1 | bca |
| bac | 1 | bab | cbc | 1 | bcb |
| bba | 1 | bac | cc | 1 | bcc |
| bbb | 1 | bb | ccb | 1 | c |
| bcb | 1 | bba | | | |
| bcc | 1 | bbb | | | |

GROUP 2

| Plaintext | Group | Encrypted | Plaintext | Group | Encrypted |
|---|---|---|---|---|---|
| aa | 2 | ca | caa | 2 | cc |
| aab | 2 | caa | cab | 2 | cca |
| abb | 2 | cab | cac | 2 | ccb |
| abc | 2 | cac | ccc | 2 | ccc |
| baa | 2 | cb | | | |
| bc | 2 | cba | | | |
| bca | 2 | cbb | | | |
| c | 2 | cbc | | | |

GROUP 3

| Plaintext | Group | Encrypted | Plaintext | Group | Encrypted |
|---|---|---|---|---|---|
| aaa | 3 | a | bab | 3 | abc |
| aac | 3 | aa | bb | 3 | ac |
| ab | 3 | aaa | bbc | 3 | aca |
| aba | 3 | aab | cba | 3 | acb |
| ac | 3 | aac | cca | 3 | acc |
| aca | 3 | ab | | | |
| acb | 3 | aba | | | |
| b | 3 | abb | | | |

FIG. 17

| | | | |
|---|---|---|---|
| aaa | acb | bbc | cba |
| aab | acc | bca | cbb |
| aac | baa | bcb | cbc |
| aba | bab | bcc | cca |
| abb | bac | caa | ccb |
| abc | bba | cab | ccc |
| aca | bbb | cac | |

FIG. 18

| Plaintext | Group | Plaintext | Group | Plaintext | Group | Plaintext | Group |
|---|---|---|---|---|---|---|---|
| aaa | 2 | acb | 3 | bbc | 1 | cba | 3 |
| aab | 3 | acc | 3 | bca | 3 | cbb | 2 |
| aac | 2 | baa | 1 | bcb | 3 | cbc | 1 |
| aba | 1 | bab | 2 | bcc | 3 | cca | 2 |
| abb | 1 | bac | 3 | caa | 1 | ccb | 1 |
| abc | 3 | bba | 2 | cab | 1 | ccc | 3 |
| aca | 2 | bbb | 2 | cac | 2 | | |

FIG. 19

GROUP 1

| Plaintext | Group | Plaintext | Group |
|---|---|---|---|
| aba | 1 | cab | 1 |
| abb | 1 | cbc | 1 |
| baa | 1 | ccb | 1 |
| bbc | 1 | | |
| caa | 1 | | |

GROUP 2

| Plaintext | Group | Plaintext | Group |
|---|---|---|---|
| aaa | 2 | bbb | 2 |
| aac | 2 | cac | 2 |
| aca | 2 | cbb | 2 |
| bab | 2 | cca | 2 |
| bba | 2 | | |

GROUP 3

| Plaintext | Group | Plaintext | Group |
|---|---|---|---|
| aab | 3 | bca | 3 |
| abc | 3 | bcb | 3 |
| acb | 3 | bcc | 3 |
| acc | 3 | cba | 3 |
| bac | 3 | ccc | 3 |

FIG. 20

GROUP 1

| Plaintext | Group | Encrypted | Plaintext | Group | Encrypted |
|---|---|---|---|---|---|
| aba | 1 | baa | cab | 1 | bbc |
| abb | 1 | bab | cbc | 1 | bca |
| baa | 1 | bac | ccb | 1 | bcb |
| bbc | 1 | bba | | | |
| caa | 1 | bbb | | | |

GROUP 2

| Plaintext | Group | Encrypted | Plaintext | Group | Encrypted |
|---|---|---|---|---|---|
| aaa | 2 | aaa | bbb | 2 | abc |
| aac | 2 | aab | cac | 2 | aca |
| aca | 2 | aac | cbb | 2 | acb |
| bab | 2 | aba | cca | 2 | acc |
| bba | 2 | abb | | | |

GROUP 3

| Plaintext | Group | Encrypted | Plaintext | Group | Encrypted |
|---|---|---|---|---|---|
| aab | 3 | bcc | bca | 3 | cbb |
| abc | 3 | caa | bcb | 3 | cbc |
| acb | 3 | cab | bcc | 3 | cca |
| acc | 3 | cac | cba | 3 | ccb |
| bac | 3 | cba | ccc | 3 | ccc |

FIG. 21

| Plaintext | Group | Plaintext | Group | Plaintext | Group | Plaintext | Group | Plaintext | Group |
|---|---|---|---|---|---|---|---|---|---|
| $a^{1}$ | 1 | abc | 2 | $bab^{3}$ | 3 | bcb | 1 | $cba^{3}$ | 3 |
| $aa^{2}$ | 2 | ac | 3 | $bac^{1}$ | 1 | $bcc^{1}$ | 1 | cbb | 1 |
| $aaa^{3}$ | 3 | $aca^{3}$ | 3 | bb | 3 | $c^{2}$ | 2 | cbc | 1 |
| aab | 2 | acb | 3 | bba | 1 | ca | 1 | $cc^{1}$ | 1 |
| aac | 3 | $acc^{1}$ | 1 | $bbb^{1}$ | 1 | caa | 2 | $cca^{3}$ | 3 |
| $ab^{3}$ | 3 | b | 3 | $bbc^{3}$ | 3 | cab | 2 | ccb | 1 |
| aba | 3 | ba | 1 | $bc^{2}$ | 2 | $cac^{2}$ | 2 | $ccc^{2}$ | 2 |
| $abb^{2}$ | 2 | $baa^{2}$ | 2 | bca | 2 | $cb^{1}$ | 1 | | |

FIG. 22

GROUP 1

| Plaintext | Group | Encrypted | Plaintext | Group | Encrypted |
|---|---|---|---|---|---|
| a[1] | 1 | b | ca | 1 | bbc |
| acc[1] | 1 | ba | cb[1] | 1 | bc |
| ba | 1 | baa | cbb | 1 | bca |
| bac[1] | 1 | bab | cbc | 1 | bcb |
| bba | 1 | bac | cc[1] | 1 | bcc |
| bbb[1] | 1 | bb | ccb | 1 | c |
| bcb | 1 | bba | | | |
| bcc[1] | 1 | bbb | | | |

GROUP 2

| Plaintext | Group | Encrypted | Plaintext | Group | Encrypted |
|---|---|---|---|---|---|
| aa[2] | 2 | ca | caa | 2 | cc |
| aab | 2 | caa | cab | 2 | cca |
| abb[2] | 2 | cab | cac[2] | 2 | ccb |
| abc | 2 | cac | ccc[2] | 2 | ccc |
| baa[2] | 2 | cb | | | |
| bc[2] | 2 | cba | | | |
| bca | 2 | cbb | | | |
| c[2] | 2 | cbc | | | |

GROUP 3

| Plaintext | Group | Encrypted | Plaintext | Group | Encrypted |
|---|---|---|---|---|---|
| aaa[3] | 3 | a | bab[3] | 3 | abc |
| aac | 3 | aa | bb | 3 | ac |
| ab[3] | 3 | aaa | bbc[3] | 3 | aca |
| aba | 3 | aab | cba[3] | 3 | acb |
| ac | 3 | aac | cca[3] | 3 | acc |
| aca[3] | 3 | ab | | | |
| acb | 3 | aba | | | |
| b | 3 | abb | | | |

FIG. 23

| PEKS # | Group | Plaintext | Seed | Encrypted | PEKS # | Group | Plaintext | Seed | Encrypted |
|---|---|---|---|---|---|---|---|---|---|
| 1 | 1 | a[1] | Yes | b | 5 | 1 | bbb[1] | Yes | bb |
| 1 | 2 | aa[2] | No | ca | 5 | 2 | bc[2] | No | cba |
| 1 | 3 | aaa[3] | No | a | 5 | 3 | bbc[3] | No | aca |
| 2 | 1 | N/A | No | | 6 | 1 | bcc[1] | Yes | bbb |
| 2 | 2 | abb[2] | No | cab | 6 | 2 | c[2] | No | cbc |
| 2 | 3 | ab[3] | Yes | aaa | 6 | 3 | N/A | No | |
| 3 | 1 | acc[1] | No | ba | 7 | 1 | cb[1] | No | bc |
| 3 | 2 | N/A | No | | 7 | 2 | cac[2] | Yes | ccb |
| 3 | 3 | aca[3] | Yes | ab | 7 | 3 | cba[3] | No | acb |
| 4 | 1 | bac[1] | No | bab | 8 | 1 | cc[1] | Yes | bcc |
| 4 | 2 | baa[2] | Yes | cb | 8 | 2 | ccc[2] | No | ccc |
| 4 | 3 | bab[3] | No | abc | 8 | 3 | cca[3] | No | acc |

FIG. 24

*Browser encrypts user input before sending to the remote server. (In the below illustration, seen through proxy Fiddler as an example, the request also gets a successful acknowledgement from server (return code=200) when the server receives the data).*

*Encrypt the query in the browser and send the encrypted query to the remote server for processing. (In the below illustration, the server acknowledges the receipt from browser (return code=200)).*

*Encrypted information is retrieved from the server as a response to the search query (step A.4. The return code of "HTTP/1.1 200 OK" indicates the server's successful response to the request).*

| | | | | | | |
|---|---|---|---|---|---|---|
| a (=97 in ASCII) | b (=98 in ASCII) | c (=99 in ASCII) | d (=100 in ASCII) | e (=101 in ASCII) | f (=102 in ASCII) | h (=104 in ASCII) |
| 0110 0001 | 0110 0010 | 0110 0011 | 0110 0100 | 0110 0101 | 0110 0110 | 0110 1000 |
| bigram P1 | | bigram P2 | | bigram P3 | | section Pz |

| | | | | | | |
|---|---|---|---|---|---|---|
| Sub-key1 cell value at (97,98)=48932 | | Sub-key1 cell value at (99,100)=21389 | | Sub-key1 cell value at (101,102)=8732 | | Sub-key2 cell value at row 104=12 |
| 1011 1111 | 0010 0100 | 0101 0011 | 1000 1101 | 0010 0010 | 0001 1100 | 0000 1100 |
| bigram P1 | | bigram P2 | | bigram P3 | | section Pz |

| Row | bigram P1 | bigram P2 | bigram P3 | section Pz |
|---|---|---|---|---|
| 1 | 1 | 0 | 0 | 0 |
| 2 | 0 | 1 | 0 | 0 |
| 3 | 1 | 0 | 1 | 0 |
| 4 | 1 | 1 | 0 | 0 |
| 5 | 1 | 0 | 0 | 1 |
| 6 | 1 | 0 | 0 | 1 |
| 7 | 1 | 1 | 1 | 0 |
| 8 | 1 | 1 | 0 | 0 |
| 9 | 0 | 1 | 0 | |
| 10 | 0 | 0 | 0 | |
| 11 | 1 | 0 | 0 | |
| 12 | 0 | 0 | 1 | |
| 13 | 0 | 1 | 1 | |
| 14 | 1 | 1 | 1 | |
| 15 | 0 | 0 | 0 | |
| 16 | 0 | 1 | 0 | |

Figure 37

| row 1 | row 2 | row 3 | row 4 | row 5 | row 6 | row 7 | row 8 | row 9 | row 10 | row 11 | row 12 | row 13 | row 14 | row 15 | row 16 |
|---|---|---|---|---|---|---|---|---|---|---|---|---|---|---|---|
| 1000 | 0100 | 1010 | 1100 | 1001 | 1001 | 1110 | 1100 | 010 | 000 | 100 | 001 | 011 | 111 | 000 | 010 |

Figure 38

| row 1 | row 2 | row 3 | row 4 | row 5 | row 6 | row 7 | row 8 | row 9 | row 10 | row 11 | row 12 | row 13 | row 14 | row 15 | row 16 |
|---|---|---|---|---|---|---|---|---|---|---|---|---|---|---|---|
| 1000 | 0100 | 1010 | 1100 | 1001 | 1001 | 1110 | 1100 | 010 | 000 | 100 | 001 | 011 | 111 | 000 | 010 |

⇩

| 1000 0100 | 1010 1100 | 1001 1001 | 1110 1100 | 0100 0010 | 0001 0111 | 1100 0010 |
|---|---|---|---|---|---|---|
| ASCII value=132 | ASCII value=172 | ASCII value=153 | ASCII value=236 | ASCII value=66 | ASCII value=23 | ASCII value=194 |
| bigram C1 | | bigram C2 | | bigram C3 | | section Cz |

Figure 39

| | | | | | | |
|---|---|---|---|---|---|---|
| Sub-key3 cell value at (132,172)=56119 | | Sub-key3 cell value at (153,236)=12522 | | Sub-key3 cell value at (66,23)=671 | | Sub-key4 cell value at row 194=183 |
| 1101 1011 | 0011 0111 | 0011 0000 | 1110 1010 | 0000 0010 | 1001 1111 | 1011 0111 |
| bigram C1 | | bigram C2 | | bigram C3 | | section Cz |

Figure 40

| | | | | | | |
|---|---|---|---|---|---|---|
| 1101 1011 | 0011 0111 | 0011 0000 | 1110 1010 | 0000 0010 | 1001 1111 | 1011 0111 |
| ▓ | 7 | 0 | Ω | *<Start of Text>* | *ƒ* | ╖ |

Figure 41

| | | | | | | |
|---|---|---|---|---|---|---|
| a (=97 in ASCII) | b (=98 in ASCII) | c (=99 in ASCII) | d (=100 in ASCII) | e (=101 in ASCII) | f (=102 in ASCII) | i (=105 in ASCII) |
| 0110 0001 | 0110 0010 | 0110 0011 | 0110 0100 | 0110 0101 | 0110 0110 | 0110 1001 |
| bigram P1 | | bigram P2 | | bigram P3 | | section Pz |

Figure 42

| | | | | | | |
|---|---|---|---|---|---|---|
| Sub-key1 cell value at (97,98)=48932 | | Sub-key1 cell value at (99,100)=21389 | | Sub-key1 cell value at (101,102)=8732 | | Sub-key2 cell value at row 105=135 |
| 1011 1111 | 0010 0100 | 0101 0011 | 1000 1101 | 0010 0010 | 0001 1100 | 1000 0111 |
| bigram Q1 | | bigram Q2 | | bigram Q3 | | section Qz |

Figure 43

| Row | bigram Q1 | bigram Q2 | bigram Q3 | section Qz |
|---|---|---|---|---|
| 1 | 1 | 0 | 0 | 1 |
| 2 | 0 | 1 | 0 | 0 |
| 3 | 1 | 0 | 1 | 0 |
| 4 | 1 | 1 | 0 | 0 |
| 5 | 1 | 0 | 0 | 0 |
| 6 | 1 | 0 | 0 | 1 |
| 7 | 1 | 1 | 1 | 1 |
| 8 | 1 | 1 | 0 | 1 |
| 9 | 0 | 1 | 0 | |
| 10 | 0 | 0 | 0 | |
| 11 | 1 | 0 | 0 | |
| 12 | 0 | 0 | 1 | |
| 13 | 0 | 1 | 1 | |
| 14 | 1 | 1 | 1 | |
| 15 | 0 | 0 | 0 | |
| 16 | 0 | 1 | 0 | |

Figure 44

| row 1 | row 2 | row 3 | row 4 | row 5 | row 6 | row 7 | row 8 | row 9 | row 10 | row 11 | row 12 | row 13 | row 14 | row 15 | row 16 |
|---|---|---|---|---|---|---|---|---|---|---|---|---|---|---|---|
| 1001 | 0100 | 1010 | 1100 | 1000 | 1001 | 1111 | 1101 | 010 | 000 | 100 | 001 | 011 | 111 | 000 | 010 |

Figure 45

| row 1 | row 2 | row 3 | row 4 | row 5 | row 6 | row 7 | row 8 | row 9 | row 10 | row 11 | row 12 | row 13 | row 14 | row 15 | row 16 |
|---|---|---|---|---|---|---|---|---|---|---|---|---|---|---|---|
| 1001 | 0100 | 1010 | 1100 | 1000 | 1001 | 1111 | 1101 | 010 | 000 | 100 | 001 | 011 | 111 | 000 | 010 |

⇩

| | | | | | | |
|---|---|---|---|---|---|---|
| 1001 0100 | 1010 1100 | 1000 1001 | 1111 1101 | 0100 0010 | 0001 0111 | 1100 0010 |
| ASCII value=148 | ASCII value=172 | ASCII value=137 | ASCII value=253 | ASCII value=66 | ASCII value=23 | ASCII value=194 |
| bigram D1 | | bigram D2 | | bigram D3 | | section Dz |

Figure 46

| Sub-key3 cell value at (148,172)=32667 | | Sub-key3 cell value at (137,253)=60552 | | Sub-key3 cell value at (66,23)=671 | | Sub-key4 cell value at row 194=183 |
|---|---|---|---|---|---|---|
| 1111 1111 | 1001 1011 | 1110 1100 | 1000 1000 | 0000 0010 | 1001 1111 | 1011 0111 |
| bigram D1 | | bigram D2 | | bigram D3 | | section Dz |

Figure 47

| | | | | | | |
|---|---|---|---|---|---|---|
| 1111 1111 | 1001 1011 | 1110 1100 | 1000 1000 | 0000 0010 | 1001 1111 | 1011 0111 |
| <blank> | ¢ | ∞ | ê | <Start of Text> | ƒ | ╖ |

| | | | | | | |
|---|---|---|---|---|---|---|
| ▓ | 7 | 0 | Ω | <Start of Text> | ƒ | ╖ |

D:

| | | | | | | |
|---|---|---|---|---|---|---|
| <blank> | ¢ | ∞ | ê | <Start of Text> | ƒ | ╖ |

Figure 49

MATHEMATICAL METHOD FOR PERFORMING HOMOMORPHIC OPERATIONS

CROSS-REFERENCE TO RELATED APPLICATIONS

This application is a continuation-in-part of Ser. No. 17/126,379, filed Dec. 18, 2020, which is a divisional of U.S. patent application Ser. No. 15/249,249, filed Aug. 26, 2016, which is a continuation-in-part of U.S. patent application Ser. No. 14/277,056, filed May 14, 2014, which is a continuation-in-part of U.S. patent application Ser. No. 14/093,499, filed Dec. 1, 2013, now abandoned, which is a continuation of U.S. patent application Ser. No. 13/090,803, filed Apr. 20, 2011, now U.S. Pat. No. 8,626,749, which claims the benefit of U.S. Provisional Patent Application No. 61/326,405, filed Apr. 21, 2010, the disclosures of each of which are hereby incorporated by reference in their entireties. U.S. patent application Ser. No. 14/277,056 also claims benefit to U.S. Provisional Patent Application 61/823,350, filed May 14, 2013, the disclosure of which is hereby incorporated by reference in its entirety.

This application also claims benefit to U.S. Provisional Patent Application 63/049,100, filed Jul. 7, 2020, U.S. Provisional Patent Application 63/049,306, filed Jul. 8, 2020, and U.S. Provisional Patent Application 63/051,838, filed Jul. 14, 2020, the disclosures of each of which are hereby incorporated by reference in their entireties.

FIELD OF THE INVENTION

The present invention relates generally to a system and method of querying an anonymized database. More particularly, the invention provides a method and system for querying an anonymized database without the need to decrypt queried data. Even more specifically, the invention provides a method and system of anonymizing a database such that it may be queried efficiently while still retaining the ability to not decrypt requested data.

BACKGROUND

As the amount of digital data created and processed by organizations continues to increase, the need to query and secure those data also grow. Data is thus often encrypted to secure it from improper access. A problem arises when the data is required for use by the proprietor or other legitimate users of the database. In order to perform an operation on encrypted data, it is typically requested from the database, decrypted, and only then can the operation be run, after which the results must be encrypted and returned to the database. The decryption and encryption steps consume vast amounts of processing resources, resulting in significant delays when working with encrypted data.

Typical architectures are network-based (e.g., client-server) database architectures. Multiple users, each with their own workstation, are trying to retrieve records from a central database. Typically, because the database is encrypted, the database private key, used for data encryption and decryption purposes, is kept on a network drive shared among the client machines. The client machines load the key from the shared network drive.

[5] Some existing methods attempt to address data decryption issues by performing operations on encrypted data directly. However these prior methods suffer from the inability to offer virtually the same performance as users are accustomed to today when running against unencrypted data. In addition, these prior methods do not offer robust analytical capabilities over encrypted data.

Thus what is needed is a new encryption system and method capable of querying anonymized electronic databases and obtaining the same results as if performing the queries against the original, unencrypted data all while being done with little actual impact to query speed. As described, our approach considerably differs from typical database operations over encrypted data today. In most of the current schemes, data must be typically decrypted before queries can be run against them. We break with this limitation by permitting queries and analysis over encrypted data.

SUMMARY OF THE INVENTION

According to an exemplary embodiment of the present invention, a method and system which allows the querying of anonymized electronic databases while obtaining the same results as if performing the queries against the original, unencrypted data with little actual impact to query speed is provided.

According to another exemplary e of the present invention, a method and system is provided which provides anonymization of data, methods to analyze the anonymized data, and a retrieval mechanism that returns the correct (unciphered) response to a user's query.

BRIEF DESCRIPTION OF THE DRAWINGS

FIG. 1 is a depiction of a system and method of identifying 5-element groups and as well as the number of tokens needed to "equalize" each token's frequency to that of its 5-element group's leader.

FIG. 2 is a depiction of a system and method of creating false rows based on the maximum number of "rows needed" across all the 5-element groupings created across all the string columns.

FIG. 3 is a depiction of a system and method of identifying 5-element groupings of individual character positions within strings and as well as the number of characters needed to "equalize" each position's frequency to that of its 5-element group's leader.

FIG. 4 is a depiction of a system and method of creating false rows based on the maximum number of "rows needed" across all the 5-element groupings of character positions in strings created across all the character positions within a given string column.

FIG. 5 is a depiction of a system and method of beginning to properly create false tokens based on substitution, as required in 5-element groupings for a specific column.

FIG. 6 is a depiction of a system and method of the resulting substitutions after tokens have been "equalized" within their 5-element groupings (e.g. the culmination of FIG. 5).

FIG. 7 is a depiction of a system and method of beginning to properly create false characters based on substitution, as required in 5-element groupings of character positions for a specific column.

FIG. 8 is a depiction of a system and method of the resulting substitutions after character positions have been "equalized" within their 5-element groupings (e.g. the culmination of FIG. 7).

FIG. 9 is a depiction of a system and method of encoding the string lengths of a single "true" row.

FIG. 10 is a depiction of a system and method of constructing a sample X1 table, used for JOINing two anonymized tables.

FIGS. 11A-C are a depiction of a system and method of decoding a small result set on a client machine.

FIGS. 12A-B are a depiction of a system and method of showing how an INNER JOIN can be performed between two anonymized tables involving the X1 table (shown in FIG. 11).

FIG. 16 is a depiction of the tables in which each the anonymization routine isolates each group and sorts its plaintext values in lexical order.

FIG. 17 is a depiction illustrates such random assignment of encrypted strings to original plaintext strings.

FIG. 18 is a depiction of a random assignment of all plaintext values in the new user universe.

FIG. 19 is a depiction of the plaintext elements as placed into groups and sorted in lexical lorder by the anonumization routine.

FIG. 20 is a depiction of the sorted plaintext universe after being split randomly into contiguous sections.

FIG. 21 is a depiction of second set of tables that will become part of the private encryption key.

FIG. 22 is a depiction of FIG. 15 after assignment of superscripts to highlight the initial plaintexts of each Group in each PEKS that the routine will now be flagging.

FIG. 23 is a depiction of FIG. 17 with maintained superscripted values associated with the start of each Group in each PEKS to maintain the illustration.

FIG. 24 is a depiction of the final modified private encryption key.

FIG. 37 is a depiction how to record the bigrams of P, and its section Pz, vertically in a temporary matrix.

FIG. 38 is a depiction how to read the lines of bits left to right from the matrix above in FIG. 37—beginning with the top row and proceeding to subsequent rows.

FIG. 39 is a depiction how C is broken up into its bigrams C1 . . . Cn and section Cz.

FIG. 40 is a depiction how C is transformed using the random values of Sub-key3 and Sub-key4.

FIG. 41 is a depiction how string C looks in its ASCII representation (for better visualization).

FIG. 42 is a depiction how we break up strong Q into its bits and bigrams.

FIG. 43 is a depiction on how the Q array is converted into random values using Sub-key1 and Sub-key2.

FIG. 44 is a depiction how a temporary matrix is created, by lining up the Q1 . . . 3 bigrams and section Qz vertically.

FIG. 45 is a depiction of how to start to fill in string D by reading the bits left to right from the temporary matrix above, beginning with the top row, and moving down the rows. The read bits are written into array D from the string's beginning.

FIG. 46 is a depiction how we convert string D into its bigrams.

FIG. 47 is a depiction how string D is transformed using Sub-key3 and Sub-key4.

FIG. 48 is a depiction how to string D appears in its ASCII representation, for visualization and comparison purposes.

FIG. 49 is a depiction of the difference between ciphertexts C and D.

DETAILED DESCRIPTION

Figures 13, 14, 15:
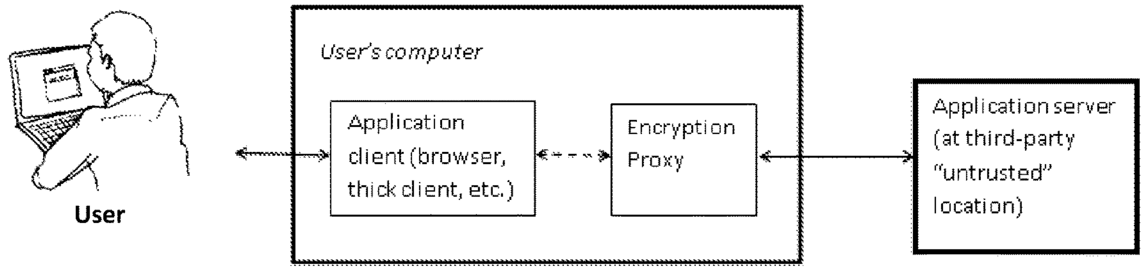
FIG. 13 is a depiction of a system showing user's computer hosting an application client, which communicates with an application server with an encryption scheme residing in encryption proxy.
FIG. 14 is depiction of a plaintext universe consisting of 3-character strings.
FIG. 15 is an illustration of how one loop with randomization might break up our plaintext universe after the loop finishes.

In order to provide near real-time querying of encrypted databases, modules are provided to perform the necessary hardware and software functions to allow querying of encrypted databases without first decrypting the data. The modules are preferably implemented by software means, but may also be implemented by firmware or a combination of firmware and software. When the database is anonymized in accordance with embodiments of the present invention, it does not require they be decrypted prior to conducting analysis. To the contrary, SELECTs, UPDATEs, and various mathematical computations, can be done on the encrypted data and correct results returned to users, after which they can be decrypted. Thus, encrypted queries can be performed in near real-time. To accomplish near real time queries, queries are anonymized before being submitted to the server and anonymized results are then decrypted before being presented back to the user.

Certain preferred embodiments of the present invention are now described. As a first step, the database must be anonymized. For string values, this method securely anonymizes data at the level of individual characters yet allows for general queries and pattern matching to take place over the anonymized strings. For numbers, this method mathematically transforms values into obfuscated numeric values which will still allow some numerical computations to be done on the server while the rest of the calculations can be completed on the client. Maintaining almost the same speed of query performance is accomplished through the use of indexes. The encoding of strings and numbers involves normal textual and mathematical manipulations, allowing the full use of indexing as on normal, unencrypted databases.

The anonymization process works on a single database table at a time. It anonymizes all columns, not just those with "sensitive" fields such as Social Security Number or Last Name. Anonymizing all columns prevents the table from being subject to re-identification attacks which focus just on non-sensitive fields. String columns are handled differently from numeric columns.

Now described is the anonymization of strings in accordance with embodiments of the present invention. Every value in a string column is separated into its individual characters. The method deterministically encrypts each character—i.e., transforms the same character into the same encoded character every time—but in a special way. Simply deterministically anonymizing such characters without any special treatment would immediately subject the anonymized data to a frequency analysis attack.

Now described are embodiments of the present invention presented by way of examples, including the worst-case scenario example of an intruder who has access to an unencrypted static copy of the original database. However, the embodiments of the present invention are not limited to protecting data from such an intruder and are able to afford similar or greater protection from other forms of intrusion, including insider threats, and outside threats who lack a copy of the original database. Thus, if an intruder obtained a copy of the original database, she could compute the frequency of any character in it. The frequency of the enciphered character will be the same due to the deterministic nature of the anonymization (transforming the same character into the same encoding every time), leading to fairly straightforward re-identification of characters. This re-identification is obviated by combining a deterministic process with the generation of a significant number of database records which contain appropriately created fake strings. The intruder will be significantly less able to carry out a frequency analysis attack because the randomly created characters will hide the frequencies of the original characters. A further layer of security is added by breaking the anonymized table into many independent "groups" and coding each character position within each column and each group independently. Such encoding also disrupts the intruder's ability to carry out a frequency analysis attack because across groups and across different character positions, the same characters will have different encodings. Finally, the fake records will also prevent re-identification of original string values when the intruder is observing the number of rows being returned after various queries complete processing. That is, one wants to prevent an intruder from learning identifiers by seeing result set sizes. In result sets of embodiments of the present invention, fake records will be returned intermixed with real records. Thus, simply looking at the number of rows returned will not facilitate re-identification because result set sizes will not reflect accurate row counts related to the original queries.

Numeric values are protected by placing their records into the newly created groups, too. A mathematical function with different anonymization parameters for each numeric column and each group will be used to encode each numeric value. The randomization of the numeric values into groups, the fake rows which will also hide the frequency of the numeric values, and the randomness of the parameters used when computing the mathematical function will make it very difficult for an attacker to re-identify any of the numeric values he may see as well.

Preferably, anonymization is carried out in a series of steps in accordance with a preferred embodiment of the present invention described herein:

Anonymization Step 0 involves identifying the original database ("ODB" also referring to the original database possessed by the hypothetical intruder) and tables. The ODB typically consists of one or more tables, O1 . . . Op. The ODB is transformed into the anonymized database ADB which will consist of the anonymized tables A1 . . . Ap. The anonymization process works on each table using various temporary tables for the transformation. The transformation of an exemplary table O1 is now described which is converted into an exemplary anonymized table A1.

Anonymization Step 1 involves identifying all the alphanumeric symbols that make up the original database. The alphanumeric symbols will be used to anonymize the original database to preserve the data schema so as to not interfere with the operations of database applications. This step in the anonymization process involves asking the ODB owner, or scanning the tables O1 . . . Op directly, to identify the symbol sets that make up the various columns in the ODB tables. This set, comprised of, for example, the letters a-z, the letters A-Z, basic punctuation marks, and digits 0-9, is stored in table V1. V1 is used to construct the data encoding/decoding keys and for several other purposes as will be described below. The same alphanumeric symbols are used during the anonymization process as the original plaintext symbols so as to not interfere with the current database applications.

Anonymization Step 2 sets the number of groups into which the anonymized table will be divided. The more groups the stronger the security as each group gets its own encoding/decoding key. Preferably, the number of initial groups is set to five. The number of groups is preferably automatically expanded to about 30 groups in subsequent Anonymization Steps. That is, the next step in the anonymization process, Anonymization Step 2, sets the number of groups into which O1 will be divided. The more groups created the stronger the anonymization is because the rows in each group will get their own encoding key. (The more groups that are created, in fact, the closer the scheme approaches to that of a random pad). In this embodiment of the present invention, it is recommended to set the number of groups to 5 for any table to be anonymized because additional groups, e.g., more security, will automatically be created in subsequent Anonymization Steps. Based on later Anonymization Steps, 5 groups will be doubled to 10 groups as new "true" groups (i.e. those containing the original data from the ODB) are formed to prevent frequency analysis attacks on strings and characters within groups, as will be shown in Anonymization Steps 5 and 6. The group count of 10 will then be increased to a group count of about 30 as about 20 "false" groups (i.e. those containing the fake rows the anonymization process introduces) will be added to the table, too. These false groups make it very difficult to carry out a frequency analysis attack on strings and characters on the whole table, as will be shown in Anonymization Steps 7 through 9.

In embodiments of the present invention it is also possible to set the initial group number even higher, this generates an even higher final total group count, hence making A1 even more secure with minimal loss of performance. Increasing the number of groups in our own testing has, so far, only shown small performance differences.

In Anonymization Step 3 anonymizing the first database table by copying it into a temporary table is performed. Besides the original table's columns, the temporary table introduces special columns so that client workstations can properly query the anonymized data after anonymization. Separate the temporary table into the initial number of groups as configured in Anonymization Step 2. That is, in Anonymization Step 3, O1 is copied into temporary table B1. Special columns are introduced in B1 to allow for client machines to subsequently query the anonymized data. The first column added, GpNum, holds the number of the group to which a given row belongs. Among other things, this column is used to discard rows from result sets that belong to false groups and retain rows that belong to true groups. The second column added, RecInfo, contains the lengths of each string value in that row, encoded as a character within V1. This column is used to trim string values in result sets so that the string values with proper original lengths can be shown to the user after they are returned to the client from the server. The third column added, RowNum, is a counter representing the row number for the row. Among other things, it is used to determine if a numeric value in a result set row was originally an outlier so that its proper outlier value may be restored before it's shown to the user.

Next, B1 is divided into the initial number of groups (for example, 5) as set in Anonymization Step 2. Substantially the same number of rows in each group in the anonymized table is maintained so that differing group row counts do not assist an intruder in any of his or her re-identification efforts. Hence, the GpNums of B1's rows are updated to roughly evenly divide them among all possible initial true groups.

Table R1 is also created in this Anonymization Step. This table is used to process the DELETE command in the scheme. R1 will hold the RowNums for those rows that are scheduled for deletion, and any rows in R1 will not be incorporated into any application query against the anonymized database because the rows will ultimately be erased.

Anonymization Step 4 creates uniform length strings within every string column so that anonymized values can't be guessed due to their lengths. Preferably, a uniform relative length is created for all the values in every string column. Thus, an intruder would not be able to compare his O1 copy to A1 and identify records in A1 due to equal string lengths. To create uniform lengths in each column, the length of its longest string is computed. Then every string value in the column is padded with itself, character by character, in order, wrapping back to the beginning after the end of the string is reached, until the total length equals the identified maximum length. Finally, the RecInfo column for each row in B1 is set to indicate it's a "true" row as these rows are copies of the original O1 values.

Anonymization Step 5: to make a frequency analysis attack on characters or strings within groups more difficult, rows having the most popular leading characters in a strategically chosen string column are exchanged with rows from randomly chosen groups. Preferably, this involves a potential "re-grouping" of the rows in B1 to prevent a character or string frequency analysis attack within groups. A column having the most popular values within B1 is chosen and used as the basis for identifying popular strings that can be moved to other groups. Such a column is used as the basis for segregation because in a frequency analysis attack its values can be more easily recognized. An intruder could try to map its unique values to the same unique values in his O1 copy. However, moving the popular and therefore more identifiable values of this column to other groups better hides those values. If no uniquely-valued column exists in B1 and the distribution of values in all string columns is equivalent, a random column for segregation purposes is chosen. Within each group, when examining the most uniquely-valued column, rows containing characters in the first position that are significantly more frequent than characters in the first position of other rows are identified. The larger sets of these popular rows are broken into smaller sets and each such smaller set is moved to randomly selected groups. Rows from the random receiving groups are moved into the group currently analyzed. The reason for breaking up sets of rows before moving them is to prevent the popularity of the leading characters in the uniquely-valued column from arising within new groups. At the same time, we keep the number of rows in all groups relatively equal to prevent the insider from guessing which rows have more popular characters based on different group row counts.

The following is an exemplary illustration of this Anonymization Step 5. Imagine B1 has 200 rows and is comprised of 20 groups, each having 10 rows. The column last_name is the most uniquely identifying column and we are working with group 12. A histogram of the first position of the last_name column of group 12's rows shows that there are 3 T's, 3 H's, 2 R's, 1 W, and 1 F in that character position (representing 10 rows). In this illustration the anonymization process utilizes the median to identify popular characters. In this case, the T's and H's are "popular" because their frequencies are above the median. The set of 3 rows associated with the T's are broken into random smaller sets, say one having 2 rows and another having 1 row. We pick one random group in 20 into which to move the 2-row set into; say we pick group 17. The GpNum values of the 2-row set are changed to 17. At the same time, the GpNum value of 2 random rows from group 17 is changed to 12, to preserve row counts in groups. Likewise, we randomly pick a group to move the 1-row set into; say group 2. The GpNum value of this row is changed to 2. Also the GpNum value of 1 random row from group 2 is changed to 12. The same random separation and exchange happens with the rows having the leading H's in their last_name column as well.

Anonymization Step 6: to make re-identifying characters or strings more difficult within groups, three strategically chosen columns are selected. All the rows found by identifying the most popular leading characters of the three columns are moved to newly created groups to dilute the popularity of string values. This step in the anonymization process is to create new groups for rows having popular string values across several uniquely-valued columns. Like in Anonymization Step 5, an intruder could also identify popular string values by combining several of the most uniquely identifying columns and mapping the implicated identifiers to his O1 copy, thereby facilitating the re-identification of the unique anonymized values. Thus, this step identifies columns which contain the most unique values to separate the popular rows from the unpopular ones. The popular rows are then moved out into new groups. As an example, three columns are picked that, when combined, will produce the most unique possible values in B1. Note, if no uniquely-valued columns exist in B1 and the distribution of values in all string columns is equivalent, three random columns for segregation purposes are chosen. (In testing, the Last Name, First Name, and Diagnosis columns contained the most such unique values). A combined histogram of the first and second character of each of the three string values across the three columns is built. From every set of high-frequency rows within the groupings, the number of rows equal to the median frequency of the histogram, or the first frequency found above the median, is moved to newly created groups. By removing a substantial chunk of popular rows from a group, we further disable the intruder's ability to identify the frequencies of unique string values within groups because those frequencies have been substantially undercut. At the same time, the newly-created groups contain rows with identical frequency counts of the character groupings just described. They become also essentially indistinguishable from a re-identification perspective because within the receiving groups the frequencies of their key string values are the same.

The following is an illustration of this Anonymization Step. Imagine B1 has 200 rows and is comprised of 20 groups, having 10 rows in each group. The columns last_name, first_name, and diagnosis are the most uniquely-identifying columns in B1. Suppose we are working with group 8. Table 1 below shows a combined histogram of the 1st and 2nd position of column last_name, the 1st and 2nd position of column first_name, and the 1st and 2nd position of column diagnosis:

TABLE 1

| $1^{st}$ pos. last_name | $2^{nd}$ pos. last_name | $1^{st}$ pos. first_name | $2^{nd}$ pos. first_name | $1^{st}$ pos. diagnosis | $2^{nd}$ pos. diagnosis | freq. | GpNum |
|---|---|---|---|---|---|---|---|
| s | m | j | o | c | a | 3 | 8 |
| s | m | m | a | d | i | 2 | 8 |
| j | o | m | i | d | i | 2 | 8 |
| h | o | s | t | h | i | 1 | 8 |
| p | o | l | i | c | a | 1 | 8 |
| f | r | r | o | c | o | 1 | 8 |

The median in the frequency column is 1.5 and the first frequency greater than this number is 2. We create a new group to transfer the popular rows to. For example, we create group 24. Therefore, 2 of the 3 rows from group 8 matching the first grouping in the table 1 above have their GpNum values changed to 24 in table 2 below. Similarly, both rows from group 8 matching the second grouping in the table above have their GpNum values changed to 24. Finally, both rows from group 8 matching the third grouping in the table above have their GpNum values changed to 24. Table 2 below shows the histogram of the results after this transformation:

TABLE 2

| $1^{st}$ pos. last_name | $2^{nd}$ pos. last_name | $1^{st}$ pos. first_name | $2^{nd}$ pos. first_name | $1^{st}$ pos. diagnosis | $2^{nd}$ pos. diagnosis | freq. | GpNum |
|---|---|---|---|---|---|---|---|
| s | m | j | o | c | a | 1 | 8 |
| s | m | j | o | c | a | 2 | 24 |
| s | m | m | a | d | i | 2 | 24 |
| j | o | m | i | d | i | 2 | 24 |
| h | o | s | t | h | i | 1 | 8 |
| p | o | l | i | c | a | 1 | 8 |

Group 8 has become smaller but because we are doing this for all 20 groups in B1, they also shrink, making their sizes not helpful to an intruder from a re-identification perspective. Group 24, in the meantime, now has 6 rows. Within this group, the combined frequencies of the leading characters of the most uniquely-identifying columns in its rows equal, i.e. they are 2. Therefore, re-identifying the string values in this group also becomes very difficult for an intruder.

Anonymization Step 7 begins to make frequencies of string values indistinguishable in the temporary table. Start to create false rows which when combined with true rows will make frequencies of different string values indistinguishable within result sets derived from this table. Anonymization Step 7 creates equal frequencies of different full-length string values to further make differentiating full-length string values via a frequency analysis attack very difficult. Referring now to FIG. 1, for each string column in B1, a histogram of full-length string values—called tokens from now on—is recorded in table E1 in order of descending frequency. Grouping tokens into sets of 5, the number of rows needed to be added to each token to make it equal the most frequent token in its 5-group set is also recorded in E1. If there are less than 5 tokens in a token's "5-group" set (e.g. it's the last grouping in the histogram), then we record just for those tokens how many rows compared to their leader are needed to make their frequencies equal. Next, the "rows needed" column is aggregated for each column in B1—meaning, it is totaled for each column across all of the column's rows in E1. The largest such aggregated "rows needed" value is found. FIG. 1 below shows an example of a small 3-column B1 (without the padding of string values for clarity), the associated E1 table, and how one identifies the largest aggregated "rows needed" value.

Referring again to FIG. 1, the first_name column has the highest aggregated "rows needed" value—a total of 7 rows needed. Random rows are copied from B1 into temporary table C1 equaling this value (e.g., 7, in this case). The rows will become some of the "false" rows of A1. Thus preventing the intruder from surmising which tokens are requested or returned based on result set size. Tokens will be replaced in the columns in C1 based on the "rows needed" parameter to ensure that when tokens in any 5-group set from E1 are requested, result sets will return true and false rows whose total number approximately equals, thus interfering with any re-identification attempts. New groups are created in C1 so that the row count in each false group is equal roughly to the row count in the original B1 groups. We want to maintain group row counts to prevent the intruder from understanding which are the false or true groups due to an unequal number of group rows. The RecInfo values of all the rows added to C1 are labeled as "false" because these will become false rows in A1. FIG. 2 continues the example of FIG. 1. (It shows how the 7 random rows are copied from B1 into C1. We assume that B1 has approximately 3 rows per group, therefore, C1 must maintain such row counts in its newly-created false groups, too).

Anonymization Step 8: To undermine frequency analysis attacks on individual characters, begin to make frequencies of characters within strings indistinguishable in the temporary table. Begin to create false rows so that when combined with the number of true rows, frequencies of different characters in the same positions become indistinguishable within result sets derived from the anonymized table.

In each string column, the same technique as for tokens is applied to individual characters. For each string column, a histogram of frequencies of individual character positions within that column in order of descending frequency is built and stored in table F1. Grouping these positions into disjoint sets of 5, the number of rows needed to be added to each position to make it equal the most frequent position in its group is also recorded in F1. If there are less than 5 positions in the grouping (e.g. the last group in the histogram), the number of rows needed when compared to their leader is computed just for those positions. The values from the "rows needed" column are aggregated for each position and the maximum aggregated "rows needed" count is found. FIG. 3 illustrates the tasks of this Step. It shows the column first_name taken from a B1 table (unpadded for clarity and different from the B1 used in FIGS. 1 and 2); the resulting F1 table; and how to identify the aggregate maximum number of "rows needed" value.

Still referring to FIG. 3, the highest aggregated "rows needed" value comes from the second position, i.e., 14 rows are needed. Random rows are copied from B1 into temporary table D1 equaling the most such rows needed (e.g., 14 here). These rows will become additional "false" rows in A1. The intent is to considerably undermine re-identification of characters based on result set sizes by making character frequencies within result sets indistinguishable from those of their peers in their 5-group sets. New groups are created in D1 so that the row count in each is equal roughly to the row count in the original B1 groups to preserve group row counts. The RecInfo values of all the rows added to D1 are labeled as "false". FIG. 4 below continues illustrating the example of FIG. 3. (It shows how 14 random rows are copied from B1 into D1. Note that because B1 only has 9 rows, some rows must be (randomly) sampled twice to produce the 14 rows. We assume that B1 has approximately 3 rows per group, therefore, D1 must maintain such row counts in its newly-created false groups, too).

Note, although in this embodiment we focus on creating 5-elements sets to undermine frequency analysis attacks on tokens and character positions, this is a configurable parameter in the embodiments of the present invention. For example, one could create 10-element, 4-element, etc. sets depending on how much security is needed in the ADB.

Anonymization Step 9: "Equalize" the string and character values set up in Anonymization Steps 7 and 8. Among the false rows generated in those two Steps, substitute the needed string and character values to make string and character values almost equal in frequency within their respective 5-element groupings.

That is, Anonymization step 9 is the process of "equalizing" the tokens and positions set up in Anonymization Steps 7 and 8. Using E1 and F1, the tokens and positions specified therein will replace other tokens and positions in C1 and D1, respectively, guided by the former tables' "needed rows" columns.

In the case of tokens and E1, replacement starts using the top (e.g., most popular) token in E1. As substitutions continue, if all E1 tokens are exhausted, yet there are rows in C1 that have not yet received substitutions, substitution continues in a round-robin fashion. That is, tokens are equally distributed among the remaining false rows in C1. Every token in E1 for the column, starting from the top and moving down one token at a time, is used once. If the bottom of E1 is reached once again before C1 is exhausted, the process wraps back to the top of E1 and begins with the top token again.

As an illustration, imagine C1 contains 7 rows, based on the example in FIGS. 1 and 2. In the example there, the first_name column had the highest "rows needed" parameter, resulting in 7 rows in C1. After we create the 7 rows, suppose that, as part of creating false tokens across all of C1, we have now reached the point of processing string column last_name. It only requires 6 rows to be replaced. FIG. 5 shows the subset of E1 dealing with last_name and the C1 table produced from B1. Both tables are the same as in FIG. 1, reproduced here just for convenience.

The substitution process starts with the first row in C1. Moving down E1 and C1, the last_name column in C1 is systematically replaced by 0 Jones's, 1 Smith, 1 Lurie, 2 Jackson's, and 2 Felix's. Because the total number of token replacements via E1 is only 6, for C1's row 7 we go back to the beginning of E1. Row 7 in C1 is replaced with 1 Jones. At this point replacement is stopped because we have substituted for all 7 rows in C1. FIG. 6 shows the transformed C1.

The same substitution approach is taken for character positions. As an illustration, and continuing with the example from FIGS. 3 and 4, imagine D1 has 14 rows, based on the maximum "rows needed" column of position 2 from that example. We have created the 14 rows, and now, as part of creating the fake positions across all of in D1, we have reached the point of working with the 1st position of column first_name in F1. It has a smaller aggregated "rows needed" value compared to its position 2. FIG. 7 shows a subset of F1 with the details of position 1 and the associated D1 table. Both are the same as in FIGS. 3 and 4, reproduced here just for convenience.

Starting at the top of D1 and the top of F1, we systematically replace the first position of the first_name column in D1 with the characters in F1. We substitute in 0 J's, 1 R, 1 S, 2 B's, and 2 V's. Because we have only substituted 6 rows, we return to the top of F1 and now begin substituting in a round-robin fashion. We substitute in 1 J, 1 R, 1 S, 1 B, and 1 V. Our current total, 11, is still 3 short of the needed 14 rows. We start at the top of E1 once more and substitute in 1 J, 1 R, and 1 S, as which point we stop replacement. We have now substituted for all of D1's rows. FIG. 8 shows the transformed D1. Finally, after all the tokens and positions have been substituted in the ways described above, C1 and D1 are appended to B1.

Anonymization Step 10: randomly shuffle the existing groups in the table to further obscure any potential group order. Also create a temporary table which will identify which groups contain false and true rows. That is, this Step randomly shuffles the groups created in B1 to further scramble any potential previously-created group ordering. A new table, G1, is created with new group numbers representing the true and false groups (of course, the true rows are maintained in the true groups while the false groups are maintained in the false groups). Also, a temporary table, Y1, is created to just list which group numbers contain true rows and which contain false rows. This table becomes part of the A1 table private key, part of the database private key, and is used to discard false rows when result sets involving A1 are returned to the client from the server.

Anonymization Step 11: begin anonymizing the numeric columns. Each number is converted to a different number through the use of a consistent mathematical function but with specially-chosen randomized parameters. That is, this Step (11) handles O1's numeric columns. Numeric values are transformed into other numbers using a special monotonic mathematical function. Every numeric column in G1 is processed. For every group, three values are obtained: the average of the numeric values for that group, a random number—called a random multiplier from now on, and another random number—called a random addend from now on. (In our testing for this scheme, we generated a random multiplier in the range of 500,000 to 1,500,000). To encode a numeric value within a group, the average of values in that group is subtracted from the number, the result multiplied by the random multiplier, and to this result the random addend is added. As we will see, such an encoding allows for a various computations like SUM, AVG, subtraction, etc. to be handled to a considerable degree by the server, although requiring some final computations on the client. At the same time, the security of numeric values is maintained because every group will have a random collection of rows. The average of values, a key contributor to the encoding, becomes a pseudo-random number, different from group to group, undermining a frequency analysis attack on the numbers. In addition, the random multiplier and random addend differ from group to group so that the anonymized values have little relationship to each other. One value could have been bigger or smaller than the other in O1, a relationship which the random multiplier and random addend especially help break in G1. The average, random multiplier, and random addend are different for each numeric column as well. All this randomization makes an intruder's ability to re-identify any particular column value, when he sees A1, very difficult. Further, as discussed previously, the number of groups into which O1 is divided can always be increased, creating even more challenges to numeric re-identification. The random multiplier, random addend, and average for each group and column are stored in a table which will become part of the private key. It will be used to "decrypt" the numeric values, or computations involving them, on the client when result sets are returned to the client by the server.

Anonymization Step 12: handle the numeric outliers by transforming them into values within the normal range of their groups. The original values are recorded so they can be later restored within results sets on the clients. That is, this anonymization step (12) involves properly managing numeric outliers. Despite the availability of groups and the mathematical function, certain numeric values may be so different from average that even placing them into groups and encoding them via the average, random multiplier, and random addend will still not hide their value. They look extremely different from the groups they are in, if not the entire A1 table. To prevent the re-identification of such values, in G1, outliers are transformed to numbers which are within the range of the rest of their respective groups. The original values are recorded in a file to be part of the A1 table private key for subsequent restoration within result sets on the client. Before the mathematical function is applied to any numeric value, the number is compared to a number three standard deviations below and three standard deviations above the average of all of the numbers in its group. If the value is at least three standard deviations below or above the average in its group it's considered an outlier and its complete row is recorded in temporary table H1. Its value in G1 is transformed into a value randomly selected from the three sigma range within its group. The point of keeping the outlier values in G1 rather than removing their rows altogether is to preserve the statistics that the other columns within these rows may support. The columns can support the movement of rows to other groups based on character frequencies, etc., as explained in earlier Anonymization Steps. It also becomes more difficult to identify the next outlier values after the most extreme outlier values are transformed if the transformed outliers could randomly take on those next-largest outlier values. The intruder does not know if the "outlier" value he sees is the next-largest outlier or the largest outlier made to look like the next-largest outlier. H1, containing the original outlier values and the values that replaced them, becomes part of the A1 table private key to be used on the client. Note that after an outlier value is modified it is then encoded in the same way as any other number as described in Anonymization Step 11: the group average is subtracted from it, the result multiplied by the random multiplier for its column and group, and the random addend is added to this result based on the column and group.

Anonymization Step 13: create the random encoding/decoding key for the table and use it to permute each character within each string value in the table. This Step involves the construction of the encoding/decoding key for A1 that will be used to obfuscate every character in every string column in A1. A sub-key will be constructed for each group and character position in G1. The combination of all the sub-keys is the complete key that becomes part of the A1 table private key files that is made available to the client machines. For each string column, for each position, for each group in G1, we randomly select how all characters in that position will be permuted into other characters. That is, we don't just permute actual characters that exist in G1 but we create a random permutation of all possible characters, relying on V1, constructed earlier, to supply both the allowed domain and range for the permutation. This is done to make encoding and decoding easier on the client because the A1 table private key has more structure and hence more efficient indexing properties. Table 3 below illustrates small portions of two sub-keys, representing how characters "a" through "e" for column last_name in position 2 in groups 27 and 45 are permuted in a fictitious G1:

TABLE 3

| Original char. | Permuted char. | Column | Position | Group Num |
|---|---|---|---|---|
| a | h | last_name | 2 | 27 |
| b | A | last_name | 2 | 27 |
| c | 4 | last_name | 2 | 27 |
| d | w | last_name | 2 | 27 |
| e | $ | last_name | 2 | 27 |
| a | u | last_name | 2 | 45 |
| b | D | last_name | 2 | 45 |
| c | h | last_name | 2 | 45 |
| d | 3 | last_name | 2 | 45 |
| e | P | last_name | 2 | 45 |

We also create a separate group, i.e., a separate sub-key, for rows which are INSERTed after G1, in the final form of A1, is placed into production. To prevent the intruder's guessing of encodings within existing groups by the introduction of new statistics that might somehow assist in re-identification, we place a new row and its associated statistics into a new group. We also create a random "average" value, a random multiplier, and a random addend for each numeric column and a new sub-key for each string length column to be stored in the RecInfo column for the new INSERT group. (The encoding of string lengths is discussed below in Anonymization Step 15). Note that isolating newly INSERTed rows in their own group certainly tells the intruder that that group number contains true rows. He can focus his re-identification efforts there. However, the intruder cannot know column values of newly INSERTed rows per our threat model. As mentioned in the very beginning, the intruder can only copy the ODB before the anonymization takes place, not afterwards. His copy of the ODB will not have the newly INSERTed rows and he cannot compare anonymized values of these rows with any original plaintext values. He can try to use published statistics—from the Census Bureau, etc.—to mount a frequency analysis attack on tokens or character positions. But given the difficulty in re-identifying the ADB when he has a copy of the ODB, as has been (and will continue to be) shown in this note, breaking the security of the anonymized rows without having the original plaintext values makes re-identification even more difficult.

Still, it also is possible to re-anonymize the database, i.e. create a new ADB, whenever the database owner wishes. The new ADB re-distributes the rows from the INSERTed group into regular groups so that the intruder will not know which groups contain the new rows or what their anonymized content even is. The frequency of re-anonymization can be tied to how many rows are INSERTed into the ADB within some fixed period. If the number of new INSERTs, say, per month, is high, re-anonymization can be more frequent, for example, possibly every few weeks. If the number of new INSERTs is low, re-anonymization can be less frequent, happening, say, once per quarter. (Please see our Implementation Performance Results discussion at the bottom of this note describing when to re-anonymize the ADB).

Next, using the sub-key mappings, each character in G1's string values is permuted into its encoded form. Finally, all the sub-key mappings are combined into one encoding file to be placed into the A1 table private key.

Anonymization Step 14: encode the string lengths of every string value by permuting them into a character in the domain of the ODB and store the encodings in the temporary table. In other words, in this Step, we finish string column processing. The length of each string value is recorded in the RecInfo column of its row. Because the lengths are numeric one could encode them just like numbers more generally. However, this would preserve the order of the encodings within a group because the mathematical function is monotonic. Preserving the order could give an intruder more information about which strings belong to which group. He could compare A1 with the ordered string lengths he has in his O1 copy which could facilitate some of his re-identification efforts. Therefore, more preferably, because one never needs to know the ordering of string lengths during anonymization, the encoding mechanism is the permutation of string lengths into characters in the ODB which are stored in the RecInfo column. Each string column length obtains its own permutation based on the group it's in and the string column it's associated with. Preferably, V1 is relied on. A given string length is mapped to the ordered symbol set in V1 to first identify the character associated with the length of the string. Then we map this character into V1 again to encode the length. As an example, imagine V1 is comprised of 62 characters: the lower case characters, the upper case characters, and the digits 0-9, ordered in this specific way within V1. To encode a string length of 4, we find the character the length is associated with: in this case, it's the lower case "d", the fourth character from the start of V1. Then we permute "d" into another character in V1, for example, "R". Such permutations, sub-keys just like the regular encoding of characters described in Anonymization Step 13, are combined and stored in the encoding file of A1's private key. Because strings lengths should, in general, be small, a typical string length should "fit" within the symbol set of a typical V1. If some string lengths don't "fit" within V1, we could arbitrarily increase the size of our encoding space to any representation. For example, if we need string lengths of up to 10,000 we could create a permutation matrix mapping each length 1-10000 to a 3-position lower-case character value, for example, "dgq". Because we could arbitrarily represent $26^3$, or 17,576 values, using such a representation, using this construction would cover the needed 10,000 character lengths using the symbols in V1. This permutation matrix becomes part of the A1 table private key.

For each group, for each string column, each string length value is permuted as described above. These encoded lengths are concatenated, separated by specially marked delimiters, and placed as one long string into the RecInfo column. That is, they are appended to the flag indicating whether the row is true or false that is already present in that column. FIG. 9 illustrates how a small part of a 2-column G1 having a single "true" row in one group is transformed to contain encoded string lengths. (In the example, we assume the size of V1 is 62 characters. V1 contains the lower case characters, the upper case characters, and the digits 0-9, ordered in this particular way. The sub-key files are separate just for clarity. Ultimately they are combined into one encoding file). Finally, a new table, A1, which ultimately becomes the anonymized representation of O1, is created which contains everything from G1 except for the true/false row indicator in the RecInfo column.

Anonymization Step 15: create indices within the anonymized table to improve query performance. The next anonymization Step, 15, is to create indices on the anonymized table to improve query performance. Because simple textual and numeric manipulations are used to encode the plaintext data in A1, many of the indexing functions of the underlying database engine work on the anonymized data. This embodiment creates a non-clustered index on each string column in A1 to speed the processing of queries. In addition, because groups play a key role in extracting data, on numeric columns, a multi-column, non-clustered index is constructed with the GpNum column being the leading column in each such index. A single clustered index comprised of, in order, the GpNum, RowNum, and Last Name columns, is also constructed to further enhance query performance. Indices are not created on the RowNum or RecInfo columns. When we tested with indices on these two columns, they appeared to slow down rather than speed up queries. We also create a special index on the R1 table. We want to ensure that only unique RowNums are inserted into it. We create a UNIQUE index on R1 and also specify that this table should ignore any duplicate RowNums insert attempts, the motivation for which will be explained when we discuss the DELETE command later on. (In the Microsoft SQL Server 2008 environment, which is our testing environment, ignoring duplicate rows means that the index is created with the IGNORE_DUP_KEY=ON parameter). At this point, we are finished with O1 and it can be detached and stored for later reference. Table A1 is ready to be used by the database application(s).

Anonymization Step 16: anonymize the other tables of the original database, following the steps similar to Anonymization Steps 1 through 15. To handle the other tables of the ODB, O2 . . . Op, a similar process to the one described in Anonymization Steps 1 through 15 is undertaken. If these tables do not need to be JOINed on any columns to each other or to O1, the anonymization process for these tables becomes a two step process. To speed table anonymization and the loading of the database private key into memory on client computers, some of the encodings used for A1 may be used to encode columns in the other Ai. The appropriate number of groups is chosen for tables Oi independently of O1 and the anonymization of Oi is done using Oi's data. However, when it comes to choosing the average, random multipliers, and random addends for Oi's numeric columns and the sub-keys for Oi's string columns, the database script checks table A1's and table Ai's columns. Every Ai column that has an analogous column in A1 can use the average, random multipliers, random addends or character encoding for that A1 column. Anonymization steps 1 through 15 have already equalized the frequency of tokens and character positions of Ai strings. The shuffling of the values in numeric columns into random groups and the creation of false numeric values—when false records were created during string and character "equalization"—masks the numeric values as well. Hence, the average, random multipliers, random addends, and sub-keys—the final overlays over the true anonymization performed earlier—, can be re-used. If the number of groups in some Ai is greater than the number of groups in A1 then new numeric and string encodings will have to be created for those groups. Also, for those Ai columns that have no equivalent in A1, the average, random multipliers, random addends, and sub-keys are chosen independently as described in Anonymization Steps 11 and 13, respectively. Each position and numeric value in each group is encoded either using A1's private key or Ai's private key. Each table Ai also gets its own Ri table to assist with managing DELETE commands. Indices are also created on the Ai as for A1. If some of Ai's columns use the same encodings as analogous A1 columns, the private key files associated with those encodings do not need to be stored on the shared network drive. Clients will rely on A1's private key files to encode and decode those Ai columns. Otherwise, all the Ai private key files used to encode queries and decode the results targeting the Ai are installed on the shared network drive to be accessed by client machines.

If a table Oj must be JOINed on one more or more columns with Oi, which has already been anonymized earlier, a somewhat different procedure is undertaken. Imagine we know which columns will be used for the JOIN prior to anonymizing Oj. The columns used for JOINing Oj must be anonymized in the same way as the corresponding columns in Oi because strings must match when compared. Although our JOIN process can handle multi-column and multi-table JOINs, we'll use the following simpler example to illustrate how JOINs are handled.

Now, suppose one wanted to JOIN O2 to O1 and only one column will be used for JOINing. O2 is copied into temporary table B2 which will similarly have the new RecInfo, GpNum, and RowNum columns created. The same strings in B2 must be padded as they were padded in B1 because we may be doing full-length string comparisons during the JOIN. Because the padding mechanism is deterministic—i.e., appends the same value over and over, character by character, until the maximum length of the string value is reached-tokens that are identical between B2's and B1's JOIN columns will be therefore padded the same way.

Next the unique plaintext padded values from the JOIN column in B2 are recorded in a separate table, X1. Unique X1 values are reproduced within X1 as many times as there are groups in A1. Such a construction of X1 will allow the extraction all potential rows from A1 and A2 when they are JOINed across their different group encodings in any JOIN query. Obtaining such rows will, in turn, allow one to rebuild the JOIN result set on the client. This is discussed in more depth later on but, essentially, X1 acts as a bridge, allowing one to return to the client all relevant rows from A1 and all relevant rows from A2. Using these data, the driver then finalizes the presentation of the JOIN result set on the client. FIG. 10 illustrates the construction of X1. (It shows how the X1 is extracted from a small 3-group padded B2 and then how it's expanded based on the associated (and not shown) 4-group A1).

How the X1 table is used to handle JOINs is discussed later on.

Note, if the JOIN column(s) are not known ahead of time and are only later determined, the anonymization steps related to O2 can be done when the columns for the JOIN are determined. A re-anonymization of O2 will have to be done as follows: O2 can be retrieved from archived storage. Alternatively, after O2 is constructed it can be decoded and the re-anonymization done on the resulting plaintext table.

Next, the same steps as for O1 are followed for O2. The same number of groups as for A1 is selected to construct A2. The group number must be preserved because we want to preserve the encodings for the column on which the tables are JOINed. All other steps—with regard to moving rows to new groups based on character frequencies; grouping string values and individual characters into 5-element groups; etc.—are done as before based on O2's data. The final groups of B2 are compared to Y1, the table created earlier indicating which are the true and false groups in A1. The true and false group numbers of B2 are converted to, respectively, the true and false group numbers of A1 so that the group-based encodings for JOIN purposes can be maintained. Note, even if O2 is very small or very large and generates less or more groups compared to O1, respectively, this is acceptable because our driver can still construct a JOIN query to return appropriate rows of the two tables implicated in the JOIN to finalize the presentation of the result set on the client. Once again, for faster processing any other numeric and string columns in O2 analogous to those in O1 can use the same average, random values (multiplier and addend) and encodings as for each group in O1. For any different columns, the numeric and string columns must be transformed with independently generated average and random values (multiplier and addend) and encodings. In either case, the X1 table used for JOINs is encoded using the same encodings as that of its counterpart column in A1. Indices are ultimately created on A2 as for A1. Table A2 is now ready to be placed into production.

If tables O3 . . . Op are also candidates for JOIN, their anonymization follows the same steps as just described for O2.

Tables A2 . . . Ap are now created and can be placed into production.

Placement Into Production

To place this scheme into production, in accordance with embodiments of the present invention, the ADB is made accessible to all the users that need it. A driver is installed on each appropriate client workstation. The application(s)

that access the ODB are re-configured to point to our driver instead of the ODBC driver they currently use.

The database private key is made available to all clients. The database private key is composed of the Ai table private key files and general database files. The following are the private key files for each specific Ai in the ADB:

1. The Y1 table, indicating whether a particular group is true or false.
2. The encoding file describing how each character position is encoded for each group in each string column. This file also describes the encoding for each string length "column" in each group.
3. The file describing the average, random multiplier, and random addend for each numeric column in each group.
4. The H1 table, describing the original and modified numeric outlier values in certain rows.
5. The file containing the maximum lengths of each padded string column.
6. The file describing how many rows there are in the entire table.
7. The file describing how many groups there are in the table.

The following are the general database files:

1. The V1 table, containing the domain of the characters in O1 . . . Op.
2. The file describing how many rows the database server can handle within an anonymized subquery whose components are linked by OR statements. (This is further explained in the "Constructing Anonymous Queries" section).

These nine files must be placed on the shared network drive that all clients access, as discussed in the beginning of this document, from which all clients can obtain them.

Encrypted Operations

Query Re-Write by the Driver

Now described is how the driver constructs the queries for the scheme. The scheme fully operates over encrypted data given the breadth of SQL commands and does not require decryption. Therefore, the driver translates plaintext queries from the database applications into encrypted queries so they can work with the ADB. Now described is how the driver handles such query re-writing and management in general and then how it handles issues specific to specific kinds of SQL queries. As for the almost real-time performance feature of queries through the use of indexing, this is discussed in more detail in the Implementation Performance Results section. The driver loads the private key into memory for faster data encoding and decoding. The driver intercepts and parses each query going from the client application(s) to the server. The driver identifies all the columns where constants are specified (for example, in SET clauses of UPDATE statements, WHERE clauses in SELECT statements, etc). The driver encodes these constants for each group of the table(s) targeted by the query using the table's (or tables') private key; it constructs a large multi-part query. To illustrate, query construction for a single table A1 is demonstrated as an example. However it is readily apparent that the driver can readily work with multiple tables. For each A1 group, the driver creates a sub-query containing the column(s) which are implicated in the query and it properly encodes the relevant constant(s) for that group. All the sub-queries are appended together using OR statements into larger tuples.

Constructing Anonymous Queries

Based on our test results, it has been found that the server efficiently processes queries when each of these larger tuples manages a specific number of rows across all of its sub-queries. In our testing, an MS SQL 2008 Server worked efficiently when there were about 260,000 rows processed by each of these larger tuples. The 260,000-row capacity may be server specific. Therefore, it is a configurable parameter, i.e. a file, in the database private key. The driver computes how many sub-queries to place within a larger tuple so that the server efficiently handles anonymized queries. The driver knows the number of rows and the number of groups in A1; they are part of the database private key. Therefore, the driver uses the following formula to compute the optimum number of sub-queries to place into the larger tuples:

round([260000*number of groups in table]/number of rows in table)

Once the larger tuples are formed, they are combined with UNION statements to produce a large multi-part query. In certain cases, to more easily manage queries, one may preferably invoke a stored procedure on the server. In this example, it is passed as a list of the encoded constants. The stored procedure parses our list and dynamically creates and executes the necessary SQL statements. Note that when string columns are implicated by the application's query, the driver automatically supplies the correct padding to identify the correct strings. As discussed in Anonymization Step 3, every string value is padded by repeatedly appending it to itself, one character one at a time, wrapping back to the beginning of the value until the maximum length of the column is reached. After the padding, the driver is ready to encode the constant(s).

Anonymous LIKE Statement Processing

If the WHERE clause of a user's query contains a LIKE statement, the proper construction of the encoded LIKE statement depends upon the construction of the plaintext LIKE constant in the query. If the wildchar '%' is the final character of the plaintext LIKE constant, then the encoding of the constant in the encoded WHERE clause encodes the prefix before the wildchar for each group in A1. But if the plaintext LIKE constant contains wildchars prior to the final character of the constant, then the driver will have to create a multi-component query. Each component will encode a full query to find the rows where the encoded LIKE constant is located at a specific position in the string. The query components will be ORed together to produce the multi-component query that finds all the needed rows satisfying the user's request. In particular, each component query focuses on encoding a LIKE constant that locates the needed constant within different string positions using a moving index across the implicated string column. The first component query, starting at the index of 1, encodes the query so that the LIKE constant is found in the first position of the implicated string column. Continually moving the index to the right by one, each subsequent component query encodes the query so that LIKE constants are found at each successive character position in the implicated string column. Component queries are created until the maximum length of the implicated string column, available from the targeted table's private key, in memory, minus the length of the plaintext LIKE constant, has been reached. The "placeholder" SQL character "_" will be used to fill all the positions in the encoded LIKE constant before the index currently being examined. This will force the encoded constant to be found at that particular index position of the encoded string and nowhere else in the implicated string column.

Anonymous LIKE Statement Example

The following example illustrates the construction of a multi-component query for a non-trivial plaintext LIKE constant. Imagine the driver receives a SELECT statement which includes the WHERE clause " ... WHERE last_name LIKE '% ack %'". Assume the column last_name has a padded length of 8 characters. The driver will produce a 6-component query. The first component will encode "ack" for all A1 groups for last_name character positions 1, 2, and 3. The encoded LIKE constant will have zero "_"'s preceding it because the constant for this component query tries to find strings where it is present specifically in the beginning of the string, in position 1. For example, if "tr2" are the encodings of the characters "ack" for positions 1, 2, and 3, respectively, the LIKE clause for this component query would be " . . . LIKE 'tr2 %'". The second component query encodes "ack" for all A1 groups for last_name character positions 2, 3, and 4. The encoded constant has one "_" preceding it because this encoded LIKE constant aims to find strings where it is specifically found in position 2 in the string of the implicated string column. For example, if "f5P" is the encoding for the characters "ack" for positions 2, 3, and 4, respectively, the anonymized LIKE clause for this component query would become " . . . LIKE '_f5P %'". And so on, until the encoding of the sixth query component. That component will encode "ack" for all A1 groups for last_name character positions 6, 7, and 8. The encoded constant has five "_"'s preceding it because that anonymized LIKE constant tries to find strings where it is found starting at exactly position 6 of the string. For example, if "J9a" is the encoding for the characters "ack" for positions 6, 7, and 8, respectively, the anonymized LIKE clause for this component becomes " . . . LIKE '_____J9a'". (There are five underscores between the apostrophes in the constant). These six components are ORed together to produce the large multi-part query. Note that the encoded LIKE constants, especially those in the last few component queries, may implicate rows where the constant is found in the encoded padding as opposed to the actual encoded string value. These rows will be discarded on the client. As part of the cleaning of the result set on the client, the driver checks whether the constant found in the string is within the permitted length of the string. The string length is obtained from the RecInfo column. If it's not within the length of the string the row is discarded.

Presenting Results to User

The large encoded query (or encoded list for the stored procedure) is sent to the server and encoded results, if any, are returned to the client. If any results are returned, the driver first discards any fake rows. It compares their GpNum values with its file in memory describing which groups are false and which are true. In the remaining rows, all the string values are trimmed based on their original lengths as encoded in their RecInfo columns. Next, the encoded strings and numerical values are decoded. As each numerical value is converted to its original value, first, its associated RowNum is compared to the outlier RowNums, also in the database private key in memory. If the RowNum matches the RowNum flagged as having one or more numerical outlier values, the original outlier value(s) is reinstated before the result set is returned to the user. Similarly, towards the end of any result set processing, every outlier value is examined to ensure that if no row was returned containing that outlier value, but the value should have been in the result set, an outlier row is created with its original strings and numeric values in the result set. A similar process is undertaken when an arithmetic query implicates an outlier value. Any arithmetic computation (e.g., SUM, AVG, etc.) result returned by the server is additionally (re)processed on the client to include any outlier value(s) involved in the computation. All the plaintext rows in the result set can finally be returned to the user. It's important to note that the result set comes back to the client as one set of rows which are processed and then returned to the user. The driver does not wait in a loop interacting with the server, obtaining partial result sets and building up the final result set. Our driver could be implemented for such interaction, but currently works with a single query and a single response. FIGS. 11A-C show how a small result set from a SELECT query targeting a simple table is decoded based on the database private key in memory. (Bold characters are used to illustrate the changes happening to implicated row values after each step).

Now described are the handling of specific queries:

Select

A SELECT statement is handled like the general query case described above. However, as will be further described when discussing the DELETE command, only rows which are not in the R1 table, which are rows being scheduled for deletion, can be involved in any query. When constructing the SELECT query, the driver therefore appends to it a clause to do an OUTER JOIN with the R1 table. From the table resulting from this OUTER JOIN, the query selects only those rows whose RowNums are not in R1. These rows are then returned to the client as the result set.

Count

A COUNT statement is implemented relatively directly. As in the SELECT statement discussed above, the result set must only include those rows which are not scheduled for deletion. Again, the clause to do an OUTER JOIN with R1 is appended to the encoded COUNT query to count only the non-R1 rows. Sub-counts of rows for each group, based on the associated SELECT statement with the COUNT clause, are returned along with the group numbers for each sub-count. The client discards the sub-counts of false groups, adds the remaining sub-counts, and presents the final COUNT result to the user.

Update

An UPDATE statement is handled partly like the general query case. Because the rows implicated by an UPDATE command may cross groups, we use a different "SET<variables>" clause for each group to UPDATE the variables in that group using its proper encoding. Consequently, each group gets its own UPDATE command. For each UPDATE command, the client encodes the constant(s) the user is searching for (e.g., specified in his WHERE clause), and the constant(s) we want to set the column(s') values to. To preserve the padded length of the constants to be inserted, before they are encoded, they are padded with the original string value repeatedly. As explained before, this is done character by character until we've reached the maximum length of the column. Further, because the new constants may have a different length than the string values they replace, we update the RecInfo column for all the affected rows with the new lengths. The driver encrypts the new length of each constant by permuting it into a character in the ODB domain, using the sub-key in the overall encoding file, available in memory, for the associated string length "column" and group. The client sends to the server a list of UPDATE commands separated by blanks. The server treats each UPDATE command independently. Each UPDATE command updates the implicated rows in a specific group with the new constant(s) and sets the proper RecInfo locations of those rows to the constants' new lengths.

An important point to make is that whenever UPDATEs are issued, if rows with outlier values are implicated, this should become known to all client machines. Otherwise, they will continue to rebuild result sets with outdated outlier values. The client issuing the UPDATE to the outlier(s) will update his database private key in memory with the new outlier value(s). Its driver will then copy the outlier file (the H1 file, as per Anonymization Step 12) into the shared network drive for all the other clients to access. Thus, before it issues any query, the driver on any client checks the shared network drive to see if the date or time of the outlier file are different compared to the file it has in memory. If date or time is different, the driver uploads the new file into memory before making a query to the ADB.

Insert

An INSERT statement is handled by working with the last group in A1. For each new row to be INSERTed, all the string values of the row are padded by repeating their values until the maximum lengths of their columns are reached. The padded values are then encoded using the sub-key, within the overall encoding file, for A1's last group. The numeric values of the row will be converted using the random "average" value, random multiplier, and random addend for the last group. The true lengths of each string value are mapped into random characters in V1 using the sub-key for each string length "column" for that group. The lengths are also recorded in the RecInfo column. The next sequential RowNum for the row is also created for the row. (In our case, this is done automatically by the server because the RecInfo column is designated as an IDENTITY column in A1 in our test database. When a new row is INSERTed, the server automatically assigns the next numeric value to the RowNum value of that row). Because during UPDATE and SELECT commands we UPDATE and SELECT from A1's last group, the new row is now retrievable from A1 if it's implicated by a query.

Delete

DELETE commands are handled in a special manner. Because we found, during our testing, that straightforward DELETE commands to the ADB were taking 3-4 times longer than one reference standard we compared our performance to—the Microsoft JDBC driver, as we will discuss in our Performance section below—, we came up with a different solution for row DELETEs. We created the R1 table. (Please see Anonymization step 2 for a description of R1). The DELETE command is constructed similar to a generic query. But rather than deleting rows, it constructs INSERT commands for each group, INSERTing the RowNums of the rows to be DELETEd into R1. A scheduler is set up on the server to invoke a stored procedure to actually DELETE the rows in R1. We found when testing, that when the stored procedure tried to delete a large number of rows, other client queries were forced to wait until the command completed (apparently due to table or row lock-outs). We had to break our scheduled DELETE tasks into smaller chunks. Rather than scheduling a DELETE for all rows in R1, our stored procedure was configured to only DELETE 100 rows at a time. The stored procedure was scheduled to run every minute of every day. With such a configuration, actual row erasures had negligible impact on the client's other queries. (See the Performance section for additional information on DELETE command performance). Of course with our scheme, a given customer can schedule more deletions per run, or, conversely, less frequent runs, knowing the performance capabilities of its hardware and software.

Note that whenever DELETEs are issued, if rows with outlier values are implicated, this should become known to all client machines. Otherwise, just like for the UPDATE command, clients will continue to build result sets with outdated outlier values. The client issuing the DELETEs to the outlier(s) will remove the value(s) from his database private key. Then he will copy this file (i.e. the H1 file) into the shared network drive with the other database private key files for all other client machines to access. Before any query, each client driver checks to see if the outlier file on the shared network drive is more recent compared to the file it has in memory. If so, the driver uploads the new outlier file before making new queries to the ADB.

Join

Various JOINs can be started on the server and completed on the client. This uses the Xi tables created in Anonymization Step 16. When JOINing Ai to Aj, Ai is first JOINed with the Xi table and then the Xi table is JOINed with Aj. The results of both JOINs, modified to extract only those set of columns requested by the user, are sent to the client. The client will then restore the proper JOIN result set and present it to the application. For illustration, we focus on retrieving the rows of A1 when it's INNER JOINed with A2 over a single column. But other kinds of JOINs (e.g. LEFT, SELF, etc), including multi-column and multi-table JOINs can be similarly done using such a scheme. Suppose the column name is I_name and we want to merge the tables intake and discharge. The JOIN we discuss is: "SELECT a.*FROM intake AS a JOIN discharge AS b ON a.I_name=b.I_name". We first describe the mechanics how our driver implements the JOIN and then show an example to clarify the points. We obviously cannot do a JOIN of the two implicated tables directly on the server due to different group encodings in the ADB. Imagine I_name "Jones" is in group 5 of A1 and in group 7 of A2 but does not exist in group 5 of A2. A JOIN involving equality comparisons between A1 and A2 would fail to produce results for "Jones" because, due to different encodings, its versions in A1 group 5 and A2 group 7 could not be directly equated. Currently our driver implements JOINs via a stored procedure on the server but this can also be ported to the JAVA (programming language) code in our driver. Upon getting a JOIN request from the application, the driver sends the tables and column implicated to the stored procedure. The stored procedure combines the results of two special types of queries in one table, J1, which it returns to the client. The driver will restore the correct JOIN result set for the user on the client via J1. The first component of J1 is the selection of rows from A1 when it is JOINed (i.e., based on equality or other comparison as specified in the user's query) to the encoded X1. Because X1 encodes all values of A2 encoded as for every group in A1, all possible A1 rows that can link to A2 rows on that column are selected, regardless of encoding. The second component of J1 will select the rows from X1 which are JOINed to the rows of A2 (again based on the comparison as specified by the user's query), GROUPed BY the frequency with which they occur in X1. Because X1 encodes all values of A2, we are basically merging A2 with itself. The intent is, for each group, to identify for each A2 token how many times it is implicated in the JOIN. This frequency is used to reproduce the correct number of times the rows from the first part of J1 are found in the result set, as will be shown below. Both J1 components are returned the client in one combined result set.

The driver handles the returned J1 via a loop. First, all the rows in both components of J1 are stripped of false rows. Next, the column implicated in the JOIN is fully decoded in both the first and second components of J1 so we can compare strings without the interfering group encodings. Next, for each row of the second part of J1 (i.e., the A2-implicated rows of the JOIN), every row in the first part in J1 (i.e., the A1-implicated rows) is checked. When there is a match of rows based on the requested comparison, each row in J1's first part is reproduced in the result set as many times as the frequency count for the row from the second part specifies. The effect of this step is to reproduce every row in A1 exactly as many times necessary as if we did the INNER JOIN directly on the server for the implicated column. And when done for all rows from both components in J1, the result is the one requested by the user: we pick just the rows of A1 when it forms a cross-product with A2 on the implicated column. FIGS. 12A and 12B illustrate the INNER JOIN process over tables intake, discharge, and X1. (In the example shown in FIGS. 12A and 12B, we do not show how the values in the I_name column were originally encoded but that once decoded they can be readily JOINed. Also, the padded string length for I_name is 6 alphanumeric characters. Further, only the true rows are shown in the intake and discharge tables for a simpler presentation. Finally, for easier visualization, the bold italicized rows shown in the intake, discharge, and X1 tables are the ones implicated in the JOIN with X1 in either J1's first or second component). The result table obtained can now be fully decoded and returned to the application.

Mathematical Functions

With regard to mathematical calculations, some calculations can be performed on the server with intermediate results transferred to the client for additional computations and final presentation to the user. For other mathematical computations, complete rows, or at least the numeric values of the implicated columns, must be returned to the client and the full calculation be performed on the client. In all cases, the R1 table is used to avoid computing with rows that are scheduled for deletion. The sections below explain how different computations are managed.

Comparison Functions

Comparisons such as '>', '<=', etc. involving numbers can be done on the server. Because the encoded numbers are ordered within each group, we can select from each group exactly which rows satisfy the comparison. By specifying a different comparison constant for each group, the same procedure to create the multi-part query as for the general query case is done here, with each query component seeking the rows which satisfy the comparison in its group. The single large query therefore obtains all the rows satisfying the comparison function in the table.

Aggregate Functions

MIN and MAX functions can be partially performed on the server and completed on the client. Just like the Comparison Functions above, due to the monotonicity of the mathematical function, the server can find the MIN or MAX value(s) within each group, returning them to the client. The driver can decode the sub-group MIN/MAX values and return the overall MIN or MAX across all the groups to the user.

The SUM computation can be started on the server and completed on the client. As an illustration, consider doing a SUM for just one group, to understand the general case. Imagine that the user wants to compute a SUM of a column, and a total of 3 rows from the same group are implicated. The original implicated numeric values are A, B, C; the user needs A+B+C. We add the encoded values for A, B, and C on the server and remove the average and random multiplier factors on the client. Suppose A, B, and C are in group 12 and are encoded as follows:

$$((A-\Delta 12)*RM12)+RA12$$

$$((B-\Delta 12)*RM12)+RA12$$

$$((C-\Delta 12)*RM12)+RA12$$

Here Δ12 is the average of the implicated column for group 12 while RM12 and RA12 are, respectively, the random multipliers and random addends for the implicated column for group 12. If we add these encodings on the server, we get:

$$((A-\Delta 12)*RM12)+RA12+((B-\Delta 12)*RM12)+RA12+((C-\Delta 12)*RM12)+RA12=[(A-\Delta 12)+(B-\Delta 12)+(C-\Delta 12)]*RM12+3*RA12=[(A+B+C)-3*\Delta 12]*RM12+3*RA12$$

We return this value to the client. We also need to return the number of rows implicated to the client, in this case 3. The driver subtracts from the returned result <number of rows implicated>*[random addend for group] (i.e. 3*RA12, in this example). The random addend it has in its database private key in memory. This result is divided by RM12, which it also has in memory. To this result the driver adds<number of rows implicated>*[avg of column for group] (i.e. 3*Δ12, in this example. Note, the driver has Δ12 for the implicated column in memory as well). The end result is the required SUM. For a more general multi-group SUM, the group-specific SUMs along with their row counts are returned to the client just as in the example above, decoded, and added together to provide the requested multi-group SUM to the application.

The computation for AVG can be done similarly to SUM. We compute the SUM for each group as above, combine each of the partial results on the client to produce a total sum, and divide this value by the total number of rows selected, which should be returned for each group. This is the desired average.

Other Functions

Although other mathematical functions can be partially performed on the server they mostly have to be done on the client. For trigonometric functions (SIN, COSINE, etc), the rows implicated need to be returned so that the trigonometric functions can be computed on the client. Logarithmic functions have to be computed on the client as well. Exponential functions can be partially computed on the server, but administratively it's easier to do the full computation on the client. Since the random addend for the group, now exponentiated, was added to the original numeric value, it will have to be removed by dividing the exponentiated value from the server by the exponentiated random addend. The random multiplier, a multiplier, would have to be removed on the client by dividing this result by the exponentiated random multiplier. Because the average for the group, now exponentiated, was subtracted from the original numeric value, it will also have to be removed by multiplying the previous result (which removed the exponentiated random multiplier) by the exponentiated average. Given these complex corrections, it's easier to perform the entire calculation on the client. Various other functions (e.g., STDEV (Standard Deviation), POWER, etc.) must be computed on the client as well.

Ordering Functions

GROUP BY and ORDER BY Statements

The GROUP BY and ORDER BY functions can be initially done on the server but mostly will be handled on the client. The GROUP BY function can aggregate data within a group. If only a single group's rows are implicated, the client can simply decode and return the GROUP BY results collected by the server to the user. If the aggregation of variables is done across groups, the server must return the results GROUPed BY within individual groups because of different encodings across groups. The client will decode the data, synthesize values across groups, and present the aggregate results to the user. A similar approach is used for the ORDER BY function. If numeric values must be ORDERed BY and they are just contained within one group, sorting them can be readily done on the server just as described in the Comparison Functions section above. If numeric values must be ORDERed BY and multiple groups are implicated, then all the affected rows will have to be returned to the client, decoded, and ordered in DESCENDING, etc. order and presented to the user. Numeric order is not preserved across groups. Finally, all affected rows will also have to be returned to the client when doing ORDER BY involving string comparisons. Because lexical order is not preserved after original plaintext characters are randomly permuted into other characters, all the implicated rows will have to be returned to the client. The driver will decode the rows, alphabetize the strings as requested, and present the ordered rows to the user.

Performing Secure String Comparisons

However, outside of the ORDER BY clause, doing direct string comparisons—e.g., when explicitly requested by the user in his WHERE clause—, is possible on the server. The driver constructs SQL requests to extract the necessary strings plus false SQL requests to extract strings which are purposefully NOT "greater than", NOT "less than", etc. compared to the user's comparison string. The former SQL requests provide the needed result set rows while the latter SQL requests undermine the intruder's re-identification efforts. Although lexical order is not preserved on strings, the driver does know which strings are ">", "<", etc. compared to the user's comparison constant(s). Our anonymized query is constructed to specifically ask for those strings. Due to the sheer volume, the driver doesn't itemize all possible strings meeting the user's criteria. Instead, the driver only specifies the individual characters in the first character position of the string that satisfies the user's request. The driver constructs a LIKE statement containing all the needed first position characters which, collectively, locates a superset of all strings that are in the user's requested range. From this result set the driver selects the specific rows needed by the user. For example, if the user asks for all rows " . . . WHERE last_name>'williams'", the first letter in the comparison string is "w". The range is the lower case letters; therefore, on the server we must find those rows where last_name starts with individual letters from "w" though "z". Each of these letters in the range enters a LIKE clause so that the correct rows can be located in the targeted anonymized table. The driver also adds to the LIKE clause several false characters, opposite of what the user asked for, to retrieve fake, unnecessary rows as well. Given the WHERE clause just mentioned, the driver will ask for last_names that begin with, say, "d", "e" and "k" to be returned, too.

From a security perspective, the intruder, who sees how many parts comprise our LIKE statement, will not be able to tell which string the user originally asked for. First, we are asking for character positions, not strings, so the most the intruder can surmise is that we are looking for ">='w'" rather than ">'williams'". Second, the mere fact that we send a particular number of characters in our encoded LIKE statement does not tell the intruder if the encoded query represents a simple comparison such as ">='w'" or a more complex one such as ">='c' AND <='f'". In both cases, in the domain of lower-case characters, both requests will produce an equivalent 4-component query (not including the fake character requests). Hence, the intruder cannot say what the user really asked for from the database. Third, the intruder also cannot guess which characters we are looking for because of the addition of false characters. The total number of characters in our LIKE statement will probably be larger than the total number of characters arising just from the range of first characters that we are specifying in the LIKE clause. The intruder can count the characters in the LIKE clause and find the letter that is this many positions from the end of the range or the letter that is this many positions from the beginning of the range. But he will be unable to discern the first letter in the user's original comparison constant because he cannot compute the right offset to be used due the inclusion of the fake characters in the LIKE clause. Finally, the intruder will also not be able to surmise which characters we seek because he will be unable to tell the range we are working with, further weakening re-identification efforts. Lower case and upper case characters are both encoded through random permutations in V1. Simply looking at an encoding does not reveal the case of the original plaintext character. Seeing an "h" as an encoding of a plaintext character does not reveal to the intruder whether the encoded query represents ">='s'" or ">='S'".

String Comparison Example

The following example is an illustration of how a string comparison query is constructed. Consider the request "SELECT*from patient WHERE last_name>'smith'". We focus on the first character of the constant "smith", the letter "s". For each group in "patient" (i.e., now it's in the form of the anonymized table A1), we construct a LIKE statement to find strings beginning with "s". The driver appends one character at a time to the clause until it reaches the end of the range of the domain. The range in this case is "s" through "z". To understand the construction of the entire query, let's just focus on encoding one group, say group 23. In group 23, these 8 characters are encoded as, respectively, a, 6, d, w, U, p, Q, s. They enter our anonymized LIKE statement. We also find 0-10 "fake" characters preceding "s", say, a total 4 characters. Imagine these characters are q, e, g, b, and they are encoded as, respectively, y, 3, 9, L in group 23. These characters are also added to our LIKE clause. The encoded subquery for group 23 in A1 becomes: "SELECT*from patient WHERE last_name LIKE '[a6dwUpQsy39L]%'. A similar encoded subquery will have to be constructed for all the other groups in A1. All the subqueries are combined into one large query as in the general query case described above and sent to the server. Upon return, in addition to deleting all the false rows, all the unasked-for rows are deleted by the client, too. In the case of group 23, these would relate to the encoded characters y, 3, 9, L. The client would have to delete the unasked-for rows from the other groups using their encodings as well. Lastly, the last_name values in all the remaining rows are decoded. They are compared to the original comparison string "smith" to find just the last_name values which are ">'smith'". These rows are then fully decoded and returned to the user.

Performance of String Comparison

Because we return more rows to the client than necessary, this method appears a bit slower than if we could issue string comparisons more directly. However, the majority of these rows will have to be returned anyway because they are implicated in the user's query. Any slower performance of this approach therefore mostly arises due the additional rows being retrieved from the fake character requests in the LIKE clause. However, as our Implementation Performance Results section below shows, the overall performance of our scheme on various commands (e.g. SELECT, UPDATE, DELETE, etc.) is good and that includes the use of LIKE constants in WHERE clauses. Therefore, delays to retrieve the fake rows for this approach should be manageable as well.

Programming Constructs

In addition to general queries, programming constructs such as STORED PROCEDUREs, VIEWs, and similar functions on the server called by clients' database application(s) can be "anonymized" on the server as well so that they can also work with the anonymized data. Whether the database script of the construct has to be changed on the server, however, depends on its complexity. A simple construct performing very basic queries may require no changes and our driver can call it directly. A simple construct expecting arguments also may require no changes. For example, if the construct takes arguments and targets a single table, our driver can simply create a long query containing as many subqueries as there are groups in the resulting anonymized table. Each subquery will call the construct once using encrypted constant(s) for a particular group in the anonymized table. These subqueries can be linked together via UNION statements so that the client ultimately receives the full set of result rows. Certainly complex constructs may require changes to the database script so that various queries can properly deal with the anonymized data.

In embodiments of the present invention, the anonymization process is a relatively infrequently-run process, perhaps happening quarterly or semi-annually. It must be done once to create the ADB. If no new rows are subsequently INSERTed, the owner of the ODB may wish to re-anonymize the ODB several times a year, much as if changing an application or network password. Although statistics are secure and are not changing, good security practice dictates that periodically changing the secret preserves its secrecy. Malicious observers are noticing information about queries and encodings in the ADB, which improves their attempts at re-identification of these essentially static data over time. If rows are INSERTed regularly, the ODB owner may want to re-anonymize the data perhaps once per month or more frequently to create more secure statistics. The ODB must be available for the re-anonymization; alternatively, the ADB can be decrypted and the resulting plaintext database re-anonymized. After every re-anonymization, the new database private key must be placed on the shared network drive. Other clients will access this database private key so that they can properly work with the newly-anonymized tables.

In the foregoing exemplary embodiments, we have described various computations over strings as requiring the decryption of results on the client machine before further analysis and aggregation can be completed on the client so that final results can be presented to the user. In fact, should it ever become necessary to analyze encrypted string data on the client, this can also readily be done due to the structure of our table private key for any Ai. Our key (the encoding file) is built on the database in Anonymization Step 13 wherein every character position in V1 is permuted into some other position in V1. This permutation is stored in a consistent, ordered fashion in the Ai table private key. For example, for every permutation of lower case characters, we store in our table private key, in alphabetical order, first how the letter "a" is permuted, then how the letter "b" is permuted, and so on, until how the letter "z" is permuted. Furthermore, because each representation of the next character position in a column in a given group is merely appended to the bottom of the table private key as the key is being constructed, and the size of V1 obviously does not change during each position permutation, the driver knows at any given time the offset in the Ai table private key where the permutation for a given character position for a given column for a given group begins. This unique structure of the Ai table private key allows the driver to quickly examine the encoded characters of strings returned in result sets and determine their equality or lexical order despite the fact that their character permutations are completely random and regardless of whether the strings are actually in the same or different groups. Therefore, GROUP BY, ORDER BY, and JOIN—rather than decrypting data on the client to complete analysis and aggregation, as they are described to at least partly do in the foregoing embodiments—these statements can readily be coded within the driver to examine encrypted data on the client. They could be readily re-programmed to work as follows: first, they properly construct the result set to be presented to the user from the result set sent by the server while it's still in encrypted form. Then they decrypt the restructured result set and then they immediately present the decrypted result set to the user. There is no need for these commands to do further work on the result set after it's decrypted because all cleanup (post processing) is done on the encrypted result set sent from the server. Our testing in our "Implementation Performance Results" section below was not done when such commands were coded to work with encrypted data but rather when they are coded to decrypt results as soon as possible on the client.

Also, we can readily encrypt our queries and result sets by encrypting the channel between clients (or some intermediary gateway) and the database server. A scheme such as SSL, IPSEC, etc. can be implemented to protect against known-plaintext attacks and similar kinds of attacks in the literature, if needed.

Now described are various working examples of embodiments of the present invention:

EXAMPLE 1

Anonymization Process

First, the anonymization technique takes some time to convert the ODB to the ABD. Converting a single table, O1, consisting of a hundred or a thousand rows into an anonymized table A1 made up of, respectively, approximately 300 or 3000 rows (i.e., two thirds of the rows are added false rows) and comprised of 30 groups (10 true groups and 20 false groups) takes about several minutes. If we start with an O1 containing 1,000,000 rows and wish to create a 30-group anonymized A1 table, A1 will have close to 3,000,000 rows and the anonymization can take about 5.5 hours to complete. If we wish to convert a 1,000,000-row O1 into a 120-group A1 table (still having about 3,000,000 rows but being a more secure table), the process takes about 7 hours to complete. Much of the time is spent by the database server running the database scripts. Much of this work can be ported to a JAVA (programming language) program to considerably improve performance. Moving the character encoding process, for example, from a database script to a JAVA (programming language) program changed the time required for this step from 3+ hours to 10 minutes.

EXAMPLE 2

Query Performance

The performance of various important queries in our scheme was good. We first examined in more depth our driver's performance compared to one standard, the Microsoft JDBC driver (MS driver from now on). We then compared the performance of our driver operating on two analogous A1 tables, with one being more secure than the other because it was divided into more groups. With the exception of a couple of references in this paragraph to the MS driver and the R1O table—both related to our comparison with the MS driver—the text herein describes our testing environment for both the MS driver comparison and the more-secure table comparison. Our testing was done on the MS SQL 2008 Server. The performance times pertaining to our driver below include the discarding of any false rows and the decoding, and string value trimming, of the result set by the driver to only present the proper plaintext values to the user. Note, as part of the creation of the ADB for our testing purposes, we did not employ the random addend for each numeric column as per Anonymization Step 11. We only used the average and random multiplier to encode a numeric column as described in that Step, and our statistics below reflect the usage of this pair only. However, because the random addend is only added to a number to encode it, it's incorporation to produce anonymous queries, as will be described below, and decode the result sets coming back should have minimal if any impact on the statistics below. The CPU of any computer should almost instantly handle the appropriate computations to incorporate the addend. For the purposes of our comparison with the MS driver, we compared retrieval times of the MS driver on an O1 table with 1,000,000 rows to that of our driver on the resulting A1 table of about 3,000,000 rows divided into 120 groups. Although we have recommended using a total of 30 groups for anonymization purposes earlier we wanted to examine the performance of an even more secure table to gauge any performance impact. Because in a real production environment at any given time a small portion of rows from the ODB is always deleted, we wanted to engage our DELETE mechanism so we could mirror and thus test our scheme's performance in an "equivalent" environment. Our DELETE mechanism is implemented by storing the RowNums to be DELETEd in R1. A number of our queries are implemented to also check the R1 table before retrieving or computing over the implicated rows to avoid processing any DELETEd rows. For most of the queries below, we purposefully DELETEd about 50,000 rows from the O1 table and an equivalent amount from the A1 table. (That is, for the A1 table we INSERTed the RowNums of the rows to be DELETEd into R1). For the purposes of our comparison with the MS driver, we used an equivalent R1, called R1O from now on, for the O1 tables to hold the row numbers to be DELETEd for these tables. We similarly checked against R1O when performing various queries against the O1 tables to avoid processing any DELETEd rows.

Our driver's performance results compared to the MS driver are summarized in Tables 4 and 5 below, the latter illustrating our performance comparison results for the JOIN command. The illustrations are followed by a discussion.

TABLE 4

| | Our Driver Table: about 3,000,000 rows Num of Groups: about 120 | | | | Microsoft Driver Table: 1,000,000 rows | |
|---|---|---|---|---|---|---|
| Command | Anonymized Result Set (total true and false rows returned) | True Result Set (total true rows extracted) | Speed | | True Result Set | Speed |
| SELECT (large request) | ~51,500 | ~47,500 | ~1 min., 50 sec. | ⇔ | ~47,500 | 3+ min. |
| SELECT (small request) | ~780 | 2 | 2-3 sec. | ⇔ | 2 | 2-3 sec. |
| numeric ">" comparison (larger request) | ~1,840 | ~930 | ~5 sec. | ⇔ | ~930 | ~5 sec. |
| numeric ">" comparison (small request) | ~5 | 3 | 2-3 sec. | ⇔ ⇔ | 3 | 2-3 sec. |
| DELETE (large request) | ~101,800 | ~95,400 | ~8 sec. | | ~95,400 | ~7 sec. |
| DELETE (small request) | ~780 | 2 | 2-3 sec. | | 2 | 2-3 sec. |
| COUNT (large request) | ~107,200 | ~94,800 | 4-5 sec. | | ~94,800 | ~4 sec. |
| COUNT (small request) | ~780 | 2 | 2-3 sec. | | 2 | ~2 sec. |
| UPDATE (large request) | ~107,200 | ~95,000 | ~39 sec. | | ~95,000 | ~15 sec. |

TABLE 4-continued

| | Our Driver Table: about 3,000,000 rows Num of Groups: about 120 | | | Microsoft Driver Table: 1,000,000 rows | |
|---|---|---|---|---|---|
| Command | Anonymized Result Set (total true and false rows returned) | True Result Set (total true rows extracted) | Speed | True Result Set | Speed |
| UPDATE (small request) | ~1,530 | 2 | ~5 sec. | 2 | ~2 sec. |

For the JOIN discussion below—part of our comparison with the MS driver—, our O1 was only 100,000 rows not 1,000,000 rows as above for the main MS driver comparison testing. For the JOIN comparison we only DELETEd about 5,000 rows from the O1 table and an equivalent amount from the A1 table. As we will see in the JOIN discussion below we tested JOINing O1 to O2 with JOINing A1 to A2. O2 had a size of 20 rows while A2 had a size of about 60 rows. Our performance results for the JOIN command are summarized in Table 5:

TABLE 5

| Our Driver | | | | | Microsoft Driver | |
|---|---|---|---|---|---|---|
| Table A1: about 300,000 rows Table A2: about 60 rows | | Num. of Groups: about 120 Num. of Groups: about 30 | | | Table O1: 100,000 rows Table O2: 20 rows | |
| Command | Anonymized Result Set (true + false rows and row frequency counts returned) | True Result Set (total true rows extracted) | Speed | | True Result Set | Speed |
| JOIN | ~52,600 | ~76,000 | <2.5 min. | ⇔ | ~76,000 | almost 5 min. |

We now elaborate on results shown in Tables 4 and 5s.

SELECT Statement

With regard to completing SELECT commands, our driver was equally fast compared to the MS driver when result sets were small. It was considerably faster than the MS driver when result sets were large. When retrieving a small result set from O1 (2 individual rows via a SELECT statement), the MS driver took 2-3 seconds. Retrieving an identical small result set (which contained 2 true rows and about 780 true and false rows in total) from A1 using our driver also took 2-3 seconds. When retrieving a large result set with tens of thousands of rows or more, the MS driver took about a third or more time compared to our driver. Retrieving a result set with about 47,500 rows took the MS driver a little over three minutes to finish. An equivalent result set containing 51,500 true and false rows (and the same about 47,500 true rows) took our driver about a minute and fifty seconds to complete. We suppose that the printing of the results to the screen—in which the MS driver preserves the full length of each column and therefore winds up printing many blanks before the field separator, while we only print the true length of each field followed by its separator—, may be one reason why our driver performed faster than the MS driver. It may also be the way the MS driver extracts rows from the database (e.g. apparently using a cursor to fetch rows in a specific way from the database before returning for additional rows). The MS driver source code was not available to us so we could not confirm the reason for its slower performance.

JOIN Statement

Our driver executed the JOIN command considerably faster than the MS driver as well. This was not only due to the possible printing and database query management issues discussed above. We also send less information to the client from the server and therefore optimize communication performance. Because we GROUP frequencies of, for example, the A2 table rows rather than sending back each row which is implicated, we reduce the overhead of the communications. For example, imagine we are JOINing A1 to A2 on field last_name and want to only select A1's rows. Table A2 has 10 rows with the same last name in group 32 which will be implicated in the JOIN. For group 32, we send back one row with that last_name value along with a frequency count of 10; we don't return the other 9 rows, as discussed under JOIN command processing earlier. Because this is done across many tokens in A2, we potentially considerably reduce the amount of data we return (of course, this depends on the size of the JOIN result set). To assess JOIN performance, we tried JOINing an O1 table with 100,000 rows with an O2 table of 20 rows on a single column and just SELECTing the rows from O1. The MS driver took almost 5 minutes to complete, and a total of about 76,000 rows were involved. We tried JOINing the associated A1 table of about 300,000 rows broken into 120 groups with the associated A2 table of about 60 rows, again SELECTing just the A1 rows. Our driver took a little under 2.5 minutes to finish. (A total of about 52,600 true and false rows, including the frequencies with which certain rows must be reproduced were involved).

Comparison Statement (">")

The performance of the ">" comparison was the same between our driver and the MS driver. A retrieval of a small result set—3 rows—using the ">" comparison on a numeric column took both the MS driver and our driver about 2-3 seconds to finish. (Our driver retrieved the same 3 rows and about 5 true and false records in total). A retrieval of a larger result set—about 930 records—using the ">" comparison took both the MS driver and our driver about 5 seconds to complete. (Our driver extracted the same approximately 930 records from within a result set of approximately 1,840 true and false records).

DELETE Statement

Our DELETE performance was quite close compared to the MS driver. Because we DELETE by INSERTing RowNums into R1, to make a meaningful comparison, we compared our ability to INSERT rows into R1 with the MS driver's ability to INSERT rows into the R1O table. Our DELETE statistics measure the time to INSERT the implicated rows into R1, or R1O, as opposed to actually erasing those records from their respective tables. A DELETE for a small number of rows, 2 rows, took 2-3 seconds using the MS driver as well as our driver. (Two rows and about 780 true and false rows in total were DELETEd by our driver). A DELETE command to erase about 95,400 rows from O1 took the MS driver about 7 seconds to finish. Our equivalent DELETE command on the A1 table (about 95,400 true rows and about 101,800 true and false rows in total were involved) took about 8 seconds to finish.

COUNT Statement

When issuing COUNT commands, our driver's performance was also quite close to the MS driver. When the number of rows implicated was few (2 rows), the MS driver retrieved a COUNT result in 2 seconds. Our performance on small result sets (e.g., the same 2 rows and a total of about 780 true and false rows were involved) was 2-3 seconds. When the number of rows implicated was large, about 94,800, the MS driver retrieved a COUNT result in 4 seconds, whereas we finished an equivalent retrieval in 4-5 seconds. Our driver worked with a total of about 107,200 true and false rows to retrieve the approximately 94,800 true rows.

UPDATE Statement

The performance of our driver on the UPDATE command was about two and a half times slower compared to the MS driver. An UPDATE command to alter a single column value implicating a small number of rows (2 rows) took about 2 seconds via the MS driver while it took about 5 seconds via our driver. (Our driver processed about 1,530 true and false rows to UPDATE the 2 true rows). When working with large result sets, an UPDATE command to alter a single column value implicating approximately 95,000 rows took, on average, 15 seconds with the MS driver. With our driver it took, on average, about 39 seconds to finish. Our driver processed about 107,200 true and false rows to UPDATE the approximately 95,000 true rows.

In general, when we are slower than the MS driver, we suspect that our poorer performance is due to our need to involve more rows and more columns in our queries. Our queries implicate more sometimes many more (false) rows which the MS driver does not have to deal with. In the case of the UPDATE command, we also have to update the length field in the RecInfo column in addition to updating the implicated column value. The extra update takes approximately half of the time compared to the overall UPDATE elapsed time.

EXAMPLE 3

Query Performance Over More Secure Tables

With regard to query performance when the security of tables is increased, in our testing, increasing the number of groups into which an anonymized table is divided did not affect by much the time for queries to complete. We tested an O1 containing 1,000,000 rows and the resulting A1 containing about 3,000,000 rows divided into 30 groups (10 groups were true and 20 groups were false) as we normally recommend. We then improved security further by dividing an A1 generated from a very similar O1 (and also having roughly 3,000,000 rows) into 120 groups (40 groups were true and 80 groups were false). We tested the performance of SELECT, COUNT, DELETE, UPDATE, and mathematical comparison functions of the two A1's. Our testing process was described in the section above, "Query Performance". The 120-group A1 was, on average, slower by a couple of seconds, if that much, on various queries compared to the 30-group A1. FIG. 20 below highlights the performance comparison between the two A1's:

TABLE 6

| | A1 Table (30 groups) Size: about 3,000,000 rows | | | | A1 Table (120 groups) Size: about 3,000,000 rows | | |
|---|---|---|---|---|---|---|---|
| Command | Anonymized Result Set (total true and false rows returned) | True Result Set (total true rows extracted) | Speed | | Anonymized Result Set (total true and false rows returned) | Total Result Set (total true rows extracted) | Speed |
| SELECT (large result set) | ~54,100 | ~47,500 | ~1 min., 44 sec. | $\Leftrightarrow$ | ~51,500 | ~47,500 | ~1 min., 50 sec. |
| SELECT (small result set) | ~5,500 | 1 | 1-2 sec. | $\Leftrightarrow$ | ~780 | 2 | 2-3 sec. |
| numeric ">" comparison (larger result set) | ~2,100 | ~930 | ~4 sec. | $\Leftrightarrow$ | ~1,840 | ~930 | ~5 sec. |
| numeric ">" comparison (small result set) | ~5 | 3 | ~2 sec. | | ~5 | 3 | 2-3 sec. |
| DELETE (large result set) | ~114,800 | ~94,800 | ~8 sec. | | ~101,800 | ~95,400 | ~8 sec. |

TABLE 6-continued

| | A1 Table (30 groups) | | | A1 Table (120 groups) Size: about 3,000,000 rows | | |
|---|---|---|---|---|---|---|
| | Size: about 3,000,000 rows | | | Anonymized | Total | |
| Command | Anonymized Result Set (total true and false rows returned) | True Result Set (total true rows extracted) | Speed | Result Set (total true and false rows returned) | Result Set (total true rows extracted) | Speed |
| DELETE (small result set) | ~5,470 | 1 | ~2 sec. | ~780 | 2 | 2-3 sec. |
| COUNT (large result set) | ~115,300 | ~95,500 | 3-4 sec. | ~107,200 | ~94,800 | 4-5 sec. |
| COUNT (small result set) | ~5,470 | 1 | 1-2 sec. | ~780 | 2 | 2-3 sec. |
| UPDATE (large result set) | ~114,800 | ~94,800 | ~30 sec. | ~107,200 | ~95,000 | ~39 sec. |
| UPDATE (small result set) | ~5,470 | 1 | 2-3 sec. | ~1,530 | 2 | ~5 sec. |

EXAMPLE 4

Database Private Key Issues

One potential drawback of our scheme is the loading of the database private key into memory. When we tested with an A1 of 3,000,000 rows and 120 groups, the loading of the various components of the private key could take 7 seconds. However, this delay only happens during the establishment of the session between the application and the database. The establishment of the session happens infrequently; therefore, the 7-second delay should also be infrequently experienced by the user. Our code to load the private key is placed in the initialization routines of the driver because we need the private key early in our processing. These routines are invoked when the session between the application and the database is created. (For example, this may happen when the user opens his application by double clicking on it in his Windows Desktop). The application will not close the session until the application is closed. Otherwise it has to pay the penalty of going through its own initialization routines again to open a new session with the database. Until the session is closed, therefore, the user will not experience the 7-second delay from the loading of the database private key into memory. The delay may be considered part of application initialization and we believe it should not significantly affect the user's experience. There will probably be other initialization delays which the user will have to bear as his application loads, and our 7-second delay may, in fact, be considered one such delay. However, if this becomes problematic, a separate daemon can be built which will start when the user boots his machine, or the first time that the user starts the application. The daemon will load and manage the database private key, communicate with our driver when it requests the key (e.g. for data encoding and decoding), and not close until a truly terminal event, e.g., a machine shut down. Under such a scenario, the 7-second delay is suffered by the user infrequently or, probably, rarely because the daemon should, practically speaking, rarely be closed.

A related issue when loading the database private key is memory capacity. In earlier designs of our scheme, we experimented with loading millions of records representing our database private key into memory from disk as we tried to keep track of more metadata related to our anonymized table(s). Because there were so many rows to load, occasionally the driver on our test machine, a laptop with 2 GB or RAM, would hang with error messages such as "out of heap space". It is possible that if there are many private key files for many tables to load—i.e., one, two, or more million rows placed into memory—, the driver may similarly hang on client machines. There are three possible solutions to this problem. One is to purchase more memory for the hanging client workstations. Two is to allocate more overall memory to our driver on the hanging machines. When we increased our internal JAVA (programming language) heap size on our test machine, through a re-configuration of the JAVA (programming language) Virtual Machine, we alleviated the problem. The third solution is to again create a daemon which will manage the database private key for all client workstations. This daemon can be placed on a separate machine which has a large memory. It will communicate with all the clients, or just those that hang, if that is better, when they need access to the database private key.

EXAMPLE 5

This Example analyzes why an initial group count of 5 is chosen in Anonymization Step 3. A final total group count of about 30, produced from an initial group count of 5, as explained in Anonymization Step 3, makes it exceedingly difficult to break the string encodings that will be contained in A1. To understand why, we must first understand how the intruder attempts to break our scheme. Let's recall that we anonymize numeric columns by using a monotonic function which preserves the ordering of numbers within every group across all numeric columns. The intruder can use his O1 copy, chose a numeric column M0 he likes, sort it in descending order, and extract the highest values from the column. Then he locates the corresponding column M1 in A1, and launches a matching process to relate his highest values in M0 with the highest values in M1. As M1 is broken into groups, the intruder uses a loop operation to examine every group he sees in M1. O1's highest values had to have been distributed within A1 somehow, and this matching process attempts to locate them.

As he links the two ordered sets of M0 and a particular group within M1, the intruder extends the hypothetical links of numbers into links of strings. What we mean is: suppose the intruder has identified a row in M1 that he thinks matches one of his highest numeric values in M0. He now makes a hypothetical assumption that the decryption of the field s1 from some string column S1 from A1 (restricted to the row of matching numbers) has value s0 which is a field in the corresponding column S0 from O1 (restricted to the row of matching numbers). He propagates s0 as a decoding key onto all characters within the group that match by position and value to the characters of s1. If he is able to completely replace all of A1's character strings in that group without conflicts (i.e. no interference with decoding attempts based on prior numerical matches), the intruder has found a potential way to decode the group. By going through the matching process and bringing in more decoding rules (i.e. more s0's), the intruder either completes the decoding of the entire group, or must revisit his previous assumptions and make new matching assumptions for steps he previously completed. If his initial selection of the set of highest numbers in M0 and group in M1 are large enough he will likely succeed, though it will cost him an enormous amount of time as we calculate below. The remaining highest numeric values from O1 can be used to try and decode another group in A1, until all groups in the table are so decoded. Given this approach, we suggest the following heuristic approach to find the number of groups into which A1 should be divided. The output of these calculations is an estimate of the maximum time it takes for the intruder to successfully decode one group.

Upper bound, in seconds, on time to "break" one group=
[(1% of total # of rows in O1)*(total # of groups in A1)*
(1% of total # of rows in A1 group)$^3$*(total # of rows per group in A1)*
(total # of characters to be decoded per row in A1 group expressed as
of general operations to be carried out on a computer)*
(total # of assembly statements required to handle one general operation on
a computer)]/
[(total # of assembly statements performed by intruder's computer per second)*
(# of computers employed by intruder)]

The intuition for these terms stems from our description of the intruder's approach above:

The factor (1% of total # of rows in O1) arises because the intruder wants to focus on the top (e.g., 1%) of the numeric values in O1's numeric column. These are the "extreme" values which allow her to match the most "extreme" (i.e., highest) values in A1's numeric column, leading to more certainty in the matching of values.

The factor (total # of groups in A1) arises because, in the worst case, the intruder may need to decode every possible group in A1 until he reaches the last group where decoding finally succeeds.

The factor (1% of total # of rows in A1)$^3$ arises because the intruder has to, in the worst case, complete a nested-loop three levels deep as he tries to decode A1's string column. First, the intruder has to loop through all possible numbers, call them Ps, in the highest numerical values of A1's group. He is trying to match them with the highest numbers in O1's group. Given an initial "seed", i.e. a possibly matching P, the intruder tries every other number in his list, we can call them Qs, one by one. He tries to decode the remaining strings in A1's group using the associated strings from O1 which match the Qs. Imagine he gets closer to the end of the list of Qs and fails. That is, he finds he cannot impose a decoding scheme on A1's group using the 01 string matched to the current Q record due to decoding conflicts (e.g., the characters he's trying to decode have already been decoded via a match with a previous Q record). He has to back up one position, to (n−1), and try the n-th decoding (the decoding for the current Q record), as the (n−1)-th decoding. He has achieved success until now, therefore, he can remove the decoding of the previous O1 string and attempt to decode using the current O1 string. In the worst case, he will have to go down to almost the end of the list of Qs, then be forced to retrace his steps back to the beginning of the list, and attempt to traverse the (almost) complete list again, trying to find a proper decoding for A1's string column in the group.

The factor (total # of rows per group in A1) arises because for every numerical match, the intruder will have to decode at most the entire string column within A1's group using the value from O1's string column. As explained before, during anonymization, we try to maintain the same number of rows per group in every Ai table.

The factor (total # of characters to be decoded per row in A1 group expressed as # of general operations to be carried out on a computer) arises because for each string replacement attempt, the CPU has to replace, e.g. using SUBSTRING or other pattern matching operations, a specific number of characters in the string. For example, it could be the maximum string length for the column.

The factor (total # of assembly statements required to handle one general operation on a computer) arises because a general operation to replace one character within some higher level language (in which the intruder's program presumably would be written) would take more assembly instructions to actually carry out on a computer.

The factor (total # of assembly statements performed by intruder's computer per second) arises because we need to incorporate how long it will take the intruder's computer to replace one character during the decoding attempt.

The factor (# of computers employed by intruder) arises because the intruder can use more than one CPU and have them work in parallel trying to decrypt the group. The main loop in our "algorithm" above (and alluded to in step 1 above), can be broken up so that different computers are trying to successfully replace strings in their own range of the highest numeric values in O1.

As an illustration of a possible computation of the upper bound, imagine the following values exist for a given installation of our scheme at a customer site:

(1% of total # of rows in O1)=10,000 (i.e., assume an O1 of 1,000,000 rows)
(total # of groups in A1)=30 (i.e., imagine the resulting A1 is divided into 30 groups)
(total # of rows per group in A1)=100,000 (i.e., assume an A1 of approximately 3,000,000 and a group count of 30)
(1% of total # of rows in A1)$^3$=(1000)$^3$ (i.e., assume an A1 of approximately 3,000,000 rows and a group count of 30. Therefore, the row count per group is 100,000, and 1% of this is 1000)
(total # of characters to be decoded per row in A1 group)=10 (i.e., assume we are working with column Last Name which has a maximum length of 10 characters.

In the worst case, all of these characters would have to be decoded when decoding a row)

(total # of assembly statements required to handle one general operation on a computer)=10

(total # of assembly statements performed by intruder's computer per second)=3,000,000,000 (i.e., a CPU operating at 3.0 GHZ)

(# of computers employed by intruder)=1

Therefore, upper bound on the time to break one group, in seconds, is:

$$[(10000)*(30)*(1000)^3*(100000)*(10)*(10)]/[(3000000000)*(1)]=1{,}000{,}000{,}000{,}000 \text{ seconds}\sim 31{,}700 \text{ years}$$

Although this is a very high number, it's important to point out that this upper bound estimates the effort to decode one group. The intruder will have to apply similar logic, using his remaining highest values in his 10,000 original O1 values, to decode the other groups. Only then has he successfully decoded the full table. The upper bound to decode the entire table would therefore be significantly higher than the estimate above. But even decoding the complete table does not mean that the intruder has decoded the original table. Since we add false rows to A1 as part of anonymization, the intruder may obtain a successful decoding on the false groups. Some or many false groups would be decoded via the approach above because false groups are made to mimic true rows and true groups. The intruder cannot definitively say he's decoded the original values because he may have decoded fake values. That is why the final group count of about 30, and an initial group count of 5, is useful for near any table. The upper bound on the time to break the entire table is extremely high. And even if he achieves "success," the intruder still can't be sure he's decoded the true rows.

The following sections describe two more embodiments of the invention. Both deal with the representation and the computation of numbers in an encrypted fashion. To this end, both schemes would work within the invention within a group. That is, the descriptions below describe homomorphic representations and computations as would exist within a group. If there is a need to perform computations across groups, computations within every group would be done on the server with the encrypted data. Subsequently, the homomorphic results would be returned for each group to the client. On the client the results for all groups would be decrypted and combined to produce a single result which would be returned to the user.

Note that the term "PDL" in these two embodiments mean the server hosting the encrypted data. This server may be in the cloud or data center or another hosted location. The term "DCL" in these two embodiments means the client where the user's database application resides and which has the keys to decrypt the data sent from the PDL.

This embodiment elaborates encryption and decryption operations over rational numbers. Even though the same encryption applies against real numbers, we have no practical usage on the computer for the true real numbers unless they are rational. Therefore, elsewhere in this paper, it is assumed that numeric data we use consists of the rational numbers only. The invented family of the encryption algorithms—called as RLE (Ratio Less Encryption)—is described in this paper by the system of linear algebraic equations, and decryption is made possible by solving this system of equations. This family provides cloud and data centers computing with a new way of database operations, data hosting, transmission and computational analysis using ciphered data.

During RLE development, two areas—the computer calculations reliability and data hacking—were specifically scrutinized. Since the loss of significance digits in computations due rounding, truncation and inadequate binary data presentation would significantly affect the quality of RLE symmetrical encryption, therefore, the first few chapters of this paper is dedicated to the analysis of these losses and foundation of the reliable RLE symmetrical encryption. Upon conclusion with reliability issues, we introduce RLE encryption transformations and elaborate algorithms to perform general numerical and statistical calculations using RLE encrypted data. Associated with these calculations is one of the main results of this paper stated as follows:

Without compromising the security and privacy, the basic arithmetic operations (addition, subtractions, multiplication and division), individually or in tandem (i.e., as part of the complex calculations), can be derived over encrypted data until the final result, still encrypted, reaches the end user, where it can be decrypted and displayed on user's screen, or archived for further needs.

To demonstrate the RLE applicability in performing meaningful calculations, we derived rudimentary statistics—the variance and covariance of the true data—by using the encrypted data only. In spite of the size of the samples ($3E10^5$ and $10^6$ entries), the results were obtained with up to 15 digits accuracy for double precision data and 32 digits accuracy for BigDecimal data with initial precision of 38 digits (including the whole numbers).

Alongside with RLE based numerical calculations, this paper demonstrates that randomization and partial privatization of the encrypted data deliver a strong encryption, preventing intruder's malicious attacks—like open data attack or brute force attacks. (In the rest of this paper an open data attack is an attack in which, the intruder has a partial knowledge about correspondence between a few encrypted and true items).

To aim in understanding of the RLE methodology and to raise the confidence in using it, a series of examples with an accelerated level of complexity were built throughout the text.

1.0 Introduction: In order to prove the main result (stated in abstract) we implement the RLE randomized encryption methodology which makes RLE encrypted data completely scrambled and unrecognizable by no one without knowledge of private keys. Since RLE decryption goes through a series of algebraic calculations to reverse the encrypted code, therefore, deciphering might result in loss of significant digits. Later could invalidate the decrypted results as we may not get the deciphered data exactly the same as we began with. Thus, knowledge of the private keys and reverse algorithms, in case of RLE, does not guaranty the reliable deciphering, yet. This makes RLE very different from the whole number encryptions (such as Rivest algorithms [1] [2], AES [6], etc.) where the knowledge of the private key and knowledge of the reverse procedures guarantees the reliable deciphering.

Thus, in case of RLE deciphering, not only we need the knowledge of the private keys and reversing procedures but also we must make sure that our decryption operations will not result in the significant (beyond reliable level) loss of significant digits.

Thus being said, as a prerequisite for RLE foundation, this paper invested a significant effort to analyze inaccuracies associated with data conversions into internal computer format. Likewise, calculation problems due rounding, truncation and unreliable algorithms were thoroughly investigated. Subsequently, some rudimentary measures for calculation of error estimates were proposed to aim in performing reliable encryption and decryption operations. In doing arithmetic, RLE strongly adhere to IEEE 754 standards in an attempt to avoid calculations resulting in none numerical symbols like NaN, ±0, ±∞. The obtained conclusions had been put forward to build sustainable RLE algorithms for symmetrical encryption.

In conclusion of this short introduction, and in addition to what had been said about RLE reliable encrypting, we submit that elaboration of RLE security (due randomization and randomized operations) and proof of the main results (related to secure numeric operations over RLE encrypted data), shows that RLE technology not only can be used for encryption of databases and operations but also for performing numerical analysis in the public networking domains.

1.1 RLE domain and targets: Let's agree here and to the end of this paper to use symbol ■ for designating the end of proof or end of discussions with respect to a particular statement or topic.

We begin introducing RLE by specifying the target of our work so as to explain why we need the new encryption tools instead of using existing encryption methodologies. The encryption target in this paper is the rational numerical data. As far as textual data is concerned, we assume that this data must be converted to numeric form, so then the RLE encryption rules could apply. One might argue that textual data is also numeric given how computer understands and interprets it. However, nobody had ever spoken about precision of textual data, where for us this topic is one of the major points for concern. Thus, numerization of textual data enables us to adjourn from its internal presentation (which may be different on different computers) and enables to treat every entry in database or flat files as a numeric entity. Another consideration why we need RLE encryption algorithms is because they are especially effective for structured data (such as databases, XML files, etc.) where data is naturally pre-partitioned. For unstructured data (such as large flat files, or large blobs, etc.), we shall pre-partitioning them first so as to benefit from RLE usage. Since pre-partitioning of nonstructural data is kind of a work of art, therefore, this topic shall be examined separately.

Thus, in this paper, we will assume that we are dealing with a Relational Database Management System (RDBMS). But our approach works with other structured and even unstructured data. As result, our examples for large statistical calculations are produced by using RDBMS data, where illustrations of arithmetic operations were based on the hand made collections of data.

Let's look at some numerical columns which we want to encrypt. According to RDBMS logical design, each database is a combination of some kind of columns of homogeneous entities. By this we mean that the number of stars in Andromeda Galactic and the price of the one piece of soap cannot belong to one and same column of RDB data. The reasoning for forming a column is due to some functional properties natural for this column. We, thus, have columns of salaries, columns of people ages, or columns of stock prices (industrial, commercial, etc.). Correspondingly, we look at each column as a statistical sample and apply statistical sampling technique to study, sort, get rid of outliers or do other manipulations over our data. This aims the fact that all entries within a column are related to each other. The following example illustrates our concept.

Example 1.1

Let's consider a Salary column from Employee table describing employee information of a large hospital. The salaries are ranging from 5 figures (15-30K of dollars) to 7 figures (1-2 million dollars). Hardly ever a full time worker in a hospital would earn less than 15K with minimum wage $7.5 per hour. Likewise, it is almost improbable that the highest salary of a hospital Executive will exceed 3-5 million dollars. Thus, the natural range of the salaries in the Salary column is between 15K and 5000K. As, on the lower end, the precision of the salary is typically measured in cents, therefore, the "chunk of salaries" for the hospital employees is some range of rational numbers from 15K to 5000K measured with two decimal digits after the decimal point.■

1.2. RLE Data realm: Let's R be a set of the rational numbers. Since R is used in this paper for computer applications and because arithmetic or binary operations over numbers in R could potentially produce either too small or too large numbers or unrecognizable combination of bits, therefore, based on IEEE-754 standards, five symbols (NaN, ±∞, and ±0) are added to the set R. This combination of set R and five symbols, for the future references, will be called as realm $\Re$.

In addition, we assume that the maximum and minimum ranges of the rational numbers that ever be used for RLE applications are laying inside of the interval $(-10^{150}, 10^{150})$, and the precision of these numbers can't be higher than E-100. These limitations, though, are set exclusively due computer limitations as RLE scheme posses no such restrictions.■

2.0. Data transition from external to internal formats: As every rational number R is a ratio of two whole numbers, p and q, therefore, without loss of generosity, for the future references, we will assume that p and q are mutually exclusive, i.e., their greatest common divider is equal to one. With respect to rational numbers and their different format presentations (inside and outside of computer), the following four topics will be discussed and illustrated in the subsequent sections 2.1-4.1.2:

- numeric representation of data before (NRB) it enters the computer
- conversion of NRB data to decimal format (NDB) before it enters computer
- conversion of NDB data into computer internal format (NIF)
- precision of NRB, NDB and NIF data types 2.1. Numeric representation of NRB data: For commonality purposes, we will use the virtual scientific notation for numeric data which is defined as follows:

$$R=a_0(a_1 \ldots a_k)_b*\mathrm{pow}_c(d_0(d_1 \ldots d_l)_c) \quad (2.1.1)$$

where:

$(a_1 \ldots a_k)_b$ is mantissa over base b $a_0$ is the sign of number R $\mathrm{pow}_c(\ldots)$ is the power function, i.e., $\mathrm{pow}_c(x)=c^x$ $(d_1 \ldots d_l)_c$ is a degree mantissa over base c for the power function $\mathrm{pow}_c(\ldots)$ $d_0$ is sign of the degree The expression (2.1.1) is the most generic form of NRB, though, for our purposes, we will identify bases b and c as one and the same number by setting b=c. To convert any rational number R (given in form (2.1.1) to decimal value, we first convert numbers $a_0*(a_1*b^0+a_2*b^1+ \ldots +a_k*b^{k-1})$ and $pow_b[d_0*(d_1*b^0+d_2*b^1+\ldots+d_l*b^{l-1})]$ into two decimal values p and q, and then divide p into q as usual. Without loss of generosity we further assume that p and q are decimal numbers (i.e., b=c=10), and the issue remains as to what range and precision of the decimal ratio p/q we would like to maintain. These two items—range and precision—will be our next topic.

2.2. Range and Precision of NRB: Before we proceed with our elaboration, let's assume that rational numbers in this and subsequent sections belong to one and the same chunk of data. For simplicity, we could think of a chunk as a column in a database table, though, for an unstructured data organization, we could associate with a chunk a sample of preselected numbers from this organization. Thus, when we talk about range and precision of a particular number we gather that same assumptions and conclusions are true for all the numbers in a chunk.

First of all, there are natural limits for the maximum and minimum numbers for every chunk as long as we speak about a real life application. Thus, fiction applications, as well as, infinite chunks are excluded from our discussion. Secondly, there is a natural limitation posed by computer as to how many significant digits it can maintain in one numeric word (or data type). The spread of significant digits between the highest significant digit of the maximum number in a chunk to the lowest significant digit for the same chunk we call as the range of the chunk, and the precision of the lowest significant digit we call as the chunk's precision. Depending on the software and the data type we chose for our calculations, there may be a problem to fit a given data type into a particular range. For example, for a double type in Java, computer allocates 64-bits for one word. From it, 52 bits are used for mantissa, 11 for exponent and one bit for sign. This construction allows only 16 decimal digits to fit in one word, and, thus, such accommodation may not be sufficient for some chunks to perform multiplication and division (or else) without loss of precision. Therefore, let's make 2.2.1. Precision assumption: in view of the modern computer technologies, we will assume that, for all the practical purposes,—no matter how large the initial range of the data is,—we could always find a data type, or, if needed, a series of data types, to accommodate our data with some small and insignificant rounding error depending on the chunk's precision.

What kind of small and insignificant rounding error we are talking about is the quintessence of our preparatory work for introducing the RLE encryption. We will revisit this issue as our scheme for converting data to computer format will progress.

Let's conclude this paragraph by bringing Example 2.3. A set of 99063 numbers was generated using random number generator. This simulation produced a normal distribution with mean 100, standard deviation 0.05 and range from $10^2$ to $10^{-13}$ (maximum 16 digits per number). The entire operation was performed on a computer using Java code. The average for the sample had been calculated with a precision of $10^{-28}$. Then, each number from this sample was divided by the obtained average, and all such ratios were summed. The result of this sum was found to be $99063+2.16*10^{-26}$. Since the expected result is 99063, the calculation error, in this calculation, thus, was $2.16*10^{-26}$. This is a small number considering that the initial precision for the chunk was $10^{-13}$. The complete and final result of this run is presented in Table 2.3.1 below.

TABLE 2.3.1.

| | |
|---|---|
| Clock time Before insert randnum to $T_r$able | = 2011-02-17 16:59:36.453 |
| Insertion into $T_r$able completed | = 2011-02-17 16:59:45.812 (9 sec) |
| Aft Summation total Big | = 9904085.3512087928039000000000000000 |
| BigAverage as totalBig/99063 | = 99.977644036711918717381868 1041 |
| Insert {X − Avg} into Table pl | = 2011-02-17 16:59:46.125 (0.3 sec) |
| ValidateAvg = Avg * $N_{samp}$ | = 9904085.3512087928038999999999996458 |
| Error Validation | = 3.542E−24 |
| writing ratios X/Avg to $T_1$able | = 2011-02-17 16:59:46.203 |
| Insert $T_1$able completed | = 2011-02-17 16:59:55.265 (9 sec) |
| Ratio Data back from $T_1$able + summation Σ (X/Avg) | = 99063.000000000000000000000000216 |
| Read $T_\Delta$able after summation | = 2011-02-17 16:59:55.515 (0.3 sec) |
| Validation derivatives Σ (X − Avg) | = 3.5417E−24 (Whole test 19 sec) |

3.0. Conversion NRB into Numeric Decimal NDB This paragraph gets into details regarding range and precision of NRB and NDB data. Let's notice that when original (raw) data is decimal, both NRB and NDB are the same. When NRB is not decimal, then it is a pure fractional number p/q, with or without the whole part. If p>q, then ratio a=p/q has a whole part supplemented with some fraction. Let's make the following assumptions regarding these fractions:

(A) a none periodic decimal fraction (B) a periodic fraction (C) a combination of the none periodic and periodic decimal fraction Indeed, if q is a product of $2^m$ and $5^n$ for some m, n=0,1, . . . , then (A) is taken place. If, to the contrary, q does not contains factors of 2 and 5, then (B) is hold. Finally, if q contains mixed factors: either 2 or 5, or both, and other than 2 and 5 factor, then (C) is true.

Since the precision of the whole number is defined by the lowest digits, therefore, without loss of generosity, we assume that p/q consists of the fractional part only.

Note: The non periodic fraction size depends on $2^m$ and $5^n$ denominator's components. The size of periodic part (if any) depends on the q factors other than 2 or 5. If Z is one such factor—other than 2 or 5, and $Z>10^{16}$, than to display just one period of the fraction p/q we need data types allowing more than 16 digits (which, for example, excludes a double data type in Java).

Regardless on p, q, m, n and Z, the conversion of NRB into NDB is a deterministic process which can always be completed in a finite number of steps. This process will be described next.

3.1. Conversion of NRB into NDB process: Let's X=p/r is the rational number to be converted to decimal form, p<q, $q=2^m5^nZ_1*\ldots*Z_k$, and $Z_1, \ldots, Z_k\neq 2, 5$. Let's $X_0, X_1, \ldots, X_a$ (a is some positive whole number) are all the iterations of X obtained during a process of converting X to NDB form. All iterations Xi, i=1, . . . , a, are described by the following stepwise process $\mathfrak{D}$.

Step 1. Select factor $Z_0=2^m*5^n$ containing the maximum number of 2 and 5 dividers in q and assign $X_0=p/(2^m*5^n)$ as a first iteration of NDB. If q does not contain the nontrivial factors then assign $X_0=p$.

Step 2. Let's assume that for every j≤i an iteration $X_j$ had been built, so:

$$X_j=X_{jr}+\Delta X_j, \tag{3.1.2}$$

where $X_{jr}$ is the rounded value of $X_j$, and $\Delta X_j$ is an estimated rounding error. Let's, now, build the next iteration $X_{jr}$ for j=i+1, and find an estimated rounding error $\Delta X_j$. Let's s is the number of significant digits in previous iteration $X_i$, and $x_0$ and $x_{s-1}$ are the lowest and highest precision digits in $X_i$.

Step 3. Let's calculate the rounded decimal periodic representation for $Y_j\equiv 1/Z_j$, j=i+1, as well as an estimated rounded error $\Delta Y_j$ for $Y_j$. Let's t is the significant range of $Y_{jr}$ (where $Y_{jr}=Y_j-\Delta Y_j$), and $y_0$ and $y_{r-1}$ are the highest and lowest precision digits in $Y_{jr}$.

Step 4. Let's multiply the previous iteration $X_i$ by the rounded $1/Z_j$, j=i+1, fraction. We get $$X_{jr}+\Delta X_j=X_i*Y_j=X_{ir}*Y_{jr}+X_{ir}*\Delta Y_j+Y_{jr}*\Delta X_i+\Delta X_i*\Delta Y_j \quad (3.1.4)$$

We have $|\Delta X_i|\le 5*10^{-s}$, $|\Delta Y_j|\le 5*10^{-t}$ based on assumptions for $|\Delta X_i|$ and $|\Delta Y_j|$.

If range for the product $X_{ir}*Y_{jr}$ in (3.1.4) is too large to fit into a predefined data type then the sum (3.1.4) must be truncated and rounded. Subsequently, in this case, the errors product, $\Delta X_i*\Delta Y_i$, must be dropped because its precision too high to contribute any digits—significant or dirty—to the truncated sum (3.1.4). Regardless of whether any digits from $\Delta X_i*\Delta Y_j$ can be used during rounding of (3.1.4) to get $X_{jr}$ or not, we compute the j=i+1 iteration by selecting $X_{jr}$ and $\Delta X_j$ from (3.1.4) as follows:

$$X_{jr}=(X_{ir}*Y_{jr}+X_{ir}*\Delta Y_j+Y_{jr}*\Delta X_i+\Delta X_i*\Delta Y_j)_r \quad (3.1.5)$$

$$\Delta X_j=\Delta(X_{ir}*Y_{jr}+X_{ir}*\Delta Y_j+Y_{jr}*\Delta X_i+\Delta X_i*\Delta Y_j) \quad (3.1.6)$$

The expression $( \ldots )_r$ with a sum of four products inside on the right side of (3.1.5) needs an explanation. We associate with $( \ldots )_r$ a window through which we see digits of four products inside curly brackets. The product with the lowest precision in it is the left most digit in $X_{ir}*Y_{jr}$. The product with the highest precision in it is the left most digit in $\Delta X_i*\Delta Y_j$. The distance in decimal positions between left most digits in $X_{ir}*Y_{jr}$ and $\Delta X_i*\Delta Y_j$ is s+t digits. Sign '$)_r$' at the end of the right side in (3.1.5) is the sign for truncation and rounding operation being applied to the expression inside of the brackets. If operation $( \ldots )_r$ truncates and rounds V digits and v<s+t then $\Delta X_i*\Delta Y_j$ cannot contribute any digits to the rounded value of $X_{jr}$. Similar consideration would apply to inequalities v<s (and $X_{ir}*\Delta Y_i$ cannot contribute digits), or v<t (and $Y_{jr}*\Delta X_i$ cannot contribute digits) to $X_{jr}$ value. Finally, if v<min(s,t) then only digits from $X_{ir}*Y_{jr}$ can be used to form $X_{jr}$. Formula (3.1.6) is a complementary to (3.1.5) and plays no independent role in selecting the range of the i+1 iteration product.

Thus, formulas (3.1.5) and (3.1.6) enable to maintain the selected range (constant, incremental or variable) across iteration process. The rounded error $\Delta X_{i+1}$ and product $X_{(i+1)r}$ which are calculated at current iteration get passed as is to the next iteration. This concludes exploration of NRB to NDB conversion.

The following example illustrates some of the discussed issues. In particular, it restores the true significant digits in (3.1.5) using every one product inside of the right side brackets. For simplicity, we use the decimal fractions only.

Example 3.1.7

Let's $X=69783*10^{-7}$, $Y=345678*10^{-10}$, $X1=6978*10^{-6}$, $\Delta X_1=3*10^{-7}$ $Y_1=34568*10^{-9}$, $\Delta Y_1=-2*10^{-10}$. We have $X_1*Y_1=24121550400*10^{-17}$, $Y_1*\Delta X_1=103704*100^{-17}$, $X_1*\Delta Y_1=-139560*10^{-17}$, $\Delta X_1*\Delta Y_1=-6*10^{-17}$.

Direct substitution of intermediate products $X_1*Y_1$, $Y_1*\Delta X_1$, $X_1*\Delta Y_1$, $\Delta X_1*\Delta Y_1$ in formula (3.1.4) validates our calculations.

Let's notice that product $X*Y(=24122447874*10^{-17})$ has eleven significant digits, and only the first four digits are in match with $X_1*Y_1$ digits. The last seven digits in $X_1*Y_1$ are in error because expression $(Y_1*\Delta X_1+X_1*\Delta Y_1+\Delta X_1*\Delta Y_1)$ has a range is from $10^{-21}$ till $10^{-27}$, and every digit from this range is in error due accumulated rounding errors.■

There is a caveat here. In order to multiply numbers with more than eight significant digits we need double arithmetic multiplication. As Java offers only 16 decimal digits for doubles, therefore, just a simple multiplication of eight digits number by a nine digits number produces a loss of the last significant digit and rounding of the $16^{th}$ digit in the product. As such errors get accumulated we cannot use standard Java's data types to perform multiplication. Fortunately, Java has an advanced mechanism—the BigDecimal arithmetic—which enables operations over numbers with large range. We used earlier the BigDecimal arithmetic to get results in Table 2.1.1. We will use the BigDecimal Math Library further on for different encryption tasks throughout this paper. Our next topic of discussion is conversion NDB data to NIF format.

4.1. Conversion to NIF format: Comment: If tomorrow's computers will be able to perform decimal operations without converting data to binary format first, then the discussion in this paragraph would be obsolete. Until then, we must visualize to some greater detail the problems associated with our data presentation inside computers so as to see what we can do to get around or minimize the conversion data errors.

In this section, our target is conversion of external data (mostly decimal) into internal (always binary) format. The problem with conversion, and subsequent idiosyncrasies associated with computational errors had attracted a considerable attention in science and technology since invention of the computers. Even so the IEEE standards based on works by W. Kahan, [3], D. Goldberg, [4], and others computer scientists and mathematicians had uncover the mystery behind enigma of computer calculations, the problem of getting the clean result from approximately calculated data will never go away. As our encryption/decryption go straight into the arithmetic over rational numbers, therefore, we will describe a few the most simple and primitive ways how to block the calculation errors from eradicating the defense line of our encryption. Let's look at a few examples before defining a method which will bring some comfort and trust to our calculations.

Example 4.1.1

Let's look at the following display of a decimal number after it had rushed through the printing pool to the screen. We took a rational number g=0.117 as an example to illustrate an existing problem in converting and storing it inside computer with maximum possible precision. Since 0.117 cannot be converted exactly into binary number, we decided to use 56 decimal positions so as to get a binary approximation to 0.117 with $10^{-56}$ accuracy. We used Big Decimal arithmetic to handle this task and entered 0.117 as a double data type for converting number g into BigDecimal number with 56 decimal positions. Here is how this conversion looks like:

Big-DecG=0.11700000000000000677236045021345489658-415317535400390625<<12345678901234567890123456-78901234567890123456789012345>> (4.1.1)

The error beyond $17^{th}$ position can be explained as follows. Rounding 0.117 binary starts from extracting maximum binary fraction from it—which is $2^{-4}$=0.0625. The remainder is 0.117−0.0625=0.0545. Let's extract next maximum binary fraction from the remainder. This number is $2^{-5}$=0.03125. The next difference 0.0545−0.03125=0.02325 contains fraction $2^{-6}$=0.015625 and remainder 0.007625. Next maximum binary, the fraction $2^{-7}$, can't be subtracted from the previous remainder. However, the following, $2^{-8}$, binary fraction can be. As result, after eight iterations, we got eight binary digits 0.00011101, i.e.

$$0.117 \approx 0.00011101 \text{ (with some degree of accuracy)} \quad (4.1.2)$$

Continue this process, we would be able to get the binary image "in progress" as long as we have enough room to operate, i.e., the remainder is not null, and the decimal image of the next binary fraction range is within allowable range (in our case, 16 decimal digits). Since each division by two moves the lowest digit to the right by one position, therefore, when seventeenth division would occur, the lowest digit will be truncated (due shift and round operation), and the last significant digit of the remainder will become dirty, i.e., losses its significance. Further division by two of the binary fraction and subtraction from remainder makes remainder and the decimal image of the binary fraction even "more dirtier" (i.e., accumulates additional rounding and calculation errors), and thus, all the digits beyond $17^{th}$ position cannot be trusted. In fact, everything beyond this position in expression (4.1.1) is an accumulation of dirty digits.

We can alienated the problem in (4.1.1) and correct the conversion error by using the following two scale operation (available through BigDecimal library). First, we will truncate the BigDecimal number with 16 clean digits, so as to get unobstructed $g_1$=0.1170000000000000, using scale=16, and then, using another scale, to convert $g_1$ into $g_2$=0.11700000000000000 . . . 0 using scale=56. Thus, we can over shadow the conversion errors beyond $16^{th}$ digit and get clean data as long as we know ahead of time what actual range of our external data is. We will call this 2-step technique as "cut and paste" trick. We use this "trick" on many occasions throughout the paper because we found that conversion errors beyond $17^{th}$ position have gotten there due deficiency of the conversion algorithm which can be corrected to obtain a clean data with limitless precision. This justifies the "cut and paste" usage (simply speaking, CAP algorithm) for our encryption needs. The following example demonstrates one useful application where CAP algorithm produces cleanly a converted inside computer data with more than 26 digits.

Example 4.1.2

The NRB number $X_{nrb}$=11.012345678901234567 treated inside computer as double, though, as is, it consists of more than 16 digits. As double, it was converted into BigDecimal format, and the results of such conversion looks like this 11.0123456789012337253552 68. It has only 14 significant digits after the decimal point matching the original number. The little trick here is that we can use CAP algorithm in tandem by breaking the initial number $X_{nrb}$ into two parts: 14 digits in one, and the rest in the other part, and after that, convert cleanly both parts (using CAP algorithm), and appending together two results. This will produce an accurate BigDecimal NIF representation for $X_{NRB}$ number as $X_{NIF}$=11.0123456789012345670000000.0. We sparingly use this approach to get statistics for large samples of encrypted data.

5.0. Strategy for improving calculation reliability.

The follow up chapters 5.1-8.4 are dedicated to analysis of reliability in computer calculations and measures which we found useful to improve it. The following topics, in particular, will be covered up:

Confidence in computer calculations

Calculation errors over NIF data.

Choosing reliable algorithms and data precision to minimize loss of significance.

The ESIA algorithm for analysis of conversion error

Analysis of the BigDecimal conversion errors by using ESIA

The Simplified Cut and Paste tool for improving reliability of data

Accumulation calculations errors in NIF data

IBP effect on confidence

Prediction of resulting confidence using calculus

Examples for IBP estimation

Loss of significance due calculation and rounding errors accumulation

Calculation errors and precision estimates.

Incorporation of the latest IEEE requirements for reliable computing 5.1. Confidence in computer calculations. This is a huge topic to explore in one section. So, we will break our discussion of confidence into many not necessary independent topics in an attempt to address numerous factors involved in getting reliable results on computer. As computers are of limited precision, therefore, forceful truncation and rounding are part of the computer well being (not the applications well being, of course!). Simultaneously, this poses all kind of scenarios where those rounding and truncation errors can be exposed. As our goal to deliver an encryption scheme in the field of rational numbers, we must be alert to address all these uncertainties (errors and scenarios that expose them) as need arises.

In an attempt to systematize these errors and sources for those errors, we compiled a working list by placing in it the only those issues which we think are pertinent for security and reliability of our encryption and decryption model.

Here is the list of such errors and situations where these errors might occur in order, and those which will eventually lead us to definition of a reliable encryption scheme:

1. Conversion errors. As data enters computer, it must be converted to computer format. As computer data is always binary this creates conversion problems on the top of computer precision limitation problems.
2. Loss of significance is aggregated by the computer precision limitation and selection of inappropriate calculation algorithms
3. Choosing reliable and efficient algorithms to perform calculations as encryption adds one additional level of complexity to the calculations performed
4. Raising precision of the data under operations in order to separate a subrange of digits holding conversion errors from a subrange of digits holding calculations errors within one and the same data type.

Even so this list may not be complete but it highlights the area we are about to explore, and if some issues had not been included in this list now, we will add them as we go along. Thus, following our agenda, we will explore next the calculation errors using NIF data.

5.2. Calculation errors over NIF data. Let's agree here and to the rest of this paper that the maximum range of the decimal digits for a casual numeric column in a database is assumed to be 150 digits.

In the previous samples 4.1-4.2, we discussed conversion errors associated with translating NDB into NIF data. We introduced the CAP algorithm to shadow off the conversion errors when range of the ought to be converted data is known ahead of time. There is quite a demand for the CAP tool, because entries from a single chunk could have different ranges and precisions, and this potentially could cause a wrong usage of data. Even when data's range and precision are properly recognized, nevertheless, calculation errors such as badly selected algorithms, or even simple arithmetic operations over numbers close by value could lead to a complete or partial loss of significance.

As the problem of loosing precision (the same as loosing significance) will never go away, and it gets only worse together with the amount of calculations performed, nevertheless, losing a few significant digits does not necessary mean to lose the whole result. Only when errors and data inaccuracy get intermixed with the statistical limits of confidence, only then we shall not trust our calculations and do something to correct the problem.

One way to prevent the loss of significance (due conversion and calculation errors) is to increase the precision range of data in operation. Such expansion enables to build a safety corridor in NIF data presentation into which calculation errors can be accumulated (or, as we say it, "dumped into"). These dumpers being filled with zeros (as significant digits) in the beginning, during data conversion, form some kind of a wall to prevent the accumulated errors from being moved into significance territory.

Our nearest goal is to increase the precision of data so as to prevent accumulation of calculation errors within an original (i.e., external) range of significant digits. This issue is resolved in the next paragraph where we improve the external-to-internal data conversion routines. Later, this enable us to build the clean internal data having practically unlimited precision (briefly speaking, PUP data).

6.0. Choosing reliable algorithms and data precision to minimize loss of significance. In this section, first, we will improve the data conversion routine using java.math.BigDecimal software. We will show that the currently available in Java double to BigDecimal data conversion routine has a systematic rounding error. Based on this finding, we built (using the same java.math.BigDecimal software) an efficient external-to-internal data conversion routine which enable us to produce the clean internal PUP data.

First, let's make the following fundamental assumption: Statement 6.1.: The NIF format of every number M is deterministically defined.

Proof using Ever Shrinking Interval Algorithm (briefly ESIA): In order to prove this statement we will use the ESIA algorithm which builds iteratively two series of upper and lower binary boundaries approaching number M. With each iteration step, the upper boundaries are descending and lower boundaries are ascending so as the interval between latest pair of boundaries is smaller than for the previous pair. The descending and ascending factors used to reduce the upper and lower boundaries are binary fractions as well. The process stops if one of the boundaries matches number M, or the interval gets smaller than the a-priory set limit. In first case, i.e., when one of the boundaries matches M, this number, M, converts exactly to a binary fraction. In second case, M is approximately equal to a binary boundary (upper or lower), and the error of approximation is less than preset limit. Now, to complete the proof, let's denote the limit in ESIA iteration as $\varepsilon$, and let's assume that $\varepsilon$ lies inside interval $2^{-(k+1)}$ and $2^{-k}$. If $|\log_2\varepsilon|$ is an absolute value of $\log_2\varepsilon$, and $[|\log_2\varepsilon|]$ is the whole part $|\log_2\varepsilon|$ then to reach limit in ESIA iteration we need no more than k+1 steps. This completes the proof.

Note 6.2. The following few paragraphs demonstrate the usage of ESIA algorithm. In them, we explain the "mystery" of errors beyond $17^{th}$ position in BigDecimal representation of the decimal numbers. We observed those errors earlier in Example 4.1.1. We will show that these errors are not random events, but rather systematic errors of an inaccurate conversion routine. To prove this fact we reconstructed the same "conversion errors" using ESIA algorithm. With the use of Simplified version of the CAP Algorithm (which works with decimal numbers having no more than 17 significant decimal digits) we are able to correct these conversion errors and improve the conversion routine. As result, a clean NIF data, free of conversion errors, is produced—as table 6.3.2 will show. Using clean data, we were able to build the strong RLE symmetrical encryption thoroughly described in details in chapter 9 of this paper. In the next few paragraphs, we will describe in some details the error correction effort mentioned in this note. Right after that, we will discuss the calculation errors and the loss of precision due these errors. Both steps—conversion errors correction and estimation of the loss of significant digits aim in resolving reliability issues concerning RLE symmetrical encryption.

6.3. The ESIA algorithm in action. Example 6.3.1. To prove that ESIA is practically important, we analyzed the following series of decimal fractions: 0.01, 0.02, 0.03, 0.05, 0.07 and a few multiples of them. All together, we look at only eight fractions from 0.01 to 0.08. Their initial BigDecimal presentations are displayed in the second column of Table 6.3.1.

TABLE 6.3.1

| Seed | "dirty" BigDecimal conversion |
|---|---|
| 0.01 | 0.01000000000000000020816681711721685132943093776702880859375 |
| 0.02 | 0.0200000000000000004163336342344337026588618755340576171875 |
| 0.03 | 0.0299999999999999988897769753748434595763683319091796875 |
| 0.04 | 0.040000000000000000832667268468867405317723751068115234375 |
| 0.05 | 0.05000000000000000277555756156289135105907917022705078125 |
| 0.06 | 0.059999999999999997779553950749686919152736663818359375 |
| 0.07 | 0.070000000000000006661338147750939242541790008544921875 |
| 0.08 | 0.08000000000000000166533453693773481063544750213623046875 |

With respect to table 6.3.1 above, let's notice that we are dealing here with decimal numbers containing less than 17 significant digits (excluding leading zeros). Secondly, every BigDecimal in the $2^{nd}$ column (which is a conversion of the decimal on the left from the same row) contains conversion error starting in $18^{th}$ or $19^{th}$ positions. In the next table 6.3.2 we will display the same errors but obtained by our Java programs with the use of ESIA algorithm. This shows, thus, that the conversion errors in table 6.3.1 (displayed in the second column) are not randomly originated, as we were able to reproduce them by using a deterministic algorithm. As result, these errors could had been avoided, and, therefore, after displaying this reproduction of errors in table 6.3.2, we will describe the cleaning algorithm (called as Simplified Cap Algorithm) to produce the clean BigDecimals which match by value to the initial decimal numbers from the first column of table 6.3.1. The assemble of the clean BigDecimal is shown in the follow up table 6.3.3.

6.3.2. Analysis of the BigDecimal conversion errors by using ESIA: As Java program (which implements ESTA algorithm) launches an iterative process, a series of shrinking intervals—surrounding seeds 0.01 trough 0.08—are produced. The size of each interval got recorded. Each iterative process addresses one seed at a time, and each interval delivers a distance between edges surrounded the original seed. The purpose for each iteration step is to shrink the interval from the previous iteration. The discrepancies between the seed and interval edges produce left and right approximation errors, and the largest of them get divided in half to define the shrinkage at the next iteration step.

If we accept the edges as seed's approximation, the size of interval gives the precision of approximation. When interval gets smaller than an a-priory preset level, the process stops.

This ESIA routine was implemented using BiDecimal Java technology. We used this routine to prove that java.math.BigDecimal conversion routine from double to BigDecimal data types generates conversion errors which has no random basis in it, but rather produced due deficiency of the algorithm used. As it shown in Table 6.3.1, the errors began accumulating after 17 significant digits were produced. In order to prove that errors in table 6.3.1 have no random origin, we tuned the ESIA Algorithm and reproduced results from table 6.3.1. ESIA results are shown in the second column of table 6.3.2. These results are matching exactly.

TABLE 6.3.2

| | Seed | BigDecimal conversion | Latest right/left correction | Prey right/left correction |
|---|---|---|---|---|
| 1 | 0.01 | 0.0100000000000000002081<br>668171172168513294309937<br>76702880859375000000000000 | rou Right −2.0816681<br>711721685132943093776702<br>880859375000000000E−19 | 8.673617379884035472059 6<br>224069595336914062500000<br>000000E−19 |
| 2 | 0.02 | 0.0200000000000000004163<br>336342344337026588618 75<br>53405761718750000000000000 | rou Right 5.8366636<br>576556629734113812446 59<br>4238281250000000000E−19 | 1.734723475976807094411 9<br>244813919067382812500000<br>0000000E−18 |
| 3 | 0.03 | 0.0299999999999999988897<br>769753748434595763683 31<br>90917968750000000000000000 | −1.102230246251565404233<br>166809082031250000000000<br>000000E−19 | 1.387778780781445675529 5<br>395851135253906250000000<br>00000000E−17 |
| 4 | 0.04 | 0.0400000000000000008326<br>672684688674053177237 51<br>06811523437500000000000000 | 1.673327315311325946822 7<br>624893188476562500000000<br>000000E−19 | 3.469446951953614188823 8<br>489627838134765625000000<br>0000000E−18 |
| 5 | 0.05 | 0.0500000000000000027755<br>575615628913510590791 70<br>22705078125000000000000000 | 2.224442438437108648940 9<br>208297729492187500000000<br>0000000E−18 | 6.938893903907228377647 6<br>979255676269531250000000<br>0000000E−18 |
| 6 | 0.06 | 0.0599999999999999977795<br>539507496869191527366 63<br>81835937500000000000000000 | −2.204460492503130808 47<br>263336181640625000000000<br>00000000E−19 | 2.775557561562891351059 0<br>791702270507812500000000<br>00000000E−17 |
| 7 | 0.07 | 0.0700000000000000066613<br>381477509392425417900 08<br>54492187500000000000000000 | −6.613381477509392425 41<br>790008544921875000000000<br>00000000E−19 | 2.775557561562891351059 0<br>791702270507812500000000<br>00000000E−17 |
| 8 | 0.08 | 0.0800000000000000016653<br>345369377348106354475 02<br>13623046875000000000000000 | −6.653345369377348106 35<br>447502136230468750000000<br>00000000E−19 | 6.938893903907228377647 6<br>979255676269531250000000<br>0000000E−18 |

As our ultimate goal is to produce the clean NIF data, therefore, in the next section we will introduce the Simplified Cut and Paste (simply, SCAP) which will be used throughout this paper to clean conversion errors and other reliability tasks.

However, before we move ahead with SCAP algorithm let's make the following comment. Note 6.3.3. If input data contains more than 17 significant digits (an event which most likely occurs in scientific application), then, due truncation operation, the straight conversion of the double to BigDecimal data types would generate irreparable conversion errors. Therefore, in order to convert decimals with more than 16 digits these numbers must be broken into chunks of numbers each containing no more that 16 significant digits. Then, each of these smaller chunks must be converted into clean BigDecimal equivalents, and to finalize the conversion all intermediate BigDecimal must be concatenated follow their original order.

6.4. The Simplified Cut and Paste tool for improving reliability of data: Let's recap what had been discussed so far regarding NDR to NIF conversion.

As we saw in tables 6.3.1, the conversion from double the BigDecimal inherently generates conversion errors beginning 17 positions after the first significant digit is produced (by the conversion routine). We found (and table 6.3.2 illustrates it) that these conversion errors have no random origin, but rather can be explained using ESIA tool. This means that conversion errors have deterministic origin, and as such can be truncated and replaced with zeros for as long as we want. The only limitation which had been imposed on the precision of our results is the maximum precision E-150 we shall not exceed.

Now, we can explain the narrative for SCAP Algorithm that enables us to clean deterministic conversion errors. We use the truncation operation to cut those errors first. This is achieved by using scale parameter which can be tuned to point to an exact location of the errors which we knew can be truncated. Next step is to achieve the desirable precision for NIF data. This property is achieved by using another scale parameter usually, larger the first scale. The second scale points to the rightmost decimal digit which defines the precision of NIF data we want to have. The gap between the first and the second scales gets filled with zeros, and all of them are significant digits for the future usage. Since scales are part of the BigDecimal math library and can tuned depending on the range and precisions of NIF data, the SCAP method can be used for various applications in connection with RLE encryption. Needless to say, though, that the most nontrivial element in applying the SCAP method is to figure out what are these scale parameters must be equal to? To answer this question we must be able to perform the analysis of errors estimates (which includes but not limited to analysis of differentials) and other elements of the prediction theory.

In conclusion of this paragraph, let's mention that SCAP method enable, indeed, the physical separation of the two areas in NIF digital format—one to keep the conversion errors, and the other to accumulate the calculation errors.■

Next table 6.4.1 shows that by applying the SCAP Algorithm, the conversion errors in the second column of the table 6.3.1 can be eliminated, and the clean BigDecimal presentation of 0.01 through 0.08 decimals can be produced:

TABLE 6.4.1

| Seed | Dirty BigDecimal conversion | Clean BigDecimal conversion |
|---|---|---|
| 0.01 | 0.0100000000000000002081668171172<br>1685132943093776702880859375000<br>0000000 | 0.0100000000000000000000000000000<br>0000000000000000000000000000000<br>0000000 |
| 0.02 | 0.0200000000000000004163336342344<br>3370265886187553405761718750000<br>0000000 | 0.0200000000000000000000000000000<br>0000000000000000000000000000000<br>00000000 |
| 0.03 | 0.0299999999999999988897769753748<br>4345957636833190917968750000000<br>0000000 | 0.0300000000000000000000000000000<br>0000000000000000000000000000000<br>0000000 |
| 0.04 | 0.0400000000000000008326672684688<br>6740531772375106811523437500000<br>0000000 | 0.0400000000000000000000000000000<br>0000000000000000000000000000000<br>00000000 |
| 0.05 | 0.0500000000000000027755575615628<br>9135105907917022705078125000000<br>0000000 | 0.0500000000000000000000000000000<br>0000000000000000000000000000000<br>0000000 |
| 0.06 | 0.0599999999999999977795539507496<br>8691915273666381835937500000000<br>0000000 | 0.0600000000000000000000000000000<br>0000000000000000000000000000000<br>0000000 |
| 0.07 | 0.0700000000000000066613381477509<br>3924254179000854492187500000000<br>0000000 | 0.0700000000000000000000000000000<br>0000000000000000000000000000000<br>0000000 |
| 0.08 | 0.0800000000000000016653345369377<br>3481063544750213623046875000000<br>0000000 | 0.0800000000000000000000000000000<br>0000000000000000000000000000000<br>0000000 |

software we use, these numbers must be broken into manageable chunks and convert into NIF format separately per each chunk, and to finalize the conversion these separate NIF's numbers must be added algebraically. The fractional parts, to the contrary, are subjected to rounding and truncation at conversion time, and, therefore, future use of fractional data could become problematic due wrongly selected computational algorithms or random error accumulation processes. As a rule of thumb, if ND's fractional part contains more than 18 significant digits, then the conversion such fractional part to NIF data (in Java implementation) requires the usage of BigDecimal numbers and application of technique described in the note 6.3.2 earlier.

Thus, calculation of IBP for NIF data is straight forward. However, effect of internal data precision on computational results depends on the type of calculations inside machine are taking place.

This concludes the topic of decimal to binary conversion errors and correction procedures aim to produce the clean input data in computer format.■

7.1. Accumulation calculations errors in NIF data: Generally, the internal presentation (NIF) and its precision is different from the external, NDR, data, therefore, we will use two distinct terms and notations for NDR and NIF data precision.

We will call as an External Boundary Precision (or, EBP) its right most significant digit of NDR number. As an illustration, the number $10.15 (ten dollars and fifteen cents) has its EBP presentation measured in $100^{th}$ of a decimal point.

We will call as an Internal Boundary Precision (or, IBP) its right most significant digit of NIF number. The IBP, generally speaking, depends on a numeric format we choose for our numeric data—it could be an integer, a binary, a float, or any other legitimate format (in Java, for instance, there are ten plus different numeric presentations of data inside computer). Since data inside computer could migrate from one data type to another, so is true for IBP—it could change over time.

However, regardless whether we address IBP or EBP, their precisions are defined by their rightmost significant digit of data presentation. Dirty digits (which, by definition, can't be significant) do not participate in specifying IBP and EBP.

7.2. IBP effect on confidence: The specified types of precision—EBP and IBP—take us right into the issues of data confidence. Do we trust our data? The answer is not simple as it sounds, because computers stores our data not necessary in its natural format but with a certain degree of approximation. Only the whole numbers are stored inside computer adequately to their external storage (unless these numbers greater than $10^{16}$, in which case , depending on 7.3 Prediction of resulting confidence using calculus: In this paragraph we began to study the effect of the internal data precision and formulas for calculations on the confidence of calculation results.

Needless to say that, intuitively, there shall be a correlation between adequate algorithms and sufficient precision of the input data, from one side, and reliable calculation results, from the other. The question remains: can this correlation be measured? Reversing the question, we could ask: is it possible for a given calculation formula (or, more generally, for a given calculation algorithm) to choose data so that errors during calculations will not subdue the validity of the original results? As the answer to this problem depends entirely on the individual formulas in progress, therefore, we specifically redirect those questions to the formulas for calculating the average of a statistical sample $$A=(1/N)\Sigma x,\ x€£ \qquad (7.3.1)$$

and standard deviation for the same sample $$\mathrm{StDev}=({}^{1}/_{N}\Sigma_{x}(x-A)^{2})^{1/2} \qquad (7.3.2)$$

7.4. Examples for IBP estimation: Even for specific formulas, the IBP estimation is quite elaborative process. Therefore, we will approach this problem by consider a few simple examples before going to general conclusions.

First, let's examine the standard deviation in formula (7.3.2) just standing on EBP side without going into details with NIF conversion.

Example 7.4.1

Let's consider a small sample #1 of just four numbers: a=2.56, b=4.09, c=2.51, d=1.38. According to (7.3.2), with N=4, and sample $S_1$={a, b, c, d), we would receive (using (7.3.1) for A and $S_1$ for £) $Average_1$=A=2.635, and $StDev_1$=0.963496237667797.

As StDev is calculated with some rounding error, let's find out how many significant digits this number has? To answer this, let's use two samples,—sample #1 in its entirety, and a sample #2 as a slightly changed version of sample #1 as it displayed below.

Example 7.4.2

Let's sample #2 be a modified version of sample #1 in which only one entry, c, has changed from 2.51 to 2.52. The rest of the values for a, b, d in sample #2 are the same as in sample #1.

For clarity reasons, let's use subscripts 1 and 2 for samples #1 and #2 correspondingly, and derive statistics—averages and StDev—for sample #2. This gives $Average_2$=2.6375 and $StDev_2$=0.9631815768586939. As $StDev_2$ distinct from $StDev_1$ starting in fourth position, let's find out whether this change could have been predicted. As this is the case, let's prove—for the reference purposes—that Statement 7.4.3. The first three significant digits in $StDev_2$ could have been predicted by using formulas (7.3.1), (7.3.2) and data from samples #1 and #2.

Proof: The difference between $c_1$ and $c_2$ is 0.01 (less that 0.5%). This causes $Average_2$ change by 0.0025, i.e., less that 0.1%. As these changes are small, we can use the standard deviation differential to bind the estimated change of StDev as a function of its derivatives changes. Let's use notation $\sigma_1$ and $\sigma_2$ instead of symbol $StDev_1$ and $StDev_2$ correspondingly. Thus, we have $$\sigma_i=\mathrm{StDev}=({}^1/_N\Sigma_{x_i}(x-A)^2)^{1/2},\ i=1,2 \tag{7.4.3}$$

Let's put $\sigma_0=\sigma_1$, and denote $\Delta\sigma=\sigma_2-\sigma_0$ (i.e., $\Delta\sigma$ is a change of $\sigma_0$ caused by c and A changes). Now, let make one last modification and put $\sigma=\sigma_2$ so as to get the final view for the changed sigma:

$$\sigma=\sigma_0+\Delta\sigma \tag{7.4.4}$$

Given expression (7.4.4) for sigma σ, let's estimate Δσ as a differential, dσ, applied to the right part in (7.4.3). We have $$d\sigma=\Sigma_{x=a,b,c,d,A}(\partial\sigma/\partial x)^*\Delta x=(\partial\sigma/\partial A)^*\Delta A+(\partial\sigma/\partial c)^*\Delta c=(-1)^*(1/N)^{1/2}{}^*(\tau(x-A))^*(\tau(x-A)^2)^{-1/2}{}^*\Delta A+(1/N)^{1/2}{}^*(c-A)^*(\Sigma(x-A)^2)^{-1/2}{}^*\Delta c, \tag{7.4.5}$$

as Δx=0 for all the x=a,b,d. The second line in (7.4.5) converts to $$(-1)^*(1/N)^{1/2}{}^*(\Sigma(x-A))^*(\Sigma(x-A)^2)^{-1/2}{}^*\Delta A=(-1)^*(1/(N\sigma))^*(\Sigma(x-A))^*\Delta A, \tag{7.4.6}$$

where σ in (7.4.6) is an old σ (i.e., $StDev_1$=0.963496237667797), and A in Σ(x−A), in the same (7.4.6), is an old A (i.e., A=$Average_1$=2.635). Since all the x's in Σ(x−A) are taken from the sample #1, therefore, Σ(x−A)=0. Thus, expression (7.4.5) can be rewritten as $$d\sigma=(1/(N\sigma))^*(c-A)^*\Delta c \tag{7.4.7}$$

Since N=4, σ=0.963496237667797, c−A=2.51−2.635=−0.125, and Δc=0.01, therefore, $$d\sigma=-3.243396162671334E\text{-}4 \tag{7.4.8}$$

The new predicted sigma using formula (7.4.4) is equal to 0.963171898051529867, where is the direct application of formula (7.4.3) towards sample's #2 data will give σ=0.9631815768586939. Thus, predicted sigma and computed $StDev_2$ have four significant digits in common. Since the correction factor do have the first significant digit in the $4^{th}$ decimal digit position, therefore, the predicted $StDev_2$ has at least four significant digits which we found to be true.■

Note 7.4.9. The sample size limitation in formulas (7.4.1) through (7.4.5) is not important. For that matter, any chunk size can be used, and algorithm for do precision estimation will be the same as all Δx=0 but Δc. The only question remains is whether Σ(x−A)=0 for large samples. In the next chapter, we will discuss the conditions where this equality (Σ(x−A)=0) is true for the large samples as well.

Notice 7.4.10. Our calculations in this section in a way of using differentials for error estimates similar to calculations described in the Lipman Bers, Calculus, v1-2, Holt Rinehart., Inc, New York, 1969. We elaborated our formulas for predicting of the confidence intervals for errors distribution independently because our encryption have no sense without reliable arithmetic. These elaborations, though, enable us to perform the reliable computer calculations involving summation of the almost 20 million residuals to produce rudimentary statistics such as calculation of variance and covariance over large sample of data. The precision of the sampling data for these calculations had $10^{-38}$ tolerance interval, and statistical parameters—standard deviation and correlation coefficients—delivered had $10^{-22}$ precision.

Conclusion 7.4.11. Based on statement 7.4.3 we could draw the following conclusions about predicted precision:

{1}: the given initial precision limitations will aim in estimating the expected precision of sigma in (7.4.4)

{2}: if sigma's precision limitation is set, it will bind the lowest precision for parameters and expressions for the right part of (7.4.5);

{3}: Collorary from {2}: the desired precision for Average, A, and standard deviation can be lowered or raised to meet the requirements set in (7.4.4) and (7.4.5).

8.0. Loss of significance due calculation and rounding errors accumulation. We discuss here the strategies to prevent such losses and demonstrated our approach by using a few numerical examples. We will show that the loss of significance can be reduced if we allocate a sufficient amount of significant digits for calculation errors accumulation, and will separate this area from the area where the highest significant digits of the input data or intermediate results are positioned.

Equality relationship in the field of the truncated rational numbers.

Let's $M_1$ and $M_2$ be two rational numbers from external realm $R_e$. Let's $EBP_1$, $IBP_1$, $EBP_2$, $IBP_2$ are boundary precisions for NIF presentations of $M_1$,$M_2$ within computer internal realm $R_i$.

Definition 8.1.1. The tolerance interval $\mathcal{J}_R$ in any realm R is defined as a half of the highest precision unit among all the entries in R.

Example 8.1.2

If $10^{-m}$ is the highest precision among all the entries x from a given realm R, then the length of the tolerance interval $\mathcal{J}_R$ in R is $0.5*10^{-m}$.

For the future references, we will assign the length of the interval $\mathcal{J}_R$ as $|\mathcal{J}_R|$.

Definition 8.1.3. We say that numbers $M_1$ and $M_2$ are equal in the realm R and write this as $$M_1 =_R M_2 \tag{8.1.3}$$

if and only if they are not exceptional symbols (i.e., not any of NaN, ±0 or ±∞)

they are equal within a given degree of tolerance in R so as $|M_1-M_2|<|\mathcal{J}_R|$.

Example 8.1.4

Let's x=0.0983, and y=0.098345. If x and y are belong to a some realm R, they are not equal because y€R implies $|\mathcal{J}_R|<10^{-6}$, though, $|x-y|>10^{-4}$. If they do not belong to the same realm, they cannot be compared. In case, when we use a universal but truncated realm $R_u$ to which all numbers with precisions less than $10^{-100}$ belong, then we would have $|\mathcal{J}_R|<10^{-100}$ where is $|x-y|>10^{-4}$, i.e., x and y are different within $R_u$ likewise.■

8.2 Calculation errors and precision estimates. Let's clarify a few following statements:

Statement 8.2.1. For any number M with a precision lower than $10^{-100}$, we can use the Simplified CAP Algorithm to make M's precision higher by a few decimal points.

Indeed, if M has less than 17 significant digits, then we can use the SCAP Algorithm to truncate M beyond last significant digit and append a few zeros to the right side of the truncated M. This will increase the significant range and precision of M. If, on the other hand, M has more than 16 significant digits, then we will break M into several chunks of less than 17 digits each. After that, the only last chunk will be expanded by one or more digits and all the chunks will get concatenated together (while preserving the original order) as one BigDecimal number.

Statement 8.2.2: The NIF right most precision for every number M is either: (a) assigned at will, (b) estimated and assumed, (c) calculated and assumed.

Proof: Based on previous Statement 8.2.1, ESIA conversion process will end up in one of the following conditions:

(case 1), the process stops by itself when M is a finite binary fraction;

(case 2), iteration process to convert M into NIF format continues to get all digits of the M's data type (for example, for double data type, M will be presented as $17^{th}$ digits decimal or in scientific notation with a decimal or hex base).

When denominator q in M=p/q contains factor $2^m*5^n$ for some m and n, then IESIA might stops by itself before filling all the decimal positions in NIF. In this case conversion of M to NIF has no dirty digits. Therefore, we could extend the significance of NIF form for M at will without changing the value of NIF form of M. Thus, in case 1, the condition a) is true. In case 2, when iteration limit $\underline{\varepsilon}$ is reached, then precision of M is defined by the last upper or lower boundary, i.e., c) is true. The b) condition is not necessary follows directly from statement 8.2.1, but inspired by it. Namely, if limit $\underline{\varepsilon}$ is too low, we can reassign $\underline{\varepsilon}$ so as to have the precision of M set to a higher level, and, thus, b) is taken place.■

Statement 8.2.3.: For every number M in our system, its $IBP_M$ precision can be made higher than $EBP_M$ precision by a well established order of magnitude, i.e.

$$EBP_M << IBP_M \tag{8.2.3}$$

Proof: This statement immediately follows from the previous statement because in three cases a)-c) the $IBP_m$ precision can be chosen arbitrarily high.

Commentary 8.2.4. The inequality (8.2.3) aims in making the precision of NIF data much higher than NDR data and, therefore, much safer operations over NIF data.

Statement 8.2.5 For every subset L of data in realm R, the following equation is true:

$$\Sigma x \varepsilon L(x-A_L) =_R 0, \tag{8.2.5}$$

where $A_L$ is the average of the chunk L, and x is any element from it.

Proof: For rational NBR and NDB numbers the equality (8.2.5) is true due definition of $A_L$. Let's prove that if inequality (8.2.3) is true then equation (8.2.5) is true for NIF data as well.

The problem with (8.2.5) truthfulness, in case of NIF, is the loss of significant digits. Here are the factors which are contributing to this loss. First is rounding errors of $A_L$ and x's. Second is accumulation of errors during subtraction. Third is summation for large samples.

Let's admit here, that if (8.2.3) is not true, then due computer precision limitations, the calculation of $A_L$ (as $(1/N)\Sigma_{X\varepsilon L}x$, where N is the size of L) and subsequent rounding operation might affect the precision of $A_L$. This would invalidate the lowest significant digit of $x-A_L$ for xεL. As result, during final summation, the inaccurate digits could get accumulated and moved up to the left so as to make inaccurate the whole result.

Thus, inequality (8.2.3) guaranty the freedom to choose the precision of $A_L$ as high as it is needed to build a safety corridor between the lowest precision of the chunk L data and the rightmost highest precision of $A_L$. Simultaneously, this will assure that the loss of significant digits in one (or many) x−A subtractions will not be promulgated to invalidate the entire sum in (8.2.5). This will take care of choosing the right range for $A_L$.

Next we will take care of the conversion errors business. If we will not intervene and leave to the computer to decide what range and where the conversion errors within NIF data will be also RLE, then here is what most likely to happen at data processing time: the conversion errors which are always present get accumulated and will move up towards the low precision digits causing loss of significance. For example, during averaging of the large samples, the summation of residuals x−A in (8.2.5) will lead to accumulation of conversion errors in the area of high precision. This will move up to the left the sum of these errors, thus, reducing the significant range. To prevent this loss of significance, the selection of the rightmost precision for data must include information about EBP precision for external data to reserve space for conversion errors. For example, to make sure that summation in (8.2.5) will not destroy the significant range of L, the square root of the cardinal number of L must be used as a factor to move to the right the rightmost precision of L. In addition, the same (the square root of the cardinal number of L) must be reserved for accumulation of calculation errors. Such strategy would prevent the summation in (8.2.5) to destroy the result significant range.■

8.3. Example showing the reduction of the loss of significance: We learned, that excessive rounding causes one inherited abnormality—it forces significant and insignificant digits be positioned next to each other within one and the same data type. This mixture of different type of digits (i.e., clean or dirty digits) is the source for all kind of idiosyncrasies resulting in accumulation of errors, and, eventually, loss of significance.

Let's consider the following example. Let's X=0.53739363563835127 and Y=0.56260636536165875. Let's assume that $17^{th}$ position (7 for X and 5 for Y) contains rounding error, and all the other positions 1 through 16 are significant, i.e., clean. The sum S=X+Y is 1.00000000000000002, and error in $17^{th}$ position got promulgated all the way to the position of the whole numbers, thus, causing the loss of significance for entire sum S. Now, if we subtract Z=3E10$^{-27}$ from S (irrespective whether 3 in Z is significant or not), we will get D=S−Z=0.99999999999999999.

By looking at D, we do not know how many significant or insignificant digits it has. Generally speaking, in order to resolve the "significance" issues in this particular case we need to keep track of the history of how the sum was formed. Such formation of S may or may not help to qualify D as significant or as a "junk" number. Apparently, this is an extreme and radical case to deal with. There are several ways to avoid this "dead lock" situation. We will discuss just two of them.

The first one is known in computer science as the "change the algorithm of operations" method. In simple cases, like in our example, to escape the loss of significance, it is sufficient to change the order of operations. Continue with our case, let's compute the Y−Z first and then add X to it. This will prevent the loss of significance in (X+Y)−Z.

On the larger scale, the table 8.3.1 below, shows how unsustainable the computations on computers can be resulting in partial loss of significance of up 75% of significant range.

Table 8.3.1 displays the results of sampling due formula (8.2.5) of the 19999076 (almost 20 million) summation of the java double numbers. The average A shown in table as Computed Mean, and it is derived as $(1/N)\Sigma_{x\varepsilon L}x$. The Computational Error, causing loss of 11 to 12 significant digits out of 16 available, were factors of data conversion errors enhanced by computation errors as well as rounding errors. This is quite a loss of significance!

The second method which is recommended here will significantly improves the statistics in table 8.3.1 (see table 8.3.2 below) is based on the earlier described SCAP Algorithm. It shall be combined with the "change operations" method mentioned above. According to CAP, every internal NIF number got replaced by a number that has much larger range and precision. The idea to use CAP to improve the results in table 8.3.1 is to separate the highest precision digits where computational errors get accumulated from the last significant digits NIF numbers have (and where the data conversion were accumulated). CAP embeds NIF into much larger by range and precision numbers. If the old language 'C' is used for NDB to NIF conversion, then internal data in long double format (minimum allowable range 1E10$^{-37}$ to 1E10$^{37}$) would have 37 digits to work with, and for most of the real life applications (finance, chemistry, weather forecasting) this would be sufficient. Oracle, for example, allows routinely to use the maximum of 38 digit numbers and has no problem maintaining huge databases and applications, so caution must also be expedite and the loss of significance must always be monitored. For Java application (which we use in this paper to illustrate the RLE encryption method), the CAP application is a must.

For RLE encryption and the large statistical calculations over RLE encrypted data, we must have a sustainable computing results. The CAP application is demonstrated in the table 8.3.2. Tests 1 through 4, in this table, are based on scale 2=32. Test #5 uses a shorter scale 2=21. This produces a loss of significance much higher than in tests 1-4 because the range of data in test 5 is narrower by 11 digits and, thus, all errors are bumping into each other causing such abnormality. When test #5 was recalculated over sample with range 32, the result get in line with the rest of the tests 1-4 (see line 6).

TABLE 8.3.1

| N# | Mean | Computed Mean | Data Type | Variance | Computational Error |
|---|---|---|---|---|---|
| 1 | 99.9999999 | 99.999999990167458 | 16digits/dbl | 0.0010 | −1.6756658054362106E−4 |
| 2 | 100.0 | 100.00000010814034 | 16digits/dbl | 0.0010 | −5.729322204217624E−5 |
| 3 | 100.0 | 100.00000321679174 | 16digits/dbl | 5.0 | 2.165858447114033E−4 |
| 4 | 100.0 | 99.99181666605385 | 16digits/dbl | 50.0 | −3.1930776100352887E−4 |
| 5 | 100.0 | 99.99987849932626 | 16digits/dbl | 0.5 | 4.367448462971879E−5 |
| 6 | 100.0 | 100.00006632508536 | 16digits/dbl | 0.5 | 4.312658255258839E−4 |

TABLE 8.3.2

| N# | Mean | Computed Mean | Var | Scale | Error |
|---|---|---|---|---|---|
| 1 | 99.99999 | 99.999999901666200913310779795384 39 | 0.001 | 32 | 6.142742290403E−20 |
| 2 | 100.0 | 100.00000010813747462143466706493617 | 0.001 | 32 | 6.611027924681E−20 |
| 3 | 100.0 | 100.00000321680257590540291579257278 | 0.1 | 32 | 6.997610321620E−20 |
| 4 | 100.0 | 99.99181666603787316523275699267769 | 50.0 | 32 | 7.03735565972E−20 |
| 5 | 100.0 | 99.999878499328442627625 | 0.5 | 21 | 1.121238E−15 |
| 6 | 100.0 | 100.00006632510693347786895335527811 | 0.5 | 32 | 1.2504818693989E−19 |

8.4. Incorporation of the latest IEEE requirements for reliable computing: In view of the fact that all the elaborations and formulas in this text were done with a sole goal to be used on computers for numeric and statistical calculations, therefore, we must consciously incorporate the latest IEEE requirements for precision computing in our encryption/decryption models. We begin this incorporation by making a few assumptions. This list of assumptions will grow as need arises.

Assumption 8.4.1. For simplicity of notation, here and elsewhere in the following text, we write x≠0 if and only if number x is not a zero number nor any of the special symbol: NaN, ±0 or ±∞, where NaN, ±0, ±∞ are special symbols defined in the IEEE 754-2008 standards, [5]. normally, these symbols are associated with execution exceptions.

Assumption 8.4.2. If during calculations over encrypted numbers the result of operation has become one of special symbols: NaN, ±0 or ±∞, then calculations must cease to continue, and result must be assigned to one of these special symbols.

Assumption 8.4.3. In addition, an investigation must be launched to find the reason for such loss of significance. To prevent this undesirable event to occur, a forecasting of the potential loss of significance (including the estimation of the accumulation errors of operations (i.e., their range and precision)) must be performed before a large amount of calculations get started. These issues were addressed earlier, and here we rely on sections 8.0-8.3 methodics for getting such estimations.■

9.1. Introduction to the Ratio Less Encryption (RLE): In this section we will define a completely randomized RLE encryption scheme. The randomization breaks the ordering homomorphism between original and RLE image domains. It, literally, turns the image domain into a chaotic mess. As result, the intruder cannot use the traditional plain text as well as data ordering based attacks to compromised RLE encrypted data.

The completely randomized encryption scheme RLE (Ratio Less Encryption) is defined in steps below as follows.

Definition 9.1.1. Let's α, β, γ, δ—are rational numbers, and $$\Delta=\alpha\delta-\gamma\beta \tag{9.1.1}$$

1s a rational function satisfying the following conditions:

$$\Delta\neq 0,\ \neq NaN,\ \neq\pm 0,\ \neq\pm\infty \tag{9.1.2}$$

Assumption 9.1.3. Here and further on in this paper, we assume that α, β, γ, δ are selected in such a way that conditions (9.1.1)-(9.1.2) are true.

Definition 9.2.1. Let's x, $r_x$ are two nonzero rational numbers taken from an unciphered true domain $\mathfrak{R}$. The following functions $$\mathfrak{D}=\mathfrak{D}(x,r_x)=\alpha x+\beta r_x \tag{9.2.1}$$

$$\mathfrak{E}=\mathfrak{E}(x,r_x)=\gamma x+\delta r_x \tag{9.2.2}$$

over x, $r_x$ and α, β, γ, δ, predicated in the assumption 9.1.3, are called as Ratio Less Encryptions (briefly, RLE), or, interchangeably, as RLE transformations. Let's also name the encryption forms $\mathfrak{D}$ and $\mathfrak{E}$ in (9.2.1) and (9.2.2) as α- and γ-encryptions correspondingly.

Elements x,$r_x$ utilized inside (9.2.1)-(9.2.2) equations are named as mutually complemented within given RLE transformation. Similarly, encryptions $\mathfrak{D}$ (x,$r_x$), $\mathfrak{E}$ (x,$r_x$) corresponding to the mutually complemented pairs, x,$r_x$, will be called as complemented encryptions.

Assumption 9.3. Here and elsewhere below, in this paper, we name the encryptions obtained with the use of formulas (9.2.1)-(9.2.2) as original encryptions.

9.4. Addition Homomorphism of RLE transformations: Let's $\mathfrak{D}_i$, $\mathfrak{E}_i$, , i=1,2, are two duplets of the encryption forms, ($\mathfrak{D}_1$, $\mathfrak{E}_1$), ($\mathfrak{E}_1$,$\mathfrak{E}_2$), for the two nonzero rational numbers x1 , x2 and complemented random values $r_{x1}$, $r_{x2}$. Let's define the sum $\mathfrak{D}_1+\mathfrak{D}_2$, $\mathfrak{E}_1+\mathfrak{E}_2$ as the following transformation over $x_1+x_2$ and $r_{x1}+r_{x2}$ elements using the following rules:

$$\mathfrak{D}_1+\mathfrak{D}_2=\alpha(x_1+x_2)+\beta(r_{x1}+r_{x2}) \tag{9.4.1}$$

$$\mathfrak{E}_1+\mathfrak{E}_2=\gamma(x_1+x_2)+\delta(r_{x1}+r_{x2}) \tag{9.4.2}$$

Statement 9.4.3. Let's ($\mathfrak{D}_i$, $\mathfrak{E}_i$), i=1,2, are two encrypted duplets of RLE transformations satisfying conditions (9.4.1)-(9.4.2). Then, there exist two rational numbers $x_3=x_1+x_2$, $r_{x3}=r_{x1}+r_{x2}$, so as their RLE encryption forms $\mathfrak{D}_3$, $\mathfrak{E}_3$ are satisfying the following equalities:

$$\mathfrak{D}_3=\mathfrak{D}(x_3,r_{x3})=\mathfrak{D}_1+\mathfrak{D}_2,$$

$$\mathfrak{E}_3=\mathfrak{E}(x_3,r_{x3})=\mathfrak{E}_1+\mathfrak{E}_2, \tag{9.4.3}$$

Proof: Let's encryptions $\mathfrak{D}_3$, $\mathfrak{E}_3$ for two rational number $x_3=x_1+x_2$ and $r_3=r_{x1}+r_{x2}$ are chosen as in (9.4.3), i.e., $\mathfrak{D}_3=\mathfrak{D}(x_3,r_{x3})=\mathfrak{D}_1+\mathfrak{D}_2$, $\mathfrak{E}_3=\mathfrak{E}(x_3,r_{x3})=\mathfrak{E}_1+\mathfrak{E}_2$. This, due definition of $x_3$, $r_3$, implies $\mathfrak{D}(x_1+x_2, r_{x1}+r_{x2})=\mathfrak{D}(x_1,r_{x1})+\mathfrak{D}(x_2, r_{x2})$, and $\mathfrak{E}(x_1+x_2, r_{x1}+r_{x2})=\mathfrak{E}(x_1,r_{x1})+\mathfrak{E}(x_2,r_{x2})$. On the other hand, if $\mathfrak{D}$ is any encryption form which is equal to the sum of the two transformations $\mathfrak{D}_1+\mathfrak{D}_2$, then due (9.2.1), $\mathfrak{D}_i=\alpha x_i+\beta r_{xi}$, i=1,2, we have $\mathfrak{D}=\mathfrak{D}_1+\mathfrak{D}_2=(\alpha x_1+\beta r_{x1})+(\alpha x_2+\beta r_{x2})=\alpha(x_1+x_1)+\beta(r_{x1}+r_{x2})=\alpha x_3+\beta r_{x3}=\mathfrak{D}_3$, i.e., there must be only one encryption transformation satisfying (9.4.1)-(9.4.3) conditions, and it is homomorphic by addition. Similar conclusion is true with respect to $\mathfrak{E}_3$ transformation in (9.2.2).■

Summarizing 9.4.2 and 9.4.5 statements we can conclude that

Statement 9.4.4. RLE transformations $\mathfrak{D}$ and $\mathfrak{E}$ defined by equations (9.2.1)-(9.2.2) deliver two homomorphisms by addition outlined by conditions (9.4.1)-(9.4.2).

9.5.1. Deciphering of the true data from RLE encrypted forms

Let's decipher x from (9.2.1)-(9.2.2) equations. By subtracting the second equation (9.2.2) multiplied by β from the first equation (9.2.1) multiplied by δ, we will get $$x=(\delta\mathfrak{D}-\beta\mathfrak{E})/\Delta \tag{9.5.1}$$

Definition 9.5.2. Let's call the algebraic expression in the right side of (9.5.1) as deciphering transformation and denoted it as $\mathfrak{D}_l^{-1}(\mathfrak{D}_l, \mathfrak{E})$.

9.6. Congruent classes in the RLE encrypted realm $\mathfrak{E}(\mathfrak{R})$.

Definition 9.6.1. Let's $\mathfrak{R}$ be an original RLE domain specified in section 1.1, i.e., $\mathfrak{R}$ is a set of rational numbers defined by a given application and expanded by a set of five special symbols {NaN, ±0, ±∞}. Let's also $\mathfrak{R}_R$ is a subset of random numbers complemented to $\mathfrak{R}$ according to (9.2.1)-(9.2.2) encryption rules. Here and further on we see no reason to distinguish $\mathfrak{R}$ and $\mathfrak{R}_R$ and will use the same symbol $\mathfrak{R}$ for both of these sets. We call the set of encrypted duplets $$\{\mathfrak{D}(x,r_x)\mathfrak{E}(x,r_x)|x\text{€}\mathfrak{R},\ r_x\text{€}\mathfrak{R}\} \tag{9.6.1}$$

as an encrypted realm over Descartes product $\mathfrak{R}\times\mathfrak{R}$ and denoted it as $\mathfrak{E}(\mathfrak{R})$.

Definition 9.6.2. Let's x,y are two numbers from $\mathfrak{R}\backslash\{0,$ NaN, ±0, ±∞}, i.e., neither of them zero nor a special symbol. For simplicity, let's use the following short hand notation $$\mathfrak{D}_x \equiv \mathfrak{D}(x,r_x),\ \mathfrak{E}_x \equiv \mathfrak{E}(x,r_x) \tag{9.6.2}$$

$$\mathfrak{D}_y \equiv \mathfrak{D}(y,r_y),\ \mathfrak{E}_y \equiv \mathfrak{E}(y,r_y) \tag{9.6.3}$$

We call two duplets $(\Delta_x,\mathfrak{E}_x)$, $(\mathfrak{D}_y,\mathfrak{E}_y)$€$\mathfrak{E}(\mathfrak{R})$ as μ-related if and only if $$(\mathfrak{D}_x,\mathfrak{E}_x)\,\bar{}_\mu(\mathfrak{D}_y,\mathfrak{E}_y) \leftrightarrow (\mathfrak{D}_x\delta-\mathfrak{E}_x\beta)/\Delta=(\mathfrak{D}_y\delta-\mathfrak{E}_y\beta)/\Delta \tag{9.6.4}$$

i.e., deciphering of any duplet in the pair $((\mathfrak{D}_x,\mathfrak{E}_x), (\mathfrak{D}_y, \mathfrak{E}_y))$ produces the same true x (as we noted earlier in this paper, the phrase "the same true x", indeed, means the following: the computed results, $(\mathfrak{E}_x\beta-\mathfrak{D}_x\delta)/\Delta$ and $(\mathfrak{E}_y e-\mathfrak{D}_y\delta)/\Delta$, literally speaking, could be different, but the difference between them must lie within an acceptable level of tolerance).

Statement 9.6.3. The μ-relationship on $\mathfrak{E}(\mathfrak{R})$ is symmetric, reflexive and transitive, and, thus, breaks $\mathfrak{E}(\mathfrak{R})$ into set $\mathfrak{E}(\mathfrak{R})/\mu$ of congruent classes which, excluding special symbols, are in one-to-one correspondence with the original data set $\mathfrak{R}$.■

The most interesting side of $\mathfrak{E}(\mathfrak{R})/\mu$ is that, with exception of special symbols, every class $\underline{X}$€$\mathfrak{E}(\mathfrak{R})/\mu$ can be inversed. The meaning of the word "inverse" can be interpreted as follows:

Definition 9.6.4. if multiplication operation $\underline{*}$ is defined in $\mathfrak{E}(\mathfrak{R})/\mu$ in a commutative, associative and distributive operation, then we say that class $\underline{Y}$ is inverse to a class $\underline{X}$, and denoted such $\underline{Y}$ as $\underline{X}^{-1}$, if and only if $\underline{X*Y}=\underline{Y*x}=\underline{1}$, where $\underline{1}$ is a unity class, i.e., $\underline{X*1}=\underline{1*X}=\underline{X}$ for every $\underline{X}$€$\mathfrak{E}(\mathfrak{R})/\mu$.

This definition has one practical application: it enables multiplication and division operations in encrypted realm. We will revisit this topic after presenting the RLE data architecture.■

Comment 9.6.5. For the all practical purposes, we have no interest in the knowledge of random variables used for encrypting the true data as our main concern is about two causes:

the reliability of the deciphered data (i.e., how close the deciphered numbers are matching the original data), and the security of the original data and operations Comment 9.6.6. If rational function Δ does not satisfy the condition (9.1.2), i.e., it is either zero, or any of the special symbols, then encryption using formulas (9.2.1)-(9.2.2) might still be possible to perform, but decryption of x will be impossible.

Assumption 9.6.7. Here and elsewhere in the following text we will assume that α, δ, γ,β—RLE encryption coefficients, are chosen in such a way that predicates (9.1.1)-(9.1.2) are true.

Comment 9.6.8. The encryption forms for x=0 are $\mathfrak{D}(0,r)=\beta r$ and $\mathfrak{E}(0,r)=\delta r$ for any r. Thus, we may have many distinct duplets, $(\mathfrak{D}, \mathfrak{E})$, deciphering to zero: all of these duplets together form the congruent class zero, $\underline{0}$, in $\mathfrak{E}(\mathfrak{R})/\mu$. To the contrary, the encryption (and decryption) is not specified if x is one of the symbols: NaN, ±0 or ±∞.

The defined in this section congruence $\mathfrak{E}(\mathfrak{R})/\mu$ is one of the fundamental properties of RLE encryption aiming in establishing arithmetic operations in $\mathfrak{E}(\mathfrak{R})$ domain. However, before discuss arithmetic operations in $\mathfrak{R}$ and $\mathfrak{E}(\mathfrak{R})$ domains, let's address in the next section the architecture of RLE system as far as RLE data hosting and securing operations are concerned.

9.7. Data architecture and security of RLE system. Before we will lay out the data architecture for secure RLE operations, let's consider a sample of encrypted data and try to protect it against an open data attack. Let's pick a pair x, $r_x$€$\mathfrak{R}$ and α- and γ-encryptions $\mathfrak{D}$ and $\mathfrak{E}$. The deciphering formula (9.5.1) for getting true x from its α- and γ-encryptions contains two RLE coefficients—δ, β. Let's assume that intruder initiates an open data attack and have gotten a tip (from insider) regarding the two true data values $x_1$=A, $x_2$=B. Let's also assume that α- and γ-encryptions are kept publicly on cloud, and intruder could get hold on $\mathfrak{D}_i$ and $\equiv_i$ i=1,2, corresponding to these $x_1$, $x_2$. Then, intruder may use equation (9.5.1) twice separately for $x_1$=A and $x_2$=B, and builds a 2×2 system of linear equations to find δ/Δ, β/Δ. Given the parameters δ/Δ, β/Δ are found, intruder uses formula (9.5.1) for every other complemented pairs $\mathfrak{D}$ and $\mathfrak{E}$ to get corresponding true x. Thus, intruder will be able to decipher the entire RLE system.

The intruder's attack which had been described right now is an imminent one if a. these α- and γ-encryptions are both available to intruder
b. the α- and γ-encryptions are collocated in public domain, i.e., an indicator pointing to the α-encryptions can be reuse to get the complemented γ-encryption.

9.7.1. Encryption forms dislocation in current data architecture In order to defend RLE system against open data attacks, theft of data, and the plain text attack (in which case, intruder uses a copy of data he/she have gotten by any other legal or illegal means), the following RLE data architecture and operations are proposed:

1. the α-encryptions and γ-encryptions must be kept in two separate domains—PDL (Public Data Location), or DCL (Data Center Location). The cloud and PDL in this paper are used interchangeably and treated as synonyms.
2. the α-encryptions forms will be hosted on public domain, i.e., on PDL.
3. the γ-encryptions forms will be kept privately at DCL 4. all operations will be executed against RLE encrypted data and results will be retained in encrypted forms
5. all operations will be completed in two steps: the first, initiation step, will begin in PDL, and the result of this step as well as the indicators of data will be sent to DCL
6. on DCL, during second step, RLE engages γ-encrypted data by employing corresponding indicators from PDL and completes execution by producing resulting duplet (D,E) of encrypted forms
7. per Client request, the result of operation will be deciphered and sent to the Client
8. the α-encrypted result, if needed, will be sent to PDL for complex calculations■

9.7.2. Discussions about accepted data architecture model. Let's make a few observations with respect to the just introduced RLE data architecture and operational scheme:

1. The development of the effective mathematical algorithms for performing encrypted calculations is a work in progress.
2. In this version of the proposed RLE, the summation of any number of $\mathfrak{D}$-forms (i.e., α-encryptions) can be completed at PDL and stored there or be sent to DCL for end-user usage.
3. In the follow up releases of RLE, it is visible to build the α- and γ-encryptions in a template parameterized forms both of which will be kept on PDL.
4. For example, the γ-encryption could be done by using formula $\mathfrak{E}=\mathfrak{E}(x, r_x, r_{\xi x})=\gamma x+\delta r_x+r_{\xi x}$ where $r_{\xi x}$ is a new random variable unique for each x. Using such $\mathfrak{E}$, the intruder will not be able to conduct the open data attack against RLE.
5. The handling of $r_{\xi x}$ especially for multiplication operation is a little bit labor intensive, and outside the scope of this introduction to RLE encryption.
6. The current and the future versions of RLE data architecture assume that all the data is privately precomputed.
7. The use of indicators for synchronizing DCL and PDL data (mentioned in the assumption "5, 6." in 9.7.1 paragraph) is implementation dependent.
8. For simplicity, in all the numerical examples in this paper, we assumed that α- and γ-encryptions are colocated, i.e., can be referenced to by using the same indicators (for example, using row ID for the encrypted database operations).
9. However, for security purposes (for example, against theft protection), the installation of the current Data Architecture assumes that complemented forms are dislocated, i.e., α- and γ-components have distinct indicators to be referred to.
10. The join between complemented α- and γ-encryptions is conducted by using a special navigating mechanism which is privately installed on DCL.
11. Regardless of the navigation between complemented α- and γ-encryptions, the formulas for RLE arithmetic operations over encrypted forms remain the same.

In view of breaking the encrypting realm $\mathfrak{E}(\mathfrak{R})$ into PDL and DCL domains, we will combine them by presenting $\mathfrak{E}(\mathfrak{R})$ as a Descartes product of PDL and DCL. Thus, if $\mathfrak{P}$ and $\mathfrak{C}$ are notations for corresponding encrypted domains PDL and DCL, then $E(\mathfrak{R})=\mathfrak{P}\times\mathfrak{C}$, i.e., it is a set of all the duplets (p,q) where $p\in\mathfrak{P}$, $q\in\mathfrak{C}$.

Our next topic has a pure technical nature, though, it is used in almost every elaboration we do for multiplication and division operations in PDL or DCL. This technique—decomposition of encryption forms—exploits addition and one sided homomorphism of RLE operational scheme.

10.1 Decomposition of encryption forms into sum of encrypted bi-products. This section expands the deciphering operation introduced in the previous section by one step further: we will show that by encrypting (9.5.1), the right side encryption can be decomposed into sum of encrypted bi-products. This technique will hide the encryption coefficients, thus, extending domain of RLE secure arithmetic operations on public and private domain.

Statement 10.1.1. Encryption of the deciphering expression in (9.5.1) enables deciphering decomposition on DCL according to the following scheme:

$$\mathfrak{D}(\delta\mathfrak{D})(x,r_x)-\beta\mathfrak{E}(x,r_x))/\Delta,r_\lambda)=\mathfrak{D}(\delta/\Delta,r_{\theta 1})\mathfrak{D}(x,r_x)-\mathfrak{D}(\beta/\Delta,r_{\theta 2})\mathfrak{E}(x,r_x) \quad (10.1.1)$$

$$\equiv((\delta-\mathfrak{D}(x,r_x)-\beta\mathfrak{E}(x,r_x))/\Delta,r_\lambda)=\mathfrak{E}(\delta/\Delta,r_{\theta 1})\mathfrak{D}(x,r_x)-\mathfrak{E}(\beta/\Delta,r_{\theta 1})\mathfrak{E}(x,r_x) \quad (10.1.2)$$

Proof: Before we proceed, let's notice that two left most expressions in (10.1.1), (10.1.2) are exactly the $\mathfrak{D}$- and $\mathfrak{E}$-encryptions of the right most expression in (9.5.1). Therefore, for the proof of the Statement we will use equations (10.1.1)-(10.1.2) instead of (9.5.1).

This proof is broken into three logistical steps:

1. begin by propagating homomorphism $\mathfrak{D}$ and $\mathfrak{E}$ by addition against the left most expressions in (10.1.1) and (10.1.2)
2. reorganizing the propagated sums by vertically slicing them and forming three deciphering expressions from these vertical slices
3. repeating the same reorganization and vertical slicing against the right most expressions in (10.1.1) and (10.1.2) to match the deciphering result in step 2.

10.2.1 (step 1). First, let's notice that homomorphism by addition of $\mathfrak{D}$ and $\mathfrak{E}$ transformations enables elaboration of (10.1.1), (10.1.2) as follows:

$$\mathfrak{D}_\delta=\mathfrak{D}(x,r_x)=\mathfrak{D}((\delta\mathfrak{D}(x,r_x)-\beta\mathfrak{E}(x,r_x))/\Delta,r_s)=\mathfrak{D}((\delta/\Delta)\mathfrak{D}(x,r_x),r_u)-\mathfrak{D}((\beta/\Delta)\mathfrak{E}(x,r_x),r_t) \quad (10.2.1.1)$$

$$\mathfrak{E}_\beta=\mathfrak{E}(x,r_x)=\mathfrak{E}(\delta\mathfrak{D}(x,r_x)-\beta\mathfrak{E}(x,r_x))/\Delta,r_s)=\mathfrak{E}((\delta/\Delta)\mathfrak{D}(x,r_x),r_u)-\mathfrak{E}((\beta/\Delta)\mathfrak{E}(x,r_x),r_t) \quad (10.2.1.2)$$

The complete proof of elaborations in (10.2.1.1) and (10.2.1.2) will be brought in step 3. Here, let's just mention that both pairs $$(\mathfrak{D}((\delta\mathfrak{D}(x,r_x)-\beta\mathfrak{E}(x,r_x))/\Delta,r_s),\ \mathfrak{E}((\delta\mathfrak{D}(x,r_x)-\beta\mathfrak{E}(x,r_x))/\Delta,r_s)) \quad (10.2.1.3)$$

$$(\mathfrak{D}((\delta/\Delta)\mathfrak{D}(x,r_x),r_u)-\mathfrak{D}((\beta/\Delta)\mathfrak{E}(x,r_x),r_t),\ \mathfrak{E}((\delta/\Delta)\mathfrak{D}(x,r_x),r_u)-\mathfrak{E}((\beta/\Delta)\mathfrak{E}(x,r_x),r_t)) \quad (10.2.1.4)$$

are deciphering into the same expression $(\delta\mathfrak{D}(x,r_x)-\beta\mathfrak{E}(x,r_x))/\Delta$. This means, that encryption pairs, (10.2.1.3)-(10.2.1.4), belong to the same congruent class $\mathfrak{E}(\mathfrak{R})/\mu$, and, thus, for security reasons, the deciphering expression based on (10.2.1.3) duplets can be replaced by (10.2.1.4) which does not contain explicit RLE coefficients.

10.2.2 (step 2). Let's perform the reconfiguration of (10.2.1.1), (10.2.1.2) and (10.2.1.3), (10.2.1.4) sums, and extract two vertical slices from (10.2.1.1), (10.2.1.2) sums:

$$(\mathfrak{D})((\delta/\Delta)\mathfrak{D}(x,r_x),r_u),\ \mathfrak{E}((\delta/\Delta)\mathfrak{D}(x,r_x),r_u),$$

$$(\mathfrak{D})((\beta/\Delta)\mathfrak{E}(x,r_x),r_t),\ \mathfrak{E}((\beta/\Delta)\mathfrak{E}(x,r_x),r_t)) \quad (10.2.2.1)$$

and correspondingly, two pairs from (10.2.1.3), (10.2.1.4):

$$(\mathfrak{D}(\delta/\Delta,r_{\theta 1})\mathfrak{D}(x,r_x),\ \mathfrak{E}(\delta/\Delta,r_{\theta 1})\mathfrak{D}(x,r_x)),$$

$$(\mathfrak{D}(\beta/\Delta,r_{\theta 2})\mathfrak{E}(x,r_x),\ \mathfrak{E}(\beta/\Delta,r_{\theta 2})\mathfrak{E}(x,r_x)) \tag{10.2.2.2}$$

Let's notice that presence of the different than $r_s$ random factors $r_u$, $r_t$ in (10.2.2.1), (10.2.2.2) would have no effect on deciphering of the true factors $\delta/\Delta$, $\beta/\Delta$ in the follow up step.

10.2.3 (step 3). We will show in this step that deciphering of every duplet in the (10.2.2.1) set produces the same result as the correspondingly positioned duplet in the (10.2.2.2) set. This will prove that the combine algebraic sum of the deciphering results found for (10.2.2.1) and (10.2.2.2) sets will produce the same summary result.

Let's make the following assignments:

$$XX_1=\mathfrak{D}^{-1}(\mathfrak{D}((\beta/\Delta)\mathfrak{E}(x,r_x),r_t),\ \mathfrak{E}((\beta/\Delta)\mathfrak{E}(x,r_x),r_t),$$

$$XX_2=\mathfrak{D}^{-1}(\mathfrak{D}(\beta/\Delta,r_{\theta 2})\mathfrak{E}(x,r_x),\ \mathfrak{E}(\beta/\Delta,r_{\theta 2})\mathfrak{E}(x,r_x) \tag{10.2.2.3}$$

The direct application of (9.5.12) to the right side of equation for $XX_1$ in (10.2.2.3) produces $$XX_1=(\delta\mathfrak{D}(\beta/\Delta\mathfrak{E}(x,r_x),r_t)-\beta\mathfrak{E}(\beta/\Delta\mathfrak{E}(x,r_x),r_t))/\Delta=(\beta/\Delta)\mathfrak{E}(x,r_x) \tag{10.2.2.4}$$

Similarly, $$XX_2=(\delta\mathfrak{D}(\beta/\Delta,r_{\theta 2})\mathfrak{E}(x,r_x)-\beta\mathfrak{E}(\beta/\Delta,r_{\theta 2})\mathfrak{E}(x,r_x))/\Delta=(\delta\mathfrak{D}(\beta/\Delta,r_{\theta 2})-\beta\mathfrak{E}(\beta/\Delta,r_{\theta 2}))\mathfrak{E}(x,r_x)=(\beta/\Delta)\mathfrak{E}(x,r_x) \tag{10.2.2.5}$$

Same elaborations lead to $$Y_1=\mathfrak{D}^{-1}(\mathfrak{D}((\delta/\Delta)\mathfrak{D}(x,r_x),r_u),\ \mathfrak{E}((\delta/\Delta)\mathfrak{D}(x,r_x),r_u)=(\delta/\Delta)\mathfrak{D}(x_1,r_x)$$

$$Y_2=\mathfrak{D}^{-1}(\mathfrak{D}(\delta/\Delta,r_u)\mathfrak{D}(x,r_x),\ \mathfrak{E}(\delta/\Delta,r_u)\mathfrak{D}(x,r_x)=(\delta/\Delta)\mathfrak{D}(x_1,r_x) \tag{10.2.2.6}$$

This leads to $$(YY_1-XX_1)/\Delta=(YY_2-XX_2)/\Delta=x \tag{10.2.2.7}$$

This will conclude the proof of the Statement 10.1.1.■

11.1. RLE multiplication/division operations on DCL.

Assumption 11.1.1. Let's agree that here and in the follow up text that when we discuss or perform arithmetic operations on DCL we mean that all the components involved in those operations are presented in encrypted forms—either original encryptions or combinations of them.

Since RLE encryptions come in duplet forms—($\mathfrak{D}$, $\mathfrak{E}$), therefore, we would also assume that all the results of arithmetic operations on DCL or PDL domains are produced in duplet forms. Those duplets, if needed, can be sent to user's application for private decryption, using formula (9.5.1), or they could be kept on DCL or PDL for further use. The fact, that deciphering operation (9.6.6) effectively eliminates randomization and restores the true data on DCL without dragging around or keeping track of random components embedded in ciphered data has two major advantages:

1. it enables to keep data in encrypted form on PDL and DCL at all the times
2. it enables to perform simple as well as complex arithmetic calculations without intermediate deciphering.

We will revisit and discuss these topics later on upon concluding analysis of arithmetic operations covering, specifically, multiplication and division operations on DCL.

Our imminent goal, thus, is to show that by knowing the encrypted images $\mathfrak{D}(x_1,r_1)$, $\mathfrak{E}(x_1,r_1)$, $\mathfrak{D}(x_2,r_2)$, $\mathfrak{E}(x_2,r_2)$ of the individual original entries $x_1$, $x_2$, we will be able to find without intermediate deciphering the encrypted values of the products $\mathfrak{D}(x_1{*}x_2, r_u)$, $\mathfrak{E}(x_1{*}x_2, r_u)$ and ratios $\mathfrak{D}(x_1/x_2, r_v)$, $\mathfrak{E}(x_1/x_2, r_v)$ for the true unciphered entries $x_1$, $x_2$.

Before we proceed with our plan, let's present an RLE one-sided homomorphism enable encrypting individual components inside complex expressions (such as RLE coefficients, random constants, etc.).

11.2 One sided homomorphism of RLE transformations.

Definition 11.2.1. Transformations $$\mathfrak{D}^{-1}(\mathfrak{D}(x{*}z,r_y),\mathfrak{E}(x{*}z,r_y))=x\mathfrak{D}^{-1}(\mathfrak{D}(z,r_y),\mathfrak{E}(z,r_y))$$

$$\mathfrak{D}^{-1}(\mathfrak{D}(x{*}z,r_y),\mathfrak{E}(x{*}z,r_y))=z\mathfrak{D}^{-1}(\mathfrak{D}(x,r_y),\mathfrak{E}(x,r_y)) \tag{11.2.1.1}$$

are called as one-sided homomorphisms.

Statement 11.2.1. The deciphering operation applied against multiplication products behaves like a one sided homomorphism as it enables selective deciphering of individual multipliers follow scheme below:

$$D^{-1}(D(x{*}z,r_y),E(x{*}z,r_y))=xD^{-1}(D(z,r_y),E(z,r_y))=z\,\mathfrak{D}^{-1}(\mathfrak{D}(x,r_y),\mathfrak{E}(x,r_y)) \tag{11.2.1}$$

Proof: By replacing x with x*z in formula (9.5.1), we will get $$(\delta\mathfrak{D})(x{*}z,r_y)-\beta\mathfrak{E}(x{*}z,r_y))/\Delta=x{*}z \tag{11.3.2}$$

Since z can be represented as $\mathfrak{D}^{-1}(\mathfrak{D}(z, r_y), \mathfrak{E}(z, r_y)$, therefore, (11.3.2) gives $$\mathfrak{D}^{-1}(\mathfrak{D}(x{*}z,r_y),\mathfrak{E}(x{*}z,r_y))=x{*}z=x\mathfrak{D}^{-1}(\mathfrak{D}(z,r_y),\mathfrak{E}(z,r_y))$$

Similarly:

$$\mathfrak{D}^{-1}(\mathfrak{D}(x{*}z,r_y),\mathfrak{E}(x{*}z,r_y))=z\mathfrak{D}^{-1}(\mathfrak{D}(x,r_y)).\blacksquare$$

Corollary 11.2.4. For ciphering of algebraic expressions we shall use the following decompositions:

$$\mathfrak{D}((\delta\mathfrak{D}(x,r_y)-\beta\mathfrak{E}(x,r_y))/\Delta,r_\lambda)=\mathfrak{D}(\delta/\Delta,r_{\theta 1})\mathfrak{D}(x,r_y)-\mathfrak{D}(\beta/\Delta,r_{\theta 2})\mathfrak{E}(x,r_y) \tag{11.2.4.1}$$

$$\mathfrak{E}(\delta\mathfrak{D}(x,r_y)-\beta\mathfrak{E}(x,r_y))/\Delta,r_\lambda)=\mathfrak{E}(\delta/\Delta,r_{\theta 1})\mathfrak{D}(x,r_y)-\mathfrak{E}(\beta/\Delta,r_{\theta 2})\mathfrak{E}(x,r_y) \tag{11.2.4.2}$$

Proof: In order to prove that presented in (11.2.4.1), (11.2.4.2) transformations are true, as far as congruent relationship (9.6.4) in $\mathfrak{E}(\mathfrak{R})$ is concerned, let's show that a duplet compounded from the left sides of equations (11.2.4.1), (11.2.4.2)

$$(\mathfrak{D})(\delta\mathfrak{D})(x,r_y)-\beta\mathfrak{E}(x,r_y))\Delta,r_\lambda),\ \mathfrak{E}(\delta\mathfrak{D})(x,r_y)-\beta(\mathfrak{E}(x,r_y))/\Delta,r_\lambda) \tag{11.2.4.3}$$

and a duplet compounded from the right sides of the same equations $$(\mathfrak{D})(\delta/\Delta,r_{\theta 1})\mathfrak{D}(x,r_y)-\mathfrak{D}(\beta/\Delta,r_{\theta 2})(\mathfrak{E}(x,r_y)),\ (\mathfrak{E}(\delta/\Delta,r_{\theta 1})\mathfrak{D}(x,r_y)-(\mathfrak{E}(\beta/\Delta,r_{\theta 2})(\mathfrak{E}(x,r_y)) \tag{11.2.4.4}$$

are μ-related, i.e., belong to the same congruent class in $\mathfrak{E}(\mathfrak{R})/\mu$. This can be achieved by showing that deciphering of the both duplets produces the same result. Indeed, starting with (11.2.4.3), we will proceed as follows:

$$\mathfrak{D}^{-1}(\mathfrak{D})((\delta\mathfrak{D}(x,r_y)-\beta\mathfrak{E}(x,r_y))/\Delta,r_\lambda,\ \mathfrak{E}((\delta\mathfrak{D}(x,r_y)-\beta\mathfrak{E}(x,r_y))/\Delta,r_\lambda)))=(\delta\mathfrak{D}((\delta\mathfrak{D}(x,r_y)-\beta(\mathfrak{E}(x,r_y))/\Delta,r_\lambda)-\beta\mathfrak{E}((\delta\mathfrak{D}(x,r_y)-\beta\mathfrak{E}(x,r_y))/\Delta,r_\lambda))/\Delta=((\delta\mathfrak{D})(x,r_y)-\beta\mathfrak{E}(x,r_y))/\Delta=x$$

Correspondingly, the second duplet upon regrouping inside deciphering scheme will produce $$\mathfrak{D}^{-1}(\mathfrak{D}(\mathfrak{D})(\delta/\Delta,r_{\theta 1})\mathfrak{D}(x,r_y)-\mathfrak{D}(\beta/\Delta,r_{\theta 2})(\mathfrak{E}(x,r_y)),\ (\mathfrak{E}(\delta/\Delta,r_{\theta 1})\mathfrak{D}(x,r_y)-(\mathfrak{E}(\beta/\Delta,r_{\theta 2})(\mathfrak{E}(x,r_y))))=$$

$$\mathfrak{D}^{-1}(\mathfrak{D})(\delta/\Delta,r_{\theta1})\mathfrak{D}(x,r_y),(\mathfrak{E}(\delta/\Delta,r_{\theta1}))\mathfrak{D}(x,r_y))-\mathfrak{D}^{-1}(\mathfrak{D}(\beta/\Delta,r_{\theta2})\mathfrak{E}(x,r_y)),(\mathfrak{E}(\beta/\Delta,r_{\theta2})\mathfrak{E}(x,r_y))=\mathfrak{D}^{-1}(\mathfrak{D}(\delta/\Delta,r_{\theta1}),\mathfrak{E}(\delta/\Delta,r_{\theta1}))\mathfrak{D}(x,r_y)-\mathfrak{D}^{-1}(\mathfrak{D}(\beta/\Delta,r_{\theta2}),\mathfrak{E}(\beta/\Delta,r_{\theta2}))(\mathfrak{E}(x,r_y)=(\delta/\Delta)\mathfrak{D}(x,r_y)-(\beta/\Delta)(\mathfrak{E}(x,r_y)=x.\blacksquare$$

The next section has a pure technical purpose, as it studies the deciphering of the duplets ($\mathfrak{D}(1,r_\varsigma)\mathfrak{D}(x,r_x)$, $\mathfrak{E}(1,r_\varsigma)\mathfrak{D}(x,r_x)$) on the DCL sites.

11.3.1. Deciphering duplets on DCL: The encryption forms for z=1 are defined as follows: $\mathfrak{D}(1,r)=\alpha+\beta r$, $\mathfrak{E}(1,r)=\gamma+\delta r$ for some r. Let's The products $\mathfrak{D}(1,r_\varsigma)\mathfrak{D}(x,r_x)$, $\mathfrak{E}(1,r_\varsigma)\mathfrak{D}(x,r_x)$, $\mathfrak{D}(1,r_\varsigma)\mathfrak{E}(x,r_x)$, $\mathfrak{E}(1,r_\varsigma)\mathfrak{E}(x,r_x)$, for any $x\in\mathfrak{R}$ are just four rational numbers with no visible distinction from any other number in the rational domain $\mathfrak{R}$. However, all these four numbers upon division by $\mathfrak{D}(1,r_\varsigma)$ and $\mathfrak{E}(1,r_\varsigma)$ produce $\mathfrak{D}(x,r_x)$, $\mathfrak{E}(x,r_x)$ correspondingly. This fact is summarized in the Statement 11.3.2. Let's $\mathfrak{D}(1,r_\varsigma)$, $\mathfrak{E}(1,r_\varsigma)$, $\mathfrak{D}(x,r_x)$, $\mathfrak{E}(x,r_x)$, are defined as in the beginning of this section. Then $$\mathfrak{D}^{-1}(\mathfrak{D}(1,r_\varsigma)\mathfrak{D}(x,r_x),\mathfrak{E}(1,r_\varsigma)\mathfrak{D}(x,r_x))=\mathfrak{D}(x,r_x) \quad (11.3.2.1)$$

$$\mathfrak{D}^{-1}(\mathfrak{D}(1,r_\varsigma)\mathfrak{E}(x,r_x),\mathfrak{E}(1,r_\varsigma)\mathfrak{E}(x,r_x))=\mathfrak{E}(x,r_x) \quad (11.3.2.2)$$

Proof: Let's prove this statement for $\mathfrak{D}(x,r_x)$ as the case for $\mathfrak{E}(x,r_x)$ can be proved by replacing $\mathfrak{D}(x,r_x)$ (for the prove purpose only) by $\mathfrak{E}(x,r_x)$. From definition of $\mathfrak{D}(1,r_\varsigma)$ we have $$\mathfrak{D}(1,r_\varsigma)\mathfrak{D}(x,r_x)=\alpha\mathfrak{D}(x,r_x)+\beta\mathfrak{D}(x,r_x)r_\varsigma=\mathfrak{D}(\mathfrak{D}(x,r_x),\mathfrak{D}(x,r_x)r_\varsigma) \quad (11.3.2.3)$$

$$\mathfrak{E}(1,r_\varsigma)\mathfrak{D}(x,r_x)=\gamma\mathfrak{D}(x,r_x)+\delta\mathfrak{D}(x,r_x)r_\varsigma=\mathfrak{E}(\mathfrak{D}(x,r_x),\mathfrak{D}(x,r_x)r_\varsigma) \quad (11.3.2.4)$$

Then, due deciphering formula (9.5.1), we have $$\mathfrak{D}^{-1}(\mathfrak{D}(1,r_\varsigma)(\mathfrak{D}(x,r_x),\mathfrak{E}(1,r_\varsigma)\mathfrak{D}(x,r_x))=\mathfrak{D}^{-1}(\mathfrak{D}(\mathfrak{D}(i\ x,r_x),\mathfrak{D}(x,r_x)r_\uparrow),\mathfrak{E}(\mathfrak{D}(x,r_x),\mathfrak{D}(x,r_x)r_\varsigma))= \quad (11.3.2.5)$$

$$(\delta\mathfrak{D}(\mathfrak{D}(x,r_x),\mathfrak{D}(x,r_x)r_\varsigma)-\beta(\mathfrak{E}(\mathfrak{D})(x,r_x),\mathfrak{D}(x,r_x)r_\varsigma)/\Delta=(\alpha\delta\mathfrak{D}(x,r_x)-\beta\gamma\,\mathfrak{R}(x,r_x)/\Delta=(\alpha\delta-\beta\gamma)\mathfrak{D}(x,r_x)/\Delta=\mathfrak{D}(x,r_x) \quad (11.3.2.6)$$

The following observation is following immediately from statement 11.3.2:

Corollary 11.3.3. Equality $\mathfrak{D}^{-1}(\mathfrak{D}(1,r_\varsigma)x,\mathfrak{E}(1,r_{525})x)=x$ is true.■

11.4.1. Ciphering complex multiplication expressions: In this section, we will elaborate the encryption algorithm for ciphering product $x_1*x_2$ on DCL.

For the sake of arguments, the following equations define the original (due (9.2.1)-(9.2.2)) encryption forms for $x_1*x_2$:

$$Z_1=\alpha x_1+\beta r_1,$$

$$W_1=\gamma x_1+\delta r_1 \quad (11.4.1.1)$$

$$Z_2=\alpha x_2+\beta r_2,$$

$$W_2=\gamma x_2+\delta r_2 \quad (11.4.1.2)$$

Subsequent application of (9.5.1) against (11.4.1.1)-(11.4.1.2) will produce $$x_1=\mathfrak{D}^{-1}(Z_1,W_1)=(\delta Z_1-\beta W_1)/\Delta$$

$$x_2=\mathfrak{D}^{-1}(Z_2,W_2)=(\delta Z_2-\beta W_2)/\Delta \quad (11.4.1.3)$$

Further, by encrypting equations (11.4.1.3) and using Corollary 11.3.3, we will get $$\mathfrak{D}(\mathfrak{D}^{-1}(Z_1,W_1),r_{\lambda1})=\mathfrak{D}(\delta/\Delta,r_{\theta1})Z_1-\mathfrak{D}(\beta/\Delta,r_{\theta2})W_1 \quad (11.4.1.4)$$

$$\mathfrak{E}(\mathfrak{D}^{-1}(Z_1,W_1),r_{\lambda1})=\mathfrak{E}(\delta/\Delta,r_{\theta1})Z_1-\mathfrak{E}(\beta/\Delta,r_{\theta2})W_1 \quad (11.4.1.5)$$

$$\mathfrak{D}(\mathfrak{D}^{-1}(Z_2,W_2))=\mathfrak{D}(\delta/\Delta\neq r_{\theta1})Z_2-\mathfrak{D}(\beta/\Delta,r_{\theta2})W_2 \quad (11.4.1.6)$$

$$\mathfrak{E}(\mathfrak{D}^{-1}(Z_2,W_2))=\mathfrak{E}(\delta/\Delta,r_{\theta1})Z_2-\mathfrak{E}(\beta/\Delta,r_{\theta2})W_2 \quad (11.4.1.7)$$

therefore, on DCL side, the deciphering formula the product $x_1*x_2$, is derived as follows:

$$x_1*x_2=\mathfrak{D}^{-1}(Z_1,W_1)\mathfrak{D}^{-1}(Z_2,W_2)=((\delta Z_1-\beta W_1))(\delta Z_2-\beta W_2)/\Delta^2=(\delta Z_1-\beta W_1)(\delta Z_2-\beta W_2)/\Delta^2=(\delta^2 Z_1Z_2-\delta\beta(Z_1W_2+W_1Z_2)+\beta^2W_1W_2)/\Delta^2 \quad (11.4.1.8)$$

In view of an explicit usage of RLE coefficients, we will convert (11.4.1.8) expressions into encrypted forms, so we could use it either on DCL and PDL sites. Let's encrypt the both sides of (11.4.1.8). This produces the following encryptions:

$$\mathfrak{D}(x_1*x_2,r_{\lambda1})=(\mathfrak{D}(\delta^2,r_{\omega1})Z_1Z_2-\mathfrak{D}(\delta\beta,r_{\omega2})(Z_1W_2+W_1Z_2)+\mathfrak{D}(\beta^2,r_{\omega3})W_1W_2)/\Delta^2 \quad (11.4.1.9)$$

$$\mathfrak{E}(x_1*x_2,r_{\lambda1})=(\mathfrak{E}(\delta^2,r_{\omega1})Z_1Z_2-\mathfrak{E}(\delta\beta,r_{\omega2})(Z_1W_2+W_1Z_2)+\mathfrak{E}(\beta^2,r_{\omega3})W_1W_2)/\Delta^2 \quad (11.4.1.10)$$

Let's notice that duplet constructed from the left sides of (11.4.1.9)-(11.4.1.10), due (9.5.1), deciphers to $x_1*x_2$ by definition of the encryption forms $\mathfrak{D}(x_1*x_2,r_{\lambda1})$, $\mathfrak{E}(x_1*x_2,r_{\lambda1})$. If, in addition, we will show that duplet constructed from the right most sides of (11.4.1.9)-(11.4.1.10), is also deciphers to $x_1*x_2$, then this would mean that we found a decomposition of encryption forms (occupying the right most sides of (11.4.1.9)-(11.4.1.10)) which contain bi-product of the encryption forms(for example, $\mathfrak{D}((\delta/\Delta)^2,r_{\omega1})*(Z_1Z_2)$, $\mathfrak{D}((\delta\beta/\Delta^2),r_{\omega2})*(Z_1W_2+W_1Z_2)$, $\mathfrak{D}((\beta/\Delta)^2,r_{\omega3})*(W_1W_2)$) which is more secure than the right most side of (11.4.1.8) containing explicit RLE coefficients. The transition from (11.4.1.9)-(11.4.1.10) to (11.4.1.8) is done next.

11.5.1. Deciphering of the multiplication results on DCL: We begin this section by computing the following three deciphering expressions:

$$\mathfrak{D}^{-1}(\mathfrak{D}(\delta^2/\Delta^2,r_{\omega1})Z_1Z_2,\mathfrak{E}(\delta^2/\Delta^2,r_{\omega1})Z_1Z_2) \quad (11.5.1.1)$$

$$\mathfrak{D}^{-1}(\mathfrak{D}(-\delta\beta/\Delta^2,r_{\omega2})(Z_1W_2+W_1Z_2),\mathfrak{E}(-\delta\beta/\Delta^2,r_{\omega2})(Z_1W_2+W_1Z_2)) \quad (11.5.1.2)$$

$$\mathfrak{D}^{-1}(\mathfrak{D}(\beta^2/\Delta^2,r_{\omega3})W_1W_2,\mathfrak{E}(\beta^2/\Delta^2,r_{\omega3})W_1W_2) \quad (11.5.1.3)$$

An immediate application of (9.5.1) and one-sided homomorphism towards (11.5.1.1), (11.5.1.2), (11.5.1.3) will produce correspondingly, $(\delta^2/\Delta^2)Z_1Z_2$, $(-\delta\beta/\Delta^2)(Z_1W_2+W_1Z_2)$, $(\beta^2/\Delta^2)W_1W_2$. By adding together these three components, we will get, due (11.4.1.8):

$$(\delta^2/\Delta^2)Z_1Z_2+(-\delta\beta/\Delta^2)(Z_1W_2+W_1Z_2)+(\beta^2/\Delta^2)W_1W_2=x_1*x_2 \quad (11.5.1.4)$$

Thus, combining together all the elaborations and formulas derived in this and previous sections, we proved the following fundamental result:

Statement 11.5.1.6. Equations (11.4.1.9) and (11.4.1.10) enable encrypted computing on DCL of the encrypted forms $\mathfrak{D}(x_1*x_2,r_{\xi k})$ and $\mathfrak{E}(x_1*x_2,r_{\xi k})$ for $x_1*x_2$ product that.■

Notice 11.5.1.7. Statement 11.5.1.6 allows series of encrypted arithmetic operations to be performed on DCL. We will explore this feature later upon concluding with division operation. Next section, though, will bring the numeric example of multiplication.

11.5.2. Numeric example for multiplication

Initial Data

X_one=84.703624017929
X_two=88.44839268288277
R_one=92.53495650085871
R_two=90.33341213109753
Big_new_Ro=1.494631

RLE Coefficients

Big_Alph=0.0872//α
Big_Beta=1.2395//β
Big_Delt=4.0051//δ
Big_Gama=−0.7034//γ

Determinant

Δ=αδ−γβ=1.22110902

Encryption Forms of X1 and X2

C_one=Big_Alph*X_one+Big_Beta*R_one=122.08323459717779
D_one=Big_Gama*X_one+Big_Delt*_one=119.68096417844278
C_two=Big_Alph*X_two+Big_Beta*R_two=311.03122514737794
D_two=Big_Gama*X_two+Big_Delt*R_two=299.57974951311894

Source Code

```
double D_δ2_rω1=Big_Alph*Big_Delt*Big_Delt+Big_Beta*Big_new_Ro;
double D_δβ_rω2=Big_Alph*Big_Delt*Big_Beta+Big_Beta*(Big_new_Ro*11.78);
double D_β2_rω3=Big_Alph*Big_Beta*Big_Beta+Big_Beta*(Big_new_Ro*2.9176);
double E_δ2_rω1=Big_Gama*Big_Delt*Big_Delt+Big_Delt*Big_new_Ro;
double E_δβ_rω2=Big_Gama*Big_Delt*Big_Beta+Big_Delt*(Big_new_Ro*11.78);
double E_β2_rω3=Big_Gama*Big_Beta*Big_Beta+Big_Delt*(Big_new_Ro*2.9176);
double D_x1Mx2=(D_δ2_rω1*C_one*C_two−D_δμ_rω2*(C_one*D_two+C_two*D_one)+D_β2_rω3*D_one*D_two)/(Det2*Det2);
double E_x1Mx2=(E_δ2_rω1*C_one*C_two−E_δβ_rω2*(C_one*D_two+C_two*D_one)+E_β2_rω3*D_one*D_two)/(Det2*Det2);
double calculated_x1Mx2=(Big_Delt*D_x1Mx2−Big_Beta*E_x1Mx2)/Det2;
log("\n Multiplication Test\n calculated x1*x2 ="+calculated_x1Mx2);
log("true x1*x2="+X_one*X_two);
```

Multiplication Test calculated x1*x2=7491.899398801246
true x1*x2=7491.899398801044

Discussions of the test results: The scale factors, 1.0 (for E_β2_rω1), 11.78 (for D_δβ_rω2), and 2.9176 (for E_β2_rω3) are chosen at random. The calculated product x1*x2 resulted in loss of the three significant digits, due disparity in ranges of RLE coefficients α, β, γ, δ. The precision of the result can be significantly improved by using BigDecimal data types. The match of 13 decimal digits between calculated and the true results cannot happened at random, and, thus, we claim it as a proof of concept for getting reliable encrypted multiplication results directly from encrypted data bypassing three steps:

1. decrypting individual multipliers
2. multiplying individual multipliers
3. encrypting result of multiplication Using BigDecimal arithmetic, the result can be improved.■

11.6. Series of multiplication: In order to get the product x1*x2*x3, we will compute the encrypted forms $\mathfrak{D}$ ($x_1$*$x_2$, $r_k$), $\mathfrak{E}$ ($x_1$*$x_2$,$r_k$), as shown in formulas (11.4.1.9)-(11.4.1.10), and reuse the same formulas in which Z1 is replaced by $\mathfrak{D}$ ($x_1$*$x_2$,$r_k$), and $W_1$ by E($x_1$*$x_2$,$r_k$). In addition, $Z_2$, $W_2$ are replaced by $Z_3$, $W_3$ correspondingly. The follow up example demonstrates these operations. Before we proceed with calculations, let's discuss the precision and location of such operations.

We will begin with the location of operations first. Since each equation either (11.4.1.9) or (11.4.1.10) uses both, α-, γ-encryptions, Z and W, therefore, neither of them, $\mathfrak{D}$ ($x_1$*$x_2$, $r_k$), $\mathfrak{E}$ ($x_1$*$x_2$,$r_k$), can be calculated on cloud. Otherwise, due open data attack, intruder and insider working together could decipher RLE code. Thus, multiplication over encrypted forms is done at DCL. The fact that data is encrypted still enables secure operations so as a regular user (without top security clearance) cannot see nor decipher intermediate results. Only the purposely deciphered data which is destined by the Application scheme will reach the end-user.

In case of the theft of data, the intruder will face a difficult problem:

1. due the fact that γ-encryptions in DCL and α-encryptions in PDL are dislocated against each other, the navigation between complemented forms is almost impossible: the indicators which are good for picking up DCL data will not work for PDL
2. a full scan of one list against the other to create a $10^{12}$ of 2×2 deciphering equations for extracting δ/Δ, β/Δ could produce a lot of the false positive hypothesis about reality of δ/Δ, β/Δ found
3. Application of the each pair of δ/Δ, β/Δ for deciphering RLE code will turn into an another large computational task because the navigation mechanism is kept privately and only downloaded into memory cash as needed by Application Server.

This concludes the époque about the location of the data components.

Now, let's address the next problem—errors accumulation during multiplication. Since accumulation of errors during series of multiplications could exceed some reliability level, therefore, number of multipliers must be limited. If $\mathfrak{E}$ $\Pi x_i$, $p_1$, . . . , $p_n$, $q_1$, . . . , $q_n$) is an error accumulation function (where ($\Pi x_i$ is a product, $p_i$—precisions, $q_i$—range of the multipliers) then differential d($\mathfrak{E}$ ($x_1$*$x_2$ . . .

$$*x_n, p_1, \ldots, p_n, q_1, \ldots, q_n)) =$$

$$\frac{\partial E}{\partial \prod} \sum \frac{\partial \prod}{\partial x} d(x_i) + \sum \frac{\partial E}{\partial p} d(p_i) + \sum \frac{\partial E}{\partial p} d(q_i)$$

can be used for the analysis of the error gross estimate. In case when we use a standard procedure for error estimates as $$d\left(\prod x_i\right) = \sum \frac{\partial \prod}{\partial x} d(x_i),$$

then derivations $d(x_1)$, $d(x_2)$, . . . , being amplified by the magnitude of $$\frac{\partial \prod}{\partial x}$$

hide some intrinsic properties of irregularities in precision, range and relative importance of these factors. There is another factor—the position of calculations error accumulation, which is also very important. If this position overlaps with rounding errors accumulation location (occurred due limited precision of the selected data types), then this might create a spike in loss of significant digits. Thus, $\mathfrak{S}(x_1{*}x_2 \ldots {*}x_n, p_1, \ldots, p_n, q_1, \ldots, q_n)$ may suite better for the errors estimation using quality and homogeneity of data as a few independent factors in addition to computer precision limitations.

11.6.1. Numeric example for calculating x1*x2*x3

By using the α-encryption, D_x1Mx2, instead of C_one, and E_x1Mx2 instead of D_one In the previous example, and replacing C_two by C_three, and D_two by D_three, we will be able to compute the α-, γ-encryptions for x1*x2*x3, i.e., to find $\mathfrak{D}(x1{*}x2{*}x3, r_{123})$, $\mathfrak{S}(x1{*}x2{*}x3, r_{123})$. The following calculations prove the concept:

Source Code:

```
log("/n Preparation for getting x1*x2*x3");
double D_x1Mx2Mx3=(D_δ2_rω1*D_x1Mx2*C_tee−
    D_δβ_rω2*(D_x1Mx2*D_tee+C_tee*E_x1Mx2)+
    D_β2_rω3*E_x1Mx2*D_tee)/(Det2*Det2);
double E_x1Mx2Mx3=(E_δ2_rω1*D_x1Mx2*C_tee−
    E_δβ_rω2*(D_x1Mx2*D_tee+C_tee*E_x1Mx2)+
    E_β2_rω3*E_x1Mx2*D_tee)/(Det2*Det2);
double calculated_x1Mx2Mx3=
    (Big_Delt*D_x1Mx2Mx3−Big_Beta*E_x1Mx2Mx3)/
    Det2;
log("2187/n Multiplication Test\n calculated
    x1*x2*x3="+calculated_x1Mx2Mx3);
log("true x1*x2*x3="+X_one*X_two*x_tee);
```

Test Data

X1 and X2 are the same as in the previous example.

X3=X_tee=81.80437453214896

R3=R_tee=93.07353341213109

Encrypted Input Data

C_tee=122.49798612353987

D_tee=315.2276116230126

D_x1Mx2 is α-encryption for x1*x2 and it is calculated in the previous example

E_x1Mx2 is γ-encryption for x1*x2 and it is calculated in the previous example

D_x1Mx2=−723525.7354738119

E_x1Mx2=−2345253.2061952176

Test Results calculated_x1Mx2Mx3=612870.1443765203 true x1*x2*x3=612870.1443767023

Conclusion

Four significant digits lost, and twelve out of sixteen digits are matching to the true product of three numbers.■

11.7.1. Division preliminary observations: For analysis of division operation, we will use the same initial data as we did for multiplication in section 11.4.1. In addition, we assume that both, $x_1$ and $x_2$, are nonzero numbers. Since ratio $x_1/x_2$ is, in fact, a product of $x_1$ and $1/x_2$, therefore, we compute ratio $x_1/x_2$ in DCL by multiplying encrypted forms of $x_1$ and $1/x_2$. To aim this goal, we develop an inverse encrypting technique for getting $\mathfrak{D}(1/x_2, r)$, $\mathfrak{S}(1/x_2)$—the encrypted inverse forms—by using α-, γ-encryptions $\mathfrak{D}(x_2, r_2)$, $\mathfrak{S}(x_2, r_2)$. To begin explaining inverse encrypting let's assume that $$Z_{/x2}=\mathfrak{D}(1/x_2, r_{/x})=\alpha(1/x_2)+\beta r/x, \qquad (11.7.1.5)$$

$$W_{/x2}=\mathfrak{S}(1/x_2, r_{/x}, r_{/\psi 2})=\gamma(1/x_2)+\delta r_{/x} \qquad (11.7.1.6)$$

12.1. Inverse encrypting for division operations. The encryptions $Z_{/x2}$, $W/_{x2}$, (in (11.7.1.5)-(11.7.1.6)) are based on inverted $x_2$ which in a sense a true data by itself. Our goal, though, is to maintain all the arithmetic operations in encrypted forms for enhanced security purposes. Let's begin with an equality that ties three factors—$x_2$, $1/x_2$, their encrypted forms and complemented condition:

$$1=x_2{*}(1/x_2)=\mathfrak{D}^{-1}(Z_2, W_2){*}\mathfrak{D}^{-1}(Z_{/x2}, W_{/x2}) \qquad (12.1.1)$$

$$x_2\neq 0,\ \neq NaN,\ \neq\pm 0,\ \neq\pm\infty \qquad (12.1.2)$$

Let's notice that condition (12.1.2) is essential for (12.1.1) taking place, therefore, here and below we will assume that (12.1.2) is always true for the purpose of this paper. Under these assumptions, let's build a 2×2 system of algebraic equations for defining $Z_{/x2}$, $W_{/x2}$ as follows:

$$x_2=\mathfrak{D}^{-1}(Z_2, W_2)=(\delta Z_{x2}-\beta W_{x2})/\Delta,$$

$$1/x_2=\mathfrak{D}^{-1}(Z_{/x2}, W_{/x2})=(\delta Z_{/x2}-\beta W_{/x2})/\Delta,$$

$$x_2{*}(1/x_2)=(1/\Delta^2)(\delta^2 Z_{x2}-\beta\delta W_{x2})Z_{/x2}+(-\beta\delta Z_{x2}+\beta^2 W_{x2})W_{/x2} \qquad (12.1.3)$$

Since $x_2{*}(1/x_2)=1$, therefore, by encrypting the both sides of (12.1.3) and applying addition homomorphism, first, and one sided homomorphisms, second, we will get $$\mathfrak{D}(1,_\zeta)=(\mathfrak{D}(\delta^2/\Delta^2,\omega_1)Z_{x2}-\mathfrak{D}(\beta\delta/\Delta^2,\omega_2)W_{x2})Z_{/x2}+(-\mathfrak{D}(\beta\delta/\Delta^2,\omega_2)Z_{x2}+\mathfrak{D}(\beta^2/\Delta^2,\omega_3)W_{x2})W_{/x2} \qquad (12.1.4)$$

$$\mathfrak{S}(1,r_\zeta)=(\mathfrak{S}(\delta^2/\Delta^2,\omega_1))Z_{x2}-\mathfrak{S}(\beta\delta/\Delta^2,\omega_2)W_{x2})Z_{/x2}(-\mathfrak{S}(\beta\delta/\Delta^2,\omega_2)Z_{x2}+\mathfrak{S}(\beta^2/\Delta^2,\omega_2)W_{x2})W_{/x2} \qquad (12.1.5)$$

To simplify these two expressions, let's declare the following privately created public keys $$Q_1=\mathfrak{D}(\delta^2/\Delta^2,\omega_1)\ Q_2=\mathfrak{D}(\beta\delta/\Delta^2,\omega_2),\ Q_3=\mathfrak{D}(\beta^2/\Delta^2,\omega_3)$$

$$P_1=\mathfrak{S}(\delta^2/\Delta^2,\omega_1)\ P_2=\mathfrak{S}(\beta\delta/\Delta^2,\omega_2),\ P_3=\mathfrak{S}(\beta^2/\Delta^2,\omega_3) \qquad (12.1.6)$$

Upon using these keys, we will get a 2×2 system of linear algebraic equations $$\mathfrak{D}(1,r_\zeta)=(Q_1{*}Z_{x2}-Q_2{*}W_{x2})Z_{/x2}+(-Q_2{*}Z_{x2}+Q_3{*}W_{x2})W_{/x2}$$

$$\mathfrak{S}(1,r_\zeta)=(P_1Z_{x2}-P_2W_{x2})Z_{/x2}+(-P_2Z_{x2}+P_3W_{x2})W_{/x2}$$

with unknown variables $Z_{/x2}$, $W_{/x2}$ (which correspond to the encryption forms $\mathfrak{D}(1/x_2, r)$, $\mathfrak{S}(1/x_2, r)$) and random $r_{/\psi 2}$. Before we compute $Z_{/x2}$, $W_{/x2}$ using system (12.1.6), let's simplify this system it by using grouping parameters as follows:

$$Q_{1Z}=(Q_1{*}Z_{x2}-Q_2{*}W_{x2})$$

$$Q_{1W}=(-Q_2{*}Z_{x2}+Q_3{*}W_{x2})$$

$$P_{1Z}=(P_1Z_{x2}-P_2W_{x2})$$

$$P_{1W}=(-P_2Z_{x2}+P_4W_{x2}) \qquad (12.1.7)$$

Under these assignments, the (12.1.6) system can be rewritten as $$Q_{1Z}Z_{/x2}+Q_{1W}W_{/x2}=\mathfrak{D}\,(1,r_\zeta)(\equiv D_{1\lambda})$$

$$P_{1Z}Z_{/x2}+P_{1W}W_{/x2}=\mathfrak{E}\,(1,r_\zeta)(\equiv E_{1\xi}) \quad (12.1.8)$$

The determinant of the 2×2 system is calculated via formula:

$$\Delta_{\lambda\xi}=Q_{1Z}P_{1W}-P_{1Z}Q_{1W} \quad (12.1.9)$$

The pivotal determinants for defining $Z_{/x2}$, $W_{/x2}$ variables are presented below as $$\Delta_{Z/x2}=D_{1\lambda}P_{1W}-E_{1\xi}Q_{1W} \quad (12.1.10)$$

$$\Delta_{W/x2}=Q_{1Z}E_{1\xi}-P_{1Z}D_{1\lambda} \quad (12.1.11)$$

Hence $$Z_{/x2}=\Delta_{Z/x2}/\Delta_{\lambda\xi}\ W_{/x2}=\Delta_{W/x2}/\Delta_{\lambda\xi} \quad (12.1.12)$$

$$1/x_2=(\delta Z_{/x2}-\beta W_{/x2})/\Delta \quad (12.1.14)$$

12.2.1. Numeric illustration for inverse encryption. The initial data used for this example is the same as in numerical example in section 11.5.2. Java source code for inverse encrypting and computing 1/x2 from inverse forms

```
double rζ=21.672; //random for 𝔇 (1,r_ζ), 𝔈 (1,r_ζ)
double D_1_rζ=Big_Alph+Big_Beta*rζ;
double E_1_rζ=Big_Gama+Big_Delt*rζ;
double eq_1_1=D_δ2_rω1*C_two−D_δβ_rω2*D_two; //
  𝔇 (δ^2/Δ^2,ω_1)Z_x2
double eq_1_2=−D_δβ_rω2*C_two+D_β_rω3*D_two;
double eq_2_1=E_δ2_rω1*C_two−E_δβ_rω2*D_two;
double eq_2_2=−E_δβ_rω2*C_two+E_β2_rω3*D_two;
//new Determinant
double Det_noKsi=eq_1_1*eq_2_2−eq_2_1*eq_1_2;
  //Δ_λξ=Q_1Z P_1W−P_1Z Q_1W
double piv_Zx2=D_1_rζ*eq_2_2−E_1_rζ*eq_1_2;
double piv_Wx2=eq_1_1*E_1_rζ−eq_2_1*D_1_rζ;
//encrypted inverse 1/x2
double D_Zx2=piv_Zx2/Det_noKsi; //Z_/x2=Δ_Z/x2/Δ_λξ,
  W_/x2=Δ_W/x2/Δ_λξ
double E_Wx2=piv_Wx2/Det_noKsi;
//computed 1/x2
double calc_1Dx2=(Big_Delt*D_Zx2−
  Big_Beta*E_Wx2)*Det2;
//Test result print
log("\n Calc 1/x2="+calc_1Dx2);
log("true 1/x2="+1/X_two);
```

Numeric Results

```
Calc 1/x2=0.011306027952201649
true 1/x2=0.011306027952201871
```

Conclusion

The inverse operation performed on DCL over $\mathfrak{D}\,(x_2,r_\lambda)$, $\mathfrak{E}\,(x_2,r_\lambda)$ In the next section we will utilize the result from this section to compute ratio x1/x2.

12.3. Numeric example for a ratio $x_1/x_2$ computed on DCL.

In this section, we will put together multiplication and inverse encrypting operations to compute the encrypted ratio on DCL, i.e., will find ($\mathfrak{D}\,(x_1/x_2,r_\lambda)$ and $\mathfrak{E}\,(x_1/x_2,r_\lambda)$ by manipulating encrypted duplets ($\mathfrak{D}\,(x_1,r_\lambda)$, $\mathfrak{E}\,(x_1,r_\lambda)$) and ($\mathfrak{D}\,(x_2,r_{\lambda 2})$, $\mathfrak{E}\,(x_2,r_{\lambda 2})$) only.

According to our plan we will derive first the inverted duplet ($\mathfrak{D}\,(1/x_2,r_{\lambda 3})$, $\mathfrak{E}\,(1/x_2,r_{\lambda 3})$) by using original duplet and ($\mathfrak{D}\,(x_2,r_{\lambda 2})$, $\mathfrak{E}\,(x_2,r_{\lambda 2})$). This was done in the previous section 12.1. Thus, the only thing that is left to produce the encrypted ratio $x_1/x_2$ on DCL is to compute the encrypted product $x_1*x_2$ with $x_2$ being replaced by $1/x_2$.

In the numeric example that follows we will use data and results from the previous example derived in 12.2.1 and will combine this data with multiplication example in section 11.5.2.

Java Source Code

```
//FINAL DIVISION
double D_x1Dx2=(D_δ2_rω1*D_Zx2*C_one−
  D_δβ_rω2*(D_Zx2*D_one+C_one*E_Wx2)+
  D_β2_rω3*E_Wx2*D_one)/(Det2*Det2);
double E_x1Dx2=(E_δ2_rω1*D_Zx2*C_one−
  E_δβ_rω2*(D_Zx2*D_one+C_one*E_Wx2)+
  E_β2_rω3*E_Wx2*D_one)/(Det2*Det2);
double calc_x1Dx2=(Big_Delt*D_x1Dx2−
  Big_Beta*E_x1Dx2)*Det2;
log("2247/n Division Test\n calc x1/x2="+calc_x1Dx2);
log("true x1/x2="+X_one/X_two);
```

Test Results

```
calc x1/x2=0.9576615407995217
true x1/x2=0.957661540799503
```

12.4. Series of divisions. The RLE scheme does not impose additional restriction on the number of divisions in a single expression except limitations caused by calculation errors accumulation. Though the division can be successfully performed in encrypted form on DCL, it is more practical to compute all the necessary products separately for nominator and denominator and complete the calculation of the ratio as a final step—whenever it is possible—by dividing the products in the nominator into product of denominator using RLE division rules.

As we discussed earlier, the loss of significance is predicated by the logic of algebraic expressions as well as by the precision degradation caused by computer imperfections. There is no shortcuts on reliability control as the anonymously obtained results during calculations could significance skew the output beyond limitations. Thus, in order to maintain the reliable computing, we must constantly monitor the precision of intermediate results.■

The remaining chapters of this paper are dedicated to RLE encrypted databases and statistical calculations using encrypted databases.

13.1. RLE database operations on PDL and DCL. We will describe in this chapter the application of RLE scheme for database encryption and operations. First, we briefly address the database properties which RLE database application scheme is predicated upon. Then, we will begin exploring statistical operations over encrypted databases. As we shall see, RLE scheme takes advantage of the database structural data organization to utilize an embedded in RLE addition homomorphism.

13.1.1. Database model for RLE application. Here and elsewhere in the following text, we assume that there is a true table T with two columns D and E. Column D contains the original data (such as salary, or age, or stock price information, or else). Column E, on the other hand, contains the true (unencrypted) random information. Upon encrypting columns D and E (as well as other columns in table T), using formulas (9.1.1) and (9.1.2), the encrypted table $\mathcal{T}$—which is an image of T—is formed. Table $\mathcal{T}$ is broken into two parts, one which installed on PDL domain, and the other which installed on DCL domain. This type of data organization will retain the RLE security at all times. Thus, two encrypted columns, $\mathfrak{D}$ and $\mathfrak{E}$ will end up in different domains—PDL and DCL correspondingly.

From operational stand point, if a request from the Client must be satisfied by using both α- and γ-encryptions, then data from the 𝔇 column must be brought in to DCL side and combined with the column 𝔈 data. There are, though, exceptions to this scheme. Indeed, if statistical calculations required a large summation to be performed over 𝔇 data, then such summation can be successfully completed in PDL domain and the result will be brought in to DCL where it will be combined with a complemented sum computed for 𝔈 data.

As RLE transformations, (9.1.1) and (9.1.2), are defined for the complemented pairs only, therefore, we assume that there is in place a navigation mechanism which brings together α- and γ-encryptions at all times whenever RLE needs complemented pairs to work on.

13.1.2. RLE Statistical calculations in DCL computing. Here and elsewhere in the remaining part of this paper, we will use the database model described in section 13.1.1. Our goal with respect to this model is to show that Statement 13.1.2. The statistical variances ${}^eV(\mathfrak{D})$, ${}^eV(\mathfrak{E})$ and covariance ${}^eK(\mathfrak{D},\mathfrak{E})$ can be calculated on DCL by using encrypted data in the 𝔇 and 𝔈 database columns. Upon calculations, the statistical results can be either deciphered on DCL in cash and transmitted to the end-user, or be kept in the encrypted forms on DCL or PDL.

Comment 13.1.2. The procedure of keeping data in two domains DCL and PDL will not endanger the RLE security and, subsequently, will create a safe environment for the original and encrypted data.

14.1. RLE methods for Statistical calculations in DCL computing: The formula for calculation variance statistics using encrypted data in 𝔇 is presented below as:

$$ {}^eV(\mathfrak{D})=\Sigma(\mathfrak{D}(x,r_x)-\mathscr{A}_{\mathfrak{D}\,(x,r)})^2, \quad (14.1.1) $$

where x€D, $r_x$€E, $(x,r_x)$ is a pair of a mutually complementary entries from table T, $\mathfrak{D}(x,r_x)$ is an RLE encrypted image of x, and $\mathscr{A}_{\mathfrak{D}\,(x,r)}$ is average for encrypted elements in 𝔇.

Note 14.1.1. For simplicity and the proof of concept, we use the entire set of elements from columns D (original, true, data) and E (random data complemented to the original data in D).

Note 14.1.2. According to RLE scheme columns D and E never get stored or transmitted to public domain.

Note 14.1.3. As other arrangements in PL/SQL operations are likely arising, the computing of the statistical results for the partial sets of elements are straight forward and require similar operations. Those partial scale database applications will be elaborated in a different research on RLE privacy preserving in database operations.

Note 14.1.4. In the follow up text, some of the RLE operations over encrypted data are targeting data either in columns 𝔇 or 𝔈 but not in both. Therefore we don't need to transfer data from column) to DCL but rather complete statistical calculations in public domain (PDL) and only the final result of operations shall be brought in to DCL.

Since RLE is a summation homomorphism, therefore, average $$ \mathscr{A}_{\mathfrak{D}\,(x,r)}=(1/N^{\mathfrak{D}})\Sigma(\mathfrak{D}(x,r_x))=(\alpha A_{Lx}+\beta A_{Lr}) \quad (14.1.2) $$

where $A_{Lx}$ and $A_{Lr}$ are corresponding averages for data set in columns D and E. Subsequently, formula (14.1.2) can be rewritten as $$ {}^eV(\mathfrak{D})=\Sigma((x-A_{Lx})\alpha+\Sigma(r_x-A_{Lr})\beta)^2 \quad (14.1.3) $$

If we denote the true variance of the elements in D as ${}^tV(x)$, then ${}^tV(x)=\Sigma(x-A_{Lx})^2$. Subsequently, the true variance ${}^tV(r_x)$ of the column E is $\Sigma(r_x-A_{Lr})^2$, and the true covariance ${}^tK(x,r_x)$ between true columns D and E is $\Sigma(x-A_{Lx})(r_x-A_{Lr})$. Under these notation, the right part of (14.1.3), after opening braces, can be rewritten as $$ {}^eV(\mathfrak{D})=\Sigma(x-A_{Lx})^2\alpha^2+\Sigma(r_x-A_{Lr})^2\beta^2+2\alpha\beta\Sigma(x-A_{Lx})(r_x-A_{Lr})={}^tV(x)\alpha^2+{}^tV(r_x)\beta^2+2\alpha\beta\,{}^tK(x,r_x) \quad (14.1.4) $$

The same operations over encrypted variance ${}^eV(\mathfrak{E})$ over column 𝔈 will produce $$ {}^eV(\mathfrak{E})=\Sigma((x-A_{Lx})\gamma+\Sigma(r_x-A_{Lr})\delta)^2==\Sigma(x-A_{Lx})^2\gamma^2+\Sigma(r_x-A_{Lr})^2\delta^2+2\gamma\delta\Sigma(x-A_{Lx})(r_x-A_{Lr})=={}^tV(x)\gamma^2+{}^tV(r_x)\delta^2+2\gamma\delta\,{}^tK(x,r_x) \quad (14.1.5) $$

The relations (14.1.4) and (14.1.5) define two algebraic equations for defining three unknown variances ${}^tV(x)$, ${}^tV(r_x)$ and ${}^tK(x,r_x)$. The third equation will come from exploring the covariance ${}^e(\mathfrak{D},\mathfrak{E})$ between two encrypted columns 𝔇 and 𝔈. It is calculated as $$ {}^eK(\mathfrak{D},\mathfrak{E})=\Sigma(\mathfrak{D}(x,r_x)-\mathscr{A}_{\mathfrak{D}\,(x,rx)})(\mathfrak{E}(y,r_y)-\mathscr{A}_{\mathfrak{E}\,(y,ry)}) \quad (14.1.6) $$

Let's notice that 𝔇 and 𝔈 columns are physically residing in two different domains—PDL and DCL correspondingly. However, in order to compute (in this version of RLE) we will bring column 𝔇 to DCL where (14.1.6) will be safely computed. Applying averaging formulas to $\mathfrak{D}(x,r_x)$, $\mathfrak{E}(y,r_y)$, $\mathscr{A}_{\mathfrak{D}\,(x,rx)}$ and $\mathscr{A}_{\mathfrak{E}\,(y,ry)}$, we get $$ {}^eK(\mathfrak{E},\mathfrak{E})=\Sigma((x-A_{Lx})\alpha+\Sigma(r_x-A_{Lrx})\beta)((x-A_{Lx})\gamma+\Sigma(r_x-A_{Lrx})\delta) \quad (14.1.7) $$

After a few algebraic transformations, (14.1.7) will turned into $$ {}^eK(\mathfrak{D},\mathfrak{E})=\alpha\gamma({}^tV(x))+\beta\delta({}^tV(r_x))+(\alpha\delta+\beta\gamma)({}^tK(x,r_x)) \quad (14.1.8) $$

This is the last equation together with two previously derived in (14.4.4) and (14.4.5) enable to devise the unknown true variances ${}^tV(x)$ and ${}^tV(r_x)$, and covariance ${}^tK(x,r_x)$ as a unique solution to the 3×3 system of the linear algebraic equations. We will assume here that determinant of this system is neither zero nor any of the exceptional symbols such as NaN, ±0 or ±∞. In the following text we will elaborate in greater details the conditions under which the determinant of the described 3×3 system is nonzero nor an exceptional symbol NaN, ±0 or ±∞.

In conclusion of this paragraph let's notice that equations (14.1.4), (14.1.5), (14.1.8) connect together the encrypted parameters, ${}^eV(\mathfrak{D})$, ${}^eV(\mathfrak{E})$ and ${}^eK(\mathfrak{D},\mathfrak{E})$, with true statistical parameters ${}^tV(x)$, ${}^tV(r_x)$ and ${}^tK(x,r_x)$ using RLE encryption coefficients. Since the statistical variables ${}^eV(\mathfrak{D})$, ${}^eV(\mathfrak{E})$ and ${}^eK(\mathfrak{D},\mathfrak{E})$ are from the encrypted data, they can be sent over network to any central service locations which holds the RLE private keys. Thus, there is no need to use the original deciphered data for statistical computing anywhere in network, yet, the statistical parameters can be obtained readily by transmitting a few encrypted results.

In the next section, we will display formulas for arithmetic operations to derive the true statistics from their RLE encrypted images.

15.1. Getting ${}^tV(x)$, ${}^tV(r)$ and ${}^tK(x,r)$ as equation solutions. Let's M=M(α,δ,β,γ) is the matrix for equations (14.1.4), (14.1.5) and (14.1.8). Here is how it looks in the table form:

$$M = \begin{matrix} \alpha^2 & \beta^2 & 2\alpha\beta \\ \gamma^2 & \delta^2 & 2\gamma\delta \\ \gamma\alpha & \beta\delta & \alpha\delta+\beta\gamma \end{matrix} \quad (15.1.1)$$

Let's Δ be this matrix's determinant. The mathematical formula for computing determinant Δ using matrix M in (15.1.1) is presented below:

$$\Delta=\alpha^2*\delta^2*(\Delta\delta+\beta\gamma)+\alpha\gamma*\beta^2*2\gamma\delta+\gamma^2*2\alpha\beta*\beta\delta-\alpha\gamma*\delta^2*2\alpha\beta-\gamma^2*\beta^2*(\alpha\delta+\beta\gamma)-\alpha^2*\beta\delta*2\gamma\delta=\alpha^3*\delta^3-3\alpha^2*\delta^2*\beta\gamma+3\alpha\delta*\gamma^2*\beta^2-\gamma^3*\ \beta^3=(\alpha\delta-\gamma\beta)^3 \quad (15.1.2)$$

Thus, in order to find the unique solution for the true variances ${}^tV(x)$, ${}^tV(r_x)$ and covariance ${}^tK(x,r_x)$, the RLE encryption coefficients in (9.1.1)-(9.1.2) must satisfy the following condition:

$$\alpha\delta\neq\gamma\beta\text{, nor }\alpha\delta-\gamma\beta\text{ can be any of symbols NaN, }\pm 0\text{ or }\pm\infty \quad (15.1.3)$$

Here and further on in this paper we will assume that coefficients α,δ,β,γ in (9.1.1)-(9.1.2), indeed, satisfy condition (15.1.3).

Thus, what is left for us to elaborate is to find the explicit expressions for variances and covariance ${}^tV(x)$, ${}^tV(r_x)$, ${}^tK(x, r_x)$. Let's notice that the completion of this task, will, simultaneously prove the statement 13.1.2.

In order to find the solution to the 3×3 system of linear algebraic equations specified in (14.1.4),(14.1.5),(14.1.8), let's create three pivotal matrices $T_1$, $T_2$, and $T_3$ as:

| Matrix $T_1$ | | | Matrix $T_2$ | | | Matrix $T_3$ | | |
|---|---|---|---|---|---|---|---|---|
| ${}^eV(\mathfrak{D})$ | $\beta^2$ | $2\alpha\beta$ | $\alpha^2$ | $-{}^eV(\mathfrak{D})$ | $2\alpha\beta$ | $\alpha^2$ | $\beta^2$ | ${}^eV(\mathfrak{D})$ |
| ${}^eV(\mathfrak{E})$ | $\delta^2$ | $2\gamma\delta$ | $\gamma^2$ | $-{}^eV(\mathfrak{E})$ | $2\gamma\delta$ | $\gamma^2$ | $\delta^2$ | ${}^eV(\mathfrak{E})$ |
| ${}^eK(\mathfrak{D},\mathfrak{E})$ | $\beta\delta$ | $\alpha\delta+\beta\gamma$ | $\alpha\gamma$ | $-{}^eK(\mathfrak{D},\mathfrak{E})$ | $\alpha\delta+\beta\gamma$ | $\alpha\gamma$ | $\beta\delta$ | ${}^eK(\mathfrak{D},\mathfrak{E})$ |

These three matrices are obtained from matrix M by replacing its 1st, 2nd, 3rd columns correspondingly with a column constructed by using the right sides of the equations (14.1.4), (14.1.5), (14.1.8). The determinants $\Delta_i=\Delta(T_i)$, i=1,2,3, are defined as follows:

$$\Delta_1={}^eV(\mathfrak{D})*\delta^2*(\alpha\delta+\beta\gamma)+{}^eV(\mathfrak{E})*\beta\delta*2\alpha\beta+{}^eK(\mathfrak{D},\mathfrak{E})*\beta^2*2\gamma\delta—{}^eK(\mathfrak{D},\mathfrak{E})*\delta^2*2\alpha\beta-{}^eV(\mathfrak{E})*\beta^2*(\alpha\delta+\beta\gamma)-{}^eV(\mathfrak{D})*\beta\delta*2\gamma\delta=({}^eV(\mathfrak{D})*\delta^{2+}\ {}^eV(\mathfrak{E})*\beta^2-{}^eK(\mathfrak{D},\mathfrak{E})*2\delta\beta)(\alpha\delta-\beta\gamma) \quad (15.1.4)$$

$$\Delta_2=\alpha^2*(-{}^eV(\mathfrak{E}))*(\alpha\delta+\beta\gamma)+\alpha\gamma*(-{}^eV(\mathfrak{D}))*2\gamma\delta+\gamma^2*2\alpha\beta*(-{}^eK(\mathfrak{D},\mathfrak{E}))+\alpha\gamma*{}^eV(\mathfrak{E})*2\alpha\beta+\gamma^2*{}^eV(\mathfrak{D})*(\alpha\delta+\beta\gamma)+\alpha^2*{}^eK(\mathfrak{D},\mathfrak{E})*2\gamma\delta \quad (15.1.5)$$

$$\Delta_3=\alpha^2*\delta^2*{}^eK(\mathfrak{D},\mathfrak{E})+\alpha\gamma*\beta^2*{}^eV(\mathfrak{E})+\gamma^2*{}^eV(\mathfrak{D})*\beta\delta-\alpha\gamma*\delta^2*{}^eV(\mathfrak{D})-\gamma^2*\beta^2*{}^eK(\mathfrak{D},\mathfrak{E})-\alpha^2*\beta\delta*{}^eV(\mathfrak{E}) \quad (15.1.6)$$

Correspondingly, the solution to the system $${}^tV(x)=\Delta_1/\Delta \quad (15.1.7)$$

$${}^tV(r_x)=\Delta_2/\Delta \quad (15.1.8)$$

$${}^tK(x,r_x)=\Delta_3/\Delta \quad (15.1.9)$$

Subsequently, $${}^tV(x)=({}^eV(\mathfrak{D})*\delta^2+{}^eV(\mathfrak{E})*\beta^2-{}^eK(\mathfrak{D},\mathfrak{E})*2\delta\beta)/(\alpha\delta-\beta\gamma)^2 \quad (15.1.10)$$

$${}^tV(r_x)=({}^eV(\mathfrak{D})*\gamma^2+{}^eV(\mathfrak{E})*\alpha^2-{}^eK(\mathfrak{D},\mathfrak{E})*2\alpha\gamma)/(\alpha\delta-\beta\gamma)^2 \quad (15.1.11)$$

$${}^tK(x,r_x)=({}^eV(\mathfrak{D})*\delta\gamma+{}^eV(\mathfrak{E})*\alpha\beta-{}^eK(\mathfrak{D},\mathfrak{E})*(\alpha\delta+\beta\gamma)/(\alpha\delta-\beta\gamma)^2 \quad (15.1.15)$$

The numeric example will be presented next.

16.1. Numerical examples. Our goal in this section is to create a numeric example in which a true original table T containing a few numeric columns was converted into an encrypted table $\mathfrak{T}$ by using RLE transformation. Then, two mutually complemented columns (that were transformed by RLE application) and their encrypted images were statistically analyzed and statistical parameters—variance and covariance—were calculated for the original (the true) and encrypted columns. Next, the encrypted statistics was plugged into the system of algebraic equations (14.1.4)-(14.1.5), (14.1.8) to derived the deciphered true variances and covariance ${}^tV(x)$, ${}^tV(r_x)$, ${}^tK(x,r_x)$. As the last step in this example, the derived statistics and the original statistics were compared to see what kind of significance the derived statistics did have. For comparing and analysis, the true and deciphered results were placed into tables for concluding discussions.

16.1.1. Database model for this example. We assumed that the two samples, $\mathbb{L}$ and $\Re$, each containing 300275 rational (double precision) numbers were generated by using the Gaussian random number generator with mean 100.0f and variance 5.0f for set $\mathbb{L}$ and mean 2.13f and variance 0.05f for set $\Re$. Both sets were loaded as is (i.e., unsorted and unorganized) into two columns L and R of the true database table T. As entities of the same table, those columns entries are in one-to-one correspondence (based on row IDs) to each other. This enables to apply the RLE transformation against columns L and R by using formulas (9.1.1)-(91.2). The RLE coefficients α, β, γ, δ are set as follows:

$$\alpha=0.0872,\ \beta=1.2395,\ \gamma=-0.7034,\ \delta=4.0051 \quad (16.1.1)$$

Upon transformation, two encrypted columns $\mathbb{L}$ and $\Re$ are created inside encrypted database table $\mathfrak{E}(T)\equiv\mathfrak{T}$. Since the whole purpose of this exercise is to see how the precision and significance of the deciphered results are degrading, we maintain two independent RLE encryptions—one for double precision data, and another—for 38 digits BigDecimal data and operations.

The deciphered results for the true variances ${}^tV_1(x)$ and ${}^tV_2(x)$ were obtained from data in both tables, $\mathfrak{T}_1$ and $\mathfrak{T}_2$, and displayed in tables 16.2.1-16.2.2. We used double precision for columns $\mathfrak{L}_1$. $\Re_1$ in table $\mathfrak{T}_1$, and BigDecimal, 38 digits scale, for columns $\mathfrak{L}_2$. $\Re_2$ in table $\mathfrak{T}_2$. Independently, for comparing purposes, we calculated the true variance and covariance from original (true) data and placed them in the same tables.

16.2. Original and Deciphered Covariance

TABLE 16.2.1

| double precision based calculations | | | | |
|---|---|---|---|---|
| | Calculated from RLE data | | Derived from the True Data | |
| | Formulas | | Formulas used | |
| ${}^tV(x)$ | (15.1.7) | 7480247.599716847 | $\Sigma(x - A_{Lx})^2$ | 7480247.599716848 |
| ${}^tV(r_x)$ | (15.1.8) | 543754.6258459229 | $\Sigma(r - A_{Lr})^2$ | 543754.6258459229 |
| ${}^tK(x, r_x)$ | (15.1.9) | 1971149.2987314523 | $\Sigma(x - A_{Lx})(r - A_{Lr})$ | 1971149.2987314519 |

Shown in the first row of table 16.2.1 the deciphered and true variances ${}^tV(x)$ are different from the BigDecimal version displayed in tables—16.2.2 and 16.2.3. The difference begins in the $8^{th}$ decimal position. Since BigDecimal calculation was performed with E-38 precision, and V(x) in tables 16.2.2 and 16.2.3 match each other with up to 25 decimals after the decimal point, therefore, the calculated results in tables 16.2.2 and 16.2.3 are trusty to up to $25^{th}$ decimal digits after the decimal point. Subsequently, the last three digits in the calculated results of ${}^tV(x)$ and ${}^tK(x,r_x)$, which are displayed in table 16.2.1, are dirty. Thus, calculation of variance and covariance using double precision arithmetic for a sample size of 300K resulted in a loss of three significant digits.

TABLE 16.2.2

| Deciphering statistics using BigDecimal with E-38 precision | | |
|---|---|---|
| | Formula | Calculated from true data |
| ${}^tV(x)$ | (15.1.7) | 7480247.5997167904010865314308249ˆ6964202814052 |
| ${}^tV(r_x)$ | (15.1.8) | 543754.6258459289166839331063060128ˆ8321727673 |
| ${}^tK(x, r_x)$ | (15.1.9) | 1971149.2987314923543375351670046944ˆ55336447883 |

TABLE 16.2.3

| Deciphered Variance (${}^tV(x)$), E-38 BigDecimal precision | |
|---|---|
| From encrypted data | 7480247.5997167904010865314308249ˆ1897348414135 |

17.1. Deciphering covariance in general case. In this section we will compute the covariance statistics between two meaningful columns (for example, we can use salary and age, or moving average of one for the industry pertinent statistics and the stock price fluctuation of a particular company, etc.). Thus, for those scenarios where RLE is used for a meaningful covariate analysis, we must redefine the covariance formula. Let's L and D are two columns containing original data (say, salary an age), and $L_R$, $D_R$, are two random columns that are complementary to L and D in RLE encryption scheme. The encrypted covariance ${}^eK(\mathscr{D}(x,r_x), \mathscr{L}(y,r_y)$ is calculated via formula (14.1.6):

$$ {}^eK(\mathscr{D}(x,r_x), \mathscr{L}(y,r_y))=\Sigma(\mathscr{D}(x,r_x)-\mathscr{A}_{\mathfrak{D}(x,rx)})\mathscr{E}(y, r_y)-\mathscr{A}\mathscr{E}_{(y,ry)}),\ x\in D,\ y\in L,\ L\neq D \quad (17.1.1) $$

where x and y are true entries (for example, age and salary) belonging to the different columns, and L and D, and neither of them are not randomly created. Each of two columns has independently crafted complementing columns of random entries—$R_L$ for L, and $R_D$ for D. It is assumed that encryption of D is done differently than the encryption of L, This means that there are two set of the encryption coefficients: α, β, γ, δ (used for encrypting (D, $D_R$), and ω, θ, ν, π (for encrypting (L, $L_R$). Given that these assumptions are in place, the encrypted covariance can be described as $$ {}^eK(\mathscr{D}(x,r_x), \mathscr{L}(y,r_y))=\Sigma(\mathscr{D}(x,r_x)-\mathscr{A}_{\mathfrak{D}(x,rx)})(\mathscr{E}(y, r_y)-\mathscr{A}\mathscr{E}_{(y,ry)})=\Sigma((x-A_{Lx})\alpha+(r_x-A_{Lrx})\beta)\Sigma((\gamma-_{Ly})\omega+(r_y-A_{Lry})\theta)=\alpha\omega\Sigma(x-A_{Lx})(y-_{Ly})+\beta\omega\Sigma(r_x-A_{Lrx})(y-A_{Ly})+\alpha\theta\Sigma(x-A_{Lx})(r_y-A_{Lry})+\beta\Theta\Sigma(r_x-A_{Lrx})(r_y-A_{Lry})=\alpha\omega{}^tK(x,y)+\beta\omega{}^tK(r_x,y)+\alpha\theta{}^tK(x, r_y)+\mathbf{62}\ \Theta{}^tK(r_x,r_y) \quad (17.1.2) $$

This would be the first equation for deriving the decipher covariance ${}^tK(x,y)$. This first equation has four unknown variables ${}^tK(x,y)$, ${}^tK(r_x,y)$, ${}^tK(x,r_y)$, ${}^tK(r_x,r_y)$. The other three equations are derived by using ${}^eK(\mathscr{D}(x,r_x), \mathscr{L}_R(y,r_y))$, ${}^eK(\mathscr{D}_R(x,r_x), \mathscr{L}(y,r_y))$, ${}^eK(\mathscr{D}_R(x,r_x), \mathscr{L}_R(y,r_y))$ which produce:

$$ {}^eK(\mathscr{D}_R(x,r_x), \mathscr{L}(y,r_y))=\gamma\omega{}^tK(x,y)+\delta\omega{}^tK(r_x,y)+\gamma\theta{}^tK(x, r_y)+\delta\Theta{}^tK(r_x,r_y) \quad (17.1.3) $$

$$ {}^eK(\mathscr{D}(x,r_x), \mathscr{L}_R(y,r_y))=\alpha\nu{}^tK(x,y)+\beta\nu{}^tK(r_x,y)+\alpha\pi{}^tK(x,r_y)+\beta\pi{}^tK(r_x,r_y) \quad (17.1.4) $$

$$ {}^eK(\mathscr{D}_R(x,r_x), \mathscr{L}_R(y,r_y))=\gamma\nu{}^tK(x,y)+\delta\nu{}^tK(r_x,y)+\gamma\pi{}^tK(x,r_y)+\delta\pi{}^tK(r_x,r_y) \quad (17.1.5) $$

The matrix of this system of equations looks as follows $$ \begin{matrix} \alpha\omega & \beta\omega & \alpha\theta & \beta\theta \\ \gamma\omega & \delta\omega & \gamma\theta & \delta\theta \\ \alpha\nu & \beta\nu & \alpha\pi & \beta\pi \\ \gamma\nu & \delta\nu & \gamma\pi & \delta\pi \end{matrix} \quad (17.1.6) $$

and its determinant Δ is computed by decomposing it into a sum of smaller determinants:

$$ \begin{matrix} & |\delta\omega\ \gamma\theta\ \delta\theta| \quad |\gamma\omega\ \gamma\theta\ \delta\theta| \quad |\gamma\omega\ \delta\omega\ \delta\theta| \quad |\gamma\omega\ \delta\omega\ \gamma\theta| \\ \Delta = & \alpha\omega^*\ |\beta\nu\ \alpha\pi\ \beta\pi| - \beta\omega^*|\alpha\nu\ \alpha\pi\ \beta\pi| + \alpha\theta^*|\alpha\nu\ \beta\nu\ \beta\pi| + \alpha\theta^*|\alpha\nu\ \beta\nu\ \beta\pi| - \beta\theta^*|\alpha\nu\ \beta\nu\ \alpha\pi| \\ & |\delta\nu\ \gamma\pi\ \delta\pi| \quad |\gamma\nu\ \gamma\pi\ \delta\pi| \quad |\gamma\nu\ \delta\nu\ \delta\pi| \quad |\gamma\nu\ \delta\nu\ \gamma\pi| \end{matrix} \quad (17.1.7) $$

By breaking each of the 3×3 determinant in (17.1.7) into 2×2 determinants like in bellow equation:

$$\begin{array}{c} |\delta\omega\ \gamma\theta\ \delta\theta| \quad |\alpha\pi\ \beta\pi| \quad |\beta\nu\ \beta\pi| \quad |\beta\nu\ \alpha\pi| \\ \alpha\omega^*|\beta\nu\ \ \alpha\pi\ \ \beta\pi| = \alpha\omega^*(\delta\omega^*|\gamma\pi\ \ \delta\pi| - \gamma\theta^*|\delta\nu\ \ \delta\pi| + \delta\theta^*|\delta\nu\ \ \gamma\pi|) \\ |\delta\nu\ \ \gamma\pi\ \ \delta\pi| \end{array} \tag{17.1.8}$$

leads to $$\Delta=\alpha\omega\delta\omega\pi^2\Delta_x-\alpha\omega\gamma\theta*0+\alpha\omega\delta\theta\nu\pi(-\Delta_x)-\beta c\Delta_x-\beta\omega(-\gamma\theta)\nu\pi\Delta_x-\beta\omega\delta\theta*0+\alpha\theta\gamma\omega*0-\alpha\theta\delta\omega\nu\pi\Delta_x+\alpha\theta\delta\theta\nu^2\Delta_x-\beta\theta\gamma\omega\nu\pi(-\Delta_x)+\beta\theta\delta\omega*0-\beta\theta\gamma\theta\nu^2\Delta_x, \tag{17.1.9}$$

where $\Delta_x=\alpha\delta-\gamma\beta$. If we denote $\Delta_y=\omega\pi-\nu\theta$, then (17.1.10) will be transformed into $$\Delta=\Delta_x^2(\omega^2\pi^2-2\omega\theta\nu\pi+\theta^2\nu^2)=\Delta_x^2\Delta_y^2 \tag{17.1.10}$$

In order to find the true covariance ${}^tK(x,y)$ from the system (17.1.2)-(17.1.5) we must replace the first column in matrix (17.1.6) with the encrypted covariance values found in the left side of equations (17.1.2)-(17.1.5). After this replacement, the matrix for defining ${}^tK(x,y)$ will look as follows:

$$\begin{array}{cccc} K_1 & \beta\omega & \alpha\theta & \beta\theta \\ K_2 & \delta\omega & \gamma\theta & \delta\theta \\ K_3 & \beta\nu & \alpha\pi & \beta\pi \\ K_4 & \delta\nu & \gamma\pi & \delta\pi \end{array} \tag{17.1.11}$$

where $K_1={}^eK(\mathfrak{D}(x,r_x), \mathfrak{L}(y,r_y))$, $K_2={}^eK(\mathfrak{D}_R(x,r_x), \mathfrak{L}(y,r_y))$, $K_3={}^eK(\mathfrak{D}(x,r_x), \mathfrak{L}_R(y,r_y))$ and $K_4={}^eK(\mathfrak{D}_R(x,r_x), \mathfrak{L}_R(y,r_y))$.

Finally, to get the deciphered covariance ${}^tK(x,y)$, we will use formula:

$${}^tK(x,y)=\Delta_{K,1}/\Delta \tag{17.1.12}$$

where Δ—the determinant of the matrix in (17.1.6) found in (17.1.10), and $\Delta_{K,1}$ is determinant of the matrix (17.1.11) which contains RLE encrypted covariance and privately held coefficients for encrypting columns D and L.

In order to get $\Delta_{K,1}$ we will decompose the original $\Delta_{K,1}$ into sum of 3×3 determinants using the same method we used to compute Δ, though, instead of the first row, we will use the first column. The formula for computing $\Delta_{K,1}$ will look as follows:

$$\begin{array}{c} |\delta\omega\ \gamma\theta\ \delta\theta| \quad |\beta\omega\ \alpha\theta\ \ \beta\theta| \quad |\beta\omega\ \alpha\theta\ \beta\theta| \quad |\beta\omega\ \alpha\theta\ \beta\theta| \\ \Delta_{K,1} = \\ K_1^*|\beta\nu\ \alpha\pi\ \ \beta\pi| - K_2^*|\beta\nu\ \alpha\pi\ \ \beta\pi| + K_3^*|\delta\omega\ \gamma\theta\ \delta\theta| - K_4^*|\delta\omega\ \gamma\theta\ \ \delta\theta| \\ |\delta\nu\ \gamma\pi\ \ \delta\pi| \quad |\delta\nu\ \gamma\pi\ \delta\pi| \quad |\delta\nu\ \gamma\pi\ \delta\pi| \quad |\beta\nu\ \alpha\pi\ \beta\pi| \end{array} \tag{17.1.13}$$

After computing four determinants in (17.1.13), we will get the following expression for $\Delta_{K,1}$ $$\Delta_{K,1}=K_1(\delta\omega\pi^2\Delta_x-\beta\nu*0+\delta\nu\theta\pi(\Delta\Delta_x))-K_2(\beta\omega\pi^2\Delta_x-\beta\nu\theta\pi\Delta_x+\delta\nu*0)+K_3(\beta\omega*0-\delta\omega\theta\pi\Delta_x+\delta\nu\theta^2\Delta_x)-K_4(\beta\omega\theta\pi('\Delta_x)-\delta\omega*0+\beta\nu\theta^2\Delta_x)=\Delta_x(\delta\pi K_1(\omega\pi-\nu\theta)-K_2\beta\pi(\omega\pi-\nu\theta)-K_3\delta\theta(\omega\pi-\nu\theta)+K_4\beta\theta(\omega\pi-\nu\theta))=\Delta_x\Delta_y(K_1\delta\pi-K_2\beta\pi-K_3\delta\theta+K_4\beta\theta) \tag{17.1.14}$$

where $\Delta_y=\omega\pi-\nu\theta$ is determinant for RLE encryption coefficients for columns L and $L_R$ (an origin for y and $r_y$ elements). Hence, finally, $${}^tK(x,y)=(K_1\delta\pi-K_2\beta\pi-K_3\delta\theta+K_4\beta\theta)/\Delta_x\Delta_y \tag{17.1.15}$$

18.1. Covariance (test data description) In order to illustrate the usefulness of the previous section work aimed to decipher the encrypted covariance ${}^eK(\mathfrak{D}(x,r_x), \mathfrak{L}(y,r_y))$, ${}^eK(\mathfrak{D}_R(x,r_x), \mathfrak{L}(y,r_y))$, ${}^eK(\mathfrak{D}(x,r_x), \mathfrak{L}_R(y,r_y))$ and ${}^eK(\mathfrak{D}_R(x,r_x), \mathfrak{L}_R(y,r_y))$ into a true covariance ${}^tK(x,y)$, we generated four samples of data using Gaussian random number generator. Each sample used different mean and standard deviation as routine to generate these samples shows:

| Data generator | Mean | Std | Column name |
|---|---|---|---|
| TryBigDec1( ).RandSig1( | 100.0f, | 5.00f, | D_RandSig); |
| TryBigDec1( ).RandSig1( | 10.0f, | 100.00f, | DR_RandSig); |
| TryBigDec1( ).RandSig1( | 50.0f, | 5.00f, | L_RandSig); |
| TryBigDec1( ).RandSig1( | 5.0f, | 500.00f, | LR_RandSig); |

The four produced samples—D_RandSig, DR_RandSig, L_RandSig, LR_RandSig—were used to create a new true table T. For that, created four samples were entered “as is” into four distinct columns, D, DR, L, and LR of table T. Next, table T was encrypted into table $\mathfrak{T}$ using formulas (9.1.1) and (9.1.2). We apply two different sets of coefficients, α, β, γ, δ, for encrypting columns D and DR, and ω, θ, ν, π for encrypting columns L and LR. Below these two sets of coefficients are displayed as double data types:

```
double D_alpha=0.0872;
double D_beta=1.2395;
double DR_gama=-0.7034;
double DR_delta=4.0051;
double L_omega=1.3061;
double L_teta=-0.4358;
double LR_nu=2.0431;
double LR_pi=3.5491;                    (18.1.2)
```

The test results—to check out the usefulness of formula (17.1.15)—are presented in the next section. All calculations were produced on PC laptop HP Pavilion dv6000™ configured as AMD Turion(tm) 64X2 Mobile Technology TL-56 1.80 GHZ, 32-bit Operating System Vista with 2GB of RAM. We used the Java software with Java.math. BigDecimal library included in NetBeans IDE 6.9 installed separately as a standalone package.

18.1.2. Covariance (Calculated Test Results)

Start testing 2012-08-02 05:38:36.196

Original & randomized data have gotten at 2012-08-02 05:38:47.178

Calculated Averages $Average_D$=100.00440841199002863

$Average_{DR}$=9.8519537643445042871

$Average_L$=50.004275104969137196

$Average_{LR}$=5.3233661795703605443

RLE Coefficients:

BigD_alpha=0.0872000000000000000000000000000000000000000000

BigD_-beta=1.239500000000000000000000000000000000-000000000000

BigDR_gama=–0.703400000000000000000000000000000000000000-0000000

BigDR_delta=4.00510000000000000000000000000000000-0000000000000000

BigL_omega=1.306100000000000000000000000000000000000-00000000000

BigL_teta=–0.435800000000000000000000000000000000000000-0000000

BigLR_nu=2.0431000000000000000000000000000000-00000000000000

BigLR_pi=3.54910000000000000000000000000000000-0000000000000

Covariances for the Four Encrypted Columns Using Double Precision Data:

ek1_x_y=5.092055538395554E7 eK2_rx_y=1.6304338104120618E8 eK3_x_ry=–4.186093778943358E8 ek4_rx_ry=–1.3400629592589872E9

BigDecimal Encryption and covariances calculated at 2012-08-02 05:43:07.23

Covariances for the Four Encrypted Columns Using Bigdecimal Data:

eBig_K1_x_y=50920555.38395608056581154011459-92780249590713451800000000 eBig_K2_rx_y=163043381.04120510849492906154148386010283171943204400000000 eBig_K3_x_ry=–418609377.894343824268081645467649829159938-314923606000000 eBig_K4_rx_ry=–1340062959.258960811416785759293978743051319777510586000000

Control Sums Accuracy Results (for Averages Calculations):

eBigD_Avg=0E-48, eBigDR_Avg=0E-48, eBigL_Avg=0E-48, eBigLR_Avg=0E-48

Time Marks During Covariances Calculations:

completed at 2012-08-02 05:43:08.04 lasting total 4 min 31 sec: 1) download of raw data (11 sec; 2) encryption and randomization—4 min 20 sec Covariance Results by Using Double Data Type deciphered=–32363.76265276129 original=–32363.762655110873

Covariance Results by Using BigDecimal Data Type deciphered=–32363.762655110216594512936450281564557060000405515667 original=–32363.762655110216594512936450281564557060000000000000

18.1.3. Numeric test discussions: The deciphered and original covariances are in match with each other, though, different original data types produce different matching accuracies:

1. double data type sample with starting precision of $10^{-11}$ delivers up to $10^{-5}$ accuracy result 2. BigDecimal sample with starting precision of $10^{-48}$ delivers up to $10^{-42}$ accuracy result The above calculations were performed just to show that original statistics—variance of and covariance for a set of $3*10^5$ entries—can be computed very accurately:

TABLE 18.1.4

| Test description & computing time | Type of encryption | Data type/Precision |
|---|---|---|
| Load true data from DB<br>Encrypting $3*10^5$ pairs twice<br>Uploading to encrypt table<br>Compute var, covar, four col<br>4 min 20 sec | strong RLE | BigDecimal<br>$10^{-42}$ |

Section 27

27.1 Introduction We now discuss a new scheme for doing homomorphic encryption. To maintain the security of the RLE model requires, when anonymizing a numeric column, that one of the two resulting encrypted columns be located on the DCL. We have invented a different homomorphic encryption scheme that keeps more encrypted data on the PDL. It is described below.

The new scheme is based on the cryptographic concept of the one-time pad. Numeric values are encrypted by adding specially generated random numbers to them. The random numbers are computed from a very wide range of mathematical formulas. The resulting ciphertexts are stored on the PDL, e.g., in a table. Also stored on the PDL is auxiliary information associated with each table row. This information is used in creating the random numbers to encrypt the original values. The auxiliary information is also used to decrypt the encrypted values later on the DCL. In our scheme, original numeric values are encrypted using two different encryption methods which thus produce two different ciphertexts. Each ciphertext is used to perform a different kind of homomorphic operation and is stored in its own column on the PDL. The first encryption method allows numbers to be fully homomorphically added and subtracted. The second encryption method allows numbers to be fully homomorphically multiplied and divided. To decrypt results for either method, results are computed on the PDL and returned to the DCL, along with the appropriately combined auxiliary information. The DCL uses the auxiliary information to remove the random numbers associated with the aggregated encrypted results. The outcome is the plaintext results originally requested by the user. When complex formulas are involved—involving addition and/or subtraction and multiplication and/or division—results cannot be fully computed on the PDL because our two encryption methods are not compatible cryptographically. Therefore, partial results are computed on the PDL and sent to the DCL. Additional cryptographic methods are applied to these results to convert them into compatible encryption schemes. Fully homomorphic arithmetic can then be used to complete the original requested computation on the DCL. At all times, whether on the PDL or DCL, our scheme ensures that no plaintext result is ever revealed until it finally must be presented to the user.

27.2 Homomorphic Operations

Our scheme facilitates homomorphic operations. We first provide a definition of a homomorphic scheme so that we can later demonstrate how our approach meets the definition. Let E be an encryption function and D be the associated decryption function. E is a homomorphic encryption function if D(E(X) (operator1) E(Y)) decrypts to the result X (operator2) Y where X and Y are two numbers and operator1 and operator2 are among {+, –, *, /}. Our scheme supports two types of homomorphic methods. First, it provides a method to perform homomorphic addition and subtraction. We have created encryption function E1 and decryption function D1 with the properties such that D1(E1(X)+E1(Y))

=X+Y. The same functions also facilitates D1(E1(X)−E1(Y))=X−Y. We will see later how E1 is constructed so that we can ascertain that it meets the definition of homomorphic scheme. Our scheme also provides a different method for homomorphic multiplication and division. We have created another encryption function E2 and its associated decryption function D2 with the properties such that D2(E2(X)+E2-(Y))=X*Y. Similarly E2 and D2 have the properties such that D2(E2(X)−E2(Y))=X/Y. We will also see later how E2 is constructed so that we may ascertain how it also meets our definition of homomorphic scheme.

We should point out that our scheme is designed to work in a relational algebra context, i.e. an SQL context. And by design it is a bit limited in that context. First, our E1 and E2 functions support homomorphic operations within any numeric columns but only for rows that don't repeat. That is, standard SUM, AVG, and other SQL functions that aggregate unique row values can be computed homomorphically. If row values repeat then we need a somewhat different approach to do overall computations. In this case, our parser on the DCL—before it converts the user's query to send to the PDL—will break up the query into individual sub-queries. Each sub-query will have aggregating functions involving only unique rows. Each sub-query will be sent to the PDL and individual results obtained there. Results from all the sub-queries will be returned to the DCL and final results will be computed on the DCL. For example, the query "SELECT SUM(salary) WHERE last_name='Smith' GROUP BY last_name" would be completely handled by the E1 function on the PDL because all rows are unique. A self-JOIN statement that involves the same rows, on the other hand, will be appropriately divided on the DCL into independent sub-queries. These will be sent and computed on the PDL and their results returned to the DCL where the computation of the self-JOIN will be completed.

Also, as we suggested in section 20.1, queries that involve addition/subtraction and multiplication/division cannot be fully computed on the PDL. Our homomorphic approach for addition/subtraction is different from our homomorphic approach for multiplication/division. If a user requests a formula with a mix, separate partial results will be computed on the PDL and returned to the DCL. On the DCL, they will be homomorphically combined/completed. The partial results will be homomorphically combined when the original encrypted formats were incompatible by applying a standardization encryption function. This function will use various randomized scaling factors and partial decryptions so that it meets the definition of homomorphic encryption function. In this manner, added/subtracted results will be combined with multiplied/divided results to produce a final result that can be decrypted and presented to the user. The randomized scaling factors and partial decryptions that the standardization encryption function uses will be discussed in the next version of this paper. But an example at the end of this paper will demonstrate the intuition behind this function's workings.

Also, if the original query involve many nested expressions of addition/subtraction and multiplication/division, then the above-mentioned process will have to repeat a number of times. Moving from the innermost level of parenthesis to the outer, intermediate results will be computed, and a standardization encryption function, Ek, will convert the addition/subtraction-based results and the multiplication/division-based results into a standard encrypted form. These will be combined to produce Ek-based results. Then the next parenthetical level will be tackled and results will be computed there. Using standardization encryption function E(k+1), they, along with the Ek results, will be converted and combined into E(k+1) results. Afterwards the next parenthetical level would be tackled. And so on. This process would continue until the results at the final parenthetic level are combined. Finally, the appropriate decryption function would be used to decrypt those results into a plaintext result which can be returned to the user. (Again, the methods involved for creating standardization encryption functions at each nested parenthetical level will be defined in the next version of this paper).

The important point to make about our overall scheme though is that it always provides "end-to-end" encryption. At no time is sensitive data revealed during the computation process on the PDL or the DCL, until the results are finally ready to be presented to the user.

27.3 Detailed Description of Scheme We now explain how our scheme encrypts numbers in a database to facilitate homomorphic operations. Imagine an original plaintext table has several numeric columns. Our scheme anonymizes these columns using the following ordered steps:

1) The original plaintext table is copied into a temporary table.
2) The temporary table's row order is randomized. Each numeric column Ni thus becomes Si (a "scrambled" column).
3) The temporary table is divided into groups. Each group will have an equal number of rows, Z rows. (However, the last group in the table will probably have less rows—unless the total number of rows in the table happens to be an exact multiple of Z). A new column, called group_column in the rest of this Appendix, will be added to the temporary table to identify the group associated with the row. The group_column value for a row will be set to (row number)/Z, i.e., the quotient after the Si row number is divided by Z. How Z is selected will be described in step (4) below.
4) Within each group, each row will be associated with an index, i, such that i=1 . . . Z. A new column, called index_column in the rest of this Appendix, will be added to the temporary table to identify the index in the group associated with the row. The index_column value for a row will be set to (row number) mod Z, i.e., the remainder after the Si row number is divided by Z. In terms of representing index values, each value in the index_column will be a binary number that holds exactly Z bits. All the bits in this binary number will be zero except for the bit of the index. The indices will be numbered right to left within this binary number. For example, if the row number is 2156 and Z is 20 for this temporary table (i.e. 20 rows per group), index i would be 2156% 20=16. Thus, the index_column value for this row will look like '0x00001000000000000000'. Here there is a 1 is in the $16^{th}$ position (moving right to left) and the rest of the bits are zero.

We now explain how to select Z in our scheme. This is a performance-driven exercise. Z is the length in bits of the binary index value that is held in a database column. And these binary variables will be added together on the PDL, as will be explained later in this document. Thus, when an application wants to use our scheme, it should choose a Z such that the database on the PDL can readily manipulate such binary numbers. The idea is to maximize the number of bits that can fit within a standard database column of type BINARY so that adding many numbers in this column would be easy. For example, the system may start with Z=1024 and see whether this is too little or too much in terms of the system performance in supporting many additions of such numbers.

5) For each Si column, the following steps are performed:

a) A new column, called add_column in the rest of this document, will be created in the temporary table. It will be used to facilitate adding and subtracting the encrypted values in the Si column, i.e. it will contain the E1-encrypted Xs. The encoding of each value X will be E1(X)=X+f1(g,i). Function f1 will be created to take as input the group number (g) and index (i) of the row in the table and convert them into a random number. Function f1 can be defined in numerous ways. For example, f(g,i) could be defined as i+g; it could be defined as the expression [square root (7*i+15/g)]; it could be defined heuristically by if—statements such as "if g=1 and i=1 then f1(g,i)=12; if g=1 and i=2 then f1(g,i)=77; if g=1 and i=3 then f1(g,i)=60.8; . . . if g=5 and i=8 then f1(g,i)=−45; etc"; it could be defined by hash(g,i) where hash is a standard cryptographic hash function like SHA256, group g is used to derive a long key k (perhaps from a lookup table), and the expression hash(g,i) is the hash of the index i with the key k appropriately converted (i.e. formatted) into a large number that can be added to X; or it could be any combination of such methods. (Note that f(g,i) defined based on purely polynomial constructions may be less secure than the heuristic expressions or hash computations mentioned above depending on factors such as number of groups, number of numeric values in the column, etc). Function f1 is the key mechanism that provides the randomization that makes E1 a secure encryption function.

b) Another new column, called mult_column in the rest of this document, will also be created in the temporary table. It will be used to multiply and divide the encrypted values in the Si column, i.e. it will contain the E2-encrypted Xs. The encoding of each value X for this column will be E2(X)=log(X)+f2(g,i). The log representation of X means natural log, and the log of X is taken so that the system can encrypt logs of Xs and use addition of logs when multiplication of Xs is called for. Likewise, the system can perform subtraction of logs when division of Xs is called for. The purpose of adding and subtracting logs is so that the system will accumulate less calculation errors. For example, our scheme could be configured to use multiplication instead of logs. E2(X) could be defined as X*f2(g,i), i.e. multiplying by a random number. To compute X*Y the system would compute E2(X)*E2(Y). But such multiplication will accumulate errors after the decimal point faster in comparison to adding logs. Note that as a result of using logs, we can only encode numbers greater than 0, as logs of 0 and negative numbers don't exist. Thus, our homomorphic abilities for multiplication and division are restricted to cases when the numbers involved are greater than zero. In the future, we will provide a scheme for dealing with 0 and negative numbers for multiplication and division.

Note that the f2(g,i) function is computed just like f1(g,i), i.e. any combination of computations that are dependent on group number and index of the row may be used. The function f2(g,i) should be different from f1(g,i) so that if any knowledge is gleaned about f1(g,i) it will not disclose any knowledge about f2(g,i). Once again, the randomization of the f2 function provides the security of the E2 encryption function.

6) The group_column, index_column as well as the add_column and mult_column for each Si column are placed into the PDL. The anonymized numeric columns are now ready to be used in production.

Note that for better security, as an optional part of steps (5a) and (5b), it's also possible to analyze all the Xs in the Si column to find the f1(g,i) and f2(g,i) that will better hide those Xs (for example, extreme outliers). Rather than constructing random f1(g,i) and f2(g,i) functions we could construct the f1 and f2 to better hide X values. That's not the approach adopted in this document, but it could be done.

Also note that from a security point of view, in steps (5a) and (5b), a different f1(g,i) and f2(g,i) needs to be used for every Si column to prevent known plaintext attacks. For example, if the random number associated with a given X, or even the definition for the entire function f1 or f2, were discovered for some Si, the attacker would not be able to decrypt the random numbers associated with f1 or f2 for other Xs in the same row (i.e. values in other numeric columns in the same row). Likewise the attacker couldn't surmise the f1 or f2 for other columns (other Si's). The random numbers and functions f1 and f2 would be different for other Si columns by design.

27.4 Homomorphic Addition/Subtraction In this section we discuss how the above anonymization approach supports homomorphic addition and subtraction in SQL. When a user requests to add or subtract numbers, the DCL will convert his query to operate on the PDL. As per the restrictions described in section 20.2, if a query implicates identical rows within the same SELECT statement, the statement will be divided into multiple independent SELECT sub-statements. Each sub-statement will be sent to the PDL and its results returned to the DCL. On the DCL all the results from all sub-statements will be combined homomorphically because all the sub-statements are of the same format, i.e. E1-encrypted. The final result will be decrypted and returned to the user as representing the result of the original SELECT statement.

We now describe how an individual SELECT sub-statement will be processed to show its homomorphic properties. Imagine the SELECT sub-statement requires adding two numbers, X1 and X2. Although our analysis will generalize to adding X1 . . . Xn; subtracting X2 from X1 (which is addition in reverse); etc. The DCL will convert the SELECT sub-statement to use the add_column, i.e. to use E1 encryption. On the PDL, E1(X1) will be added to E1(X2). The result of adding two (and for reference purposes more) E1(Xi)'s on the PDL will be called the aggregated E1(X) value in the rest of this document. To facilitate decryption of this value, the PDL will also add the index_column values of the rows for X1 and X2, but only if they are part of the same group. If they are part of the same group, the binary numbers of these two rows will be added, otherwise they will not be added. The resulting index_column value will be called the aggregated index value in the rest of this document. It is associated with a specific group. Hence, in the case of adding E1(X1) and E1(X2), we will have either one aggregated index value because both of the rows were from the same group, or two aggregated index values because the two rows were from different groups.

After the aggregated E1(X) value and aggregated index values, along with their respective groups, have been calculated on the PDL, they are returned to the DCL. On the DCL, the aggregated E1(X) value will be decrypted. For each group, the DCL breaks up in the aggregated index value into its individual indices. For each index, the DCL computes f1(g,i). (Because all the rows added together are unique, there will never be an "overflow" when adding indices. Each row always represents a different index within one group and the rest of the bits in the index value are zero). The DCL then adds all the f1(g,i) values together across all the groups. This sum is subtracted from the aggregated E1(X) value. The result is the plaintext result of adding the original X1 and X2.

Let us look at the formulas, which will also demonstrate that E1 is homomorphic according to our definition of homomorphic encryption from above. We have $$E1(X1)=X1+f1(g_{x1},i_{x1})$$

$$E1(X2)=X2+f1(g_{x2},i_{x2})$$

If we add these two on the PDL we obtain $$E1(X1)+E1(X2)=X1+f1(g_{x1},i_{x1})+X2+f1(g_{x2},i_{x2})$$

If we decrypt this sum on the DCL we obtain $$D1(E1(X1)+E1(X2))=[X1+f1(g_{x1},i_{x1})+X2+f1(g_{x2},i_{x2})]-[f1(g_{x2},i_{x2})+f1(g_{x1},i_{x1})]=X1+X2$$

This form abides by the definition of the homomorphic encryption function from section 20.2. We have "D(E(X) (operator1) E(Y)) decrypts to the result X (operator2) Y where X and Y are two numbers and operator1 and operator2 are among {+, −, *, /}." In this case, X and Y represent X1 and X2, operator1 is + and operator2 is +.

Here is an example of how E1 works to illustrate the mechanics. Imagine that the original plaintext table has 8 rows, and Z=4 (i.e. 4 rows per group—based on application testing). The function f1(g,i) is defined to be hash1(g,i), where group g is used to derive a long key k, and hash1(g,i) is the industry-standard SHA256 hash function applied to the index i and key k, converted to an appropriate format so it can be added to X. The function f2(g,i) is defined to be hash2(g,i) where group g is used to derive a different long key k, and hash2(g,i) is the industry-standard SHA256 hash function applied to the index i and key k, also converted to an appropriate format so it can be added to X. After following the anonymization steps of section 20.3, the temporary table below is constructed and stored on the PDL. (Note that the first two columns, X and its row number, will obviously not be on the PDL—they are present here only for illustration. Also, the hash computations/representations are purposefully made smaller only for illustration. They would be much bigger on real systems).

becomes 0x0010+0x1000 or 0x1010. For group 2 the aggregated index value becomes 0x0100. The 2157.3; the 0x1010 along with the fact that this aggregated index value is for group 1; and the 0x0100 along with the fact that this aggregated index value is for group 2, are returned to the DCL. The DCL will decrypt the aggregated E1(X) value. When the DCL gets these data, it first sums all the f1(g,i) associated with group 1. Seeing 0x1010, it understands that the $2^{nd}$ and $4^{th}$ index are involved (moving right to left). It uses the definition of f1(g,i) to compute the sum of the two associated random numbers, i.e. it computes hash1(1,2)+hash1(1,4) to obtain 7+11 or 18. (See the table above for the values of the relevant hash1 computations). Next, the DCL transforms the index value for group 2 into the single random number. 0x0100 represents index 3, thus the random number computed for group 2—again, using the definition of f1(g,i)—is hash1(2,3), or 12. (Again, see the table above for the value of the relevant hash1 computation). Combining the two sums, the DCL obtains 18+12 or 30. This sum is subtracted from the aggregated E1(X) value: the DCL obtains 2157.3−30, or 2127.3. This is the same value as the original plaintext sum of the implicated Xs, which is 34+89.3+2004 or 2127.3. This illustrates the accuracy of our scheme.

27.5 Homomorphic Multiplication/Division In this section we discuss how our scheme supports homomorphic multiplication and division. When a user requests to multiply or divide numbers, the DCL will convert his query to operate on the PDL. Again, as per the restrictions described in section 20.2, and as mentioned in section 20.4, if a query implicates identical rows within the same SELECT statement, the statement will be divided into multiple independent SELECT sub-statements. Each sub-statement will be sent to the PDL and its results will be returned to the DCL. On the DCL all the results from all the sub-statements will be combined homomorphically because all such results are of the E2 format. The final result will be decrypted and returned to the user as the answer to the original SELECT statement.

We describe how an individual SELECT sub-statement will be processed to show the homomorphic properties of E2. Imagine the SELECT sub-statement requires multiplying X1 by X2. (Of course—such an analysis also generalizes to multiplying X1 by X2 by X3 . . . Xn; as well as dividing X2 by X1, which is, of course, inverse multiplication; etc). The DCL will convert the SELECT sub-statement to use the mult_column, i.e. to use E2. On the PDL, the system adds E2(X1) and E2(X2). Recall that E2 uses logs and thus terms

| X | row number | add_column [E1X)] | mult_column | [E2(X)] group_column | index_column |
|---|---|---|---|---|---|
| 44 | 1 | 44 + [hash1(1, 1) = 5] = 49 | log(44) + [hash2(1, 1) = 8] = 11.78418963 | 1 | 0x0001 |
| 34 | 2 | 34 + [hash1(1, 2) = 7] = 41 | log(34) + [hash2(1, 2) = 32] = 39.52636052 | 1 | 0x0010 |
| 28.5 | 3 | 28.5 + [hash1(1, 3) = 9] = 37.5 | log(28.5) + [hash2(1, 3) = 112] = 115.34990409 | 1 | 0x0100 |
| 89.3 | 4 | 89.3 + [hash1(1, 4) = 11] = 100.3 | log(89.3) + [hash2(1, 4) = 260] = 264.49200149 | 1 | 0x1000 |
| 10 | 5 | 10 + [hash1(2, 1) = 8] = 18 | log(10) + [hash2(2, 1) = 12] = 14.30258509 | 2 | 0x0001 |
| 44 | 6 | 44 + [hash1(2, 2) = 10] = 54 | log(44) + [hash2(2, 2) = 40] = 43.78418963 | 2 | 0x0010 |
| 2004 | 7 | 2004 + [hash1(2, 3) = 12] = 2016 | log(2004) + [hash2(2, 3) = 116] = 123.60290046 | 2 | 0x0100 |
| 127 | 8 | 127 + [hash1(2, 4) = 14] = 141 | log(127) + [hash2(2, 4) = 264] = 268.84418709 | 2 | 0x1000 |

Imagine the user issues a request to add the Xs in rows 2, 4, and 7. The aggregated E1(X) value becomes 41+100.3+2016=2157.3. The aggregated index values of the involved rows must also be computed to facilitate this value's decryption on the DCL. There are two groups implicated across the Xs, groups 1 and 2. For group 1, the aggregated index value will be added when multiplication of plaintext values is required. We call the result of adding two (and for reference more) E2(Xi)'s on the PDL the aggregated E2(X) value in the rest of this Appendix. So that the aggregated E2(X) value can be decrypted on the DCL, as part of this operation, the PDL will also add the index_column values of the two involved rows but, again, only if they are part of the same group. If they are part of the same group, the index numbers of the rows are added, otherwise, the index numbers of the two rows are not added. As for the homomorphic addition/subtraction case, the resulting index_column value, added or not, will be called the aggregated index value in the rest of this Appendix. It is also associated to a specific group. In the case of adding E2(X1) and E2(X2) on the PDL, we will again either have one aggregated index value if the two involved rows were from one group, or we will have two aggregated index values if the two involved rows were from different groups. After the aggregated E2(X) value and aggregated index values, along with their respective groups, have been calculated they are all returned to the DCL.

To decrypt the aggregated E2(X) value, for each group, the DCL breaks up the aggregated index value into individual indices. For each index, the DCL computes f2(g,i). The DCL adds all the f2(g,i) values together for all the groups. It subtracts this sum from the aggregated E2(X) value. Call this result C. The DCL raises e to the power of C, reversing the log effect. The result of this computation is the plaintext result of multiplying X1 and X2. (Note, that rather than using natural log and e, a different log/power could be employed during the anonymization of the original table, further confusing any potential attacker trying to break this scheme if he were to examine the encrypted data on the PDL).

Once again, let us observe the formulas behind E2 and how this function is homomorphic. We have $$E2(X1)=\log(X1)+f2(g_{x1},i_{x1})$$

$$E2(X2)=\log(X2)+f2(g_{x2},i_{x2})$$

If we add these two on the PDL we obtain $$E2(X1)+E2(X2)=\log(X1)+f2(g_{x1},i_{x1})+\log(X2)+f2(g_{x2},i_{x2})$$

Now if we decrypt this sum on the DCL we obtain $$D2(E2(X1)+E1(X2))=e\hat{}([\log(X1)+f2(g_{x1},i_{x1})+\log(X2)+f2(g_{x2},i_{x2})]-[f2(g_{x2},i_{x2})+f2(g_{x1},i_{x1})])=X1*X2$$

This is again of the homomorphic form we discussed in section 20.2. We have "D(E(X) (operator1) E(Y)) decrypts to the result X (operator2) Y where X and Y are two numbers and operator1 and operator2 are among {+, −, *, /}." In this case, X and Y represent X1 and X2, operator1 is + and operator2 is *.

Here is an example to illustrate E2 operations. Assume the same table from the addition/subtraction example before, with the same Z, f1(g,i), and f2(g,i). (It's reproduced just for reference).

or 547.63877367. For each group, the relevant indices must be captured. Groups 1 and 2 are involved for the three Xs. For group 1, the aggregated index value is 0x1000. For group 2, the aggregated index value becomes 0x0001+0x1000 or 0x1001. The 547.63877367; the 0x1000 and the fact that this aggregated index value is for group 1; and the 0x1001 and the fact that this aggregated index value is for group 2, are all sent to the DCL. On the DCL the aggregated E2(X) value is decrypted. For each group, the sum of the associated f2(g,i)'s are computed and then all the sums combined. In the case of group 1, because 0x1000 is the fourth index, we must compute f2(1,4), which is, per the definition of f2(g,i), hash2(1,4), or 260. (See the table above for the value of the relevant hash2 computation). For group 2, the DCL sees that 0x1001 represents the first and fourth indices. It computes the sum f2(2,1)+f2(2,4), which is hash2(2,1)+hash2(2,4), or 12+264, or 276. (Again, see the table above for the values of the relevant hash2 computations). The sum of all the f2(g,i)'s is thus 260+276, or 536. This sum is subtracted from the aggregated E2(X) value, which becomes 547.63877367−536, or 11.63877367. Finally, the constant e is raised to this power, i.e. the DCL computes e^11.63877367, which is 113,411 (after rounding with a pre-determined precision). Notice that this is again the result of the actual plaintext multiplications. We have 89.3*10*127 or 113,411. This again illustrates the accuracy of our scheme.

27.6 Standardization Encryption Example As explained in section 20.2 we cannot perform fully homomorphic computations on the PDL when the request contains a mixture of addition/subtraction and multiplication/division. To handle such requests, we compute partial results on the PDL and then return the partial results to the DCL. On the DCL we used standardization encryption to convert them into forms that can be homomorphically combined. Afterwards, the arithmetic can be completed homomorphically on the DCL. And this process may need to be repeated several times if there are complex nested expressions.

In this section we show a simple example to demonstrate the intuition behind the standardization process. As we indicated in section 20.3, a more formal explanation of how such standardization encryption works will be provided in the next version of this paper. Imagine a user wants to compute (X1+X2)+(X3*X4). We cannot compute this formula completely on the PDL because it contains addition and multiplication elements, which are incompatible. So we compute C1=E1(X1)+E1(X2) and C2=E2(X3)+E2(X4) separately on the PDL. Then we return both results to the DCL along with their associated group numbers and aggregated index values for each group. On the DCL, we use a

| X | row number | add_column [E1(X)] | mult_column | [E2(X)] group_column | index_column |
|---|---|---|---|---|---|
| 44 | 1 | 44 + [hash1(1, 1) = 5] = 49 | log(44) + [hash2(1, 1) = 8] = 11.78418963 | 1 | 0x0001 |
| 34 | 2 | 34 + [hash1(1, 2) = 7] = 41 | log(34) + [hash2(1, 2) = 32] = 39.52636052 | 1 | 0x0010 |
| 28.5 | 3 | 28.5 + [hash1(1, 3) = 9] = 37.5 | log(28.5) + [hash2(1, 3) = 112] = 115.34990409 | 1 | 0x0100 |
| 89.3 | 4 | 89.3 + [hash1(1, 4) = 11] = 100.3 | log(89.3) + [hash2(1, 4) = 260] = 264.49200149 | 1 | 0x1000 |
| 10 | 5 | 10 + [hash1(2, 1) = 8] = 18 | log(10) + [hash2(2, 1) = 12] = 14.30258509 | 2 | 0x0001 |
| 44 | 6 | 44 + [hash1(2, 2) = 10] = 54 | log(44) + [hash2(2, 2) = 40] = 43.78418963 | 2 | 0x0010 |
| 2004 | 7 | 2004 + [hash1(2, 3) = 12] = 2016 | log(2004) + [hash2(2, 3) = 116] = 123.60290046 | 2 | 0x0100 |
| 127 | 8 | 127 + [hash1(2, 4) = 14] = 141 | log(127) + [hash2(2, 4) = 264] = 268.84418709 | 2 | 0x1000 |

Suppose the user wants to multiply the Xs in rows 4, 5, and 8. First, the aggregated E2(X) value is computed on the PDL. This is 264.49200149+14.30258509+268.84418709, standardization encryption function to convert C1 and C2 into encrypted forms for subsequent homomorphic computations. We first modify C2. We remove all the random numbers involved in computing C2. We compute the sum—call it S2—of the two f2(g,i)'s for the two originally involved Xs (X3 and X4). Next, we pick a random number, Q, and set C2'=e^[C2−S2+log(Q)]. The effect of this last step is to partly decrypt the product of X3 and X4 per the definition of E2; add a new random number, log(Q), to the result; and simplify this result by raising e to the resulting power. Computationally all this happens simultaneously on the DCL, and the final effect of the overall step is a further encryption of the product of X3 and X4. The result is now integrated with a new random number, Q, thus, intermediate result C2 is protected by this random number. Now we "standardize" C1. We multiply C1 by Q—i.e., set C1'=C1*Q. This further encrypts C1 by also multiplying it by a random number (again Q). Having these two encrypted intermediate values, we can continue with the following homomorphic arithmetic:

$$F=C1'+C2'=$$

$$C1*Q+e\hat{}[C2-S2+\log(Q)]=$$

$$([X1+f1(g_{x1},ix_{x1})]+[X2+f1(g_{x2},i_{x2})])Q+$$

$$e\hat{}(([\log(X3)+f2(g_{x3},i_{x3})]+[\log(X4)+f2(g_{x4},i_{x4})])-[f2(g_{x3},i_{x3})]+f2(g_{x4},i_{x4})]+\log(Q))=$$

$$([X1+X2]+[f1(g_{x1},i_{x1})+f1(g_{x2},i_{x2})])*Q+e\hat{}((\log(X3)+\log(X4)+\log(Q))=$$

$$([X1+X2]+[f1(g_{x1},i_{x1})+f1(g_{x2},i_{x2})])*Q+(X3*X4*Q)=$$

$$([X1+X2+(X3*X4)]+f1(g_{x1},i_{x1})+f1(g_{x2},i_{x2}))*Q$$

We now have an encrypted intermediate result F and it represents an encrypted result of the user's original request. This can be seen by noticing the two terms on the left in the above formula and the random values used to encrypt those two terms in the right half of the above formula. Now we can decrypt F. We divide F by Q; call the result F'. We compute the sum of the two f1(g,i)'s for the two Xs related to C1 (X1 and X2). Call this result S1. We subtract S1 from F'. The result is the plaintext result of (X1+X2)+(X3*X4), as can be witnessed in the above formula. Thus, this result can be returned to the user.

Notice how the "standardization" process—call this our encryption function E3—is also homomorphic. This is seen because we have $$E3(C1')=C1*Q$$

$$E3(C2')=e\hat{}[C2-S2+\log(Q)]$$

Now if we add these two on the DCL we get $$E3(C1')+E3(C2')=C1*Q+e\hat{}[C2-S2+\log(Q)]$$

When we decrypt this on the DCL with the associated decryption function, D3, we obtain $$D3(E3(C1')+E3(C2'))=[(C1*Q+e\hat{}[C2-S2+\log(Q)])/Q]-[f1(g_{x1},i_{x1})+f1(g_{x2},i_{x2})]=(X1+X2)+(X3*X4)$$

Thus, E3 is again of the homomorphic form discussed in 20.2. We have "D(E(X) (operator1) E(Y)) decrypts to the result X (operator2) Y where X and Y are two numbers and operator1 and operator2 are among {+, −, *, /}." In this case, X and Y represent (X1+X2) and (X3*X4), respectively; operator1 is + and operator2 is +.

Note that from the perspective of security, at no time are intermediate results in the above process decrypted. "Keys" used for the standardization encryption, such as the random number Q, could be kept in memory rather than on disk. If at any time the DCL system should crash or of some attacker should break into it, he will not be able to retrieve those keys from transient storage (i.e., memory) so easily. Thus he will not be able to decrypt any intermediate results that he may find.

GLOSSARY

| Term | Definition |
|---|---|
| ODB | The original unencrypted database. |
| O1 . . . Op, Oi, Oj | O1 . . . Op are the original unencrypted tables making up the ODB: 01 through Op. Oi and Oj are the more generic descriptions of these tables. That is, i, j = 1 . . . p. |
| ADB | The anonymized database into which the ODB is converted. |
| A1 . . . Ap, A2, Ai, Aj | A1 . . . Ap are the anonymized tables making up the ADB, into which tables O1 through Op are converted. A2, and more generally, Ai and Aj are the same as tables A1 . . . Ap. That is, in the case of Ai and Aj, i, j = 1 . . . p. |
| V1 | Table to hold all possible alphanumeric symbols making up tables O1 . . . Op. The overall goal of V1 is to maintain the data schema of the ODB in the ADB so that existing database applications continue to work. V1 is used for constructing the private encoding/decoding key for each Ai, including the key to encode/decode string value lengths for each Ai. |
| B1 | The first temporary table into which O1 is converted as its being anonymized. |
| GpNum | New column introduced into every table A1 through Ap as tables O1 through Op are anonymized. GpNum holds the number of the group to which a given row belongs. Used to discard rows from result sets that belong to "false" groups (i.e. which contain fake records) and retain rows that belong to "true" groups (i.e. containing the original ODB data). |
| RecInfo | New column introduced into every table A1 through Ap as tables O1 through Op are anonymized. RecInfo contains the lengths of each string value in that row, permuted to be represented as a character within the list of V1 symbols. Used to trim string values in results sets so that the proper string values can be returned to the user. |
| RowNum | New column introduced into every table A1 through Ap as tables O1 through Op are anonymized. RowNum is the row number for the row. Used to determine if a numeric value in a result set row was originally an outlier so that its proper outlier value can be restored before it's returned to the user. |
| R1, Ri | R1 is a table used for DELETE command processing. It holds the RowNums for those rows that are scheduled for deletion. If any rows in Rl are implicated in any query they will not be processed because the rows are ultimately scheduled to be erased. Ri is just like R1 but for the other Ai tables; that is, i = 2 . . . p. Ri is used to handle the processing of the DELETE command for each Ai. Ri holds the RowNums of rows that are scheduled for deletion. If any rows in Ri are implicated in any Ai query they will not be processed because they are scheduled to be erased. |
| E1 | Temporary table used to foil re-identification attempts via token frequency analysis attacks. E1 contains a histogram of tokens in every string column in B1. In every column in the histogram, tokens are combined into disjoint sets of 5. E1 records the number of rows needed for each token to equal the frequency of the leader in its 5-element group. Used in conjunction with the C1 table. |
| C1 | Temporary table used with E1; it contains "false" rows randomly selected from B1. Tokens will be replaced in the columns in C1 based on their "rows needed" parameter in E1. The purpose of this replacement is to ensure that result sets involving string tokens in any 5-group set will return true and false rows whose total number approximately equals, which considerably undermines re-identification efforts. |
| Aggregated "rows needed" value | Used in the context of E1 and F1. The total number of "rows needed" for a given column or position in, respectively, E1 or F1. This number represents the total number of rows needed within a column or position for al1, respectively, tokens or positions in |

-continued

GLOSSARY

| Term | Definition |
| --- | --- |
| | their 5-element groups to equal the frequency of their leaders of their 5-element groups. |
| F1 | Temporary table used to foil re-identification attempts from character frequency analysis attacks. It contains a histogram of every character position of every string column in B1. For every position in every column in the histogram, its character values are grouped into disjoint sets of 5. F1 records the number of rows needed for each position to equal the frequency of the leader in its 5-element group. Used in conjunction with the D1 table. |
| D1 | Temporary table used with F1; it contains “false” rows randomly selected from B1. Character positions will be replaced in the columns in D1 based on their “rows needed” parameter in F1 to ensure that result sets involving character positions in any 5-group set will return true and false rows whose total number approximately equals, which significantly undermines re-identification efforts. |
| G1 | Temporary table, a copy of B1. Used to reorder the groups in B1 to further obscure any potential insecure groupings of rows. |
| Y1 | Temporary table, a copy of G1. This table, listing which GpNums are true and false in A1, will become part of the database private key. It will be used to discard rows from false groups in results sets when they are returned from the server to the client. |
| H1 | A table containing the original outlier values and the values that replaced them. This table will become part of the database private key for A1 to properly restore outlier values on the client when results sets from the server involving A1 contain masked outlier values. |
| X1, Xi | X1 is a table used for JOINing A1 with A2 on a single column. X1 contains all the unique values within that single column in A2 replicated and encoded as many times as there are groups in A1. It will be used in conjunction with the J1 construct to restore the result set of the JOIN command on the client. Similarly, Xi is a table used for JOINing Ai with Aj on a single column more generally. Xi contains all the unique values within the implicated column in Aj replicated and encoded as many times as there are groups in Ai. Like X1, Xi is used to restore the JOIN result set on the client. |
| B2, Bi | B2, and more generally, Bi, is the same as table B1 but used for anonymizing table O2 or (more generally) table Oi. |
| Database Private Key | A set of nine files to be made available to client machines so they can interact with the ADB. The database private key is composed of the Ai table private key files and general database files. The following are the Ai table private key files:<br>1. The Y1 table, indicating whether a particular group is true or false.<br>2. The file describing how each character position is encoded for each group in each string column. This file also describes the encoding for each string length “column” in each group.<br>3. The file describing the average, random multiplier, and random addend for each numeric column in each group.<br>4. The H1 table, describing the original and modified numeric outlier values in certain rows.<br>5. The file containing the maximum lengths of each padded string column.<br>6. The file describing how many rows there are in the table.<br>7. The file describing how many groups there are in the table.<br>The following are the general database files:<br>1. The V1 table, containing the domain of the characters in O1 . . . Op. |

-continued

GLOSSARY

| Term | Definition |
| --- | --- |
| | 2. The file describing how many rows the database server can handle within an anonymized subquery whose components are linked by OR statements. |
| J1 | A temporary table used when JOINing two tables in the ADB. It contains the results of the first table JOINed to table X1 combined with the results of X1 JOINed to the second table. J1 is used to restore the result set of the JOIN on the client. |
| R1O | Just like the R1 table for the A1.<br>R1O is just a reference to a table associated with O1. It’s used for comparing the performance of the DELETE command on an A1 table with an O1 table. R1O holds those O1 row numbers that are scheduled for deletion. If any rows in R1O are implicated in any O1 query they will not be processed because they will ultimately (in theory, because we never actually deleted any O1 rows in testing) be erased. |

EXAMPLE 6

The following is an exemplary enhancement of the material located in paragraphs 348 through 477:

9.0. Ratio Less Encryption (RLE) Foundation

In the previous version of RLE, we assumed that one half of the encrypted data was store on cloud, and another—symmetrical part—was store privately on DCL (data center location). Here we extend the RLE definition by randomizing additionally the second half of encrypted data to allow to keep both halves of encrypted data on cloud. Here is the definition of the new scheme:

9.1. Statement: For any

A.1. rational numbers x, x1, x2,

A.2. the arbitrary random r_x, rξ_x, r_x1x2, rξ_x1x2,

A.3. the fixed privately kept random numbers r_1, rξ_1

A.4. the privately kept rational coefficients α, δ, γ, β

A.5. the fixed public (privately computed) key $D_{\_1}=\alpha*1.0+\beta*r\_1$

A.6. the fixed public (privately computed) key $E_{\_1}=\gamma*1.0+\delta*r\_1+r\xi\_1$ A.7. the privately kept determinant $\Delta=\alpha*\delta-\gamma*\beta\neq 0$ the encryptions $$\text{i. B.1. } D_x=\alpha*x+\beta*r\_x \tag{9.1.1}$$

$$\text{ii. B.2. } E_x=\gamma*x+\delta*r\_x+r\xi\_x \tag{9.1.2}$$

$$\text{iii. B.3. } D_{x1x2}=\alpha*x1*x2+\beta*r\_x1x2 \tag{9.1.3}$$

$$\text{iv. B.4. } E_{x1x2}=\gamma*x1*x2+\delta*r\_x1x2+r\xi\_x1x2 \tag{9.1.4}$$

and deciphering formula:

$$\text{v. B.5. } x=(\delta*D_x-\beta*E_x+\beta*r\xi\_x)/\Delta \tag{9.1.5}$$

the random numbers $r_{x1x2}$ in B.3—all of those listed in A1-A7 and B1-B5 conditions can be selected in such a way that the encrypted product $D_{x1x2}$ defined in the follow up condition $$\text{vi. B.6. } D_{x1x2}=(\alpha\delta*D_{x1}-\alpha\beta*E_{x1})*(\delta*D_{x2}-\beta*E_{x2})/\Delta^2 \tag{9.1.6}$$

is taking place if and only if $$r_{x1x2}=-\alpha(r\xi\_x1*(\delta D2-\beta E2)+r\xi\_x2*(\delta D1-\beta E1)+\beta r\xi\_x1*r\xi\_x2)/\Delta^2 \tag{9.1.7}$$

The proof of the Statement 9.1 is encapsulated in the follow up sections 10.0-12.0.

Corollary 9.2. The product x1*x2 can be derived from B.3 as

1. $x1*x2=(D_{x1x2}-\beta r_{x1x2})/\alpha$ (9.2.1)

Corollary 9.3. The product x1*x2 can be derived from B.4 as

2. $x1*x2=(E_{x1x2}-\delta*r_{x1x2}-r_{\xi\_x1x2})/\gamma$ (9.3.1)

10.0. Data and Operations Under RLE Scheme Control.

Let's assume here and further on that all the assumptions and statements that are made in Statement 9.1 with respect to RLE scheme are true, unless it is specifically mentioned otherwise.

In order to implement on computer the requirements A1-A7 and B1-B6 spelled out in Statement 9.1, let's assume that the true data is loaded into a private Data Central Location (DCL). As our goal is to encrypt and place on cloud the encrypted data, let's assume that the complementary random numbers r_x used by B.1, B.2 encryption equations are generated using some kind of secure RNG. The specific examples of two reliable randomization scheme are presented in sections 11 and 23 for illustration purposes.

For the time being, let's assume that the required random data is available per request. One such pair of complemented random, rξ_x1, rξ_x2 listed in (9.1.7) is elaborated in chapter 11.2. The encryption coefficients α, β, γ, δ are chosen and be privately on DCL. Upon encryption, via (9.1.1) and (.1.2), the encrypted data is transferred to cloud, and its remnants—the true data and its encrypted images—are purged from DCL.

Note 10.1. As no true nor encrypted data can be found on DCL, and instead in only the encrypted form the data is known to public, therefore, this RLE model is principally different from the older scheme of RLE in which case the αencryptions were kept on cloud, and γ-encryptions were placed on DCL.

In both cases, though, the numerical operations over encrypted data were achieved without intermediate decryptions.

b. Preliminary discussions regarding rξ1 , rξ2 and $r_{\xi\_x1x2}$

The accent in this section is on complementary random computing and deciphering operations.

The deciphering of x, due B.5 in section 9.1, is based on c. the public forms D(x), E(x)

d. the private coefficients β, δ and determinant Δ, e. the private random rξ_x.

The deciphering of multiplicative product x1*x2, due (9.3.1), is based on f. computed form $E_{x1x2}$ g. private coefficients δ, γ h. complemented randoms $r_{\xi\_x1x2}$ due privately computed (9.1.7))

i. privately computed $r_{x1x2}$ due

1. $r\_x=(\alpha E(x)-\gamma D(x)-\alpha r\xi\_x)/\Delta$ (11.1.1)

Thus, we can use rξ_x in RLE scheme together with D(x), E(x) and encryption coefficients α, β, γ, δ for reconstructing the true data on DCL.

In the next section, we will construct rξ_x securely and reliably from encrypted data on cloud.

j. Constructing rξ_x from a set of random constants

We will use a recursive algorithm for which is based on the following series of assumptions:

1. let's choose two binary strings b_ξx1 and b_ξx2 with the same length n
2. let's choose two sets G={$g_i$|i=1,2, . . . , n} of the nonezero random constants.
3. let's choose arbitrarily a set J={$j_1$, $j_2$, . . . , $j_m$} of some m positions from the original 1,2, . . . , n positions and fix it for all the rΣ_x's.

Let's K={$k_j$|j=$j_1$, $j_2$, . . . , $j_m$}, m≤n, is a second set of the nonezero random constants.

let's choose a transposition transformation t(b_ξx) to transform binary string b_ξx into itself, i.e., t(b_ξx) has the same number of 1-s and 0-s that b_ξx has but distributed differently.

let's $p_i$ is an i-th bit position inside t(b_ξx), and v($p_i$, t(b_ξx)) is a Boolean function ii. $v(p_i,\ t(b\_\xi x))=1 \leftrightarrow t(b\_\xi x)|_{i\text{-}position}=1$ (11.2.1)

iii. $v(p_i,\ t(b\_\xi x))=0 \leftrightarrow t(b\_\xi x)|_{i\text{-}position}=0$ (11.2.2)

let's f_rξ(t), t=1,2, is a linear form for computing rξ_x1 or rξ_x2 via equalities:

$$r\xi\_x1=f\_r\xi(t)|_{t=1}=g_{j1}*k_{j1}*v(p_{j1},\ t(b\_\xi x1))+\ldots+g_{jm}*k_{jm}*v(p_{jm},\ t(b\_\xi x1)) \quad (11.2.3)$$

$$r\xi\_x2=f\_r\xi(t)|_{t=2}=g_{j1}*k_{j1}*v(p_{j1},\ t(b\_\xi x2))+\ldots+g_{jm}*k_{jm}*v(p_{jm},\ t(b\_\xi x2)) \quad (11.2.4)$$

Since products $k_{jh}$*v($p_{jh}$, t(b_ξx1)), h=1, . . . , m, are predicated to positions $j_h$ and bits values in t(b_ξx1), therefore, not every $g_i$ is used for computing rξ_x1, and , likewise, in getting rξ_x2.

To clarify the situation we will provide a numeric examples after next two short sections.

k. Derivation of the true product x1*x2 from encrypted forms

The deciphering formula (9.1.5) implies:

1. $x1*x2=(\delta D1-\beta E1+\beta r\xi\_x1)*(\delta D2-\beta E2+\beta r\xi\_x2)/\Delta^2$ (11.3.1)

Multiplying by a the both sides of (11.3.1) we will get $$D(x1x2)-\beta r_{x1x2}=(\alpha\delta D1-\alpha\beta E1+\alpha\beta r\xi\_x1)(\delta D2-\beta E2+\beta r\xi\_x2)/\Delta^2 \quad (11.3.2)$$

Given that random $r_{x1x2}$ can be any number, therefore, we can assume that:

$$r_{x1x2}=\alpha(r\xi\_x1*(\delta D2-\beta E2)+r\xi\_x2*(\delta D1-\beta E1)+\beta r\xi\_x1*r\xi\_x2)/(-\Delta^2) \quad (11.3.3)$$

Now, combination of (11.3.2) and (11.3.3) will produce i. $D(x1x2)=(\alpha\delta D1-\alpha\beta E1)*(\delta D2-\beta E2)/\Delta^2$ (11.3.4)

This will enable us to derive x1*x2 on DCL in one step as:

$$x1*x2=(D(x1x2)-\beta r_{x1x2})/\alpha=((\alpha\delta D1-\alpha\beta E1)*(\delta D2-\beta E2)/\Delta^2-\beta r_{x1x2})/\alpha \quad (11.3.5)$$

Let's notice that (11.3.3) produces $$r_{x1x2}=\alpha(r_{\xi\_x1}*(\delta D_2-\beta E_2)+r_{\xi\_x2}*(\delta D_1-\beta E_1)+\beta_{\xi\_x1}*r_{\xi\_x2})/(-\Delta^2)=$$

ii. $(r_{\xi\_x1}*(D_\delta D_2-D_\beta E_2)+r_{\xi\_x2}*(D_{67}D_1-D_\beta E_1)+D_\beta r_{\xi\_x1}*r_{\xi\_x2})/(-\Delta^2)-$ iii. $(_{\xi\_x1}*(r_{\xi\_\delta}D_2-r_{\xi\_\beta}E_2)+r_{\xi\_x2}*(r_{\xi\delta}D_1-r_\beta E_1)+r_{\xi\_\beta}r_{\xi\_x2}*r_{\xi\_x2})/(-\Delta^2)$ (11.3.6)

m. Template for computing $r_{x1x2}$ on cloud.

As (11.3.6) utilizes public encrypted forms $D_i$, $D_\delta$, $D_\beta$ and complementary private randoms $r_{\xi\_xi}$, i=1,2, $r_{\xi\_\delta}$, $r_{\xi\_\beta}$, therefore, we replace $r_{\xi\_xi}$, i=1,2, $r_{\xi\_\delta}$, $r_{\xi\_\beta}$, by their correspondent templates—which are binary strings $b_{e\_xi}$, $b_{\xi\_\delta}$, $b_{\xi\_\beta}$,—and, thus, obtain a new template for computing $r_{x1x2}$:

$$b_{\xi x1x2} \equiv ({}_{\xi\_x1}*(D_\delta D_2 - D_\beta E_2) + b_{\xi\_x2}*(D_\delta D_1 - D_\beta E_1) + D_\beta b_{\xi\_x1}*b_{\xi\_x2})/(-\Delta^2) -$$

i. $(b_{\xi\_x1}*(b_\delta D_2 - b_\beta E_2) + b_{\xi\_x2}*(b_\delta D_1 - b_\beta E_1) + b_\beta b_{\xi\_x1}*b_{\xi\_x2})/(-\Delta^2)$ (11.4.1)

The new template $b_{\xi\_x1x2}$ is computable on cloud, and upon being transported to DCL, it gets converted to $r_{x1x2}$ by partitioning the expression (11.4.1) and applying (11.2.3) to each partition. In the next section, we will use equation (11.3.6) to compute a sample of $r_{x1x2}$.

12.1. Simplifying Computations of rξ_x1, rξ_x2

To proof the concept for enabling rξ_x1, rξ_x2 computations by using the binary strings as templates, let's make the following assumptions:

a. let's select the binary strings b_ξx1 and b_ξx2 as five bits long, i.e., n=5;

b. Let's chose a set G of the fixed random constants $\{g_1, g_2, g_3, g_4, g_5\}$, =1,2, . . . , n} and let's set all the $k_j$, $j=j_1, j_2, \ldots, j_m$, m=n, equal to 1;

(3) Let's $J_1$ be a set of all positions $\{j_1, j_2, \ldots, j_n\}$ in b_ξx1 and $J_2$ is positions set for b_ξx2

(4) the transformation t(b_ξx) over binary strings b_ξx1 and b_ξx2 b_ξx is trivial—it leaves all the bits in the same positions (5) assumptions (1)-(4) above will simplify the formula (11.2.3) to make it look like:

$$r\xi\_x_i = f\_r\xi(t)|_{t=i} = g_1*v(1, b\_\xi x_i) + \ldots + g_n*v(n, b\_\xi x_i),\ i=1,2 \quad (12.1.1)$$

where we assume that n. the only reason why $g_i$*v(i, b_ξx1)=0 for some, i∈{1,2, . . . , n} is because the original binary strings b_ξx1 or b_ξx2 have zero in i-th position.

As result, the random numbers $r\xi\_x_t$, t=1,2, computed via (12.1.1) equations, are sums of a type $\Sigma g_{pi}$*v(i, $b\_\xi x_t$), i=1, . . . , n, t=1,2. we will use this result in the next section to decipher $D(x_1x_2)$.

Definition 12.1.2. Let's call the B.1 and B.2 equations in statement 9.1 as α- and γ-encryptions correspondingly.

13.0. Numeric Deciphering of $D(x_1x_2)$.

By using the encrypting coefficients: α=0.0872, β=1.2395, γ=−0.7034, δ=4.0051 the true rational numbers $$x1=84.703624017929,\ x2=88.44839268288277$$

and the complemented random (used for B.1, B.2 encryption)

$$r_{x1}=92.53495650085871,\ r_{x2}=90.33341213109753E1$$

The following calculations are privately performed:

determinant Δ=α*δ−γ*β=1.22110902 encryptions: Dx1=122.08323459717779, Dx2=119.68096417844278

In order to compute x1*x2 by using formula (10.4.5) we need to find two parameters— a. D(x1x2) using formula (10.4.4), and (2) $r_{x1x2}$ using formula (10.4.3). This can be done after we will compute rξ_x1, rξ_x2 by using (10.3.1), (10.3.2).

Let's begin executing our plan by defining the following objects:

i. the two binary strings b_ξx1=10110, b_ξx2=01010 ii. turning these strings into random rξ_x1, rξ_x2 using (11.2.3), (11.2.4).

iii. Set $G=\{g_1, g_2, g_3, g_4, g_5\}$ of the rational random constants presented below in Table 13.1

| $g_1$ | $g_2$ | $g_3$ | $g_4$ | $g_5$ |
|---|---|---|---|---|
| 0.37386220 | 1.89762753 | 2.07586534 | 0.5987675 | 1.17652367 |

Without (a), (b) and (c) formulas (10.3.1), (10.3.2) cannot be applied. Giving that (a), (b) and (c) are completed, the computations in (10.3.1), (10.3.2) produce the following results:

$$r\xi\_x1 = g_1 + g_3 + g4 = 0.3738622 + 2.07586534 - 0.5987675 = 1.85096004 \quad (13.1.1)$$

$$r\xi\_x2 = g_2 + g_4 = -1.89762753 - 0.5987675 = -2.44972754 \quad (13.1.2)$$

By plugging rξ_x1, rξ_x2 and x1, x2, $r_{x1}$, $r_{x2}$ into (9.1.2), (9.1.6), (9.1.7) we will get:

i. Ex1 312.88218518737796 ii. Ex2 297.08335448311897 iii. Dx1x2=657.10403222420257 iv. $r_{x1x2}$=−4.5838821736393038

The calculated product of two rational numbers x1 and x2 was x1x2=7491.89939880105 the true product of the same numbers with double represion is x1*x2=7491.89939880104

Test conclusion: the calculated and the true products are matched with 14 decimal digits. This includes the four whole and ten decimal digits after the decimal point. Thus, the computed and the true products match each other with 1.0E-10 precision (making only 1.0E-11 error).

14. 1. Calculation the Sum of True Products from Encrypted Sum.

In this chapter, we will expand the section's 12 results to derive the true sum $\Sigma x_i*x_j$ of several products, thus, deciphering $D(\Sigma x_i*x_j)$.

We begin by reversing (9.1.1) equation. This will produce

1. $x=(D_x-\beta*r\_x)/\alpha$ (14.1.1)

for any rational number x encrypted via formula (9.1.1). In particular, if $x=\Sigma x_i*x_j$, then:

2. $\Sigma x_i*x_j=(D(\Sigma x_i*x_j)-\beta*r_{\Sigma xi*xj})/\alpha$ (14.1.2)

The expression $r_{\Sigma xi*xj}$ in (14.1.2) is a complementary random in getting $D(\Sigma x_i*x_j)$ using (9.1.1). Let's show that $D(\Sigma x_i*x_j)=\Sigma D(x_i*x_j)$. Upon applying (9.1.1), (9.1.2) towards x+y, we will get v. $D_{x+y}=\alpha*(x+y)+\beta*r_{(x+y)}$ (14.1.3)

vi. $E_{x+y}=\gamma*(x+y)+\delta*r_{(x+y)}+r_{\xi\_(x+y)}$ (14.1.4)

Since due (9.1.5),

1. $x+y=(\delta*D_{x+y}-\beta*E_{x+y}+\beta*r_{\xi\_(x+y)})/\Delta$ (14.1.5)

Let's notice that expression in the right side of (14.1.5) does not contain $r_{(x+y)}$. Therefore, from the deciphering stand point, it does not matter what is the value of $r_{(x+y)}$, as long as it is not a special symbol ±0, NAN and ±∞. Thus, $r_{(x+y)}$ is an arbitrary random number, and if we will set $r_{(x+y)}=r_x+r_y$, then (14.1.3) can be rewritten as:

vii. $D_{x+y}=\alpha*(x+y)+\beta*(r_x+r_y)=D_x+D_y$ (14.1.6)

Later proves that if complemented randoms for $D_{x+y}$ are properly selected, then (9.1.1) can be treated as homomorphism by addition. This implies that if complementary $r_{\Sigma xi*xj}$ is selected as 1. $r_{\Sigma xi*xj}=\Sigma r_{xi*xj}$ (14.1.7)

then

2. $D(\Sigma x_i * x_j) = \Sigma(D(x_i * x_j))$ (14.1.8)

The last two equalities enable us to compute the true sum of the cross products as 3. $\Sigma x_i * x_j = (D(\Sigma x_i * x_j) - \beta \Sigma r_{xi*xj}/\alpha$ (14.1.9)

Our effort in this example chapter culminates with the following:

15.1. Fundamental Theorem for RLE Encrypted Operations:

Statement 15.2. Let's $\Sigma x_i * x_j$ is a sum of the true products for rational numbers $x_i$, i=1,2, . . . , m.

Let's $D(x_i * x_j)$ is an RLE encryption for every individual product $x_i * x_j$, i, j=1,2, . . . , m, and $r_{xi*xj}$ is a complementary random for this encryption. Then there are two equivalent way for deciphering $D(\Sigma x_i * x_j)$:

viii. $\Sigma x_i * x_j = \Sigma(D(x_i * x_j) - \beta * r_{xi*xj})/\alpha$ (15.2.1)

1. $\Sigma x_i * x_j = (D(\Sigma x_i * x_j) - \beta r_{\Sigma xi*xj})/\alpha$ (15.2.2)

Proof: Equations (14.1.8)-(14.1.9) used in tandem will give $$\Sigma x_i * x_j = (D(\Sigma x_i * x_j) - \beta * r_{\Sigma xi*xj})/\alpha = (\Sigma D(x_i * x_j) - \beta * \Sigma r_{xi*xj})/\alpha = \Sigma(D(x_i * x_j) - \beta * r_{xi*xj})/\alpha$$

This validates the equivalence of the (15.2.1) and (15.2.2) equations.■

16.0. Using RLE Scheme for Complex Calculations on Cloud.

The second fundamental equation, (15.2.2) allows to decipher the sum of any number of encrypted products as long as the accumulated calculation errors are within the legitimate limits. Indeed, by using formula (14.1.1) in which x is replaced by $\Sigma x_i * x_j$, we decipher the desire sum from its encrypted image. However, due security reasons, equation (15.2.2) cannot be used on cloud as it employs the private coefficients α, β in an explicit form. In addition, formula (15.2.2) contains unknown variables—$D(\Sigma x_i * x_j)$ and $r_{\Sigma xi*xj}$. Let's notice, that expression $D(\Sigma x_i * x_j)$ can be replaced, due (14.1.8), by the sum $\Sigma D(x_i * x_j)$. Each individual encryption $D(x_i * x_j)$ is computable using formula (11.3.4) under assumption that complemented random $r_{xi*xj}$ was computed or it will be computed using formula (11.3.3). Since, due assumption (14.1.7), $r_{\Sigma xi*xj} = \Sigma r_{xi*xj}$, therefore, formulas (15.2.1) presents a better alternative for deciphering $\Sigma x_i * x_j$, than (15.2.2) equality. As implementation of (15.2.1) via (11.3.3) and (11.3.4) still employs private coefficients α, δ, β coefficients and $\Delta^2$, therefore, our next step is to use the template (11.4.1) to sum up all such template to obtain two template versions of $\Sigma D(x_i * x_j)$ and $\Sigma r_{xi*xj}$ expressions so as to perform the most computations on cloud and to complete on DCL the calculation of $\Sigma x_i * x_j$ in one step.

Here is where the binary strings b_ξxi, b_ξxj, i=1,2, . . . , T, j=1,2, . . . , S. play the pivotal role. In order to see that let's rewrite (11.4.1) as $$(b_{\xi\_x1} * D_\delta D_2 - b_{\xi\_x1} D_\beta E_2 + b_{\xi\_x2} * D_\delta D_1 - b_{\xi\_x2} D_\beta E_1 + D_\beta b_{\xi\_x1} * b_{\xi\_x2})/(-\Delta^2) -$$

ix. $(b_{\Sigma\_x1} * b_\delta D_2 - b_{\xi\_x1} b_\beta E_2 + b_{\xi\_x2} * b_\delta D_1 - b_{\xi\_x2} * b_\beta E_1 b_\beta b_{\Sigma\_x1} * b_{\xi\_x2})/(-\Delta^2) =$ $$(D_\delta(b_{\xi\_x1} D_2 + b_{\xi\_x2} D_1) - D_\beta(b_{\xi\_x1} E_2 - b_{\xi\_x2} E_1 + b_{\xi\_x1} * b_{\xi\_x2})/(-\Delta^2) -$$

x. $(b_\delta(b_{\xi\_x1} D_2 + b_{\xi\_x2} D1) - b_\beta(b_{\xi\_x1} E_2 - b_{\xi\_x2} E_1 + b_{\xi\_x1} * b_{\xi\_x2}))/(-\Delta^2)$ (16.0.1)

Now, if we will sum up by all the x in R (or a smaller but well defined a-priory set) we will get $$D_\delta \Sigma(b_{\xi\_x1} D_2 + b_{\xi\_x2} D_1) - D_\beta E(b_{\xi\_x1} E_2 - b_{\xi\_x2} E_1 + b_{\xi\_x1} * b_{\xi\_x2}))/(-\Delta^2) -$$

xi. $(b_\delta \Sigma(b_{\xi\_x1} D_2 + b_{\xi\_x2} D_1) - b_\beta \Sigma(b_{\xi\_x1} E_2 - b_{\xi\_x2} E_1 + b_{86\_x1} * b_{\xi\_x2}))/(-\Delta^2)$ (16.0.2)

$$D(x1x2) = (\alpha\delta D1 - \alpha\beta E1) * (\delta D2 - \beta E2)/\Delta^2$$

Thus, our next goal is to develop a methodology how to semi automate the computation of the $\Sigma D(x_i * x_j)$ and $\Sigma r_{xi*xj}$ on cloud by using the binary strings as templates.

16.1. Regrouping Components in $\Sigma D(x_i * x_j)$ and $\Sigma r_{xi*xj}$ Using Binary Strings.

As calculation of every $r_{xi+xj}$ via (11.3.3) uses three different types of the products x. $\alpha r\xi\_x_i * (\delta D_j - \beta E_j)/(-\Delta^2)$, $\alpha r\xi\_x_j * (\delta D_i - \beta E_i)/(-\Delta^2)$, $\alpha\beta r\xi\_x_i * r\xi\_x)/(-\Delta^2)$ therefore, the sum $\Sigma r_{xi*xj}$ can be decomposed into three components:

1. $\ominus 1 = -\alpha \Sigma r\xi\_xi * (\delta D_j - \beta E_j)/\Delta^2$ (16.1.1)

2. $\ominus 2 = -\alpha \Sigma r\xi\_xj * (\delta Di - \beta Ei)/\Delta^2$ (16.1.2)

3. $\ominus 3 = -\alpha\beta \Sigma r\xi\_xi * r\xi\_xj/\Delta^2$ (16.1.3)

Since every rξ_xi, rξ_xj , due (11.2.3), are sums of m components, therefore, equations (16.1.1)-(16.1.3) can be rewritten as ii. $\ominus 1 = -\Sigma\Sigma(g_u * k_u * v(p_u, t(b\_\xi xi)) * (\alpha\delta Dj - \alpha\beta Ej)/\Delta^2$ (16.1.4)

iii. $\ominus 2 = -\Sigma\Sigma(g_u * k_u * v(p_u, t(b\_\xi xj)) * (\alpha\delta Di - \alpha\beta Ei)/\Delta^2$ (16.1.5 iv. $\ominus 3 = -\Sigma\Sigma g_u * k_u * v(p_u, t(b\_\xi xi)) * \alpha\beta * r\xi\_xj/\Delta^2$ (16.1.6)

Due privacy concern, we cannot use equations (16.1.4)-(16.1.6) on cloud. Instead, we encrypt the $g_u * k_u * \alpha\delta/\Delta^2$, $g_u * k_u * \alpha\beta/\Delta^2$ expressions for $g_u$, $k_u$, u=1, . . . , n, so as to produce α-encryptions V. $G_{gk\alpha\delta} = \alpha * g_{ju} * k_{ju} * \alpha\delta/\Delta^2 + \beta r_{Ggk\alpha\delta}$ (16.1.7)

vi. $G_{gk\alpha\beta} = \alpha * g_{ju} * k_{ju} * \alpha\beta/\Delta^2 + \beta r_{Ggk\alpha\beta}$ (16.1.8)

Expressions, $G_{gk\alpha\delta}$, $G_{gk\alpha\beta}$, g∈G above will be used as public keys on cloud. By using this public keys we can rewrite (16.1.4)-(16.1.5) as vii. $E\ominus 1 = -\Sigma\Sigma v(p_u, t(b\_\xi xi)) * (G_{gk\alpha\delta} * Dj - G_{gk\alpha\beta} * Ej)$ (16.1.9)

viii. $E\ominus 2 = -\Sigma\Sigma v(p_u, t(b\_\xi xj)) * (G_{gk\alpha\delta} * Di - G_{gk\alpha\beta} * Ei)$ (16.1.10)

ix. $E\ominus 3 = -\Sigma\Sigma v(p_u, t(b\_\xi xi)) * G_{gk\alpha\beta} * r\xi\_xj$ (16.1.11)

given that complementary randoms $r_{\ominus 1}$, $r_{\ominus 2}$, $r_{\ominus 3}$ are selected as x. $r_{\ominus 1} = -\Sigma\Sigma v(p_u, t(b\_\xi xi)) * (r_{Ggk\alpha\delta} * Dj - r_{Ggk\alpha\beta} * Ej)$ (16.1.12)

xi. $r_{\ominus 2} = -\Sigma\Sigma v(p_u, t(b\_\xi xj)) * (r_{Ggk\alpha\delta} * Di - r_{Ggk\alpha\beta} * Ei)$ (16.1.13)

xii. $r_{\ominus 3} = -\Sigma\Sigma v(p_u, t(b\_\Sigma xi)) * r_{Ggk\alpha\beta} * r\xi\_xj$ (16.1.14)

As expressions (16.1.9)-(16.1.11) are computable on cloud, later, upon passing them to DCL, will lead us to getting $\Sigma r_{xi*xj}$ and $\Sigma x_{i*} x_j$ on DCL.

Let's do some numeric calculations.

16.2. Numeric Example to Compute $r_{x1*x2}$ from Encrypted Forms.

Elsewhere in this section we continue to use notations from the previous section. Our goal is to show that complementary random $r_{x1*x2}$ defined by equation (12.1.3) can be derived on cloud in encrypted form by using (16.1.9)-(16.1.10) equations. This encrypted form of $r_{x1*x2}$ together with $D(x_1*x_2)$ can be passed to DCL where they can be privately decrypted to obtain the true product $x_1*x_2$. This result will be subsequently expanded in the follow up sections to enable the deciphering of the encrypted sum of the multiple products.

The announced goal is encapsulated bellow as Statement 16.2. Let's y. $E\Psi1=-\Sigma v(p_u, t(b\_\xi x1)*(G_{gk\alpha\delta}*D_2-Ggk_{\alpha\beta}*E_2)$ (16.2.1)

z. $E\Psi2=-\Sigma v(p_u, t(b\_\xi x2)*(G_{gk\alpha\delta}*D_1-Ggk_{\alpha\beta}*E_1)$ (16.2.2)

aa. $E\Psi3=-\Sigma v(p_u, t(b\_\xi x_1)*Ggk_{\alpha\beta}*r\xi\_x_2)$ (16.2.3)

bb. $Z=-\Sigma v(p_u, t(b\_\xi x1)*(r_{Ggk\alpha\delta}D_2-r_{Ggk\alpha\beta}E_2)-$ i. $\Sigma v(p_u, t(b\_\xi x2)*(r_{Ggk\alpha\delta}D_1-r_{Ggk\alpha\beta}E_1)-$ ii. $\Sigma v(p_u, t(b\_\xi x1)*r_{Ggk\alpha\beta}r\xi\_x_2$ (16.2.4)

As the sum EΨ1+EΨ1+EΨ1 gives us the encrypted form of $r_{x1*x2}$, later (the sum) will produce (on DCL) the $r_{x1*x2}$ via formula:

iii. $r_{x1*x2}=((E\Psi+E\Psi1+E\Psi1)-\beta*Z)/\alpha$ (16.2.5)

16.3. Preliminary Discussions Before Computations are Performed:

Let's notice that for a single product $x_1*x_2$ the equations (16.1.8)-(16.1.10) can be simplified because in all three of them the outer summation has only one member to operate upon.

Therefore, for a single product $x_1*x_2$ we have iv. $E\Theta1=-\Sigma v(p_u, t(b\_\xi x_1))*(G_{gk\alpha\delta}*D_2-Ggk_{\alpha\beta}*E_2)$ (16.3.1)

v. $E\Theta2=-\Sigma v(p_u, t(b\_\xi x_2))*(Ggk_{\alpha\delta}*D_1-G_{gk\alpha\beta}*E_1)$ (16.3.2)

vi. $E\Theta3=-\Sigma v(p_u, t(b\_\xi x_1))*G_{gk\alpha\beta}*r\xi\_x_2$ (16.3.3)

Thus, equations (16.2.1)-(16.2.3) can be replaced by (16.3.1)-(16.3.3) correspondingly. Therefore, below in these example we will use notation EΘi instead of EΨi, i=1,2,3.

To continue, let's we assume that all the $v(p_u, t(b\_\xi x1)$ in (16.3.1) are equal to 1, and $v(p_u, t(b\_\xi x1))=0$. Thus simplifies (16.3.1), and turns it into a difference between $A1=\Sigma v(p_u, t(b\_\xi x1))*G_{gk\alpha\delta*D}2$ and $B1=\Sigma v(p_u, t(b\_\xi x1))*Ggk_{\alpha\beta*E}2$. Let's analyze A1 and expand $Ggk_{\alpha\delta}$ using (16.1.7). This will produce:

$$A1=\Sigma(v(p_u, t(b\_\xi x1))*Ggk_{\alpha\delta}*D2=\Sigma(v(p_{uj}, t(b\_\xi x1))*(\alpha*g_{ju}*k_{ju}*\alpha\delta/\Delta^2+\beta r_{Ggk\alpha\delta})*D_2 \quad (16.3.4)$$

Let's notice that we can recompose rξ_x1 by going from right to left in (11.2.3). Similarly, rξ_x1 can be extracted from $\Sigma(v(p_{uj}, t(b\_\xi x1))*\alpha*g_{ju}*k_{ju}*\alpha\delta/\Delta^2$ component in (16.3.4). Thus, vii. $A1=r\xi\_x1*\alpha^2\delta/\Delta^2*D_2+\Sigma(v(p_{uj}, t(b\_\xi x1))*\beta r_{Ggk\alpha\delta}*D_2$ (16.3.5)

Similarly, $B1=\Sigma v(p_u, t(b\_\xi x1))*G_{gk\alpha\beta}*E_2=$ viii. $r\xi\_x1*\alpha^2\beta*E_2/\Delta^2+\Sigma(v(p_{uj}, t(b\_\xi x1))*\beta r_{Ggk\alpha\beta}*E_2$ (16.3.6)

Thus, $E\Theta1=-A1+B1=-(r\xi\_x1*\alpha^2(\delta*D_2\beta*E_2)/\Delta^2+$ a. $\beta*\Sigma(v(p_{ui}, t(b\_\xi x1))*(r_{Ggk\alpha\delta}D_2-r_{Ggk\alpha\beta}E_2))$ (16.3.7)

Similarly, cc. $E\Theta2=-(r\xi\_x2*\alpha^2(\delta*D_1-\beta*E_1)/\Delta^2+$ a. $\beta*\Sigma(v(p_{uj}, t(b\_\xi x2))*(r_{Ggk\alpha\delta}D_1-r_{Ggk\alpha\beta}E_1))$ (16.3.8)

and, finally, dd. $E\Theta3=-\Sigma v(p_u, t(b\_\xi x1))*G_{gk\alpha\beta}*r\xi\_x_2))=-(r\xi\_x_1*(\alpha^2\beta/\Delta^2)*r\xi\_x_2+$ 1. $\beta*\Sigma(v(p_{ui}, t(b\_\xi x1))*r_{Ggk\alpha\beta}*r\xi\_x_2)$ (16.3.9)

Now, if we sum up the very right sides of (16.3.7)-(16.3.9) expressions and subtract β*Z using (16.2.4) we will get $E\Theta1+E\Theta2+E\Theta3-\beta*Z=-(r\xi\_x1*\alpha^2(\delta*D_2-\beta*E_2)/\Delta^2-$ 2. $(r\xi\_x2*\alpha^2(\delta*D_1-\beta*E_1)/\Delta^2$ 3. $-(r\xi\_x1*(\alpha^2\beta/\Delta^2)*r\xi\_x_2$ (16.3.10)

which is the right side of (12.1.3) multiplied by α. Hence we found a formula for computing the complementary random number which can be used in RLE scheme to encrypt the product x1*x2 into D(x1x2), E(x1x2), which is ii. $r_{x1x2}=(E\Theta1+E\Theta2+E\Theta3-\beta*Z)/\alpha$ (16.3.11)

The importance of getting $r_{x1x2}$ via last equality (16.2.6) is encapsulated in the following Statement 16.3.12. If the α- and γ-encryptions of D(x1x2), i.e., forms $D(D_{x1x2})$, $E(D_{x1x2})$ correspondingly, can be computed on cloud, then the complementary random $r_{x1x2}$ and the true product x1*x2 can be derived on DCL from encrypted expressions EΘ1, EΘ2, EΘ3, Z with the use of formulas (16.3.11) and (9.1.5).■

The numeric illustration to 16.3.12 is given next.

16.4.1. Calculations of $r_{x1x2}$ Using (16.3.10)-(16.3.11)

In this section, we use the same input data as in section 13.0. The calculated encryption forms, $Du_i$, $Ex_i$ i=1,2, are displayed in table 16.4.2

TABLE 16.4.2

| i. | | |
|---|---|---|
| | [621] $Dx_i$ | [622] $Ex_i$ |
| x1 | 122.083234597178 | 312.882185187378 |
| x2 | 119.680964178443 | 297.083354483119 |

For the proof of concept and ease of operations, we chose two binary 5-bits strings b_ξx1=10110, b_ξx2=01010, and will compute the complementary random $r_{x1x2}$ via (16.3.11) for encrypting $D(_{x1x2})$. As calculations of EΘ1, EΘ2, EΘ3, Z require additional private and public random constants we computed these public keys and place them in the table below:

TABLE 16.4.3

| iii. to define private random constants $r_{Ggu\delta}$, $r_{Ggu\beta}$ | | | | | |
|---|---|---|---|---|---|
| | U = 1 | U = 2 | U = 3 | U = 4 | U = 5 |
| $r_{Ggu\delta}$ | 3.078768 | −1.83623 | 0.34676 | −2.42678 | 1.078768 |
| $r_{Ggu\beta}$ | 0.787683 | −8.36231 | 03.45676 | −4.26781 | 0.787684 |

TABLE 16.4.4

| 1. to define public keys $G_{gu\delta}$, $G_{gu\beta}$ on cloud | | | | | |
|---|---|---|---|---|---|
| | U = 1 | U = 2 | U = 3 | U = 4 | U = 5 |
| Gguαδ | 3.82376863873706 | −2.31476393103776 | 0.47220616701941 | −3.02022294319028 | 1.36116207028325 |
| Gguαβ | 0.97869617893259 | −10.377077729698 | 4.29777510654729 | −5.29373517218393 | 0.983770864389376\ |

Using these public keys inside formula (16.3.11) we have gotten the

TABLE 16.4.5

| a. the computed $r_{x1x2}$ | |
|---|---|
| derived $r_{x1x2}$ | 3.07414655003204 |

Comment 16.4.6. As computation of $D(x_1*x_2)$ via (11.3.4) uses encryption coefficients, therefore, it is inappropriate to use this formula on cloud, and instead, the ciphering and deciphering business for the multiplicative products must use $D(D_{x1x2})$, $E(D_{x1x2})$ forms complemented with random $r_{Dx1x2}$ computed security via (16.3.11). The next section illustrates how this security issue is get resolved. Simultaneously it builds the background for the proof of the Statement (16.3.12). Later enables arithmetic and statistical operations on DCL from a semi assembled encrypted results on cloud.

16.5. Getting D(x1x2) from Double Encryptions D(D (x1x2)) and E(D(x1x2))

Let's reorganize formula (12.1.4) into a scaled sum. We have $$D(x_1x_2)=(\alpha\delta D_1-\alpha\beta E_1)(\delta D_2-\beta E_2)/\Delta^2=$$

iv. $(\alpha\delta^2/\Delta^2)D_1D_2-(\alpha\beta\delta/\Delta^2)(E_1D_2+E_2D_1)+\alpha\beta^2/\Delta^2)E_1E_2)/\Delta^2$ (16.5.1)

Let's apply α-encryption towards (16.5.1). We have $$D(D(x1x2))-\beta r_{D(x1x2)}=D_{\alpha\delta\delta/\Delta\Delta}D_1D_2-D_{\alpha\beta\delta/\Delta\Delta}(E_1D_2+E_2D_1)+D_{\alpha\beta\beta/\Delta\Delta}E_1E_2)-$$

v. $(\beta r_{\alpha\delta\delta/\Delta\Delta}D_1D_2-\beta r_{\alpha\beta\delta/\Delta\Delta}(E_1D_2+E_2D_1)+\beta r_{\alpha\beta\beta/\Delta\Delta}E_1E_2)$ (16.5.2)

Correspondingly, by taking γ-encryptions, we will obtain $$E(D(x1x2))-\delta r_{D(x1x2)}-r_{\xi D(x1x2)}=E_{\alpha\delta\delta/\Delta\Delta}D_1D_2-E_{\alpha\beta\delta/\Delta\Delta}(E_1D_2+E_2D_1)+E_{\alpha\beta\beta/\Delta\Delta}E_1E_2-$$

vi. $(\delta r_{\alpha\delta\delta/\Delta\Delta}D_1D_2-\delta r_{\alpha\beta\delta/\Delta\Delta}(E_1D_2+E_2D_1)+\delta r_{\alpha\beta\beta/\Delta\Delta}E_1E_2)-$ vii. $(r_{\xi\_\alpha\delta\delta/\Delta\Delta}D_1D_2-r_{\xi\_\alpha\beta\delta/\Delta\Delta}(E_1D_2+E_2D_1)+r_{\xi\_\alpha\beta\beta/\Delta\Delta}E_1E_2)$ (16.5.3)

Since $r_{D(x1x2}$ is an arbitrary random, therefore, we can assume that ee. $r_{D(x1x2)}=(r_{\alpha\delta\delta/\Delta\Delta}D_1D_2-r_{\alpha\beta\delta/\Delta\Delta}(E_1D_2+E_2D_1)+r_{\alpha\beta\beta/\Delta\Delta}E_1E_2)$ (16.5.4)

This condition (i.e., assumption (16.5.4)) turns (16.5.2) into ff. $D(D(x1x2))=D_{\alpha\delta\delta/\Delta\Delta}D_1D_2-D_{\alpha\beta\delta/\Delta\Delta}(E_1D_2+E_2D_1)+D_{\alpha\beta\beta/\Delta\Delta}E_1E_2)$ (16.5.5)

Similarly, $r_{\xi\_D(x1x2)}$ in (16.5.3) is not constrained by any prerequisite, we can chose it to be gg. $r_{\xi\_D(x1x2)}=(r_{\xi\_\alpha\delta\delta/\Delta\Delta}D_1D_2-r_{\xi\_\alpha\beta\delta/\Delta\Delta}(E_1D_2+E_2D_1)+r_{\xi\_\alpha\beta\beta/\Delta\Delta}E_1E_2)$ (16.5.6)

Two assumptions, (16.5.4) and (16.5.6) will turn equation (16.5.3) into hh. $E(D(x1x2))=E_{\alpha\delta\delta/\Delta\Delta}D_1D_2-E_{\alpha\beta\delta/\Delta\Delta}(E_1D_2+E_2D_1)+E_{\alpha\beta\beta/\Delta\Delta}E_1E_2$ (16.5.7)

By plugging in D(D(x1x2)), E(D(x1x2)) and $r_{\xi\_D(x1x2}$ (found correspondingly (16.5.5), (16.5.6), (16.5.7) equalities) into deciphering equation (9.1.5), we will get i. $D(x1x2)=(\delta D(D(x1x2))-\beta E(D(x1x2))+\beta r_{\xi\_D(x1x2)})/\Delta$ (16.5.8)

on DCL. The equality (16.5.8) is true due (6.1.5). At the same time, since $r_{x1x2}$ was originally derived to satisfy the (12.1.2) equality, therefore, statement 16.2.17 is proofed.■

17.1. Deciphering D(D(x1x2)) , E(D(x1x2)) into $x_1*x_2$ using Cloud Data.

In this section we still be working with a single produce $x_1*x_2$. Therefore, below, we will inherit the numeric data from section 13. In addition, we will assume (without loss of generality but for simplicity of calculations) that $k_{ju}=1$ for all the j=1,2, . . . , n and u=1, . . . , m. We also assume, that t(b_ξxi), i=1,2, leaves all the positions in b_ξxi intact, and use notation ε instead of t. Thus, ε(b_ξxi)=b_ξxi. Based on the made assumptions, we will adjust the public keys ii. $G_{g\alpha\delta}=\alpha*g_u*\alpha\delta/\Delta^2+\beta r_{G g\alpha\delta}$ (17.1.1)

iii. $G_{g\alpha\beta}=\alpha*g_u*\alpha\beta/\Delta^2+\beta r_{G g\alpha\beta}$ (17.1.2)

then modify the equations (16.2.6)-(16.2.8) and eventually get the encrypted form of $r_{x1x2}$:

iv. $E\ominus 1=-\Sigma v(p_u, b\_\xi x_1)*(G_{g\alpha\delta}*D_2-G_{g\alpha\beta}*E_2)$ (17.1.3)

v. $E\ominus 2=-\Sigma v(p_u, b\_\xi x_2)*(G_{g\alpha\delta}*D_1-G_{g\alpha\beta}*E_1)$ (17.1.4)

vi. $E\ominus 3=-\Sigma v(p_u, b\_\xi x_1)*G_{g\alpha\beta}*r\xi\_x_2$ (17.1.5)

vii. $Z=-\Sigma v(p_u, b\_\xi x_1)*(r_{G g\alpha\delta}D_2-r_{G g\alpha\beta}E_2)+$ ii. $\Sigma v(p_u, b\_\xi x_2)*(r_{G g\alpha\delta}D_1-r_{G g\alpha\beta}E_1)+$ i. $-\Sigma v(p_u, b\_\xi x_1)*r_{G g\alpha\beta}*r\xi\_x_2$ (17.1.6)

This due Statement 16.2 and an encryption formula (9.1.1) will produce ii. $(E\ominus 1+E\ominus 1+E\ominus 1)=\alpha*r_{x1x2}+B*Z$ (17.1.7)

Our goal in computing two encryptions D(D(x1x2)) and E(D(X1x2)) and decipher them on DCL is to make sure RLE scheme in this example is adequately used to get x1x2 product from the data preassembled on cloud.

17.2. Numeric Result to Decipher Cloud Data D(D(x1x2)), E(D(x1x2))

According to the assumption made in the beginning of the previous section we use the basic sample of data introduced in Section 13.0 augmented by the private random constants and public keys described in section 16.3.1.

To enable computation of $r_{D(x1x2)}$ in (16.5.4) and $r_{\xi\_D(x1x2)}$ in (16.5.6) we will set some more random constants double r_αδδ_Δ2=1.715126167; (17.2.1.1)

double r_αδβ_Δ2=2.122341243; (17.2.1.2)

double r_αββ_Δ2=−1.23578766; (17.2.1.3)

double rξ_αδδ_Δ2=0.643726167; (17.2.2.1)

double rξ_αδβ_Δ2=−1.156243543; (17.2.2.2)

double rξ_αββ_Δ2=1.9746546766; (17.2.2.3)

to compute public constants like double D_αδδ_Δ2=Alph*Alph*Delt*Delt/(Det*Det)+

1. Beta*r_αδδ_Δ2; (17.2.3.1)

double D_αδβ_Δ2=Alph*Alph*Delt*Beta/(Det*Det)+

2. Beta*r_αδβ_Δ2; (17.2.3.2)

double D_αββ_Δ2=Alph*Alph*Beta*Beta/(Det*Det)+

3. Beta*r_αδβ_Δ2; (17.2.3.3)

double E_αδδ_Δ2=Gama*Alph*Delt*Delt/(Det*Det)+

4. Delt*r_αδδ_Δ2+rξ_αδδ_Δ2; (17.2.4.1)

double E_αδβ_Δ2=Gama*Alph*Delt*Beta/(Det*Det)+

5. Delt*r_αδβ_Δ2+rξ_αδβ_Δ2; (17.2.4.2)

double E_αββ_Δ2=Gama*Alph*Beta*Beta/(Det*Det)+

6. Delt*r_αδβ_Δ2+rξ_αββ_Δ2; (17.2.4.3)

double rξ_Dx1x2=rξ_αδδ_Δ2*Dx1*Dx2−rξ_αδβ_Δ2*(Ex1*Dx2+

7. Ex2*Dx1)+rξ_αββ_Δ2*Ex1*Ex2; (17.2.5.1)

double D_Dx1x2=D_αδδ_Δ2*Dx1*Dx2−D_αδβ_Δ2*(Ex1*Dx2+

8. Ex2*Dx1)+D_αββ_Δ2*Ex1*Ex2; (17.2.5.2)

double E_Dx1x2=E_αδδ_Δ2*Dx1*Dx2−E_αδβ_Δ2*(Ex1*Dx2+

9. Ex2*Dx1)+E_αββ_Δ2*Ex1*Ex2; (17.2.5.3)

double new_Dx1x2=(Delt*D_Dx1x2−Beta*E_Dx1x2+

10. Beta*rξ_Dx1x2)/Det; (17.2.5.4)

At end of this section we compute the encrypted form $D(x_1x_2)$, $E(x_1x_2)$ and $r_{x1x2}$ not by using the encrypting formula $\alpha*x_1*x_2+\beta*r_{x1x2}$ but by deciphering $D(D(x_1x_2))$, $E(D(x_1x_2))$ into new_$D(x_1x_2)$ which eventually leads to $x_1*x_2$:

System.Console.WriteLine("\n new_Dx1x2="+new_Dx1x2+"\n true Dx1x2="+Dx1x2);

double nest_x1x2=(new_Dx1x2−Beta*new_r_x1x2)/Alph;

System.Console.WriteLine("\n new_x1x2="+newt_x1x2+"\n true x1x2="+x1*x2);

17.3. Test Results

The initial data had been set in section 13.0 and altered in Section 16.3.1.

In this section, we use data $D(x_1)$, $E(x_1)$, $D(x_2)$, $E(x_2)$, $r_{\xi\_x1x2}$, and $r_{x1x2}$ from Tables 16.4.2-16.4.5 to calculate the following results:

Formula (16.5.1) delivers $Dx_1x_2$=657.104032224203.

formula (17.2.5.2) gives $D(Dx_1x_2))$=81724.947421675286 formula (17.2.5.3) gives $E(D(x_1x_2))$=541610.3229758474

Derives the new r_x1$x_2$=3.07414655003204

Compares the derived r_$x_{x1x2}$ with original $r_{\_x1x2}$=3.07414655002127

Deciphers $D(D(x_1x_2))$, $E(D(x_1x_2))$ into derived $D(x_1x_2)$=657.104032223821 b Compares computed $D(x_1x_2)$ with original $Dx_1x_2$=657.104032224203

Computes derived $x_1x_2$ 7491.8993987988479 using $D(D(x_1x_2))$ and $E(D(x_1x_2)$ Test compares new_$x_1x_2$ with original $x_1x_2$=7491.89939880104

18.0. Deciphering of the Sum of Several Products.

In this section, we learn how to decipher the encrypted form D(Σxi*xj) by using individual encrypted products available on cloud. Our goal here is elaboration of $r_{\xi d(xixj)}$ as derivation of Σxi*xj from D(Σxi*xj)=ΣD(xi*xj) and $r_{\Sigma d(xixj)}$ is just a one-step operation. The deciphering of $r_{\Sigma d(xixj)}$ employs the double summation described by the (16.1.9)-(16.1.11) equations. For the purpose of doing the most of computations on cloud, we will change the order of summations in (16.1.9)-(16.1.11) equations to describe them as iii. $E\ominus1=-\Sigma v(p_\omega,\ t(b\_\xi xi))*\Sigma(G_{gk\alpha\delta}*Dj-Ggk_{\alpha\beta}*Ej)$ (18.1.1)

iv. $E\ominus2=-\Sigma v(p_\omega,\ t(b\_\xi xj))*\Sigma(G_{gk\alpha\delta}*Di-G_{gk\alpha\beta}*Ei)$ (18.1.2)

v. $E\ominus3=-\Sigma v(p_\omega,\ t(b\_\xi xi))*\Sigma G_{gk\alpha\beta}*r\xi\_xj$ (18.1.3)

vi. $Z=-\Sigma v(p_\omega,\ b\_\xi x_i)*\Sigma(r_{Gg\alpha\delta}D_j-r_{Gg\alpha\beta}E_j)+$ jj. $\Sigma v(p_\omega,\ b\_\xi x_j)*\Sigma(r_{Gg\alpha\delta}D_i-r_{Gg\alpha\beta}E_i)+$ a. $-\Sigma v(p_\omega,\ b\_\Sigma x_i)*\Sigma r_{Gg\alpha\beta}*r\xi\_x_j$ (18.1.4)

18.2. Numeric Example for Deciphering the Encrypted Sum of Products

Here, we will use the same data as in section 17.0 with added x3, x4, x3*x4 original and encrypted components.

Added components:

x3=81.80437453214896 $r_{x3}$=93.07353341213108 x4=89.45814304715271 $r_{x4}$=91.93876145109298 rξ_x3=2.65362151 rξ_x4=3.25238901

Dx3=122.49798612354 Ex3=317.881233133013

Dx4=121.091436277833 Ex4=313.935125451859 double rξ_Dx3x4=rξ_αδδ_Δ2*Dx3*Dx4−rξ_Δδβ_Δ2*(Ex3*Dx4+Ex4*Dx3)+rξ_αββ_Δ2*Ex3*Ex4;

kk. double D_Dx3x4=D_αδδ_Δ2*Dx3*Dx4−D_αδβ_Δ2*(Ex3*Dx4+Ex4*Dx3)+D_αββ_Δ2*Ex3*Ex4;

ll. double E_Dx3x4=E_αδδ_Δ2*Dx3*Dx4−E_αδβ_Δ2*(Ex3*Dx4+Ex4*Dx3)+E_αββ_Δ2*Ex3*Ex4;

mm. double new_Dx3x4=(Delt*D_Dx3x4−Beta*E_Dx3x4+Beta*rξ_Dx3x4)/Det;

nn. System.Console.WriteLine("\n Test 20\n new_Dx3x4="+new_Dx3x4+"\n true Dx3x4="+Dx3x4);

oo. double nest_x3x4=(new_Dx3x4−Beta*new_r_x3x4)/Alph;

```
pp. System.Console.WriteLine("\n Test 21\n
    nest_x3x4="+nest_x3x4+"\n true x3x4="+
    x3*x4);
Dx1=122.083234597178
Dx2=119.680964178443
Ex1=312.882185187378
Ex2=297.083354483119
Dx1x2=657.104032224203
check 1
x1x2=7491.89939880105
x1*x2=7491.89939880104
Gg1αδ=3.82376863873706
Gg2αδ=-2.31476393103776
Gg3αδ=2.95120616701942
Gg4αδ=-3.02022294319028
Gg5αδ=1.36116207028326
Gg1αβ=0.978696178932594
Gg2αβ=-0.46107772969796
Gg3αβ=4.2977751065473
Gg4αβ=-1.57523517218393
Gg5αβ=0.287160531377711
Test 13
new_r_x1x2=3.07414655002161
true rx1x2=3.07414655002141
Test 14
new_x1x2=7491.89939880105
true x1*x2=7491.89939880104
new_Dx1x2=657.104032224011
true Dx1x2=657.104032224203
nest_x1x2=7491.89939879885
true x1x2=7491.89939880104
x3=81.804374532149
double x3=81.80437453214896; double
    rx3=93.07353341213108;
double x4=89.45814304715271; double
    rx4=91.93876145109298;
string b_ξ_x3="00111";
string b_ξ_x4="00101";
double rξ_x3=gg3+gg4+gg5;
double rξ_x4=gg3+gg5;
double Dx3=Alph*x3+Beta*rx3;
double Dx4=Alph*x4+Beta*rx4;
double Ex3=Gama*x3+Delt*rx3+rξ_x3;
double Ex4=Gama*x4+Delt*rx4+rξ_x4;
System.Console.WriteLine("\n x3="+x3+"\n Dx3="+
    Dx3+"\n Ex3="+Ex3+"\n calc x3="+(Delt*Dx3-
    Beta*Ex3+Beta*rξ_x3)/Det+"\n true x3="+x3);
System.Console.WriteLine("\n x4="+x4+"\n Dx4="+
    Dx4+"\n Ex4="+Ex4+"\n calc x4="+(Delt*Dx4-
    Beta*Ex4+Beta*rξ_x4)/Det+"\n true x4="+x4);
double Dx3x4=Alph*(Delt*Dx3-Beta*Ex3)*
    (Delt*Dx4-Beta*Ex4)/(Det*Det);
System.Console.WriteLine("\n Dx3x4="+Dx3x4);
double rx3x4=0.0;
//rx3x4=(Dx4*(Gama*Dx3-Alph*Ex3)/(-Det)+Dx3*
    (Gama*Dx4-Alph*Ex4)/(-Det)
rx3x4=Alph*(rξ_x3*(Delt*Dx4-Beta*Ex4)+rξ_x4*
    (Delt*Dx3-Beta*Ex3)+
qq. Beta*rξ_x3*rξ_x4)/(-Det*Det);
double x3x4=0.0;
x3x4=(Dx3x4-Beta*rx3x4)/Alph;
System.Console.WriteLine("\n TEST 15\n x3x4="+
    x3x4+"\n x3*x4="+x3*x4);
double u_x3x4;
/*
EQ1=-(Gg1αδ*Dx2-Gg1αβ*Ex2+Gg3αδ*Dx2-
    Gg3αβ*Ex2+Gg4αδ*Dx2-Gg4αβ*Ex2);
EQ2=-(Gg2αδ*Dx1-Gg2αβ*Ex1+Gg4αδ*Dx1-
    Gg4αβ*Ex1);
EQ3=-(Gg1αβ*rξ_x2+Gg3αβ*rξ_x2+Gg4αβ*rξ_x2);
double Z12=0.0;
Z12=(rGg1δ*Dx2-rGg1β*Ex2)+(rGg3δ*Dx2-
    rGg3δ*Ex2)+(rGg4δ*Dx2-rGg4β*Ex2);
Z12=Z12+(rGg2δ*Dx1-rGg2β*Ex1)+(rGg4δ*Dx1-
    rGg4β*Ex1);
Z12=Z12+(rGg1β*rξ_x2+rGg3β*rξ_x2+rGg4β*rξ_x2);
*/
//getting r_x3x4 from cloud
double EQ4=-(Gg3αδ*Dx4-Gg3αβ*Ex4+Gg4αδ*Dx4-
    Gg4αβ*Ex4+Gg5αδ*Dx4-Gg5αβ*Ex4);
double EQ5=-(Gg3αδ*Dx3-Gg3αβ*Ex3+Gg5αδ*Dx3-
    Gg5αβ*Ex3);
double EQ6=-(Gg3αβ*rξ_x4+Gg4αβ*rξ_x4+
    Gg5αβ*rξ_x4);
double Z34=0.0;
Z34=(rGg3δ*Dx4-rGg3β*Ex4+rGg4δ*Dx4-
    rGg4β*Ex4+rGg5δ*Dx4-rGg5β*Ex4);
rr. Z34=Z34+(rGg3δ*Dx3-rGg3β*Ex3+rGg5δ*Dx3-
    rGg5β*Ex3);
ss. Z34=Z34+(rGg3β*rξ_x4+rGg4β*rξ_x4+
    rGg5β*rξ_x4);
double new_r_x3x4=0.0;
new_r_x3x4=((EQ4+EQ5+EQ6)+Beta*Z34)/Alph;
double new_x3x4=(Dx3x4-Beta*new_r_x3x4)/Alph;
System.Console. WriteLine("\n Test 16\n
    new_r_x3x4="+new_r_x3x4+"\n true rx1x4="+
    rx3x4);
System.Console.WriteLine("\n Test 17\n new_x3x4="+
    new_x3x4+"\n true x3*x4="+x3*x4);
//to get D_Dx3x4 and reverse
tt. double rξ_Dx3x4=rξ_αδδ_Δ2*Dx3*Dx4-
    rξ_αδβ_Δ2*(Ex3*Dx4+Ex4*Dx3)+
    rξ_αββ_Δ2*Ex3*Ex4;
uu. double D_Dx3x4=D_αδδ_Δ2*Dx3*Dx4-
    D_Δδβ_Δ2*(Ex3*Dx4+Ex4*Dx3)+
    D_αββ_Δ2*Ex3*Ex4;
vv. double E_Dx3x4=E_αδδ_Δ2*Dx3*Dx4-
    E_αδβ_Δ2*(Ex3*Dx4+Ex4*Dx3)+
    E_αββ_Δ2*Ex3*Ex4;
ww. double new_Dx3x4=(Delt*D_Dx3x4-
    Beta*E_Dx3x4+Beta*rξ_Dx3x4)/Det;
xx. System.Console. WriteLine("\n Test 20\n
    new_Dx3x4="+new_Dx3x4+"\n true Dx3x4="+
    Dx3x4);
yy. double nest_x3x4=(new_Dx3x4-
    Beta*new_r_x3x4)/Alph;
zz. System.Console.WriteLine("\n Test 21\n
    nest_x3x4="+nest_x3x4+"\n true x3x4="+
    x3*x4);
Dx3=122.49798612354
Ex3=317.881233133013
calc x3=81.804374532149
true x3=81.804374532149
x4=89.4581430471527
Dx4=121.758844892341
Ex4=308.551464678405
calc x4=89.4581430471527
```

true x4=89.4581430471527
Dx3x4=594.349087878987
Test 15
x3x4=7318.06743877984
x3*x4=7318.06743877984
Test 16
new_r_x3x4=−35.3258513776668
true rx1x4=−35.325851377664
Test 17
new_x3x4=7318.06743877988
true x3*x4=7318.06743877984
Test 20
new_Dx3x4=594.3490878787
true Dx3x4=594.349087878987
Test 21
nest_x3x4=7318.06743877659
true x3x4=7318.06743877984

The calculations of the sum of products x1*x2+x3*x4) by using data on cloud is brought below

```
double rξ_σDxixj=rξ_αδδ_Δ2*(Dx1*Dx2+Dx3*Dx4)−
    rξ_αδβ_Δ2*(Ex1*Dx2+Ex2*Dx1+Ex3*Dx4+
    Ex4*Dx3)+
  i. rξ_αββ_Δ2*(Ex1*Ex2+Ex3*Ex4);
double σD_Dxixj =D_αδδ_Δ2*(Dx1*Dx2+Dx3*Dx4)−
    D_αδβ_Δ2*(Ex1*Dx2+Ex2*Dx1+Ex3*Dx4+
    Ex4*Dx3)+
  ii. D_αββ_Δ2*(Ex1*Ex2+Ex3*Ex4);
double σE_Dxixj=E_Δδδ_Δ2*(Dx1*Dx2+Dx3*Dx4)−
    E_αδβ_Δ2*(Ex1*Dx2+Ex2*Dx1+Ex3*Dx4+
    Ex4*Dx3)+
  iii. E_αββ_Δ2*(Ex1*Ex2+Ex3*Ex4);
double new_σDxixj=(Delt*σD_Dxixj−Beta*σE_Dxixj+
    Beta*rξ_σDxixj/Det;
System.Console. WriteLine("\n Test 22\n
    new_σDxixj="+new_σDxixj+"\n true Dx1*Dx2+
    Dx3x4)="+(Dx1x2+Dx3x4));
double new_r_σxixj=((EQ1+EQ2+EQ3)+(EQ4+EQ5+
    EQ6)+Beta*(Z12+Z34))/Alph;
double calc_σxixj=(new_σDxixj−Beta*new_r_σxixj)/
    Alph;
System.Console.WriteLine("\n Test 23\n calc_σxixj="+
    calc_σxixj+"\n true x3x4="+(x1*x2+x3*x4));
```

8.3. The Calculations Results from Section 18.2.

Test 22
new_σDxixj=1251.45312010271 (the deciphered sum from the double encrypted sums)
true Dx1x2+Dx3x4)=1251.45312010319 (the straight sum of encrypted products)
Test 23
calc_σxixj=14809.9668375754 (calculated x1*x2+x3*x4)
true x3x4=14809.9668375809 (the true sum x1*x2+x3*x4)

19.0. The Simplified Scheme for Encryption/Decryption Operations

Beginning this section and follow to the end of this paper, we will use a simpler than (9.1.1)-(9.1.2) version of encryption and decryption by using the following formulas:

1. $D(x)=\lambda^*x+r_{\xi\_x},\ x\in R$ (19.1.1)

2. $x=(D(x)-r_{\xi\_x})/\lambda$ (19.1.2)

where λ is a random constant (the same for all x), and $r_{\xi\_x}$ is a random number individually selected for each x.

Definition 19.1.3. Let's call the encryption/decryption scheme that is based on (19.1.1)-(19.1.2) equations as a Truncated RLE Encryption (or briefly as TRE).

The question remains whether TRE is a secure and reliable encryption and decryption tool? We will discuss the security issue next while approaching the reliability problems at the end.

19.2. TRE Security.

Since deciphering D(x) into x using (19.1.1)-(19.1.2) is impossible without revealing λ and $r_{\xi\_x}$ parameters, therefore, due security concern, these parameters must be kept privately. On the other side, for the large databases, holding on DCL a huge stack of private keys $r_{\xi\_x}$ poses a serious maintenance problem, and on the top, an informer could copy the entire stack of private data to a flash drive and pass it alone to the intruder. To address this problem, TRE developed an original mechanism enabling re-generation of the private random constants needed for encryption and decryption purposes. Namely, it is assumed that Assumption 19.2.1. Parameter λ is permanently kept on DCL in encrypted form, where is random $r_{\xi\_x}$, x∈R, gets privately generated (as new for encryption) and re-generated (as old for decryption)—follow production formula (11.2.3)—from a small set of private constants and a large set of public binary string b_rξ_x.

Assumption 19.2.2. The binary strings b_rξ_x, x∈R , are permanently kept on cloud together with D(x), and all of them are distinct, i.e., iv. $\forall x,y\in R\ ,\ b\_r\xi\_x=b\_r\xi\_y \leftrightarrow x=y,$ (19.2.2)

As far as security of TRE is concerned, let's notice that (19.1.1) encryption is a modification of (9.1.1)-(9.1.2) RLE encryptions: we just eliminated entirely the equation (9.1.2) and dropped the $\beta r_x$ component from (9.1.1). This elimination and truncation does not diminish the security of (19.1.1) encryption, as calculation of each random $r_{\xi\_x}$ in section 11.2 is based on aaa. a random selection of entries from a set G={$g_i$, i=1, . . . , n} of random constants,
bbb. random permutation of the binary strings and entries from G, and
ccc. "black box hard coded and cache held" procedural mechanism with execute only permission.

As such black box is generated during compilation and held in cache, therefore, there are just a few (if any) individuals in any organization who could have access to this module. Thus, the code is secure if such individuals are trustworthy, which is assumed they are.

Starting from the next section, we begin the systematic study of numeric and statistical calculations over rational numbers by using TRE transformed data. This study is separated into two distinct approaches.

In the first approach,—for the proof of concept—the decryption in TRE is done under:

Assumption 19.3.1. The arithmetic and decryption formulas in TRE scheme are solely based on the D(x) forms and random constants $r_{\xi\_x}$, X∈R, (which, in turn, are derived on DCL from the publicly available binary strings b_rξ_x).

In the second approach, the arithmetic and decryption operations in TRE is done under:

Assumption 19.3.1. The mechanism for arithmetic on cloud and decryption on DCL is solely based on the publicly available binary strings b_rξ_x, x∈R, and D(x) forms, thus, bypassing calculations of the random constants $r_{\xi\_x}$ on DCL.

In the following few paragraphs we will pursue the exploration of TRE under Assumption 19.3.1.

19.4. Formulas for Multiplication in TRE Domain.

Similar to (12.1.1)-(12.1.5) equations, the multiplication of x1, x2 rational numbers with respect to (19.1.1)-(19.1.2) formulas produces the following result:

1. $x1*x2=(Dx1-r_{\xi\_x1})*(Dx2-r_{\xi\_x2})/\lambda^2$ (19.4.1)

Multiplying by λ the both sides of (19.4.1) we will get ddd. $D(x1x2)-r_{\xi\_x1x2}=(Dx1*Dx2-Dx1*r_{\xi\_x2}-Dx2*r_{\xi\_x1}+r_{\xi\_x2}*r_{\xi\_x1})/\lambda$ (19.4.2)

Given that random $r_{x1x2}$ can be any number, therefore, we can assume that:

eee. $\lambda*r_{\xi\_x1x2}=(r\xi\_x2*Dx1+r\xi\_x1*Dx2-r\xi\_x1*r\xi\_x2)$ (19.4.3)

Now, combining (19.4.1) and (19.4.2) we will have

1. $\lambda*D(x1x2)=Dx1*Dx2$ (19.4.4)

This will enable us to derive x1*x2 in one step as:

ii. $x1*x2=(Dx1*Dx2-\lambda*r_{\xi\_x1x2})/\lambda^2$■ (19.4.5)

19.5. An Example of Getting the True Product from a Product of Encrypted Forms

For this example, the initial data is defined as follows:
gg1=0.3738622000000001;
gg2=−1.89762753000002;
gg3=2.075865340000003;
gg4=−0.598767500000004;
gg5=1.176523670000005;
Lmb=8.2186865;
and the true tokens are:
x1=84.703624017929;
x2=88.44839268288277;
x3=81.80437453214896;
x4=89.45814304715271;
Let's random constants are derived as:
rξ_x1=gg1+gg3+gg4+1000;
rξ_x2=gg2+gg4−1000;
The encryptions are obtained as:
Dtx1=lamb*x1+rξ_x1;
Dtx2=lamb*x2+rξ_x2;
The random constant for the product x1x2 is derived as:
rtξ_x1x2=(rξ_x2*Dtx1+rξ_x1*Dtx2−rξ_x1*rξ_x2)/lamb;
System.Console.WriteLine("\n Calculated x1*x2="+(Dtx1*Dtx2−lamb*rtξ_x1x2)/(lamb*lamb)+"\n the true product x1*x2="+x1*x2);
The test result for multiplication is obtained as:
Calculated x1*x2=7491.89939880105
the true product x1*x2=7491.89939880104

19.6. Analysis of the Test Results

The calculated product has 14 decimal digits matching the true product digits (with 4 whole and 10 after decimal point digits matching exactly).

Thus, formula (19.4.4) can be used for multiplying the encrypted forms on cloud. The correction factor λ is kept on DCL. The deciphering factor $r_{\xi\_x1x2}$ is calculated via formula (19.4.3). Every other component in (19.4.3) is calculated on DCL by using binary strings b_ξ_x1 or b_ξ_x2, forms Dx1 or Dx2 and production formulas (11.2.3) or (11.2.4). These parameters, b_ξ_x1, b_ξ_x2, Dx1, Dx2, are past from the cloud to DCL to complete the deciphering operation.

Notice 19.6.1. To pass four parameters b_ξ_x1, b_ξ_x2, Dx1, Dx2 to DCL in order to find just one true product x1*x2 is seemed like a "hardly economical enterprise". But when lots of products are summed in Σxi*xj, then passing just four sums Σb_ξ_xi*Dxj, Σb_ξ_xj*Dxi, Σrξ_xi*rξ_xj and ΣDxi*Dxj, seems rather more efficient than to duplicate large chunks of data and develop costly strategies for secure transferring data to DCL.

Next we will study the division operation in TRE still under Assumption 19.3.1.

20.0. Ratios Deciphering by Using TRE Data

In this section, we will elaborate formula for getting the true ratio x1/x2 from TRE forms. To aim this case, we will interpret the division x1/x2 as a multiplication x1*(1/x2) and will apply the previous section elaborations to turn the product D(x1)*D(1/x2) into a deciphered product x1*(1/x2).

First, let's express D(1/x2) as a function of D(x2). Let's denote D(1/x2) as D_/x2 and apply this notation towards multiplication equality 1=x2*(1/x2). The application of (19.4.3) and (19.4.4)

formulas towards product x2*(1/x2) will produce a. $\lambda*D\_1=Dx2*D\_/x2$ (20.0.1)

where D_1=D(1.0)=λ+$r_{\xi\_1}$ is a public key, and $r_{\xi\_1}$ is a private random constant that satisfies the following (in accordance with (19.4.3)) condition:

iii. $\lambda*r_{\xi\_1}=r_{\xi\_/x2}*Dx2+r_{\xi x2}*D\_/x2-_{\xi\_/x2}*r_{\xi x2}$ (20.0.2)

Statement 20.1. Encryptions Dx2 and D_/x2 form the following relationship:

a. $D\_/x2=\lambda*D\_1/Dx2$ (20.1.1)

Proof: The equality (201.1) is true because it is a collorary of (20.0.1).

Our next step would be to decipher encryption D(x1/x2) into the true x1/x2. First, let's notice that application of two equations (19.4.4) and (20.1.1) in tandem will produce iv. $\lambda*D(x1/x2)=D(x1)*D\_/x2=D(x1)*\lambda*D\_1/Dx2$ (20.1.2)

This leads to

1. $D(x1/x2)=D(x1)*D\_1/Dx2$ (20.1.3)

i.e., D(x1/x2) is computable from the public data on cloud.

Secondly, let's notice that to decipher D(x1/x2) we need the random $r_{\xi\_D(x1/x2)}$ (which for simplicity we will denoted as $r_{\xi\_x1\_/x2}$). The existence of $r_{\xi\_x1\_/x2}$ is guaranteed due:

Statement 20.2. The random $r_{\xi\_x1/x2}$ is computable by using formula:

v. $r_{\xi\_x1\_/x2}=(r_{\xi/x2}*Dx1+r_{\xi\_x1}*D\_/x2-r_{\xi\_x1}*r_{\xi\_/x2})/\lambda$ (20.2.1)

in which vi. $r_{\xi\_/x2}=\lambda*(r_{\xi\_1}-r_{\xi x2}*D\_1/Dx2)/(Dx2-r_{\xi x2})$ (20.2.2)

and D_/x2 satisfies the condition (20.1.1).

Proof: Let's notice that rξ_/x2 in (20.2.2) is derived from (20.0.2) and (20.1.1), and, thus, it is computable on DCL. To validate (20.2.1), let's employ formula (19.4.3) for getting the random constant for multiplication product x1*x2, and replace there entries like '_x2' by '_/x2' and Dx2 by D_/x2. These replacements will turn (19.4.3) into vii. $\lambda*r_{\xi\_x1\_/x2}=r_{\xi\_/x2}*Dx1+r_{\xi\_x1}*D\_/x2-r_{\xi\_x1}*r_{\xi}\_/_{x2}$ (20.2.3)

This implies (20.2.1).■

21.1. Reverse Encryption.

In this section we will prove that encryption of the reverse x, i.e., D(1/x) can be deciphered by some specifically computed random $r_{\xi\_/x}$. Since 1=x*(1/x), thus, due section 19.2, we have viii. $D(1.0)-r_{\xi\_1}=(D_x*D_{1/x}-D_x*r_{\xi\_/x}-D_{1/x}*r_{\xi x}+r_{\xi\_/x}r_{\xi x})/\lambda$ (21.1.1)

Hence, given that random rex can be arbitrary chosen, therefore, we can assume that:

1. $r_{\xi\_/x}=(\lambda*r_{\xi\_1}-D_{1/x}*r_{\xi x})/(D_x-r_{\xi x})$ (21.1.2)

and subsequently, will obtain the relationships between straight and reverse encrypted forms:

a. $\lambda*D(1.0)=D_x*D_{1/x}$ (21.1.3)

b. $D_{1/x}=\lambda*D(1.0)/D_x$ (21.1.4)

Statement 21.1.5. The random constant in (21.1.2) can be used to decipher $D_{1/x}$ computed in (21.1.4) into 1/x.

Proof: From (21.1.3)-(21.1.4) we get $D_{1/x}-r_{\xi\_/x}=\lambda*D(1.0)/D_x-(\lambda*r_{\xi\_1}-D_{1/x}*r_{\xi x})/(D_x-r_{\xi x})$.

The subtraction in the right side of the last expression leads us to $(\lambda*D(1.0)*(D_x-r_{\xi x})-D_x*(\lambda*r_{\xi\_1}-D_{1/x}*r_{\xi x}))/(D_x*(D_x-r_{\xi x})=(\lambda*D(1.0)*D_x-\lambda*D(1.0)*r_{\xi x})-D_x*\lambda*r_{\xi\_1}+\lambda*D(1.0)*r_{\xi x}))/(D_x*(D_x-r_{\xi x}))=(\lambda*D(1.0)*-*\lambda*r_{\xi\_1}))/(*(D_x-r_{\xi x}))=\lambda x$■ (21.1.6)

21.2. Numeric Example for the Reverse Encryption Deciphering

In this example, we continue to use the numeric data defined in sections 13.0, 19.5. We will add some more numeric data as needed. Let's compute, via (21.1.4), the reverse encrypted form D(1/x2) by using initial D(x2), also find, via (21.1.2), the complementary random rex2 for deciphering D(1/x2) into 1/x2. Here is some more data and computed results:

λ=8.2186865;
rξ_1=4.07638929879;
D_1=12.29507579879
Calc $(D_{1/x2}-r_{\xi\_/x2})/\lambda$=0.0113060279522019
the true 1/x2=0.0113060279522019

22.1. Numeric Example for Deciphering Encrypted Ratios.

The algebraic deciphering of D(x1/x2) into x1*(1/x2) and numeric illustration are shown next. By combining (20.1.3) and (20.2.1) we will get:

$(D(x1/x2)-r_{\xi\_x1\_/x2})/\lambda=(D(x1)*D\_1/Dx2-(r_{\xi\_/x2}*Dx1+r_{\xi x1}*D\_/x2-r_{\xi x1}*r_{\xi\_/x2})/\lambda)/\lambda=(D(x1)*D\_1/Dx2-(r_{\xi/x2}*(Dx1-r_{\xi x1})+r_{\xi x1}*D\_/x2)/\lambda)/\lambda=(D(x1)*D\_1/Dx2-(r_{\xi/x2}*\lambda*x1+r_{\xi x1}*\lambda*D\_1/Dx2)/\lambda)/\lambda=(D(x1)*D\_1/Dx2-r_{\xi x1}*D\_1/Dx2-r_{\xi\_/x2}x1)/\lambda=(\lambda*x1*D\_1/Dx2-r_{\xi\_/x2}*x1)/\lambda$ (22.1.3)

After applying (21.1.4) and (21.1.6) towards (22.1.3) we will get:

fff. $(D(x1/x2)-_{\xi\_x1\_/x2})/\lambda=(x1*D\_x2-r_{\xi\_/x2}*x1)/\lambda=x1/x2$ (22.1.4)

■

22.2. Illustration of Division on DCL Using Encrypted Forms.

By plugging in the section's 21.2 data into (21.1.3) and (22.1.5) we will get the following C #example:

```
double rξ_x1_x2=(rξ_1_x2Dtx1+rξx1*D_1_x2−rξx1*rξ_1_x2)/lamb//    (22.1.2)

double D_x1_x2=Dtx1*D_1/Dtx2;//    (22.1.1)

double intrm=D_x1_x2−(rξ_1_x2*Dtx1+rξx1*D_1_x2)/lamb;

intrm=intrm+rξx1*rξ_1_x2/lamb//    (22.1.3)

System.Console.WriteLine("\n Test\n calc ratio x1/x2="+intrm/lamb+

a. "\n x1/x2 true ratio="+x1/x2);
```

Test Results

Test calc ratio x1/x2=0.957661540799503//utilizing (22.1.4)
true ratio x1/x2=0.957661540799503

22.3. Numeric Example of the Complex Expression Calculation

Let's compute b. $z=(x1*x2+x3*x4)/x5$ (22.3.1)

Using TRE homomorphism by addition as well as division formula (20.1.3), we will get D(z)=(Dx4+Dx5)*D_1/Dx3. In order to get z from D(z), we must get $r_{\xi\_z}$ as in (20.2.1) for X1=x1*x2+x3*x4 and X2=x5. Using Java code the test for "computed z minus the true z" produced −6.816769371198461E-14, i.e., computed z has at least 13 true decimal digits. As in our Java program we use double data types (which is equivalent to 16 decimal digits accuracy) the loss of 3 decimal digits could sometimes be considered as a big loss. However, using Oracle or SQL Server data accuracy with $10^{-38}$ precision the loss just of the last 3 digits most likely could be an acceptable result.

The next few paragraphs are highlighting statistical calculations over encrypted rational numbers predicated by the Assumption 19.3.1.

23.1. Statistics 23.2. Averaging Across Encrypted Forms

Let's X is a set of rational numbers $\{x_1, x_2, \ldots, x_N\}$. Let's $A_x$ is an average, Σx/N|x∈X, across all the entries from X, and $D(A_x)$ is the encryption of $A_x$. Let's denote D(X) as a set {D(x)|x∈X}. Our goal is to show that c. $D(A_x)=A(D(X))$ (23.2.1)

First of all, due RTE definition,

2. $D(A_x)=D(\Sigma x/N)=\lambda(\Sigma x/N)+r_{\xi\_N}$ (23.2.2)

where $r_{\xi x\_N}$ is an arbitrary complementary random for encrypting $A_x$. As equation (23.2.2) does not imposed any restrictions on selection of $r_{\xi x\_N}$, we can assume that $r_{\xi x\_N}$ is the average of all the random $r_x$, x∈X, i.e., a. $r_{\xi x\_N}=(\Sigma r_x)/N$ (23.2.3)

As result, (23.2.2) can be continued as $\lambda(\Sigma x/N)+r_{\xi x\_N}=(\Sigma\lambda x)/N+(\Sigma r_x)/N=(\Sigma(\lambda x+r_x))/N=(\Sigma D(x))/N=A(D(X))$■ (23.2.4)

24.0. Variance Across Encrypted Forms.

Statement 24.1. Let's V(X) is the variance of all the entries from X, i.e.,

3. $V(X)=\Sigma(x-A_x)^2|_{x\in X}$ (24.1.1)

Let's D(X) is the set of encryption forms across all the entries from X=, i.e.,

4. $D(X)=\{D(x)|x\in X\}$ (24.1.2)

and V(D(X)) is the variance of these encrypted forms, i.e., ii. $V(D(X))=\Sigma(D(x)-D(A_x))^2|_{D(x)\in D(X)}$ (24.1.3)

Then, two statements listed below as (A) and (B) are true:

1.—the encrypted form of the true variance can be obtained from the computed on cloud variances V(D(X)) via b. $\lambda*D(V(X))=V(D(X))$ (24.1.4)

(B)—by deploying from cloud to DCL the variance of the encrypted forms V(D(X), the later can be deciphered into the true variance V(X) by using the complemented random c. $r_{\xi\_V(D(X)/\lambda}=\Sigma r_{\xi\_D((x-Ax)2)}|_{x\in X}$ (24.1.5)

Proof: Similar to the section 23.2, let's derive D(V(X)) by using (24.1.1) as:

iii. $D(V(X))=D(\Sigma(x-A_x)^2)=\lambda*\Sigma(x-A_x)^2+r_{\xi\_\Sigma(x-Ax)2}$ (24.1.6)

Since, due Fundamental theorem for TRE encryption, the equalities (15.2.1), (15.2.2) are true simultaneously, therefore, using $\beta=1$, we will obtain the following equality:

iv. $\Sigma(D(x-A_x)^2-r_{\xi\_(x-Ax)2})=D(\Sigma(x-A_x)^2)-r_{\xi\_\Sigma(x-Ax)2}$ (24.1.7)

where every $r_{\xi\_(x-Ax)}{}^2$ is a complementary random for encrypting $D(x-Ax)^2)$.

Now, due an arbitrary nature of $r_{\xi\_\Sigma(x-Ax)2}$, we can assign

1. $r_{\xi\_\Sigma(x-Ax)2}=\Sigma r_{\xi\_(x-Ax)2}|_{x\in X}$ (24.1.8)

Later will turn (24.1.7) into $D(\Sigma(x-A_x)^2)=\Sigma D(x-A_x)^2$. Since, due formula (19.4.4) for encrypting of product, $D(x-A_x)^2=(D(x-A_x))^2/\lambda$, therefore, v. $\lambda*D(V(X))=D(\Sigma(x-A_x)^2)=\Sigma(D(x-A_x))^2$ (24.1.9)

and simultaneously, due (19.4.3), the complementary random $r_{(x-Ax)2}$ for every x in X. must satisfy equality vi. $r_{\xi\_(x-Ax)2}=2*r_{\xi\_(x-Ax)*}D(x-A_x)-(r_{\xi\_(x-Ax)})^2$ (24.1.10)

Now, due (24.1.8) and (24.1.10) we can sum up the (24.1.10) equality to get the complementary random for encrypting $\Sigma(x-A_x)^2$, i.e., getting D(V(X)):

$$r_{\xi\_V(D(X)/\lambda}\equiv r_{\xi\_\Sigma(x-Ax)2}=\Sigma r_{\xi\_(x-Ax)2}=\Sigma(2*r_{\xi\_(x-Ax)}*D(x-A_x)-({}_{\xi\_(x-Ax)})^2) \quad (24.1.11)$$

To finish with (A), let's notice that due arbitrary value of $r_{x-Ax}$, we can assume that $r_{x-Ax}=r_{\xi\_x}-r_{\xi\_Ax}$. This would justify the following elaboration $$D(x-A_x)=\lambda*(x-A_x)+r_{x-Ax}=D(x)-D(A_x)-r_{\xi\_x}+r_{\xi\_Ax}+r_{x-Ax}=D(x)-D(A_x) \quad (24.1.12)$$

Since due (24.1.12), $\Sigma D(x-A_x)=\Sigma(D(x)-D(A_x))$, therefore, to proof part (A), we must show that $D(A_x)=A_{Dx}$. However, arbitrary nature of $r_{\xi x/n}$ we can assume that i. $r_{\xi x/n}=\Sigma r_{x/n}$ (24.1.13)

Thus, $$D(A_x)=D(\Sigma x/n)=\lambda\Sigma x/n+r_{\Sigma x/n}=\lambda\Sigma x/n+\Sigma r_{x/n}=(1/n)*\Sigma(\lambda x+r_x)=A_{Dx} \quad (24.1.13)$$

Thus, the equality (24.1.12) and the (A) part are proved.

To complete with the part (B), let's notice that complementary random $\Sigma r_{\xi\_D(x-Ax)2)}$ is derivable on DCL due (24.1.8). Since, due (A), $\lambda$*D(V(X))=V(D(X)), therefore, when V(D(X)) is passed to DCL, then $r_{\xi\_x(x-Ax)2}$ can be used as a complementary random to decipher D(V(X)). This proves the second part (B) of the statement 24.1.

As any theory is good as it is supported by the amble of good examples, therefore, in the remaining part of this paper we will elaborate a technique for secure and reliable numerical calculations on cloud with the use of templates.

25.1. Calculations Over Encrypted Data on Cloud by Using Templates.

A template, here and below, is a binary string S of some predetermined length n. For example, S="0100111101011011" is a template of length 16. With each template we will associate a decimal fraction, $b_S$, which, in our example, is 0.0100111101011011. In this section, we compute complementary randoms by using templates as follows. Let's G be a set $\{g_1,g_2, \ldots, g_n\}$ of random constants. Let's $b_S$ be a template of length n, and $\{b_i|i=1,2, \ldots, n\}$are all its binary bits. Let's $r_S$ is a sum of products $g_ib_i$, such that b. $r_S=\Sigma g_ib_i,\ b_i\in b_S$ (25.1.1)

Beginning here and in the follow up sections, we will be using (18.4.1) expressions as complementary randoms $r_{\xi\_x}$ for constructing the encryption forms D(x), where x is any rational number. Let's illustrate the use of the templates by using the following example.

Let's $x_i$, i=1,2,3,4, are some four rational numbers (which we will be called as the true tokens).

Let's $G_S$ be a set $\{g_1, g_2, g_3, g_5\}$ of the five random constants. Let's use the following four binary strings $B_S$={10110, 11010, 10011, 01010} which we will use to as templates for constructing encryption forms $D_{i1}$, i=1,2,3,4. For transparency and ease of transition with previous notation, we will denote as $b_{\xi\_xi}$ i=1, . . . ,4 the templates utilized for computing the corresponding complementary randoms $r_{\xi\_x}$. Let's remember, that for decryption and analytics we will keep on cloud the encryption forms $D_{i1}$ and binary strings $b_{\xi\_xi}$ i=1, . . . , 4, while set $G_f$ of private constants $\{g_1, g_2, g_3, g_4\}$ will be kept on DCL.

For security purposes, we assume that every binary string $b_{\xi\_xi}$ before being converted into a complemented random $r_{\xi\_xi}$ gets transposed into a binary string $\tau(b_{\xi\_xi})$ of the same length and the same number of nonzero bits. The permutation $\tau$ is fixed for all string $b_{\xi\_xi}$, and it is kept private on DCL. Using the basic decryption formula the following elaboration is true:

$$(D(x_1*x_2)-r_{\xi\_x1x2})/\alpha=x_1*x_2=(D_1-\Sigma g_ib_i|b_i\in b_{\xi\_x1})(D_2-\Sigma g_jb_j|b_{\xi\_x2})/\alpha^2 \quad (25.1.2)$$

where $b_{\xi\_x1}$ and $b_{\xi\_x2}$ are binary templates for $D_1=D(x_1)$ and $D_2=D(x_2)$ correspondingly. Thus, ggg. $D(x_1*x_2)-r_{\xi\_x1x2}=D_1D_2/\alpha-(\Sigma g_iD_2b_i+\Sigma g_jD_1b_j-\Sigma g_i\Sigma g_jb_j)/\alpha$ (25.1.3)

Since $r_{\xi\_x1x2}$ is an arbitrary random, therefore, we can put:

i. $r_{\xi\_x1x2}=\Sigma_{i=j}b_i(g_iD_2+g_jD_1-g_i*\Sigma g_kb_k)/\alpha$ (25.1.4)

The only expression in (18.4.4) that needs an explanation is computation of the sum a. $S_{\Sigma bG}=\Sigma_{i=j}b_ig_i*\Sigma g_kb_k$ (25.1.5)

In database terminology, expression (25.1.5) delivers the complete outer join of the two columns $\{g_ib_i|i=1, \ldots ,n\}$ and $\{g_kb_k|k=1, \ldots, n\}$. In matrix form, the expression (4.1.5) can be obtained with the use of templates as follows. Let's $b_{\xi\_x1}$, $b_{\xi\_x2}$ are two templates which were chosen for producing the complementary randoms $r_{\xi\_x1}$ and $r_{\xi\_x2}$. Let's $F_{bx1*bx2}$ is an nxn matrix defined as:

2. $F_{bx1*bx2}=\{b_i*b_j|i,j=1,2, \ldots, n\}$ (25.1.6)

whose elements are the cross products of the bits from the corresponding templates $b_{\xi\_x1}$, $b_{\xi\_x2}$. Let's $M_{vG}$ is an nx1 matrix defined as 3. $M_{vG}=\{g_i|i=1,2, \ldots, n,\ g_i\in G\}$ (25.1.7)

whose elements are the vertically positioned random constants from G. Finally, let's $H_{dG}$ is an nxn diagonal matrix defined as hhh. $H_{dG}=\{h_{ij}|i,j=1,2, \ldots, n,\ \{h_{ij}=0,\ i\neq j\},\ \{h_{ij}=g_i,\ i=j,\ g_i\in M_{vG}\})$ (25.1.8)

Then, in matrix forms, the following calculations must be performed to obtain the value of the expression in (25.1.5):

a. $N_{n*1}=F_{bx1*bx2}*M_{vG}$ (25.1.9)

b. $P_{n*1}=H_{dG}*N_{n*1}$ (25.1.10)

c. $S_{\xi bG}=\Sigma p_i,\ p_i \in P_{n*1,\ i=1,\ldots,n,}$ (25.1.11)

where $N_{n*1}$ is an nx1 matrix whose elements are $b_i*(\Sigma g_k b_k, b_k \in b_{\xi\_x2}), b_i \in b_{\xi\_x1}$ $P_{n*1}$ is an nx1 matrix whose elements are $(b_i*g_i)*(\Sigma g_k b_k), b_i \in b_{\xi\_x1}$ $S_{\Sigma bG}$ is the sum of all the entries in the matrix $P_{n*1}$ The implementation details of the scheme for computing the complementary random $r_{\xi\_x1x2}$ proposed in this section are discussed next.

25.2. Procedure for Computing the Complementary Random $r_{\xi\_x1x2}$ Using Templates.

The elements of the matrix $N_{n+1}$ in (25.1.9) either zero (when a corresponding bit $b_i$ in $b_{\xi\_x1}$ is zero), or they are none zero but are the same and equal to the sum $Z_{x2} \equiv \Sigma g_k b_k$, $b_k \in b_{\xi\_x2}$. Thus, only once the sum $Z_{x2}$ must be computed to populate the matrix $N_{n+1}$. On the other hand, to construct the matrix $P_{n*1}$, the sum $Z_{x2}$ must be multiply by the different random constant $g_i$, i=1, . . . , n, if the bit $b_i$ is not zero, and positioned inside $P_{n*1}$ in accordance with the order of bits in the template $b_{\xi\_x1}$. As far as the practical calculations of the expressions in (25.1.4)-(25.1.11) are concerned, all of them are using the private constants $g_i$. Thus, due privacy concern, we must develop a special procedure for deriving the sum (25.1.5) as well as the other parts of the (25.1.4) expression so as to get the complementary random $r_{\xi\_x1x2}$. The idea here is to perform the mass calculations on cloud and deploying to DCL a completely finalized the encrypted results which will be deciphered to the true results (such as numerical expressions, individual decryptions, statistical calculations) in just one deciphering step. This way the public constants, encryption coefficients and the true complementary randoms would not be compromised.

To implement this approach, let's treat the complementary randoms and its templates as a vector objects and apply matrix analytics (including individual operations together with mass additions and multiplications) needed for statistical and complex numerical calculations. Let's look at $r_{\xi\_x1x2}$ as a vector object $\vec{v} \equiv \overrightarrow{r\xi\_x1x2}$ whose every i-th coordinate $v_i$ is computed via ii. $v_i=(g_i(^{D}{}_2+D_1)b_i-g_i b_i*\Sigma_{j\in b_{\xi\_x2}} g_j b_j)/\alpha$ (25.2.1)

Since binary strings $b_{\xi\_x1}$ and $b_{\xi\_x2}$ and their bits $b_i$, $b_j$ are known on cloud, therefore, the right side of the equality iii. $(1/g_i)\alpha*v_i+b_i*\Sigma_{j\in b_{\xi\_x2}} g_j b_j=(D_2+D_1)b_i$ (25.2.2)

can be gotten on cloud.

In case, when we need to perform a mass of pair multiplications intermixed with additions and division (for example, to get an average, or do the covariate analysis), we just do the additions of the $F_{bx1*bx2}$ matrices on cloud, send the $\Sigma_k F_{bx1k*bx2k}$ to DCL, and perform the (25.1.9)-(25.1.10) multiplications by using the public constants available on DCL. Upon obtaining on DCL the necessary components 1. $\Sigma_k \Sigma_i g_i*(D_{2k}+D_{1k})b_{ik}$ (25.2.3)

iv. $H_{dG}*(\{\Sigma_k F_{bx1k+bx2k}\}*M_{vG})=\Sigma_k \Sigma_i g^i b_i*\Sigma_{j\in b_{\xi\_x2}} g_j b_j$ (25.2.4)

where $\{(\Sigma_k F_{bx1k+bx2k}\}$ is a $k^{th}$ row in the matrix $F_{bx1k*bx2k}$ defined in (25.1.6), the required complementary random for deciphering of the hypothetical sum of encrypted products $D(\Sigma_k(x_{1k}*x_{2k}))=\Sigma_k D_{x1k*x2k}$ and a deciphering itself will be completed on DCL.

In case, when a multiplication of one column by the other (like salary and bonus) is needed to be perform, then the encrypted part $D_{salary}*D_{bonus}$ replaces the $D_{salary}$ column, and two pairs—first is $\{b_{salary}, b_{bonus}\}$ of two templates, and second is $\{D_{salary}, D_{bocus}\}$ of the original encryption forms. Thus, the second column keeps the history of the performed multiplication.

In case, when there is a need to hold on cloud the multiplication results, then the two pairs $\{b_{salary}, b_{bonus}\}$ and $\{D_{salary}, D_{bocus}\}$ are sent to DCL where the fresh new random template $b_{\xi\_x1*x2}$ calculated from $x_1*x_2$ seed. Then, the new encrypted form $D_{x1*x2}$ found via (9.1.1) get sent to cloud to replace the temporary help on cloud the product $D_{x1}*D_{x2}$ and temporary template pairs ($\{b_{salary}, b_{bonus}\}$ and $\{D_{salary}, D_{bocus}\}$). In case, when there is no need for storing permanently the multiplication results on cloud, i.e., calculations had been performed for analytics purposes only, then we send to DCL the individual parameters $D_1*D_2$, $D_1+D_2$ and templates $b_{\xi\_x1}$, $b_{\xi\_x2}$ for computing $r_{\xi\_x1x2}$ and the true $x_1*x_2$.■

25. 3. Illustration of Using Templates for Manipulating the Sum of Products.

The numeric example in this paragraph illustrates the use of the templates in operations theoretically elaborated in 25.1-25.2 sections. Namely, we computed the complementary random (using templates) during the ciphering cycle and reused them numerous times for deciphering purposes and complex calculations over encrypted data on cloud and DCL.

```
string[ ] pre_enc = { "10110", "11010", "10011", "01010" }; /// templates
double[ ] set_g = {1.2, 2.4, 0.8, 1.6, 2.1}; /// random constants for compl random
double coef_a = 0.75;
double[ ] token_dat = { 2.1, 1.35, 1.71, 0.8 };                /// tokens to encrypt
double[ ] r_ksi = { 0.0, 0.0, 0.0, 0.0 };                      /// to keep coml random
double [ ] enc_fm = {0.0, 0.0, 0.0, 0.0};                      /// to keep enc forms
double junk1 = 0.0;
string[,] post2_enc = new string[4, 3];                        /// to parse in the templates
for (int i = 0; i < 4; i++)                  /// parsing process
{
    iii. for (int k = 0; k < 1000; k++) { }
    jjj. char [ ] ccc = pre_enc[i].ToCharArray( );           /// turn tamplates into bits arrays
    kkk.junk1 = 0.0;
    lll. for (int j =0; j < 5; j++) {
    mmm. junk1 = junk1 + ((int)ccc[j] - 48)*set_g[j];        // add with g constants to get coml
        ksi
    nnn.            }
    ooo.            r_ksi[i] = junk1;              /// get ksi one at a time
    ppp.            enc_fm[i] = coef_a * token_dat[i] + r_ksi[i];     /// get enc forms
```

-continued

```
}
Console.WriteLine("\n test 403 \n enc forms: = " + enc_fm[0] + " " + enc_fm[1] + " " + enc_fm[2] + "
" + enc_fm[3]);
double D_x1_m_x2 = enc_fm[0] * enc_fm[1] / coef_a;        /// enc cross x1*x2
double D_x3_m_x4 = enc_fm[2] * enc_fm[3] / coef_a;        /// enc cross x3*x4
// computing ksi as Mg*(vert vector Dx*Bξx1)
double[ ] m_r_ksi = { 0.0, 0.0, 0.0, 0.0 };          /// to keep coml random
double[ ] m_enc_fm = { 0.0, 0.0, 0.0, 0.0 };          /// to keep enc forms
double [,] m_D_in_B = new double[4,5];
for (int i = 0; i < 4; i++)        /// parsing process
{
      qqq.              char[ ] ccc = pre_enc[i]ToCharArray( );          /// turn tamplates into bits
            arrays
      rrr. for (int j = 0; j < 5; j++)
      sss. {
      ttt. if (i % 2 == 0) {
                  i. m_D_in_B[i,j] = ((int)ccc[j] − 48) * enc_fm[i+1];
      uuu.              } else {
                  i. m_D_in_B[i,j] = ((int)ccc[j] − 48) * enc_fm[i−1];
      vvv.}
      www.              }
}
for (int i=0; i < 4; i++) {
Console.WriteLine("\n test 501 string = " + pre_enc[i]);
Console.WriteLine(" test 503 D_in_B: = " + m_D_in_B[i,0] + " " + m_D_in_B[i,1] + " " +
      xxx.m_D_in_B[i,2] + " " + m_D_in_B[i,3] + " " + m_D_in_B[i,4]);
}
// calc +ks1*D2 + ks2*D1
double[ ] ks_a_ks = new double[4];          // this is for +ks1*D2 + ks2*D1
junk1 = 0.0;
for (int i = 0; i < 4; i++)
{
junk1 = 0.0;
for (int j = 0; j < 5; j++)
{
      yyy.junk1 = junk1 + m_D_in_B[i,j] * set_g[j];
}
ks_a_ks[i] = junk1;
}
ks_a_ks[0] = ks_a_ks[0] + ks_a_ks[1];
ks_a_ks[1] = ks_a_ks[2] + ks_a_ks[3];
// thus [0] and [1] has x1*x2 and x3*x4 components correspondingly.
// to get ks_x1*x2 = (ks_a_ks[0] − ks_m_ks[0])/alpha, and ks_x3*x4 = (ks_a_ks[1] −
ks_m_ks[1])/alpha
double[ ] ks_m_ks = new double[2];          // this is for −ks*ks
double[,] m_vert = new double[5,2];
for (int i = 0; i < 2; i++)
{
char[ ] vvv = pre_enc[2 * i].ToCharArray( );          // get the vert string
char[ ] ccc = pre_enc[2 * i + l].ToCharArray( );          // get the horiz string
junk1 = 0.0;
for (int j = 0; j < 5; j++) {
      zzz.junk1 = junk1 + ((int)ccc[j] − 48) * set_g[j];
}
for (int k = 0; k < 5; k++) {
      aaaa.              if (vvv[k] == '1') { m_vert[k, i] = junk1; }
      bbbb.              else { m_vert[k, i] = 0.0; }
}
}
// comp ks_ks for x1*x2 and x3*x4
for (int i = 0; i < 2; i++) {
junk1 = 0.0;
for (int j = 0; j < 5; j++) {
      cccc.              junk1 = junk1 + m_vert[j, i] * set_g[j];
}
ks_m_ks[i] = junk1;
}
// comp ksi_x1x2 and ksi x3x4
double ksi_x1x2 = 0.0;
double ksi_x3x4 = 0.0;
ksi_x1x2 = (ks_a_ks[0] − ks_m_ks[0]) / coef_a;
ksi_x3x4 = (ks_a_ks[1] − ks_m_ks[1]) / coef_a;
double comp_x1x2 = (enc_fm[0] * enc_fm[1] / coef_a − ksi_x1x2) / coef_a;
System.Console.WriteLine("\n test 601 \n comp_x1x2 = " + comp_x1x2 + "\n          true x1*x2 = "
+ token_dat[0] * token_dat[1]);
double comp_x3x4 = (enc_fm[2] * enc_fm[3] / coef_a − ksi_x3x4) / coef_a;
System.Console.WriteLine("\n test 604 \n comp_x1x2 = " + comp_x3x4 + "\n          true x1*x2 = "
+ token_dat[2] * token_dat[3]);
```

Test Results

Test 403 enc forms: =5.175 6.2125 6.1825 4.6 test 501 string=10110 test 503 D_in_B:=6.2125 0 6.2125 6.2125 0 test 501 string=11010 test 503 D_in_B:=5.175 5.175 0 5.175 0 test 501 string=10011 test 503 D_in_B:=4.6 0 0 4.6 4.6 test 501 string=01010 test 503 D_in_B:=0 6.1825 0 6.1825 0 test 601 comp_x1x2=2.83499999999999 dddd. true x1*x2=2.835 test 604 comp_x3x4=1.36800000000001 eeee. true x3*x4=1.368

Conclusion:

The sum x1*x2+x3*x4 of the computed true products (derived from the sum of the encrypted products with the use of templates for managing complementary random) was calculated with $E10^{-14}$ precision. As data for this example was randomly selected, therefore, the quality of this result including the results obtained earlier in sections 11 through 18 cannot to be neglected as randomly obtained. To the contrary, the high precision match between the true and calculated products is a definite plus for using templates as a reliable and secure technique for handling the encrypted data. In addition, since variance $V(x)=\Sigma(x-A_x)^2$, as well as covariance $K(x,y)=\Sigma(x-A_x)(y-A_y)$, are some finite sums of products, therefore, this small example—just the sum of two products, $x_1*x_2+x_3*x_4$, and code and mathematical formulas used in this section,—introduces a new technology capable of performing analytics and statistical calculations over encrypted data and databases on cloud.

26.1. Using S-Constants for Generating Templates/The Algorithm for Converting Tokens into Binary Strings.

Let's assume that all distinct tokens from column L were chosen and placed into a new column K. By using K, we will construct a new column B of the distinct binary constants b_ξx synchronously positioned with x∈K. Our goal is to make b_ξx unrecognizable to no one without knowledge of the rules and algorithms that were used to produce b_ξx binaries. To meet these security goal let's make the following assumptions:

Assumption 26.1.1. Every token x∈K is turned into a string of characters T(x) by using an original or a new alphabet A and a one-to-one transformation τ: x–>τ(x).

Assumption 26.1.2. The transformation τ: x–>τ(x) is random but fixed for all the x∈K.

For simplicity, we will assume that τ is a permutation of characters within original alphabet A. Let's $K_A$ is a column containing τ(x) values for each x∈K.

Assumption 26.1.3. For every τ(x)∈$K_A$, all its digits and characters are converted into the standard 7-bit ASCII code $x_h$ consisting of pairs (d,h) of decimal, 0-7, and hexadecimal, 0-F, characters.

We denote such conversion as Hex operation, and, thus, $x_h$=Hex(τ(x)) for every x∈K.

Assumption 26.1.4 Every pair (d,h) in $x_h$ is converted into a 7-bit binary, and all such binary substrings concatenated will form a binary string b_ξ$x_h$.

For example, if x='Jm', then its 7-bit ASCII representation is '4A6D', and its binary format is 10010101011101.

Assumption 26.1.5 Before placing the binary strings b_ξ$x_h$ on cloud, their bits get transposed into v(b_ξ$x_h$) using a random permutation v, one and the same for all the b_ξ$x_h$ For example, in the previous example, after two single circular shifts follow by one mirror transposition for every pair of bits the binary string 10010101011101 will turn into 10011010101011. Since τ and v transpositions are randomly chosen, therefore, even for a two-character string like 'Jm' the number of possible expressions for v(b_ξ$x_h$) is in the range of $2^{54}*14!$, which makes intruder's job to guess what transposition was used to make v(b_ξ$x_h$) almost impossible.

26.2. Serialization Operations to Define a Unique Binary Strings on Cloud.

Since the true set L (from which the set K was constructed in previous section) could contain repetitive entries, we define a frequency function Freq(x) which, for each x∈L, describes the maximum number of x in L. The Freq(x) function allows local serialization of entries from subsets in L, to the contrary with global serialization in L which is based on L's row numbers. To clarify the local serialization, let's consider x∈L and a subset $S_x$={y|y∈L, y=x}. The entries in $S_x$ is serialized locally with an index i=1,2, . . . , Freq(x) which, in turn, is synchronized with the global serialization in L by using the next assumption.

Assumption 26.2.1. For every two indexes $i_x$ and $i_y$, x,y∈$S_x$, the relationship $i_x<i_y$ is true if and only if the row number of x in L is preceding the row number of y in L.

This enables us to associate with each entry x in column L (where repetitive entries are permitted) not only use its value (which i x) but also its serialization number $i_x$ within $S_x$. As there is no correlations between serializations of the two different subsets $S_x$ and $S_y$ for x≠y, therefore, a pair (x, $i_x$), i.e., token x and its serialization number $i_x$ within $S_x$, could serve as a unique identifier for entries in L. For that matter, we will treat serialization numbers $i_x$, x∈L, as tokens, and convert them into binary decimal presentations b_ξ$i_x$ likewise to b_ξ$x_h$. By concatenating b_ξ$i_x$ and b_ξ$x_h$ (and forming, thus, a new string b_ξ$i_x$_ξ$x_h$) we will obtain a unique binary string for every token in L. After permutating the bits in $b_{\_Rix}$ using a random permutation (one and the same for all the x) we will still get a unique string.

We will call the unique strings as s-constants and use them as templates on cloud. Thus, we will put s-constants on cloud for search, analytic and secure encryption and decryption operations as templates.

Another way to generate s-constant would be to use a hashing function such as SHA256.

27. Secure Order-Preserving Encryption Scheme 27.1. Introduction. The encryption scheme presented in this document allows for all data searches to happen over encrypted instead of plaintext data. Such a scheme can be used when the data-hosting location may be untrusted, like public cloud and similar environments. It can also be used in 'local' environments, like personal smartphones, laptops, etc. when there is desire for even greater local security. The encryption scheme is order-preserving and format-preserving, i.e. preserves the length and data type of the original plaintext.

This methodology uses multiple mutually exclusive groups as well as the optional construct of a re-generated private encryption key to encrypt data. The methodology does not suffer from global ordering attacks (i.e., the ability to order, and therefore re-identify, under certain conditions, the entire plaintext domain). The technique however is subject to local ordering attacks. That is, locally—within each mutually exclusive group—it's possible to order and therefore potentially guess how to re-identify particular encrypted data elements—which is considerably more secure than global ordering attacks. Moreover, the success of local ordering attacks can be reduced even further by using even more groups, thereby adding considerable additional security. Therefore, this scheme can be made as secure as may be required.

27.2. Overall Architecture. Let us describe our architectural assumptions about the overall IT environment as well as where our scheme lives. Consider the following illustration in FIG. 13.

The user is on a computer at their work or home. The user's computer hosts an application client, which could be a browser, a fat or thick client, etc. This client is communicating with an application server, hosted beyond the network perimeter of the user's company or home. In this case, our encryption scheme would be residing in an encryption proxy—or just proxy from now on—, which will be situated between the application client and the application server. The proxy could be architected as a browser plug-in, a stand-alone application that listens on the TCP/IP sockets connecting the client and server, or other constructions.

The private encryption key, which will be described later on, is securely associated with the proxy. For example, it can be encrypted on the user's disk and loaded into the proxy's memory during run-time. It could be stored in an HSM (Hardware Security Module) physically connected to the user's computer via PCI card and all encryption/decryption operations can be sent by the proxy to the HSM in real-time. Etc.

The implications of this configuration are as follows. Since the proxy is between the client and server, the proxy can intercept requests sent by client to server as well as from server to client. Our goal is to secure our data in the application server. Therefore, when the client sends a normal request to the server, the proxy will intercept it, encrypt the appropriate plaintext data in the request, slightly modify the request if necessary, and send the "encrypted" query to the server for execution, storage, etc. Similarly, when the server sends data to the client, the proxy will intercept the transmission, decrypt the data, and present the plaintext data back to the client. The encryption scheme is constructed to allow the client to perform all the standard SQL search functions on the application server.

Ultimately, the result is a useful proxy: the data is secured in an untrusted environment but the application doesn't suffer because it can considerably operate over the encrypted data.

Let us look at the details below to understand how our scheme accomplishes the above requirements based on the IT environment assumptions we have made.

27.3 Encrypting Small Strings

We start with a discussion on how to encrypt and operate over short strings. Longer-string encryption, as well as encrypting other types of text, e.g. integers, dates, etc. will discussed later on in this document.

Let us also mention that most of this document concerns itself about the encryption and querying of a single column in a database (i.e. a database that is hosted on the application server). Obviously, the exact same process as described herein can be followed to encrypt and query multiple columns, one at a time or many together, depending on the nature of the query.

27.3a. Anonymization Routine. Let's describe how we initially set up our encryption to send only encrypted data to the application server. First, let's point out that from an operational perspective, the anonymization routine described below could be hosted on the user's computer, the application server, some other server available to the administrator of our proxy, etc.—whatever is easier for the users or administrators of our encryption proxy. Of course, if this is done on the application server, any sensitive data (such as the original plaintext data, etc.) would need to be removed so that the application server has no knowledge of any of the sensitive details from our anonymization routine (e.g. encryption keys that we produce, etc).

Our anonymization routine breaks up all possible plaintext data—the plaintext "universe"—into 3 groups. (We will discuss later how to change the number of groups to modify the security provided by the scheme). Let us work with a particular set of strings to examine the associated details. Suppose that our full plaintext universe (e.g., all the strings that the user can ever type into his client) consists of at most 3-character strings, each character position of which comes from the set of letters {a, b, c}. Longer strings and other alphabets will be examined later in this document. This means that our plaintext universe now is as in FIG. 14.

Our anonymization routine breaks up the above list to be processed in three independent groups. That is, depending on which particular Group a string becomes associated with, the parameters of that Group will be responsible for encrypting that string. Let us explain the details:

1) The anonymization routine first sorts the list of FIG. 14 into alphabetical order.
2) The routine seeds the pseudo-random number generator (PRNG) on the device where the routine is executing. After the seeding, the anonymization routine sets up a loop to iterate through the now sorted plaintext universe (i.e., FIG. 14, now sorted). For each iteration, the routine generates a random value between 1 and 3, i.e. relying upon the PRNG as the basis for the generation. The current plaintext value of the iteration is tagged with that random value. The random value represents the Group into which the plaintext value is placed. FIG. 15 is an illustration how one loop with such randomization might break up our plaintext universe after the loop finishes.
3) Next, the anonymization routine isolates each Group into its own table and sorts its plaintext values in lexical order. The appearance of the data is illustrated in FIG. 16.
4) Lastly, the routine breaks up the original sorted universal plaintext space (e.g., a sorted FIG. 14) into three contiguous non-overlapping sections. The number of data elements in each section is a one-to-one mapping to the number of data elements in each of the three Groups of FIG. 14. Which section is chosen to have the same number of elements as any particular Group is randomly chosen. The anonymization routine then assigns each sorted section to its corresponding Group. The net effect is that each plaintext element in each Group is now assigned to another plaintext element from the plaintext universe. The strings that were assigned to the original values will now become the encrypted versions of those original values. For example, on FIG. 17 is shown one such random assignment of encrypted strings to original plaintext strings:

This completes the description of our anonymization routine. The encrypted strings created above can now be placed into our (untrusted) application server environment. And FIG. 18 will become the private encryption key that will be stored in the proxy, as discussed previously, to be used when it's desired to encrypt or decrypt data when interacting with the encrypted data in the application server.

Let us also point out that, as described in Section 27.3, the private encryption key mentioned above is to encrypt a single database column. If we would like to encrypt multiple columns, we can obviously use the same encryption key for all of them. This would make overall operations less complicated since the SQL statements would need to incorporate the structure of only one key. We can also create new encryption keys for every column which is a more secure approach; if the key of one column is ever compromised it will not affect the security of another database column. The administrator of our proxy, working with multiple columns that might need encryption, can decide the tradeoff he would like to make between using one key (less secure approach) versus multiple keys (a more complicated but more secure approach).

Now that we've described how our anonymization routine works and the makeup of our private encryption key (in FIG. 18), let us explain how the private key structure allows us to execute all the basic SQL search queries in the server—which is our goal.

27.3b. INSERT Function. Let's imagine that the user wants to insert one or more records into the application server. The proxy intercepts the request (as per FIG. 13), encrypts the plaintext argument, and sends the "encrypted" SQL query to the server. For example, imagine the user wants to execute the following command:

INSERT INTO Table1 VALUES ("abb")

The proxy intercepts the request and parses it to find the plaintext argument "abb". The proxy uses the private encryption key of FIG. 18 to look up "abb" and convert it into "cab". Finally, the proxy issues the following encrypted command to the application server:

INSERT INTO Table1 VALUES ("cab")

This will insert the appropriately encrypted record into the server.

It's important to point out here that while this section describes inserting one encrypted record at a time into the application server, it's also possible to anonymize much more data at once. For example, an entire database column; one or more database tables each with multiple columns; and even an entire database can be anonymized with the approach described here. For example, one could encrypt records in batch using the private encryption key of FIG. 18 and then import all the data into the application server using the data import techniques supported by the server. And whether data is inserted into the server on a record-by-record basis or on a much larger scale, the regular encrypted SQL queries, as described in the rest of this document, could be executed against this data; they will work exactly the same way as will be clear when examining the queries.

27.3c. DELETE and UPDATE Functions. Section 27.3b above explains how the INSERT command is transformed to work with the application server. The SQL DELETE and UPDATE statements would be handled similarly. Their plaintext arguments would be converted into encrypted arguments, just like for the INSERT command, and then they would be sent to the application server to be executed (e.g. to DELETE or UPDATE records, as required).

27.3d. Decryption Function. When individual records are retrieved from the server the proxy needs to decrypt them for the user—who needs to see plaintext values. Therefore, for any given transmission from server to client, the proxy would intercept the screen being returned, use FIG. 18 to look up the encrypted values in the screen, replace them with the corresponding plaintext values, and return the "plaintext" screen to the client. For instance, if the values "cc" and "ca" were sent from the server to the client, the proxy would intercept the transmission, swap in the original plaintext values of "caa" and "aa", respectively (as per FIG. 18), and return the screen with these data to the user.

27.3e. Equality-based Search. Now imagine the user wants to find a record (or multiple records if there are many identical data values) in the server based on an equality search. That is, the user wants to pose an SQL query such as:

SELECT*FROM Table1 WHERE Column1="acb"

The proxy would again intercept the request, recognize the plaintext argument "acb", and replace it with its encrypted equivalent "aba". The proxy would send the following "encrypted" SQL statement to the server:

SELECT*FROM Table1 WHERE Column1="aba"

This would retrieve the appropriate records which the user originally sought.

27.3f. Substring-based Search. Now let's explore how our scheme handles SQL LIKE statements, i.e., substring search. In our scheme, we can easily do "starts with" searching—that is, looking for strings that begin with a specific argument such as the clause "LIKE xyz %". Searching for strings that "end in" some argument or strings that "contain" some argument is much more difficult and will be discussed in a subsequent paper.

Therefore, imagine the user issues a request such as:

SELECT*FROM Table1 WHERE Column1 LIKE "bc %"

Because in our scheme we have three Groups, we need to set up a sub-query for each of the Groups as the user's requested substrings may be located in any of them. For the sub-query for Group 1, let us observe that the plaintext strings satisfying the clause "LIKE bc %" range from "bcb" to "bcc", as per FIG. 18. And these in turn have encrypted values ranging from "bba" through "bbb", respectively. Therefore, we would need a sub-query for this encrypted range in our "encrypted" SQL statement. Next, for Group 2, notice how the plaintexts satisfying the clause "LIKE bc %" range from "bc" to "bca", per FIG. 18, in that Group. And, in turn, these have the encrypted values ranging from "cba" through "cbb", respectively. A sub-query for this encrypted range would also be needed in our transformed SQL statement. Finally for Group 3, notice how there are no plaintext strings matching "bc %". (That is, no strings matching "bc %" were assigned to that Group during the anonymization routine). Therefore, there is no separate sub-query to create for Group 3 in our transformed SQL statement. Putting this analysis together, the proxy can issue the following single SQL statement to the application server:

SELECT*FROM Table1 WHERE (Column1 BETWEEN "bba" AND "bbb") OR (Column1 BETWEEN "cba" AND "cbb")

This statement will retrieve the strings satisfying the user's original LIKE statement request.

27.3g. Inequality-based Search. Now suppose the user wants to do an inequality or range search. She wants to find all records in which a value is greater than or BETWEEN some values. For example, the user's query might be:

SELECT*FROM Table1 WHERE Column1 BETWEEN "ba" AND "cab"

The proxy would intercept the request. Because we have three Groups, we would need to create a sub-query for each one as the requested data may be located in any of them. Let's start with the Group 1 sub-query. Since we are executing 'BETWEEN "ba" AND "cab"', we need to find the smallest value in Group 1 at least with the value of "ba", or higher, which will satisfy the lower bound of the user's request. In Group 1 that lower bound value is "ba", per FIG. 18. Now take the encrypted value of this string, "baa"—per FIG. 18. This will be the smallest encrypted value for Group 1 that we would look for as we create our encrypted query. Next the proxy will need to find the largest value in Group 1, no higher than the plaintext value "cab", i.e. the maximum value in the user's original request. This is value "ca". Its encrypted value is "bbc", which becomes the maximum encrypted value for Group 1 that will part of our encrypted query.

We now move on to Group 2. The proxy finds the smallest value in Group 2 at least with the plaintext value of "ba", or higher. This value is "baa". Its encrypted value is "cb", which becomes the lowest encrypted value for Group 2 that will be in our encrypted query. Next the proxy finds the largest ordered value in Group 2, no higher than plaintext value "cab". This value is "cab"; and its associated encrypted value is "cca", which would become the highest encrypted value for the user's request in Group 2 that will be part of our encrypted query.

Finally, the proxy works with Group 3. The proxy finds the smallest ordered value in Group 3 at least with the plaintext value of "ba" (or higher); this value is "bab". The associated encrypted value is "abc", and "abc" becomes the lowest encrypted value for the user's request for Group 3 that will be part of our encrypted query. Next the proxy finds the largest ordered value in Group 3, no higher than the plaintext value of "cab". This value is "bbc", per FIG. 18. Its associated encrypted value is "aca"; and "aca" becomes the highest encrypted value of the user's request for Group 3 that would be part of our encrypted query.

The proxy can now issue one of two requests to the server to capture the appropriate data. It can set up independent threads (i.e. fork independent threads to work in parallel) and issue one appropriate sub-query per thread—using the encrypted values identified above. In other words, this approach would create the following set of queries:

Thread 1: SELECT*FROM Table1 WHERE Column1 BETWEEN "baa" AND "bbc"

Thread 2: SELECT*FROM Table1 WHERE Column1 BETWEEN "cb" AND "cca"

Thread 3: SELECT*FROM Table1 WHERE Column1 BETWEEN "abc" AND "aca"

The proxy would need to wait for all three threads to complete, combine the three partial responses into a single response, decrypt all the data, and finally present the full plaintext response to the client.

In a second approach, the proxy can issue a single SQL query to combine the sub-queries for all three Groups in one request. This request will look like:

SELECT*FROM Table1 WHERE (Column1 BETWEEN "baa" AND "bbc") OR (Column1 BETWEEN "cb" AND "cca") OR (Column1 BETWEEN "abc" AND "aca")

Once the response is received, the proxy would again intercept it, decrypt all relevant data, and return the plaintext response to the client.

Given that we've stated how to do BETWEEN searches, we should also indicate that based on the above discussion, performing only an inequality query (e.g. "<", ">=") would be quite similar to the above. An inequality query only will require about half of the analysis as the above.

27.3h. JOIN Search. Now consider another SQL statement—JOIN. Doing JOINs is relatively straight-forward. As long as the columns of the two tables subject to the JOIN are anonymized the same way with the same key (i.e. the same FIG. 18), every equal plaintext value in both columns will become equal ciphertext values in those columns. Our scheme is deterministic—every identical plaintext input will produce an identical ciphertext output. Therefore, JOIN will work as in the normal plaintext case.

For example, the following JOIN statement over encrypted data on the server will return all the expected JOINed records as would be the case for the plaintext JOIN:

SELECT*FROM Table1 A INNER JOIN Table2 B ON A.Column1=B.Column1

27.3i. Sorting Search. Now consider a sorting query, e.g. a query with an ORDER BY clause. If the user issues a sort query, our scheme would need to do a bit more work given the records-per-page limitations that exist for many applications. When a user requests records to be retrieved from an application in sorted order, many applications sort the results on the server and only send to the client (e.g. browser, etc.) just the records from the list which will fit on one screen size. If there are more records to be sent, the application holds the sorted records on the server. The user would normally press <PAGE DOWN>, <NEXT PAGE>, or something similar in the application client to have the server send the next page-worth of sorted records. The user can continue accessing the remaining records on the server by continuing to press <NEXT PAGE>. Such typical behavior of many applications will not normally work with our scheme, however. Our records are encrypted using order-preserving encryption, but there is only local order-preserving encryption, i.e. within a Group. There is no global order-preserving encryption in, for example, a column as a whole. Therefore, if the result set contains more than the application's number of records that fit in one screen, and sorting is done on the server, our scheme can't simply issue a normal sort search. The server will generate the result set and try to sort according to a global sort and produce incorrect results. For instance, notice how in FIG. 18 the plaintext value "aa" is less than the plaintext value "bba". However, the encrypted value of "aa", "ca", is greater than the encrypted value of "bba", "bac". The server, not understanding how we break up global order using Groups, would incorrectly place "bac" before "ca" and send the screen back to the user—an incorrect user experience. Similarly, if there are many identical values of "bac" they will be sent back in one screen, while the "ca" values will be left waiting for <NEXT PAGE> requests. This is also incorrect handling.

Our scheme handles this issue as follows. It will use a specially designed Paging Algorithm (PA) to retrieve data from the three Groups on the server in a manner that caches sufficient Group data in the proxy's memory to construct required sorted pages for the user. But if there is insufficient data in the proxy's memory to build a required page, the PA will retrieve the next set of Group data from the server to construct it. Let's understand this in a little more detail. Whenever a user makes a request for sorted pages the proxy intercepts the request. The PA (part of the proxy) will start to build the response to the user one page at a time. During the construction of a given page the proxy will either have sufficient Group data in memory to construct the page, or the PA will need to retrieve a set of pages from the server on behalf of one or more Groups to construct it. If the page is built from memory, the PA will ensure it is properly sorted as it's returned to the user—as it can sort local data locally. If there is not enough data in memory to construct the page, the PA will retrieve the relevant data for one or more relevant Groups from the server, decrypt the data, sort it independently within its Group(s), append appropriate data to existing data in memory for the corresponding Group(s) (if any is already there), and finally construct, in a sorted manner, the page for the user from all the data in memory across the three Groups.

Let us go through an example to understand the specific. When the proxy first intercepts a request with an ORDER BY clause, there is no data in the proxy's memory yet as it's the first time the proxy's handling such a request. The PA needs to build the first page of the user's response. Because our scheme has three Groups, the PA creates three parallel threads forked at the same time, with each having the same ORDER BY clause as the user requested. Each thread will retrieve the relevant data from its Group from the server—which can be done because the encrypted Groups do not overlap on the server. The PA waits for all three threads to return, and then for the three returned initial pages, each page will be decrypted, placed into its own memory location and sorted according to its plaintext values. To build the first page of the user's response, the PA will construct a page-worth-of-records using the Group data in memory, sort the data in lexical order, and return this page to the client. When the user presses the <NEXT PAGE> (or equivalent) button in the client, the proxy will intercept the request and execute the PA again, now trying to construct the second page of the user's response. This construction will be as follows. The PA starts with the first element following the end of the first response page that was returned to the user. The PA will add one relevant data element at a time from the appropriate Group from memory until the screen size for the second page is reached. If, as part of building the second page, the PA ever reaches the end of a Group's data in memory before it reaches the screen size, it will request the next page for this Group from the server. The PA doesn't know whether the next data element for this second page is on the server waiting to be retrieved via a possible <NEXT PAGE> request, or we don't need any more elements in this Group and can continue building the user's second page with the data from other Groups in memory.

The PA requests from the server the next page for the relevant Group (using the parallel thread set up for the Group above, and whose session and also its sorted pages previously set up via its ORDER BY request, it is expected, should continue to be maintained on the server). After this page arrives, the PA decrypts it, sorts it, and appends it to the end of that Group's data in memory. The PA then checks whether the lexically earliest (i.e. topmost) data element of the just-returned page belongs at the very end of the second page that the PA is building. If so, then construction continues using that Group's new data in memory, as needed. Otherwise, the next data element for the user's second page was not part of that Group's data on the server and the PA uses the data in memory belonging to other Groups to continue building the second page. Data elements continue to be added to the second page until the screen size is reached. (Note that additional requests for data to the server for one or more Groups may be needed as the PA is building the user's second page—and the process followed would be as described above). Finally, the second page is now built and can be returned to the client.

The third and subsequent pages requested by the user—constructed as the user is pressing the <NEXT PAGE> button in the client—will be handled just like described above for handling the second page.

27.4 Longer Strings Management. We have concluded how we handle SQL search functions over shorter strings. Let us now describe how we handle these functions for longer strings. The above Sections described a "plaintext universe" that was at most 3-characters long. Now suppose that we have the same restricted alphabet as in Section 27.3a (i.e., {a, b, c}), but our strings can be at most 6 characters rather than 3 characters long. (We will show later in this document how to handle any length strings that we wish).

One way to address longer strings would be to expand the size of our private encryption key. Instead of dealing with only 3-char strings, our private encryption key would record all possible up-to-6-char strings and their up-to-6-character encrypted equivalents. The problem with this approach, however, is that as the possible words in our universe get, eventually, longer and longer (i.e., eventually we would like to handle 9-char, 14-char, 19-char, etc. strings), the size of the private key would grow significantly. And at some point it may be too large to store in memory, or it may take too long to traverse the key as lookups are performed. For instance, imagine if instead of our 3-char alphabet we had the normal printable characters of the English alphabet making up our strings, e.g., a-z, A-Z, 0-9, and many special symbols like #, %, <, etc. There are about 95 of such printable characters in the ASCII table. If we allow for even 5-char words in our plaintext universe (and certainly even longer), and record all possible strings in our private encryption key, we will see that the encryption key will become very large. For 5-char strings the size of the encryption key is calculated to be roughly $95^5$ (number of different 5-char word spellings)*5 (storage space required in bytes for each 5-character string) *2 (one represents all the storage required for the plaintext strings in the private encryption key and the same amount is required for storing the encrypted strings in the encryption key)

The above calculation is very roughly 77,000,000,000 bytes, or 77 Gigabytes. This data volume is too big to store in the memory of many servers and certainly personal devices. Therefore, storing the full private key in memory for "longer" strings in various contexts would certainly be quite difficult.

The approach we adopt is to break up longer plaintext strings into smaller plaintext strings and concatenate the encrypted strings of these smaller plaintext strings into longer encrypted strings. In other words, we use a very similar (and reasonably small) private encryption key, but, via concatenation, we can handle longer encrypted strings.

We will discuss the security implications of such concatenation later in this document, but right now let's discuss how we implement this approach. We expand our private encryption key set of tables (in FIG. 18) by another set of tables. The two sets of tables in our private encryption key will be used to encrypt 3-char plaintext strings which will be appropriately concatenated into 6-character encrypted strings. This is how we will handle the desired 6-character strings. Let's examine the mechanics.

27.4a. Anonymization. Let's first describe any changes to our anonymization routine. But before this, let us first describe how we will parse longer strings more generally, as proper parsing will be part of our encoding process. When handling strings 4-6 characters long, we break up the string into two substrings—the first one exactly of length 3 and the second one will contain the rest of the characters. To encode the 4-to-6-char string—for the first substring we will create a new set of encryption tables in our private key just for this 3-char "prefix". For the second substring, it will be encoded using the FIG. 18 set of tables, as we had done this before. Also, we should point out that when parsing a plaintext string of just up to 3 characters we simply parse it as one string and use the private encryption key of FIG. 18 to encode it.

Let us construct the special set of tables that we will need to encode the first 3-char "prefix" of longer strings. Following the original anonymization process of Section 27.3a, let's understand that for our 3-char "prefix", our plaintext "universe" now consists of only 3-character strings—i.e. that is the only possible length for 3-char strings:

FIG. 19

| | | | |
|---|---|---|---|
| aaa | acb | bbc | cba |
| aab | acc | bca | cbb |
| aac | baa | bcb | cbc |
| aba | bab | bcc | cca |
| abb | bac | caa | ccb |
| abc | bba | cab | ccc |
| aca | bbb | cac | |

To encode FIG. 19, as in Section 27.3a, we again set up our PRNG, and create a loop from the start to the end of this universe (in sorted order, as before). We will again have 3 different Groups. For each loop iteration we will generate a number 1-3, and the plaintext element will be assigned to that Group.

As an example, here is what one random assignment of all plaintext values in the new universe might look like after the loop completes:

FIG. 20

| Plaintext | Group | Plaintext | Group | Plaintext | Group | Plaintext | Group |
|---|---|---|---|---|---|---|---|
| aaa | 2 | acb | 3 | bbc | 1 | cba | 3 |
| aab | 3 | acc | 3 | bca | 3 | cbb | 2 |
| aac | 2 | baa | 1 | bcb | 3 | cbc | 1 |
| aba | 1 | bab | 2 | bcc | 3 | cca | 2 |
| abb | 1 | bac | 3 | caa | 1 | ccb | 1 |
| abc | 3 | bba | 2 | cab | 1 | ccc | 3 |
| aca | 2 | bbb | 2 | cac | 2 | | |

Next, like before, the anonymization routine will place each of the plaintext elements into its own Group and will sort the Groups in their own lexical order. Therefore—here is what the data will look like now:

GROUP 1

| Plaintext | Group |
|---|---|
| aba | 1 |
| abb | 1 |
| baa | 1 |
| bbc | 1 |
| caa | 1 |
| cab | 1 |
| cbc | 1 |
| ccb | 1 |

GROUP 2

| Plaintext | Group |
|---|---|
| aaa | 2 |
| aac | 2 |
| aca | 2 |
| bab | 2 |
| bba | 2 |
| bbb | 2 |
| cac | 2 |
| cbb | 2 |
| cca | 2 |

GROUP 3

| Plaintext | Group |
|---|---|
| aab | 3 |
| abc | 3 |
| acb | 3 |
| acc | 3 |
| bac | 3 |
| bca | 3 |
| bcb | 3 |
| bcc | 3 |
| cba | 3 |
| ccc | 3 |

Lastly, the sorted plaintext universe (e.g., FIG. 19, but now sorted) will be split randomly into contiguous sections to be exactly the same size as the number of elements in each of the Groups in FIG. 21. Then the sections will be assigned to their corresponding Groups. As before, the contiguous sections represent the encrypted values for those original plaintext values.

Here is what one random assignment of these contiguous sections might look like now:

GROUP 1

| Plaintext | Group | Encrypted |
|---|---|---|
| aba | 1 | baa |
| abb | 1 | bab |
| baa | 1 | bac |
| bbc | 1 | bba |
| caa | 1 | bbb |
| cab | 1 | bbc |
| cbc | 1 | bca |
| ccb | 1 | bcb |

GROUP 2

| Plaintext | Group | Encrypted |
|---|---|---|
| aaa | 2 | aaa |
| aac | 2 | aab |
| aca | 2 | aac |
| bab | 2 | aba |
| bba | 2 | abb |
| bbb | 2 | abc |
| cac | 2 | aca |
| cbb | 2 | acb |
| cca | 2 | acc |

GROUP 3

| Plaintext | Group | Encrypted |
|---|---|---|
| aab | 3 | bcc |
| abc | 3 | caa |
| acb | 3 | cab |
| acc | 3 | cac |
| bac | 3 | cba |
| bca | 3 | cbb |
| bcb | 3 | cbc |
| bcc | 3 | cca |
| cba | 3 | ccb |
| ccc | 3 | ccc |

FIG. 22 is now the other set of tables that will become part of our private encryption key. (The first part is in FIG. 18).

We have now described our modified anonymization routine and have shown how we built our somewhat larger private encryption key in FIGS. 18 and 22. Let's understand now how the private encryption key can be used for encryption and decryption of 6-character strings.

27.4b. INSERT Function. INSERT statements for longer strings work quite similar to the smaller-string INSERTs. We will need to break up the original plaintext string into its two substrings, the first exactly 3 characters long and the second comprised of the rest of the characters in the string. The first substring will be encrypted using the private encryption key tables of FIG. 22 (our 3-char "prefix" encryption), while the second substring would be encrypted using the private encryption key tables of FIG. 18. Afterwards we would combine the encrypted substrings into a longer encrypted string and INSERT that string into the server.

For example, consider the statement

INSERT INTO Table1 VALUES ("abbca")

Using our piecemeal encryption approach, the proxy would break up the plaintext argument into substrings "abb" and "ca". Using FIG. 22 it would look up "abb" and encrypt it into "bab". It would then look up "ca" and translate it into "bbc" using FIG. 18. The proxy would concatenate these two substrings and issue the following command to the server:

INSERT INTO Table1 VALUES ("babbbc")

This will insert the desired encrypted string into the server.

27.4c. DELETE and UPDATE Functions. Further, just like for the INSERT command in Section 27.4b, the DELETE and UPDATE statements would work for longer strings very similarly. That is, the user's argument would be broken up, encrypted in pieces, the pieces would be recombined, and the original UPDATE or DELETE command would be issued using the concatenated encrypted string. The appropriate string(s) would then be UPDATEd or DELETEd, as required.

27.4d. Decryption. Longer-string decryption also works quite similar to shorter-string decryption. Given an encrypted string of 4-6 chars, we first break it up into its two substrings. That is—just like for the plaintext case, we will have a 3-character encrypted "prefix", and the second encrypted substring will contain whatever characters are left over. Next, we decrypt each string with its respective private encryption key (FIG. 22 for the 3-char "prefix" and FIG. 18 for the second substring) and recombine the plaintext strings to create the full plaintext. For example, the encrypted string "baabc" would be broken up into encrypted substrings "baa" and "bc". The first encrypted substring would be decrypted (using FIG. 22) into "aba". The second encrypted substring would be decrypted using FIG. 18 into "cb". The two plaintext substrings would be combined to produce the final plaintext string returned to the client: "abacb". (And of course if the original encrypted string is 3 characters or less in length, we simply use FIG. 18 to decrypt it and return that to the client).

27.4e. Equality-based Search. Equality-based searching for longer strings is very similar to shorter-string equality searching as per Section 27.3e and the parsing as described in Section 27.4a. We would break up the plaintext search argument into its two substrings, encrypt the first and second substrings using the private encryption keys of FIG. 22 and FIG. 18, respectively, and issue the equality-based search command for the concatenated encrypted argument.

27.4f. Substring Search. When it comes to substring search (e.g. LIKE statement) for longer strings, once again, we can only readily handle "starts with" searches. "Ends with" and "contains" searches will be described in another paper. The overall approach follows Sections 27.3f and 27.4b above.

Imagine the user wants to issue the command

SELECT*FROM Table1 WHERE Column1 LIKE "cbba %"

As before, we break up the "cbba %" argument into "cbb" and "a %" (i.e. the 3-char "prefix" substring and the remaining substring). Using FIG. 22, "cbb" would be encrypted into "acb". As for "a %", using FIG. 18, we have to capture the equivalent of "a %" in each of the 3 Groups for that key because the requested data could be in any of the Groups. We again need a sub-query per Group. For Group 1, we see that "a %" captures plaintext values "a" through "acc" in that Group as per FIG. 18. And, as per FIG. 18, these represent encrypted substrings "b" through "ba". Therefore, the first sub-query in our encrypted SQL statement will contain this encrypted range. Looking at Group 2, we see that "a %" would capture plaintext strings "aa" through "abc" in that Group per FIG. 18. And these represent encrypted substrings "ca" through "cac", respectively (per FIG. 18). Therefore our second sub-query in our encrypted SQL statement would contain this encrypted range. Finally, for Group 3, we can see that capturing "a %" means capturing the plaintext strings "aaa" through "acb" in this Group. And the associated encrypted range for this plaintext range would be "a" through "aba", respectively. Therefore our third sub-query in our encrypted SQL statement would contain this range. Putting all this together—after the proxy intercepts the user's request, it will convert it to:

SELECT*FROM Table1 WHERE (Column1 BETWEEN "acbb" AND "acbba") OR (Column1 BETWEEN "acbca" AND "acbcac") OR (Column1 BETWEEN "acba" AND "acbaba")

This query will retrieve the user's requested data.

27.4g. Inequality Search. Searching for longer strings using "<", ">", BETWEEN, and related operators is a bit more involved than doing it for shorter strings. Let's recall that our encryption involves FIG. 22 for plaintext characters 1-3 and FIG. 18 for plaintext character 4-6, and each of these private encryption keys represents their own three different Groups. Therefore, we would need to create separate sub-queries for a given key and its Groups, and then combine the two overall requests into one query to appropriately capture all required data. As an example, consider the user's request SELECT*FROM Table1 WHERE Column1 BETWEEN "ba" AND "cbbca"

Because "cbbca" involves the encoding from two different keys (as it's longer than 3 characters), we can break up the query into an equivalent query to more easily manage the associated encoding. We can break up the query into SELECT*FROM Table1 WHERE (Column1 BETWEEN "ba" AND "cbb") OR (Column1 BETWEEN "cbbaa" AND "cbbca")

Now that we've constructed this equivalent query, we can encode each clause in this query with its own key. Therefore, for the clause 'BETWEEN "ba" AND "cbb"', we will find the respective encodings for this range for each of the three Groups associated with the FIG. 18 private encryption key. (This is because these substrings are only 3 characters long, and for up-to-3 chars long we use the FIG. 18 private encryption key). For Group 1 we see that the plaintext range of "ba" through "cbb" corresponds to the plaintext values "baa" through "cab" in that Group. And this range corresponds to the encrypted range of "baa" through "bca" in that Group. This encrypted range will need to be part of our query. For Group 2, we see that the plaintext range of "ba"

through "cbb" corresponds to plaintext values "baa" through "cac" in that Group. These in turn correspond to encrypted values "cb" through "ccb" in that Group. This encrypted range will also need to be part of our query. Finally, for Group 3, we see that the desired range of "ba" through "cbb" captures plaintext values "bab" through "cba" in Group 3. And these correspond to the encrypted values of "abc" through "acb" in that Group. This encrypted range will also need to be part of our query.

Now we examine the second clause in the above equivalent query. For the clause 'BETWEEN "cbbaa" AND "cbbca"' we have a fixed prefix "cbb" that will be the same for all elements. Therefore, using FIG. 22 (for all our 3-char "prefixes"), we encode "cbb" as "acb". Now for the suffixes "aa" through "ca" (the remaining substrings), we use the private encryption key of FIG. 18. We break these arguments up among the FIG. 18 private encryption key's Groups. Therefore, for Group 1, we see that "aa" through "ca" captures in Group 1 plaintext values "acc" through "ca". The encrypted values corresponding to this range is "ba" through "bbc", per FIG. 18. This encrypted range will need to be part of our transformed query. For Group 2, we see that "aa" through "ca" captures in that Group plaintext values "aa" through "c". The encrypted values corresponding to that range are "ca" through "cbc". This encrypted range will also need to be part of our transformed query. And for Group 3, we see that "aa" through "ca" captures in that Group plaintext values "aaa" through "bbc". And the encrypted values corresponding to this plaintext range are "a" through "aca". This encrypted range will also need to be part of our transformed query.

Therefore, combining all these subqueries, the final statement that the proxy would send to the server is:

SELECT*FROM Table1 WHERE (Column1 BETWEEN "baa" AND "bca") OR (Column1 BETWEEN "cb" AND "ccb") OR (Column1 BETWEEN "abc" AND "acb") OR (Column1 BETWEEN "acbba" AND "acbbbc") OR (Column1 BETWEEN "acbca" AND "acbcbc") OR (Column1 BETWEEN "acba" AND "acbaca")

This query would retrieve all of the user's originally requested data.

27.4h. JOINs. JOINs for longer strings is handled the same way as for shorter strings. Because our private encryption key tables always deterministically facilitate encrypting a given plaintext string; as long as the JOINed columns are encrypted the same way with the same private encryption key, we can perform JOINs on encrypted data and obtain the same linkage results as if they were done on the plaintext data. We are converting our plaintext arguments just like in Section 27.4b, in piecemeal fashion—and because our piecemeal parsing is also deterministic, encrypted equality comparisons will therefore work just as they do for the plaintext case.

27.4i. Sorting. Doing searches with a sorting clause for longer strings is relatively similar to doing them for shorter strings. However, we now need more independent parallel threads to handle additional clauses/sub-queries for the Groups associated with more private key tables. Our overall paradigm was described previously: we are using the Paging Algorithm (PA) to retrieve and manage Group data in memory, build pages one at a time for the user, and retrieve more Group data when it's uncertain whether subsequent data elements in the page for the user need to be obtained from the server or can be used from memory from other Group data. But in the case of longer strings, because now we have two parts of a private encryption key to work with, each with its own Groups, there will be more clauses required for the PA to retrieve the data from the server whether initially or subsequently. The PA will therefore need more forked threads over which to manage the associated sub-queries. For instance, consider an example similar to Section 27.4g—imagine the user's request is:

SELECT*FROM Table1 WHERE Column1 BETWEEN "ba" AND "cbbca" ORDER BY Column1

The PA starts building the user's response page by page. It would again use Group data in memory to construct pages when possible and reach out to the server whenever it's possible that the next data elements are on the server rather than in memory. Therefore, for the first user page, the PA would see that memory is empty and Group data to construct it needs to be obtained from the server. The PA would break up the request above into similar sub-queries as per Section 27.4g because the plaintext arguments are the same as in that Section except for the "ORDER BY" clause. Each such sub-query would need to append the "ORDER BY" clause to handle the ORDER BY on the server. Then, as before, the PA would need to wait for the completion of all the forked threads, decrypt all the data, sort it independently within each Group, place it into the memory locations of each Group, construct the first page for the user in a sorted way, and return it to the client.

Therefore, following the analysis of Section 27.4g, we would need to start the following six parallel threads to perform the overall user's request:

Thread 1: SELECT*FROM Table1 WHERE Column1 BETWEEN "baa" AND "bca" ORDER BY Column1

Thread 2: SELECT*FROM Table1 WHERE Column1 BETWEEN "cb" AND "ccb" ORDER BY Column1

Thread 3: SELECT*FROM Table1 WHERE Column1 BETWEEN "abc" AND "acb" ORDER BY Column1

Thread 4: SELECT*FROM Table1 WHERE Column1 BETWEEN "acbba" AND "acbbbc" ORDER BY Column1

Thread 5: SELECT*FROM Table1 WHERE Column1 BETWEEN "acbca" AND "acbcbc" ORDER BY Column1

Thread 6: SELECT*FROM Table1 WHERE Column1 BETWEEN "acba" AND "acbaca" ORDER BY Column1

And after the data is post-processed and placed into memory, the first page is constructed and returned to the client, the PA will continue to manage the rest of the data as per the user's <NEXT PAGE> button pressing. As the user presses <NEXT PAGE> the PA would again check whether it can build that page from memory or it must call the server. And it will continue to build pages from memory or obtain the next data for Groups from the server as required on a page-by-page basis. This is done until all the data pages requested by the user have been returned to the client.

27.4j. Handling strings longer than 6 characters. Sections 27.4a-27.4i above describe how to handle 6-character strings. Handling strings greater than 6 characters in length is relatively similar. From a parsing perspective, our parsing will continue to be: find as many fixed 3-char substrings as possible at the beginning of the string, so that only 1-3 characters remain in the end. Encode all the "prefix" substrings so found using FIG. 22, and encode the last substring identified using FIG. 18. Finally, concatenate all the encrypted substrings into one string in the same order as the plaintext was parsed; this will become the encrypted argument of the query. Such a strategy will work for all the equality-driven SQL queries above (INSERT, searching based on equality, etc). For inequality searches and LIKE statements, the same principles of setting up additional threads and creating sub-queries per individual Group for each of the two sets of private key tables, as described in previous Sections, would be done here. Encrypted queries would become longer for inequality-related searches, as for each set of private encryption key tables the encoding of their own Groups would need to be encoded for—but the overall queries would still nevertheless be correctly executed on the server.

27.5 Private Encryption Key Re-generation. While the approach described in Sections 27.4-27.4j for handling longer strings will work, there is actually a balance being made. Ideally, we'd like for the length of a substring before we require a new set of private encryption key tables to be as long as possible, so that the substrings into which we break the larger strings are as long as possible. This is to prevent frequency analysis attacks, as will be explained below. On the other hand, having longer strings within the private encryption key will make the key grow in size and, as before, at some point various devices will no longer be able to hold the large keys in memory. We present a solution below to try to a considerable degree achieve both requirements simultaneously, i.e. employing longer substrings but requiring less space for the overall private key. This will create a more secure environment but a private encryption key size that will also fit into the memory of devices.

Let us explain the issue in more detail. If we have short substrings into which longer strings are broken, due to the nature of the English language (or likely other languages with which the scheme in this document is used), shorter substrings will repeat. As result, it may be possible to carry out a "frequency analysis attack" on these short substrings. That is, it may be possible to guess the plaintext values of the encrypted strings when only examining the encrypted strings. Let's explain this vulnerability. Our encryption scheme is deterministic, and identical plaintexts will become identical ciphertexts. Therefore, the frequency of encrypted substrings in the server will be identical to the frequency of the original plaintext substrings. Suppose that English is the language of our plaintext "universe" (although as mentioned, this will likely work with other languages) and the component substrings are only, say, 3 characters long (i.e. relatively short). Then a word like "dis" would be identically encoded for words like "disenchanted", "dislike", "distant", etc. Therefore, any attacker doing a frequency analysis of the plaintext English language might be able to identify the frequency of the string "dis" in that language. This would be available by examining public data sources, academic articles, etc. He can then check whether the distribution of "dis" substrings in longer encrypted strings in the application server is the same as of the plaintext "dis" substrings he found in his analysis of plaintext English. If so, it's possible he could have identified the "dis" substrings as they would have the same distribution. It's of course non-trivial to mount frequency analysis attacks even for shorter strings. There could be other plaintext strings which have similar distributions as the plaintext string under examination and therefore the attacker could mistake encrypted substrings for some unrelated plaintext strings. Nevertheless, due to the existence of frequency analysis attacks, the longer the component substrings of encoded strings are the better it would be for the security of the scheme.

In light of this issue (frequency analysis attacks), we present a scheme to keep the length of the component substrings the same or even longer in our private encryption key tables, yet we decrease private encryption key storage requirements simultaneously to ensure the private encryption key fits in the memory of many devices.

The below Sections describe how to achieve this more optimal private encryption key construction.

27.5a. Anonymization Routine. To describe the private encryption key modifications we will now be making, let us first state a reasonable assumption. Today's computers and personal devices have relatively powerful processors. If true; to reduce the size of the private encryption key or lengthen the substrings it supports, we can regenerate the needed pieces of the private encryption key, as required, for encryption and decryption operations. Today's device and server processors should be able to do this relatively quickly as they have sufficient processing power; this is based on our assumption. However, we will also show how this assumption was also verified in our testing. (On our standard computer we achieved the good performance we are describing here by using a regenerated private encryption key. Our experimental results will be described later in this document).

The key re-generation approach will work as follows. Our proxy will create and store private encryption key slices (PEKSs)—with each PEKS representing a certain subset of the main private encryption key. Whenever data must be encrypted or decrypted, our methodology will first find the appropriate PEKS, then regenerate that slice, and finally access the required plaintext and encrypted data. Note that the amount of data represented by a single PEKS—i.e. the PEKS interval size—will need to be set as a balance between how quickly that PEKS can be re-created versus how much less space it will take. There should be (virtually) no slowdown in the application response time to the user as a result of using PEKSs. This means PEKSs should represent small intervals (as it will take less time to regenerate data within small intervals). On the other hand, small intervals mean more PEKSs will need to exist to cover the space of the private encryption key. And the smaller and smaller a PEKS interval becomes the closer the number of PEKSs start to resemble our private encryption key size as a whole because the size of each slice will be approaching that of individual data elements. And—as before—there will not be enough memory to hold all the PEKSs when they number almost as many as the number of overall data elements in the private encryption key—especially for larger substrings. Therefore, the PEKS interval should be set to a value where encryption or decryption operations are virtually unnoticeable by users yet not allow for the number of PEKSs to grow more than can reasonably be placed into a device's memory. The interval size can be determined by trial and error when anonymizing for a particular set of devices (including making worst case assumptions if the set of anticipated devices is very diverse). For example, starting with an interval size of 10,000 and adjusting from this value would be a good start. On our standard computers, we used 10,000 and had good results, as will be discussed later in this document.

Our key re-generation methodology works as follows. Recall that during our earlier anonymization approaches (e.g. Sections 27.3a and 27.4a), we set the PRNG once in the beginning of the anonymization routine and never set it again during the loop which assigns the random numbers 1-3, i.e. the Groups, to the plaintexts. We modify the anonymization routine to now set the PRNG when the loop is about to process the next PEKS worth of data. That is, starting with the first plaintext value in our plaintext universe (which would represent the start value of the first PEKS), whenever the anonymization loop iterates over the start of some PEKS in the universe, the routine will re-seed the PRNG with that plaintext value—i.e., re-seed it with the start of that PEKS. At each loop iteration, the re-seeded PRNG will generate a particular sequence of values 1-3 to assign plaintexts to Groups. And the expectation is that whenever that PEKS needs to be regenerated in the future on the same or different device (i.e. on other servers, smartphones, etc.—wherever our proxy is installed), re-seeding the PRNG with the same PEKS start value should generate the same sequence of values 1-3 for assigning plaintexts to Groups.

Note, it's very important to point out that if, in fact, PRNG behavior is not the same on every device (e.g. the random numbers 1-3 would not be generated in the same sequence on different devices even if the PRNG is re-seeded with the same PEKS values on that device), then our methodology will need to provide a PRNG. Meaning, our proxy will incorporate code or an appropriate open source library which will expose standard, accepted computer science randomization techniques to create a PRNG with seeding capability. And our seeded PRNG will be programmed such that the same seed will generate the same sequence of numbers 1-3 on any devices where it operates. In other words, instead of relying upon the Operating System of a device to provide the PRNG we will provide our own. And it should behave the same way on all devices since its code will be transferred with our compiled proxy.

Let's illustrate at high level how we can construct the smaller private encryption key. We first show the basic steps to create the key, and afterwards we will describe these mechanics in more depth.

1. Chose a PEKS interval size (a balance between creating small PEKS intervals which can be easily regenerated versus having too many small PEKSs so that the private encryption key doesn't fit into memory. For example, start with 10,000 and adjust from there, as discussed before).
2. The anonymization routine goes into a loop over the entire sorted plaintext universe. For each iteration:
   a. The routine keeps track of which PEKS the loop is currently in.
   b. If the plaintext element in the current iteration is the start of a PEKS, then the anonymization routine will seed the PRNG with that plaintext element.
   c. The routine will now generate a random number 1-3 and assign the plaintext element to that Group # (i.e. 1-3).
      i. If it's the first time that a plaintext element has been assigned to a Group in the current PEKS, the routine will flag that particular plaintext element for that Group. It will need to be recorded in our private encryption key in step 5 below.
3. The routine segregates the assigned plaintext elements from step 2(c) above into their separate Groups.
4. The routine randomly divides a sorted plaintext universe into three contiguous sections to correspond to the sizes of the three Groups from step 3 above. The routine then assigns the proper section to each Group as the encrypted values of that Group.
5. The routine now creates the private encryption key. For each unique PEKS encountered during the looping over the plaintext universe, the routine:
   a. Records the plaintext start of each Group and its corresponding encrypted value. (And if no plaintext value was ever assigned to that Group by the routine then it can record, for instance, "N/A")
   b. Records the plaintext value from step 2(b) which is the seed for the PRNG (which is also one of the plaintext values from step 5(a)).
   c. Records the PEKS # and Group # associated with each of the plaintext values recorded in step 5(a).

Let's now describe the above anonymization steps in more depth and provide an example. Imagine we want to convert the private encryption key for the plaintext universe of FIG. 14 above into a smaller private encryption key. Imagine our PEKS interval is length 5, for illustration. This means that each private encryption key slice represents 5 plaintext values. In this case, our anonymization routine would therefore re-seed the PRNG with the 1$^{st}$, 6$^{th}$, 11$^{th}$, 16$^{th}$, etc. plaintext values (i.e. every 5 data elements) during the loop iteration over the plaintext universe, generating random values 1-3 based on that seeded PRNG. Looking at FIG. 15, our anonymization routine would then re-seed the PRNG with values "a" when the loop iterates over the first string in the plaintext universe; "ab" when the loop iterates over the 6$^{th}$ string in the plaintext universe; "aca" when the loop iterates over the 11$^{th}$ string in the plaintext universe; and so on. (It should be pointed out that from an implementation perspective, a PRNG can only be seeded with numbers; therefore seeding the PRNG with a "string" can be accomplished by simply converting the string into some number using a defined algorithm. For example, the algorithm could convert the string into its ASCII equivalent on a character-by-character basis and the resulting long number could be used as the numerical seed for the PRNG; the string could be hashed with an algorithm such as SHA256 and the result converted to a number to be used as the seed. And so on).

We will also need to modify our anonymization routine such that for each start of a new PEKS, the routine will flag the first time a plaintext value has been assigned to each of the three Groups. We do this so that we can subsequently rebuild our PEKS, as will be discussed below.

Let's continue with our example and rebuild the private encryption key for FIG. 14. Suppose, as before, beginning with the start of each PEKS which is used to re-seed the PRNG, the anonymization routine assigns each plaintext value to Groups 1-3 within that PEKS. Imagine FIG. 15 is actually the resulting assignment. For illustration reasons, let us assign superscripts in FIG. 15 to highlight the initial plaintexts of each Group in each PEKS that our routine will now be flagging. The result would now be FIG. 23 below. (In terms of the assigned superscripts legend below, a superscript of "1" represents the first time a plaintext was assigned to Group 1 in a PEKS; a superscript of "2" represents the first time a plaintext value was assigned to Group 2 in a PEKS, and the superscript of "3" represents the first time a plaintext value was assigned to Group 3 in a PEKS. Note that if there are no plaintext values assigned to a particular Group in a PEKS then a string with its superscript will not be present in that PEKS).

FIG. 23

| Plain-text | Group | Plain-text | Group | Plain-text | Group | Plain-text | Group | Plain-text | Group |
|---|---|---|---|---|---|---|---|---|---|
| $a^1$ | 1 | abc | 2 | $bab^3$ | 3 | bcb | 1 | $cba^3$ | 3 |
| $aa^2$ | 2 | ac | 3 | $bac^1$ | 1 | $bcc^1$ | 1 | cbb | 1 |
| $aaa^3$ | 3 | $aca^3$ | 3 | bb | 3 | $c^2$ | 2 | cbc | 1 |
| aab | 2 | acb | 3 | bba | 1 | ca | 1 | $cc^1$ | 1 |
| aac | 3 | $acc^1$ | 1 | $bbb^1$ | 1 | caa | 2 | $cca^3$ | 3 |
| $ab^3$ | 3 | b | 3 | $bbc^3$ | 3 | cab | 2 | ccb | 1 |

-continued

FIG. 23

| Plain-text | Group | Plain-text | Group | Plain-text | Group | Plain-text | Group | Plain-text | Group |
|---|---|---|---|---|---|---|---|---|---|
| aba | 3 | ba | 1 | bc$^2$ | 2 | cac$^2$ | 2 | ccc$^2$ | 2 |
| abb$^2$ | 2 | baa$^2$ | 2 | bca | 2 | cb$^1$ | 1 | | |

Having properly tagged our PEKSs, we can now begin creating the private encryption key. Let us first segregate the plaintext values into their Groups and—just like in Section 27.3a previously—randomly assign the proper sorted subset of the plaintext universe to each Group as the encrypted values of that Group. The result will now be FIG. 24 below. (FIG. 24 is just like FIG. 18 but we maintain the superscripted values associated with the start of each Group in each PEKS to maintain the illustration).

GROUP 1

| Plaintext | Group | Encrypted |
|---|---|---|
| a$^1$ | 1 | b |
| acc$^1$ | 1 | ba |
| ba | 1 | baa |
| bac$^1$ | 1 | bab |
| bba | 1 | bac |
| bbb$^1$ | 1 | bb |
| bcb | 1 | bba |
| bcc$^1$ | 1 | bbb |
| ca | 1 | bbc |
| cb$^1$ | 1 | bc |
| cbb | 1 | bca |
| cbc | 1 | bcb |
| cc$^1$ | 1 | bcc |
| ccb | 1 | c |

GROUP 2

| Plaintext | Group | Encrypted |
|---|---|---|
| aa$^2$ | 2 | ca |
| aab | 2 | caa |
| abb$^2$ | 2 | cab |
| abc | 2 | cac |
| baa$^2$ | 2 | cb |
| bc$^2$ | 2 | cba |
| bca | 2 | cbb |
| c$^2$ | 2 | cbc |
| caa | 2 | cc |
| cab | 2 | cca |
| cac$^2$ | 2 | ccb |
| ccc$^2$ | 2 | ccc |

GROUP 3

| Plaintext | Group | Encrypted |
|---|---|---|
| aaa$^3$ | 3 | a |
| aac | 3 | aa |
| ab$^3$ | 3 | aaa |
| aba | 3 | aab |
| ac | 3 | aac |
| aca$^3$ | 3 | ab |
| acb | 3 | aba |
| b | 3 | abb |
| bab$^3$ | 3 | abc |
| bb | 3 | ac |
| bbc$^3$ | 3 | aca |

-continued

GROUP 3

| Plaintext | Group | Encrypted |
|---|---|---|
| cba$^3$ | 3 | acb |
| cca$^3$ | 3 | acc |

We can now construct the private encryption key. Using the flags/superscripts of FIG. 22 and the encrypted values from FIG. 24—for each distinct PEKS, our anonymization routine will record the plaintext start of each Group and its corresponding encrypted value. And if no plaintext value was assigned to that Group in that PEKS then nothing would be recorded (e.g. we would record "N/A" for instance). Further, for each PEKS the anonymization routine records which of the three plaintext values just recorded is the seed for the PRNG (which is needed to subsequently rebuild that PEKS). Finally, we also record the PEKS # and Group # to more easily do lookups for encryption/decryption purposes. Therefore, the following table (FIG. 25) would be created by our anonymization routine in this step (the superscripts are again preserved for illustration):

FIG. 25

| PEKS # | Group | Plain-text | Seed | En-crypted | PEKS # | Group | Plain-text | Seed | En-crypted |
|---|---|---|---|---|---|---|---|---|---|
| 1 | 1 | a$^1$ | Yes | b | 5 | 1 | bbb$^1$ | Yes | bb |
| 1 | 2 | aa$^2$ | No | ca | 5 | 2 | bc$^2$ | No | cba |
| 1 | 3 | aaa$^3$ | No | a | 5 | 3 | bbc$^3$ | No | aca |
| 2 | 1 | N/A | No | | 6 | 1 | bcc$^1$ | Yes | bbb |
| 2 | 2 | abb$^2$ | No | cab | 6 | 2 | c$^2$ | No | cbc |
| 2 | 3 | ab$^3$ | Yes | aaa | 6 | 3 | N/A | No | |
| 3 | 1 | acc$^1$ | No | ba | 7 | 1 | cb$^1$ | No | bc |
| 3 | 2 | N/A | No | | 7 | 2 | cac$^2$ | Yes | ccb |
| 3 | 3 | aca$^3$ | Yes | ab | 7 | 3 | cba | No | acb |
| 4 | 1 | bac$^1$ | No | bab | 8 | 1 | cc$^1$ | Yes | bcc |
| 4 | 2 | baa$^2$ | Yes | cb | 8 | 2 | ccc$^2$ | No | ccc |
| 4 | 3 | bab$^3$ | No | abc | 8 | 3 | cca$^3$ | No | acc |

Figure 25:
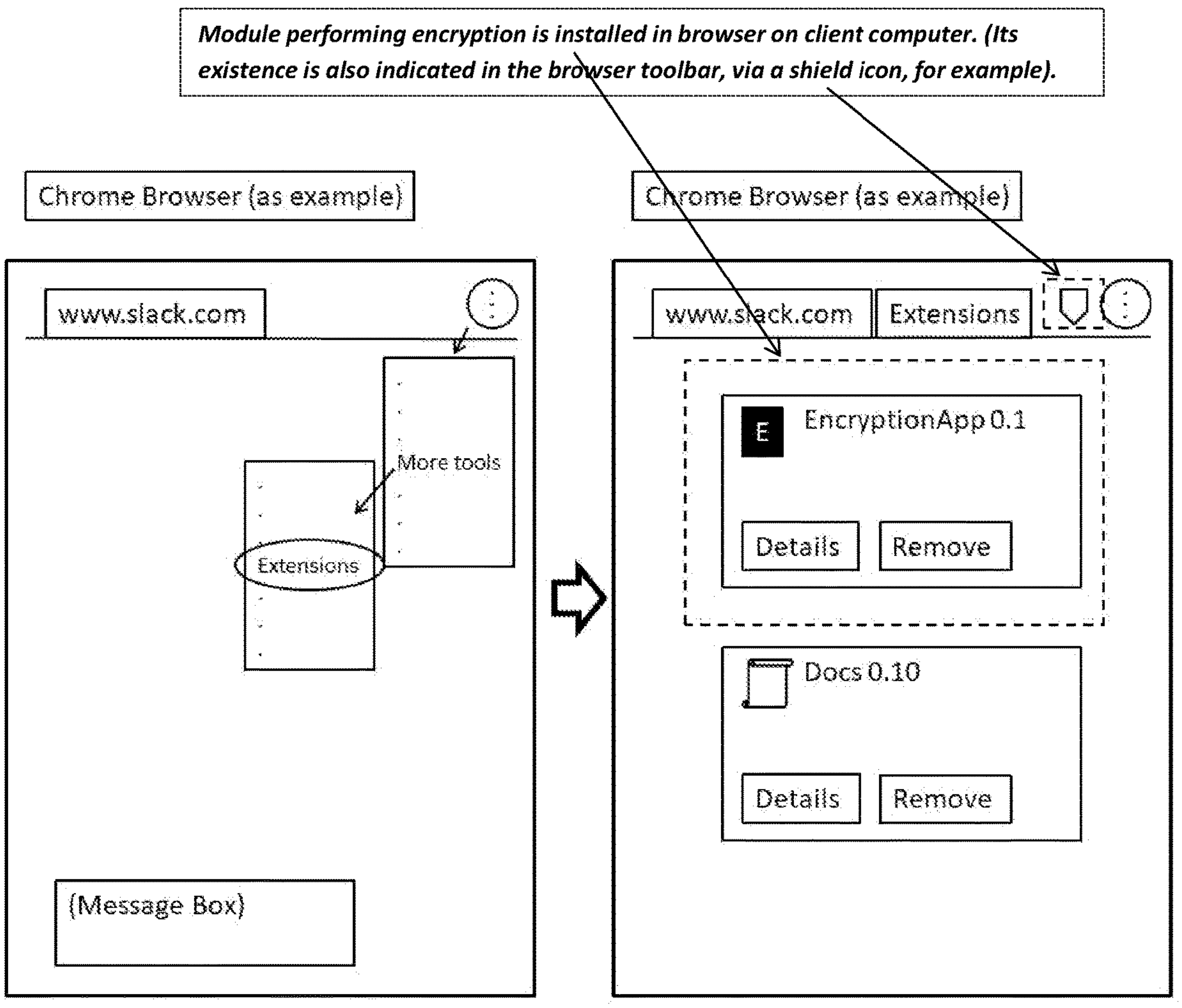
FIG. 25 is a depiction of how the encryption module is installed in the browser. The illustration on the left prepares the browser for installing the encryption module (for example, opens up the browser tab where extensions are to be installed). The illustration on the right shows that an encryption module (such as a "browser extension") has been installed into the browser.

FIG. 25 represents our final modified private encryption key. Notice now how the storage required for this key is less than when the private encryption key included all possible plaintext values (for instance as in FIG. 18. Moreover, if we wish we can make the size of FIG. 25 even smaller. We can remove the columns "PEKS #" and "Group #" from the Figure since the structure of this private encryption key is fixed. Each PEKS contains three sequential records, one for each Group—so that the "PEKS #" and "Group #" columns can be readily understood during execution time, if required).

27.5b. Abridged Private encryption key Encryption. Let's now examine how we do encryption with this abridged key. As before, we first provide the basic sequence of steps involved for reference and then describe the particulars of the methodology in more depth and give an example.

1) Whenever a plaintext argument needs to be encrypted, the encryption routine will loop over all the PEKS #s within the private encryption key. For each PEKS # the encryption routine will:
   a. Identify the next higher PEKS #.
   b. For the current, i.e. lower PEKS # as well as the higher PEKS #, obtain their seeds from the private encryption key.
   c. Check if the plaintext value to be encrypted falls between the seed of the lower PEKS # and the seed of the higher PEKS #.

d. The loop will stop when the plaintext argument is bound between the seed of some lower PEKS # and the seed of its next (i.e. higher) PEKS #.

2) The encryption routine seeds the PRNG with the seed of the lower PEKS # to help begin rebuilding that PEKS.

3) To rebuild the interval the encryption routine records in memory the associated three plaintext and encrypted starting values for Groups 1, 2, and 3 from the private encryption key for that PEKS.

4) The routine loops between the seeds of the PEKS #s obtained in step 1(d) above. For each loop iteration, the routine:

a. Generates random value 1-3 (as per the PRNG just seeded in step 2 above).

b. Places the plaintext value of the loop iteration into that Group (i.e. 1-3).

c. The encryption routine obtains the encrypted value for the current plaintext value as follows:

i. If this is the first plaintext value encountered for a Group, the encrypted value is obtained by simply accessing the first encrypted starting value that was placed into that Group in step 3 above.

ii. If this is not the first plaintext value for a Group, the encrypted value is obtained by incrementing the last encrypted value in the Group by "1" (i.e. taking the next lexical value after the last encrypted value in the Group as the encrypted value of the current plaintext value).

5) The loop of step 4 continues until the user's desired plaintext argument equals the plaintext value of the loop iteration. At this point the encryption routine:

a. Generates random value 1-3.

b. Places the plaintext value into the corresponding Group.

c. Obtains the encrypted value of the plaintext value by following step 4(c) above.

d. Returns the encrypted value obtained to the client as the encrypted value of the user's original argument.

Let us now describe these steps in more details.

Whenever a plaintext argument needs encryption, the proxy will first search through the FIG. 25 private encryption key. It will find those plaintext values which are the seeds in each PEKS; and it will find the two next-to-each-other PEKSs the "seed" values of which bound the user's plaintext argument between them. That will identify the slice in which our plaintext value lives.

Next, our encryption routine will need to seed the PRNG with the seed of the lower PEKS #. This is the interval that will need rebuilding. To rebuild the interval, the routine will first record in memory the three plaintext and encrypted starting points for Groups 1, 2, and 3, as recorded beforehand in that PEKS #. (See examples of these starting values in FIG. 25). The encryption routine will then start a loop to iterate between the plaintext seed values of the lower and upper PEKSs identified. For each loop iteration the routine will generate a random value 1-3 (as per the PRNG now seeded with the seed of the lower PEKS #). The plaintext value of each loop iteration will be placed into the Group # as indicated by the random number. (And the expectation is that either with the Operating System PRNG or our methodology's own PRNG, the sequence of random numbers for the PEKS would be the same as it was during the original anonymization. In other words, the sequence of random numbers for this PEKS would be the same as before). At the same time, the encrypted value for the plaintext value of the iteration is created by just incrementing the latest encrypted value in that Group by "1". The next string in lexical order compared to the last encrypted string in that Group becomes the encrypted value for the current plaintext value. Incrementing by "1" is correct because, as per the construction of our private encryption key during anonymization, using normally sorted sections, on a per-Group basis—the encrypted values are simply strictly incrementing strings without any gaps between them. We are therefore mimicking the same process here when "encrypting".

The loop above continues, and the table in memory—the PEKS—is gradually built up until the desired plaintext value (the user's plaintext argument)—is found. At that point, the routine generates the random number 1-3 one last time, places the plaintext value into the corresponding Group, finds the associated encrypted value (e.g. the next lexical value (incremented by "1")) in that Group, and returns that value as the encrypted value to the client. The user's argument has now been encrypted.

Let's examine an example to see how this practically works. Imagine the user issues the following request:

SELECT*FROM Table1 WHERE Column1="bc"

The proxy intercepts the request and sees that it needs to encrypt argument "bc". The proxy needs to find and rebuild the right PEKS to do the encryption. Therefore, first the encryption routine loops over all the PEKSs in the private encryption key (e.g. in FIG. 25). For each PEKS, it finds the seed for the PRNG in that PEKS # and the seed of the next PEKS #. (Unless it's the last PEKS, in which case the last plaintext value in the universe is used). The routine determines whether the user's plaintext argument falls between these two seed values, and if yes, the PEKS has been found; it's the lower PEKS.

Therefore, in our example, with the user's argument of "bc", as per FIG. 25, the encryption routine starts with PEKS #1 and its seed value of "a" and with PEKS #2 and its seed value of "ab". Since the user's argument "bc" doesn't fall between "a" and "ab" the encryption routine goes to the next iteration. For PEKS #3, the seed value is "aca". Since the user's "bc" does not fall between "ab" (the seed value of PEKS #2) and "aca" (the seed value of PEKS #3), the encryption routine goes to the next iteration. For PEKS #4 the seed value is "baa". The user's argument "bc" again doesn't fall between "aca" (the seed value of PEKS #3) and "baa" (the seed value of PEKS #4). Therefore, the routine goes to the next iteration. For PEKS #5 the seed value is "bbb". The user's argument "bc" again doesn't fall between "baa" (the seed value for PEKS #4) and "bbb" (seed value for PEKS #5). The loop goes to the next iteration. For PEKS #6 the seed is "bcc". Finally, the user's argument "bc" does fall between "bbb" (the seed for PEKS #5) and "bcc" (the seed for PEKS #6). The loop stops: the routine has found the PEKS that needs rebuilding—it's PEKS #5.

Now the routine choses "bbb"—the seed value of the lower PEKS # (PEKS #5)—to seed the PRNG; and the routine starts to rebuild the slice. First, the encryption routine creates a new table in memory where it places the initial plaintext and encrypted values for all three Groups of this PEKS. They will represent the base on which the table, the PEKS, will be built. Therefore, as per FIG. 25, for Group 1 we place the initial plaintext "bbb" and its initial encrypted value "bb" into Group 1. For Group 2, we place the initial plaintext value "bc" and its initial encrypted value "cba" into Group 2. And for Group 3, we place the initial plaintext value "bbc" and its initial encrypted value "aca" into Group 3. Next, the routine loops through the plaintext values between the seeds of PEKS #5 and PEKS #6—"bbb" and "bcc", respectively. At each loop iteration, the routine generates the random number 1-3 (per the now re-seeded PRNG) to assign the plaintext value of the iteration to that corresponding Group.

Therefore, continuing with the example we have been following above we will get the following results. Starting with "bbb", the first iteration in the loop, the random number generated by the PRNG will be 1—as per FIG. 22 (since the PRNG seeded in the same way should generate the same sequence of random numbers). Therefore "bbb" will be assigned to Group 1. And as for its encrypted value, as per the initial table that was set up in memory, its encrypted value will be the initial encrypted value we set for Group 1, i.e. "bb". We now check whether the plaintext value of the loop iteration is our user's desired plaintext argument. Since "bbb" does not equal "bc", respectively, we have not found the user's plaintext. The routine goes to the next iteration. This is plaintext string "bbc". The routine generates a random value 1-3, and must find it to be 3, as per FIG. 22 (since again the PRNG is expected to behave identically). Therefore, the routine places "bbc" into Group 3 in our PEKS in memory. We must also obtain its encrypted value. This is value "aca" because "aca" is the initial encrypted value stored for Group 3 in the PEKS table that we set up and this is the first time we are inserting into Group 3. Again the encryption routine checks whether the plaintext value for this loop iteration is the same as the user's argument. Since "bbc" does not equal "bc", respectively, we go to the next loop iteration—plaintext "bc". The routine generates a random value and must find it to be 2, as per FIG. 22. The routine therefore places "bc" into Group 2. The routine needs to find the corresponding encrypted value; and as per our initial PEKS table in memory we see that this value is "cba"—as this is our first placement into Group 2. Once again the routine checks for plaintext equality. We see that our current loop iteration plaintext "bc" does equal the user's argument "bc". Therefore, the loop stops as we have found the user's argument. The routine can now return the encrypted value of "bc", "cba"—which we just identified in the last step—to the client as the encrypted value of the user's argument.

27.5c. Abridged Private encryption key Decryption. We now describe how to do decryption with our abridged private key. It is somewhat similar to the encryption example above. Again, we show the basic steps for reference purposes followed by a more in-depth discussion and an example.

1) Whenever an encrypted value needs to be decrypted, the decryption routine will loop over all the PEKS #s of the private encryption key in memory. For each PEKS # the decryption routine will:
   a. Loop over Groups 1, 2, and 3. For each Group, the routine will:
      i. Check whether the encrypted values of the current (i.e. lower) PEKS # and the next higher PEKS # for the Group bound the user's encrypted argument.
      ii. The loop of step 1(a) stops if for one of the 3 Groups, the encrypted values bind the user's argument (i.e. the encrypted value falls in the interval).
   b. The overall loop of step 1 stops once a lower PEKS # and next higher PEKS # are found satisfying the condition in step 1(a)(ii).
2) The decryption routine seeds the PRNG with the seed of the lower PEKS # from step 1(b). The routine will now attempt to rebuild that PEKS.
3) To rebuild the PEKS the routine records in memory the associated three plaintext and encrypted starting values for Groups 1, 2, and 3 obtained from the private encryption key.
4) The decryption routine obtains the seeds for the lower and upper PEKSs which bind the encrypted value from step 1(b) above.
5) The routine loops between the plaintext seeds of step 4. For each loop iteration and associated plaintext value, the routine:
   a. Generates random value 1-3 (as per the PRNG seeded in step 2).
   b. Places the plaintext value of the iteration into that Group #.
   c. The routine finds the encrypted value for that plaintext value. This is done as follows:
      i. If this is the first plaintext value in the Group, the encrypted value is obtained by simply accessing the first encrypted starting value that was placed into that Group in step 3 above.
      ii. If this is not the first plaintext value, the encrypted value is obtained by incrementing the last encrypted value in the Group by "1" (i.e. taking the next lexical value after the last encrypted value in the Group as the encrypted value of the plaintext value).
6) The loop of step 5 continues until the requested encrypted argument equals the encrypted value in the loop iteration. At this point the decryption routine simply returns the plaintext value of the loop iteration to the client—as was obtained in step 5—as the decrypted value of the requested encrypted argument.

Let us look at these steps in detail. Given a ciphertext that needs to be decrypted for the user, the decryption routine looks at the encrypted values in each PEKS and the succeeding PEKS to see which pair of PEKSs provides the maximum and minimum encrypted values between which our encrypted value falls. Note, this search must be done on a per-Group basis to ensure we find the encrypted value in any part of the PEKS. (That is, for PEKS X and PEKS X+1, we compare whether our encrypted value falls between the Group 1 encrypted values of PEKS X and PEKS X+1; or it falls between the Group 2 encrypted values of PEKS X and PEKS X+1; or it falls between the Group 3 encrypted values of PEKS X and PEKS X+1. If any one of these is true, we have found our PEKS). Then we must rebuild the identified lower PEKS to find the plaintext value we seek. To rebuild the PEKS, the routine takes the plaintext seed of the lower PEKS # and seeds the PRNG with it. The routine also initializes a table in memory with the starting plaintext and encrypted values for each Group for that PEKS obtained from the private encryption key. This will form the base of our PEKS that will be rebuilt.

We now do almost exactly as in Section 27.5b above. We loop over the entire plaintext interval (e.g. between the seeds of the lower and the upper PEKS #s) and build our PEKS in memory one tuple of plaintext and encrypted values at a time. Once we find the encrypted value we seek the loop stops. The plaintext value associated with that encrypted value is returned to the client as the plaintext value for the encrypted argument sent from the server.

Let's examine at an example. Imagine we get the encrypted value "abb" from the server, and we need to decrypt it. We start our loop with PEKS #1 and PEKS #2 (in FIG. 25), the initial PEKSs in our private encryption key. We need to find the PEKS in which our encrypted value "abb" lies. We look at boundaries on a per-Group basis. For Group 1, since the value for PEKS #2 is undefined (in FIG. 25), there is no comparison to make for Group 1, so we skip Group 1 analysis here. For Group 2, we check whether "abb" falls between the Group 2 encrypted values recorded for PEKS #1 and PEKS #2, "ca" and "cab", respectively. Since "abb" doesn't fall between these values we now look at Group 3. For Group 3, we check whether "abb" falls between the Group 3 encrypted values for PEKS #1 and PEKS #2, "a" and "aaa", respectively. Since it doesn't fall between them, we move to the next loop iteration. Now we explore the interval between PEKS #2 and PEKS #3—again checking boundaries on a per-Group basis. Because Group 1 for PEKS #2 is again undefined (in FIG. 25), we again skip Group 1 analysis here. For Group 2, because PEKS #3 for Group 2 is also undefined we also skip Group 2 analysis here. For Group 3, we check whether the encrypted argument "abb" falls between the Group 3 encrypted values for PEKS #2 and PEKS #3, "aaa" and "ab", respectively. Since it doesn't we move to the next loop iteration, PEKS #3 and PEKS #4. Again on a per-Group basis, for Group 1, we check whether "abb" falls between the Group 1 encrypted values of PEKS #3 and PEKS #4, "ba" and "bab", respectively. Since it doesn't we look at Group 2 values. However, for Group 2, because PEKS #3 for Group 2 is undefined, we skip Group 2 analysis here. For Group 3, we check whether "abb" falls between the Group 3 encrypted values for PEKS #3 and PEKS #4, "ab" and "abc", respectively. It does fall between them. Therefore, the loop stops and we've found our PEKS—it's PEKS #3.

We now rebuild the interval. The routine takes the lower PEKS #, PEKS #3, and finds its plaintext seed—the seed values is "aca". The PRNG is seeded with it. The routine now examines all the encrypted values in this PEKS, seeking our encrypted value. The routine creates a new PEKS table in memory with the initial plaintext and encrypted values for each Group—as described in Section 27.5b—which will be the starting points for rebuilding the interval. Therefore, continuing our example, for Group 1 we set up the initial plaintext value "acc" and its corresponding initial encrypted value as "ba" in this Group in memory. Group 2 is undefined for PEKS #3 so we don't create any information for it. (Meaning that no plaintext values were assigned to that Group during anonymization of that PEKS so there is no possibility of Group 2 being "rebuilt"). For Group 3, we create an initial plaintext value of "aca" and the initial encrypted value of "ab" for this Group in memory.

The routine now loops from the seed plaintext value for PEKS #3, "aca", to the seed value for PEKS #4, "baa", looking for our encrypted argument. We generate our first random number—and as per FIG. 22 it must be 3 (again assuming that the PRNG will produce the same sequence of random numbers as during anonymization). Therefore, the plaintext value "aca" is placed into Group 3. Further, the first encrypted value from Group 3 from our PEKS table in memory, "ab", is now assigned to "aca" as the encryption of "aca". Now we need to check if we've found our encrypted argument. We check if "ab" is equal to our requested encrypted argument "abb". Since it doesn't the routine goes to the next loop iteration and rebuilds another tuple. The next iteration is plaintext "acb". The routine calls the random number generator—and it must obtain 3 here (via the seeded PRNG), again as per FIG. 22 above. The routine places plaintext "acb" into Group 3, and calculates the next encrypted value for that Group. Since an encrypted value already exists in Group 3, to calculate the next encrypted value in the list the routine simply takes the immediate next lexical string compared to the last one for Group 3. Since the last one is "ab", the next string will be "aba". Therefore, "aba" is assigned as the encrypted value of "acb". We check whether we have found our encrypted argument. Since "aba" does not equal "abb" we continue iterating. The next loop iteration is plaintext "acc". The routine calls the random number generator—and it must obtain 1, as per FIG. 22 above. The routine therefore places plaintext "acc" into Group 1. Since this is the first value in that Group, we obtain its corresponding encrypted value by using the encrypted value the table was initialized with for Group 1, "ba". We check for encrypted argument equality. Since "ba" is not equal to our encrypted value "abb" the routine continues iterating. The next iteration is plaintext value "b". The routine calls the random number generator—and it must obtain 3, as per FIG. 22. The routine therefore places plaintext "b" into Group 3, and needs to obtain its encrypted value. Again, since this is not the first encrypted value in the Group 3 list, the routine calculates the next encrypted value in Group 3. The encrypted value is the string immediately lexically after the last encrypted string in Group 3. The last string was "aba", therefore the next value is "abb". Therefore, "abb" becomes our encrypted value for plaintext "b". We again check for encrypted argument equality. Since the encrypted value just obtained, "abb", equals our encrypted argument "abb", the loop stops; we have found our encrypted argument. We return the plaintext value associated with "abb"—which from our table we just found to be "b"—back to the client. This is the decryption of the value sent by the server.

27.5d. Other Queries. Reducing the size of the private encryption key simply reduces the encryption key size. The transformation of plaintext SQL queries to encrypted queries remains the same. We encrypt and decrypt arguments using the new smaller key by regenerating the relevant PEKSs; but the methods for query transformation described throughout this document remain unchanged.

27.6 Using Multiple Groups for Encryption. Let us finally now explain the security of our scheme. The key security our scheme provides compared to other order-preserving schemes existing today is a good defense against a global ordering attack, as defined at the outset of this document. This is done via our created multiple Groups. In most other security respects our scheme is quite similar to other order-preserving encryption schemes which exist today. Let us understand how our scheme protects against a global ordering attack. When, in general, any typical order-preserving encryption is used and the entire plaintext space has been encrypted, re-identification of the encrypted data becomes something that can be done without very significant challenge. Consider the following example: the ages of students in elementary through high school. According to public sources, the typical age distributions for such students is 6 through 18. Suppose we wish to encrypt these students' age using order-preserving encryption to protect their privacy but not to interfere with sorting requests for such data from different applications. Regardless of what typical scheme we chose among today's order-preserving encryption schemes—if students of all possible ages are present in the data, this immediately could lead to a deciphering of all of the encrypted ages. An attacker—who might only have access to the encrypted data, not the plaintext data—could easily find out that typical students from elementary through high school are in fact in the age range of 6-18. This information would likewise be available from public sources. Afterwards the attacker can order the encrypted data set he has access to from smallest to highest encrypted value. He can do this because the encrypted data preserves sorting order. At this point, the smallest encrypted age value he sees would correspond to 6 because that is the smallest value in the "universe" of numbers 6-18, and that value must be present in the data set because all data values are present in the data, as we just stated above. The next largest encrypted age value he sees would correspond to age 7 as that is the second smallest number in the "universe" of numbers 6-18 and all data is present in the encrypted data set, again as we just stated. And so on. He can keep going until he locates the largest encrypted age value, which would correspond to age 18, which would be the largest of values in the "universe" of numbers 6-18, again because all plaintext data is present. Order-preserving encryption allows for this attack because it preserves global order, when all data is present, and these data can simply be re-identified by just ordering the data. The strength of the order-preserving encryption scheme itself plays no role here. As long as the routine is deterministic and preserves global order this attack can be mounted.

To prevent this kind of attack, our encryption scheme breaks up the encrypted values into multiple mutually exclusive Groups. Now ordering all values in a plaintext domain—a global ordering—would no longer possible as the data lives in multiple non-overlapping encrypted Groups. Therefore, no direct comparisons between different Groups could be done as they are "shifted" into different parts of the overall domain via our encryption. It would still be possible to order the values within their respective Groups, e.g. local order, but the attacker will not know the precise relationship between two elements in a single Group. He can see that one element is greater or less than another but he will not easily understand the plaintext "distance" between them. This is because the intervening values between these two values could be in the same or different Groups—as a result gaps are very difficult to surmise, and no precise statements can be made.

Furthermore, and recalling our comment at the start of this document about "configuring" security—if we want to make this scheme even more secure, we can break up the universe of plaintext and encrypted values across even more Groups. For example, we can make the number of Groups configurable. When we configure more than 3 Groups this will disrupt even more not only global ordering attacks but also local ordering attacks as "distances" between elements in a given Group will be even more and more difficult to understand. (And obviously the reverse would be true as well. We have discussed using three groups in this document, but even with three groups there is some complexity with our scheme, such as doing Sorting searches with multiple threads, etc. If our proxy administrator wishes, she can reduce the number of groups in our scheme to two. There will still be a good amount of security present but the scheme will be a bit less complex than as described within this document).

27.7 Format Preservation. Notice how the overall scheme described in this document preserves format. That is, the data type of our ciphertext is alpha—just like the data type of the plaintext is alpha. Further, the length is never longer than the plaintext value in all cases in all possible queries because the structure of our private encryption key limits the length of ciphertexts to the maximum length of all plaintext values. Hence, no data schema changes on the application server would be required to now store encrypted data. This is, again, an important distinction between our scheme and current order-preserving schemes. Other order-preserving schemes may or may not preserve data type during the encryption but they rarely preserve length, and ciphertexts are often longer in length than the maximum length of the plaintext values in the column. As a result, they might require data schema changes in different IT environments. And our scheme does not require such changes.

27.8 Other Data Types. For our scheme to handle other data types, like integers or dates, the approach would be quite similar to what we have been describing throughout this document. For example, for integers (or float, etc.), the anonymization routine of Section 27.3a (or Section 27.4a) would simply need to know that the plaintext universe is integers-only. The administrator of the proxy can input this or the proxy can perhaps recognize it automatically by using REGEX expressions and scanning some samples of input data. In either case, the proxy can then create a private encryption key based only on numbers. Length would be preserved, too, as again sections the plaintext universe would be assigned to our three Groups as the encrypted values of the plaintext values. Therefore, no encrypted value would ever fall outside of the length boundaries of the given plaintext universe. And of course the encryption would still be order-preserving because the sections assigned as the encrypted values would still be sorted, as before.

Similarly, dates could be treated just like numbers. (However, for dates there would be some restrictions. For example, the month of a date element can only range from 1-12. Therefore an encrypted month could also only range from 1-12 as opposed to say 0-99. Etc. These restrictions would be incorporated in our encryption key structure).

In all such cases, the format of the plaintext data would again be preserved in the encrypted data.

Lastly, the actual queries for numbers, dates, etc. (e.g. INSERT, BETWEEN searches, etc.) would be just as described in the preceding sections in this document as only the data types are changing. The query transformations themselves would not be changing.

27.9 Performance Considerations. We can now discuss the performance of our scheme. We have implemented, stress tested, as well as optimized the scheme as described in this document. That is, we have built our scheme using the various components described in this paper but implemented it to work faster using standard application optimization techniques. Specifically, we have created the PEKSs as above. But we have rebuilt the PEKSs using parallel threads as opposed to using a single thread. Using these different approaches the performance of our scheme was good. For example, working only with plaintext numbers (rather than strings), we had an original plaintext universe of 100,000,000 unique integers. We broke up our plaintext universe into 3 Groups, and we broke up our private encryption key into PEKSs encompassing 10,000 values each (i.e. interval size of 10,000). We simulated an application screen being sent from the server to the user having 1,000 rows and 10 individual columns—for a total of 10,000 encrypted values that must be decrypted for the user. In our implementation, the overall operation to decrypt and re-insert the 10,000 values back into the screen for the user to view —our overall "penalty" for adding our such security—took 100 ms. This is a reasonable overhead for such a security benefit.

Also notice that if it's ever required to improve our scheme's performance further caching can also be implemented. For example, if there are many decryptions to do (say a large screen is returned to the user with many values), data could be cached. Lookups within private encryption key tables would take less time, and time spent rebuilding certain PEKSs would no longer be required because the required data is directly cached. Processing could be sped up considerably.

27.10 Usage of Scheme in Other IT Contexts. We should also state here that the scheme as described in this document can be used in broader IT contexts. For example, the "application server" discussed throughout this document can actually be on the user's computer or mobile device when the desire is to protect an application and its data locally (e.g. on a laptop or a smartphone). Similarly, the "data" that is to be protected can exist in many forms. The data can be structured data stored in a traditional relational database (as all the examples in this document assume); it can be structured data stored within a collection of text files; it can be unstructured data stored in a public cloud-based Software-as-a-Service platform which hosts data in unstructured databases; etc. Moreover, in the same vein, although much of our document discussed the SQL language—depending on the form of the data to be protected, our scheme will also work with various other approaches for accessing/querying data. For example, queries based on XML, based on key-value pair lookups, and various other data access/query approaches would work with our scheme.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims.

EXAMPLE A

Browser Encryption Example

Referring now to FIGS. 25 through 34, a new approach for encrypting in the browser is provided.

The above disclosure provides an end-to-end encryption methodology system. Note that as per the disclosure, the end-to-end encryption methodology system doesn't undermine application functionality. As an example, we now utilize this end-to-end encryption system within the browser environment, to show how to secure website communications end-to-end. This also shows how the disclosure covers and supports the case of performing encryption and decryption within the browser itself.

A.1. The first step is to load the module performing the encryption (in the form, for example, of a "browser extension") into the browser. (Note that the browser is on the "client computer". And note that the disclosure describes encryption and decryption activities also happening on the "client computer"). The screen shots in FIG. 25 illustrate this step.

Figure 26:
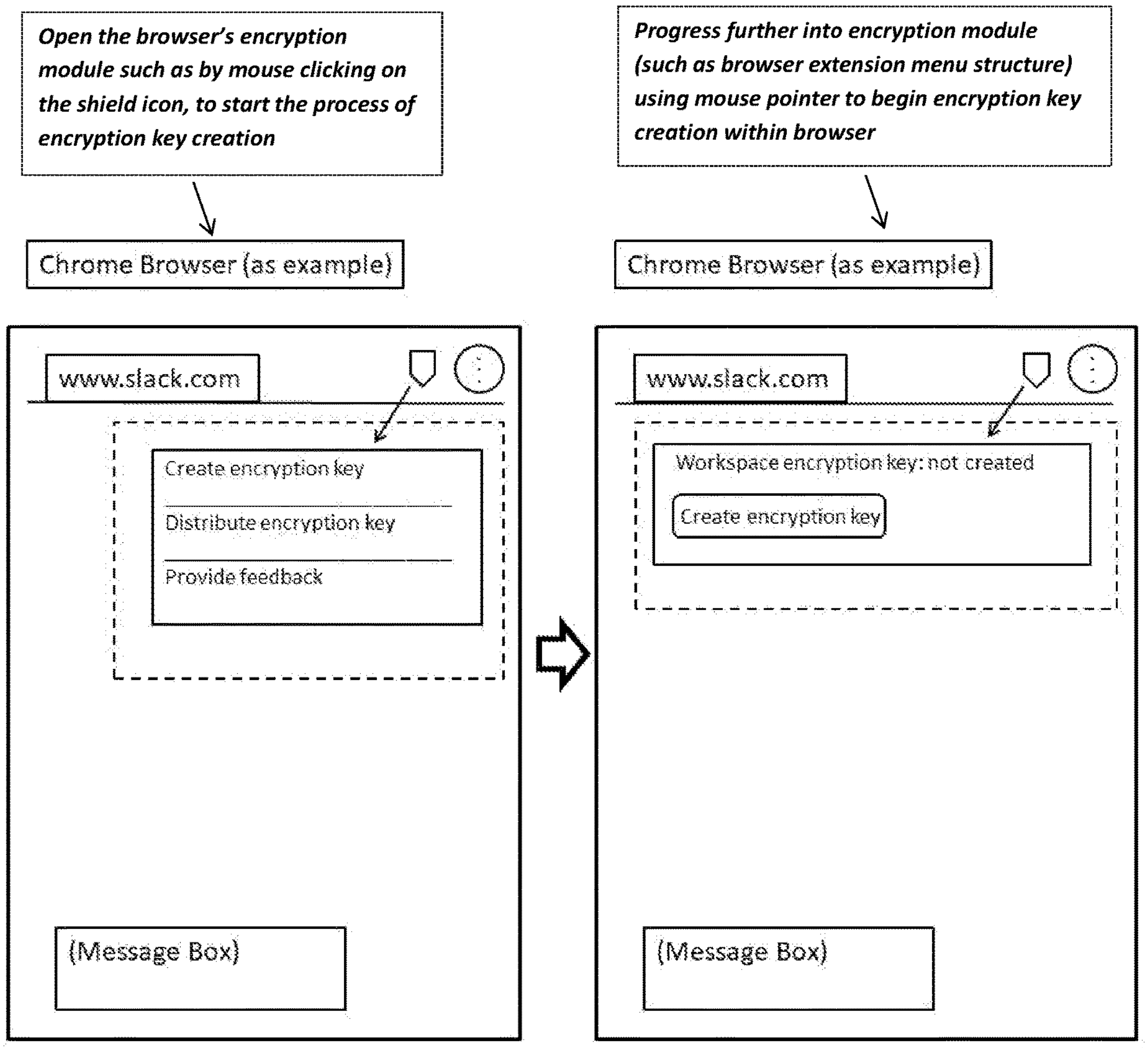
FIG. 26 is a depiction of how to create the encryption key in the browser. The illustration on the left opens up the encryption module (e.g. such as the main menu of the browser extension). The illustration on the right selects the appropriate encryption module feature to start creating the encryption key (e.g. such as the relevant menu item within the browser extension menu structure, to create the key).

A.2. The second step is to create the encryption key for the encryption system. This is done within the encryption module in the browser; and is illustrated in FIG. 26.

Figure 27:
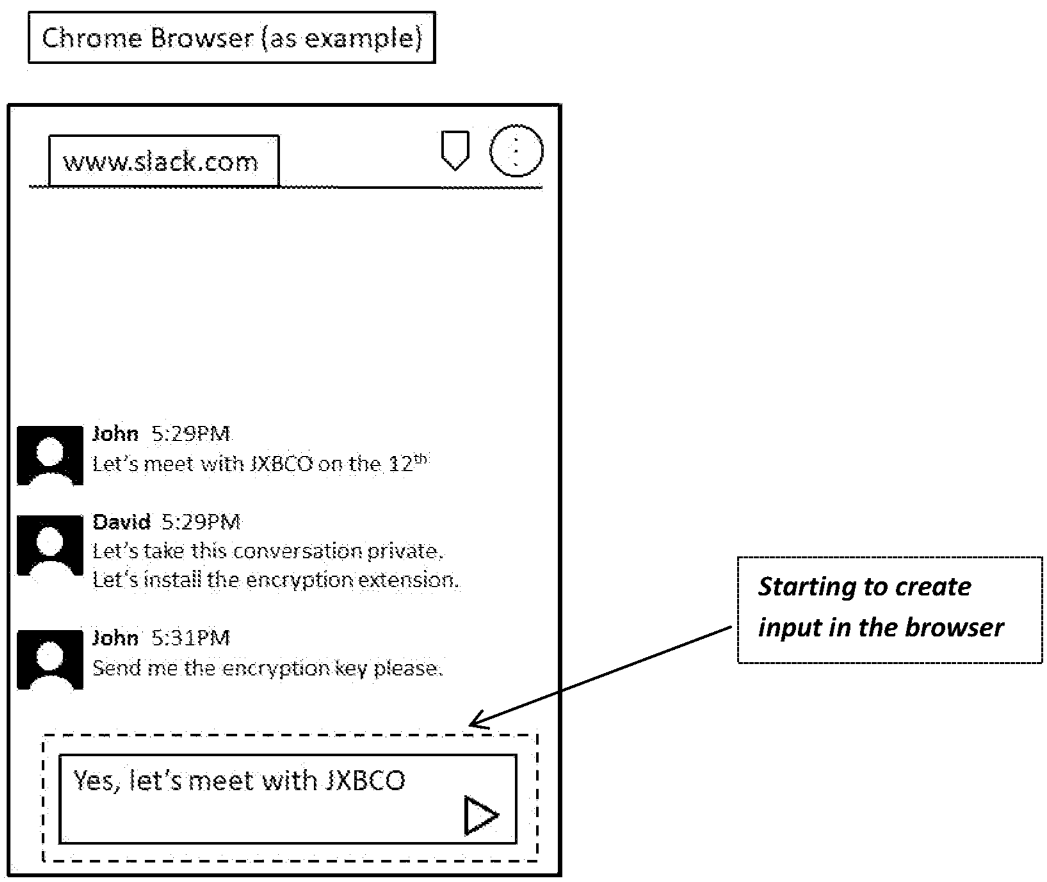
FIG. 27 is a depiction how a user starts to create data in the browser to send to the server.
Figure 28:
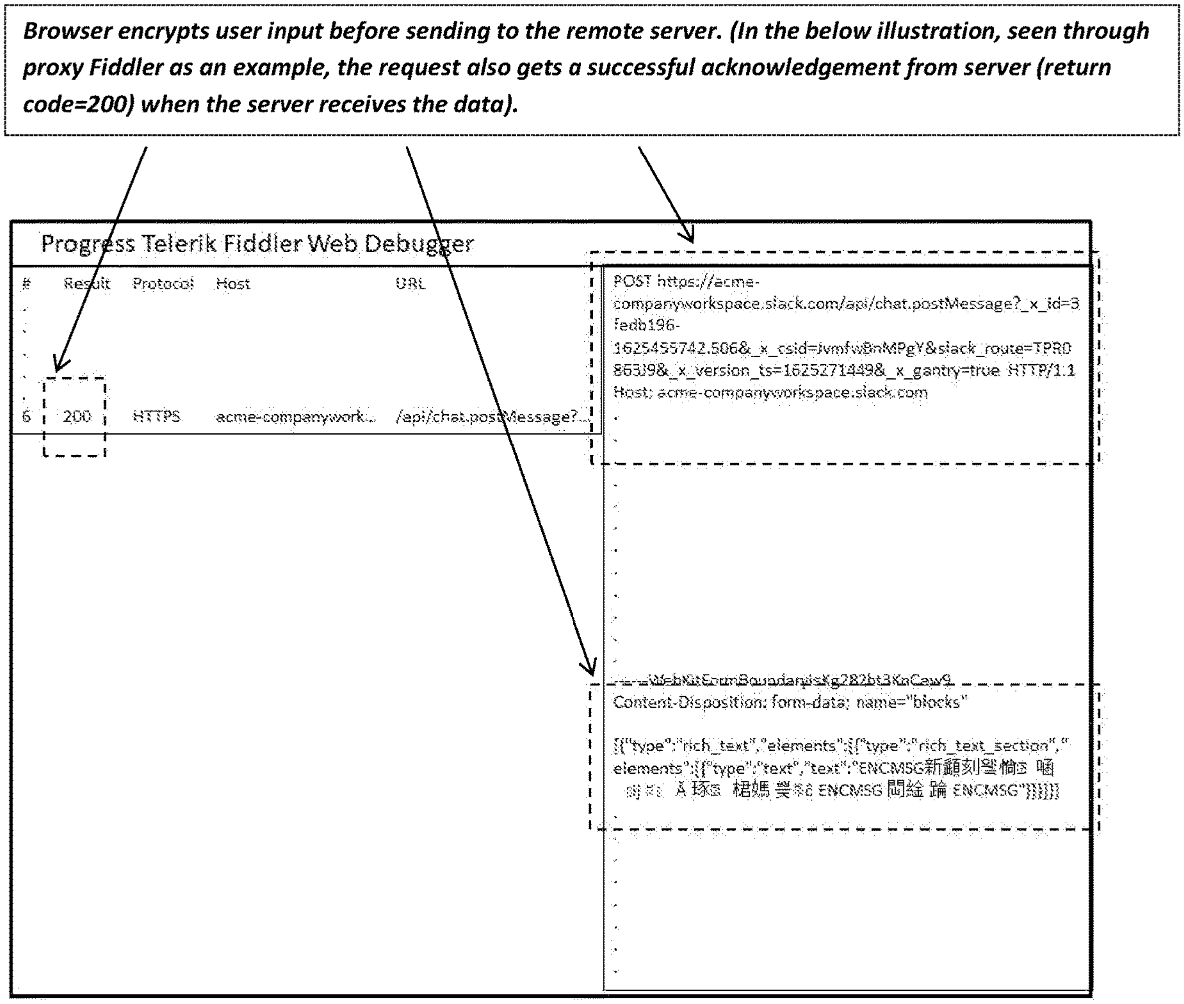
FIG. 28 is a depiction when the user completes his input, and how the user's input is first encrypted in the browser, by the encryption module, and then sent encrypted to the server.
Figure 29:
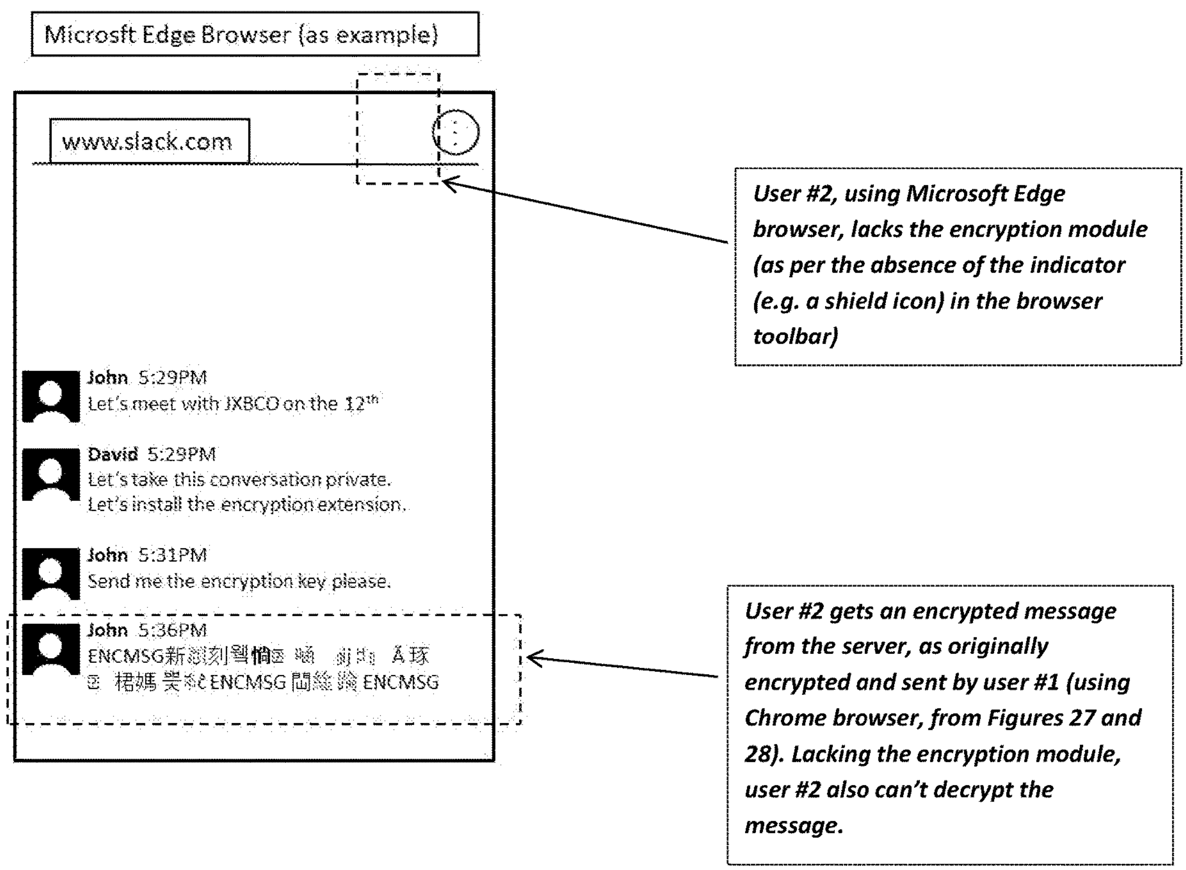
FIG. 29 is a depiction how the server forwards the received encrypted information to other recipients, and the information continues to be encrypted, as neither the server nor the recipients can decrypt it (as neither has the decryption module nor the encryption key).

A.3. The next step is, the browser encrypts information the when it's entered into the browser, before the information is sent to the server. This also means that when the server receives and sends this information to potentially other recipients, they too will get encrypted information since the server cannot decrypt the information. Moreover if recipients lack the encryption module—such as in their browsers—, they will also not be able to decrypt the received information. FIGS. 27-29 illustrate these concepts.

A.3.a. FIG. 27 illustrates how a user starts to create data in the browser to send to the server.

A.3.b. When the user completes his input, the user's input is first encrypted in the browser, by encryption module, and then sent encrypted to the server. This is illustrated in FIG. 28.

A.3.c. The server forwards the received encrypted information to other recipients, and the information continues to be encrypted, as the server cannot decrypt it. Moreover, the recipients' browsers also can't decrypt this information since they also don't have the encryption module in their browsers. This is illustrated in FIG. 29.

A.4. The next step is to generate a query in the browser, encrypt the query in the browser, and send the encrypted query to the server for processing. The below illustrations (FIG. 30-31) show this step. Note that steps A.4 and A.5 demonstrate an example of manipulating encrypted data without decryption as per the disclosure. Specifically, the search is done fully over encrypted data, without decryption (as required).

Figure 30:
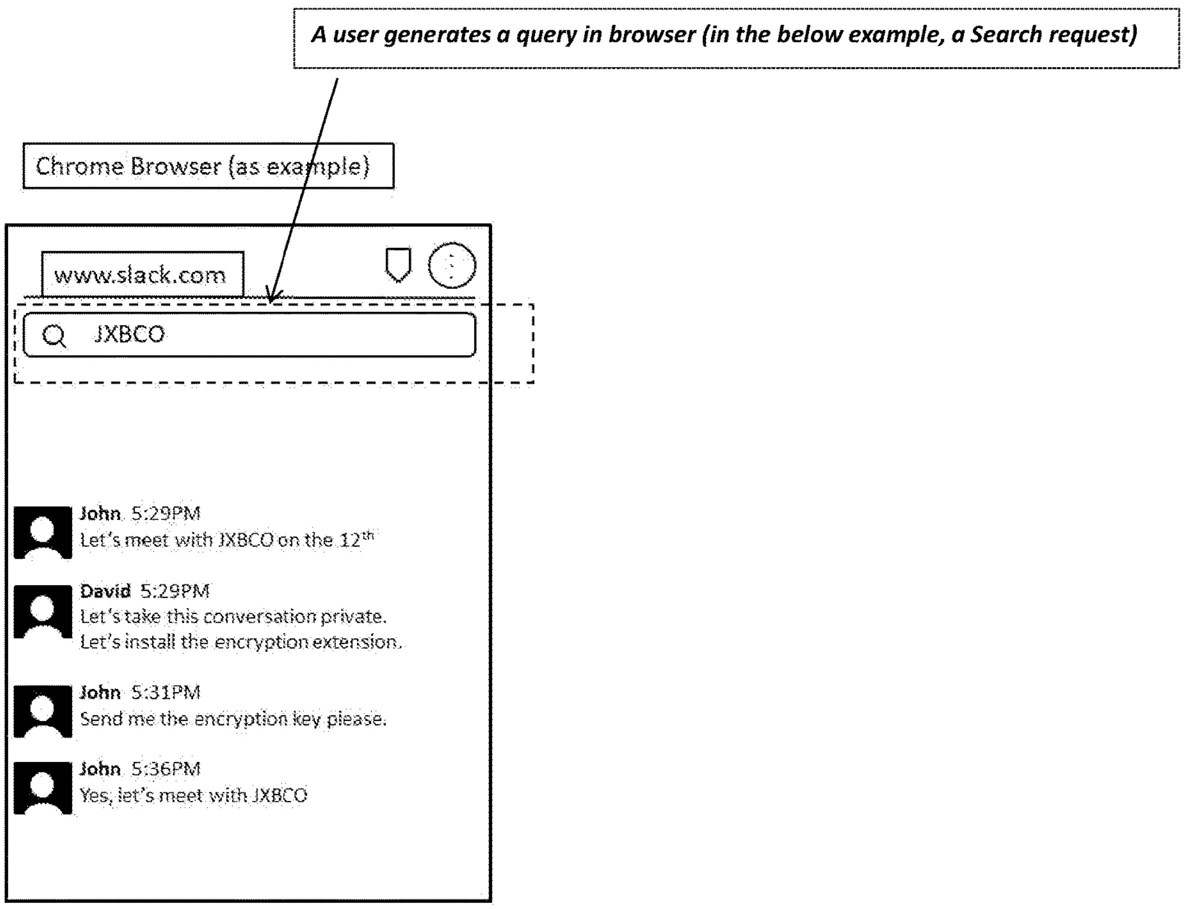
FIG. 30 is a depiction of how to generate a query in browser.

A.4.a. FIG. 30 shows how to generate a query in browser.

Figure 31:
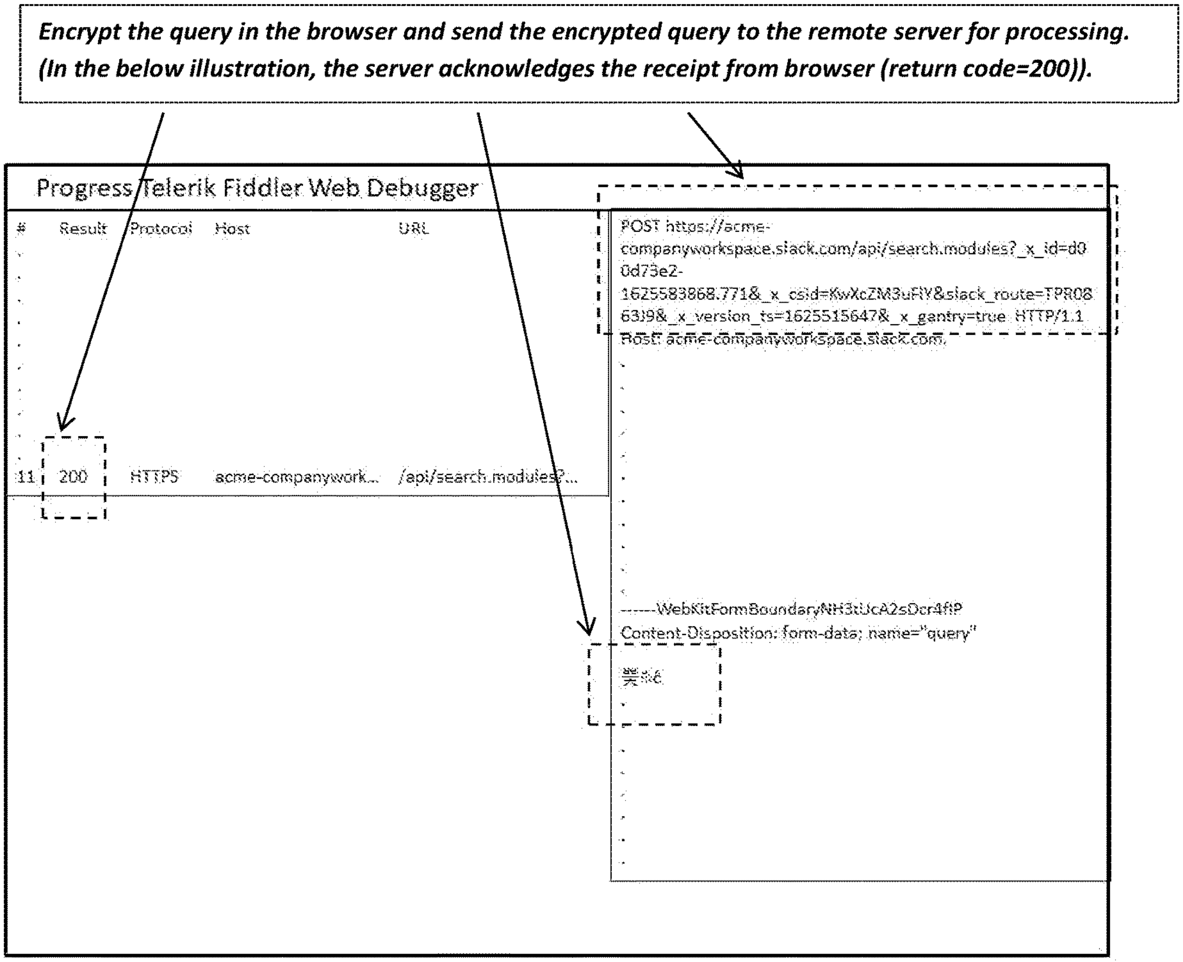
FIG. 31 is a depiction how to encrypt the query in the browser, and send it to the server for execution.

A.4.b. FIG. 31 shows how to encrypt the query in the browser, and send it to the server for execution.

A.5. The last step is to process the encrypted query at the server, without decryption—and return the proper results to the browser, which then decrypts the results, and finally shows them in the browser. The below illustrations, FIGS. 32-34, demonstrate this step (which results from executing the search request—from step A.4 above).

Figure 32:
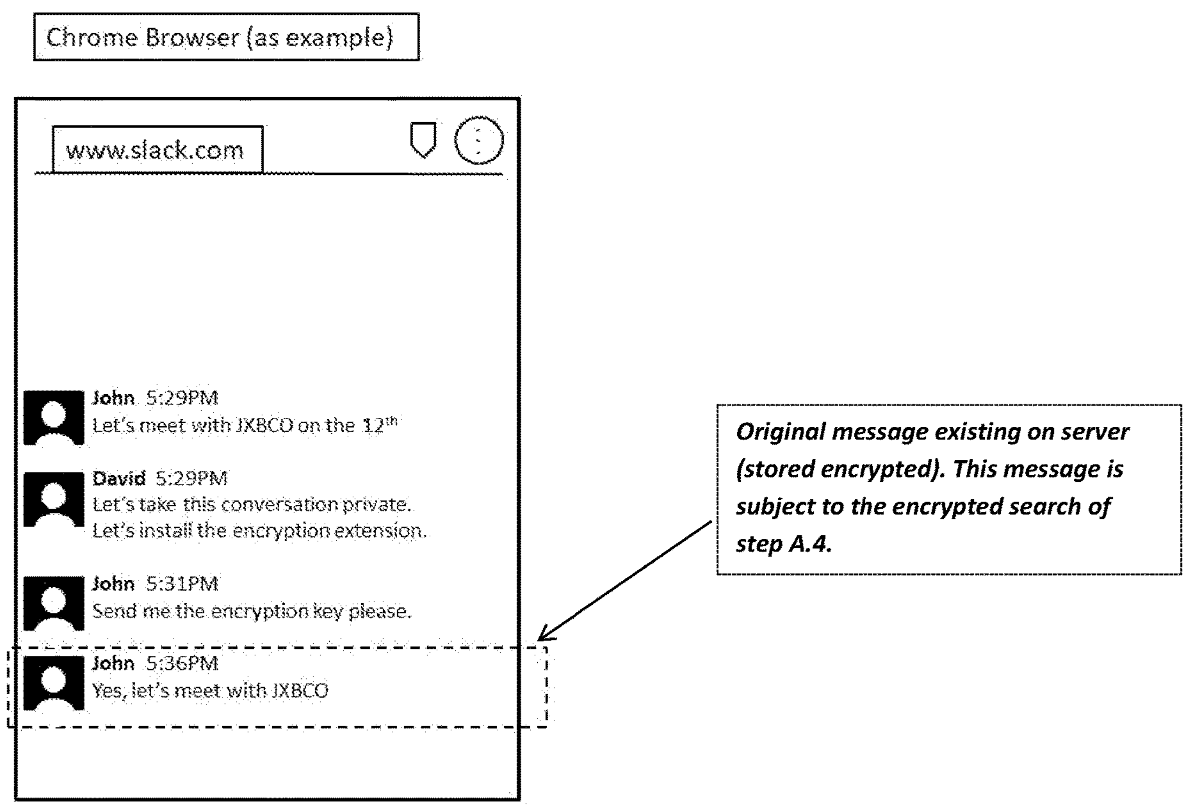
FIG. 32 is a depiction how the original information exists (and is stored encrypted) on the server.

A.5.a. FIG. 32 shows how the original information exists (and is stored encrypted) on the server.

Figure 33:
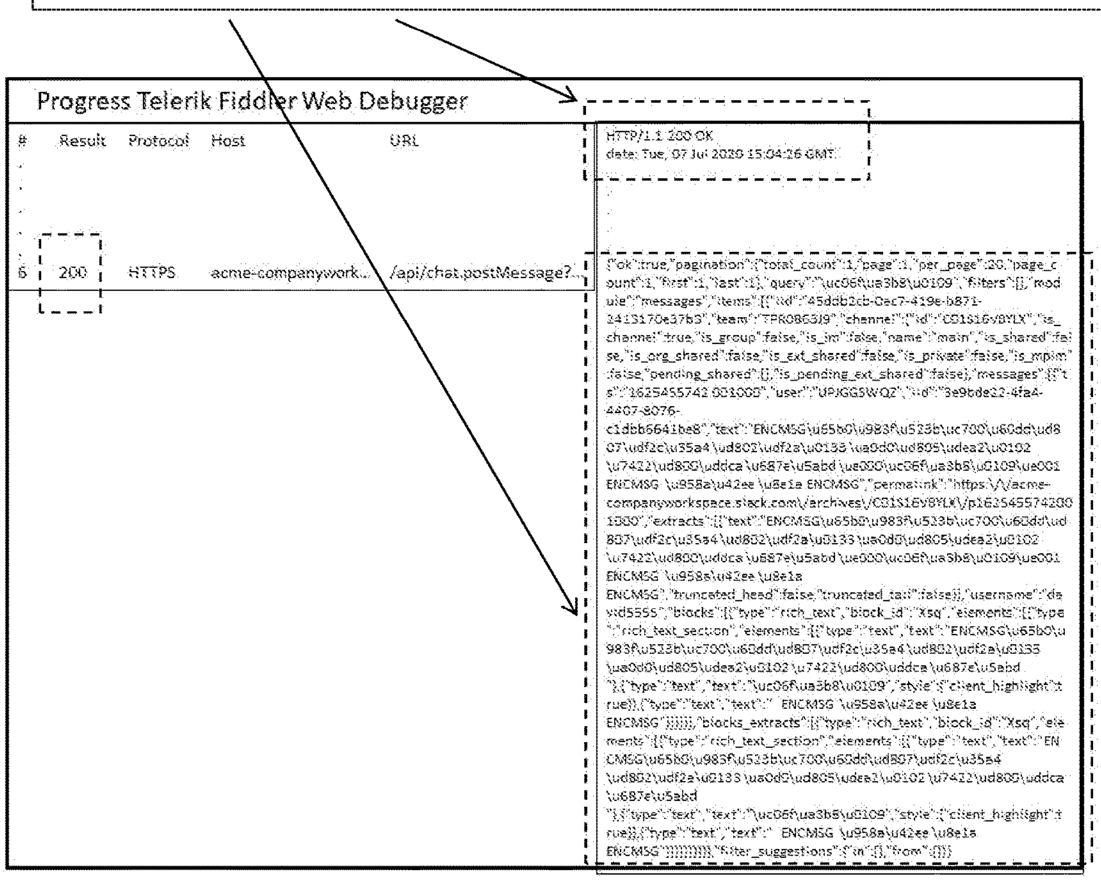
FIG. 33 is a depiction how the encrypted information on the server is retrieved from server.

A.5.b. FIG. 33 shows how the encrypted information on the server, from step A.5.a, is retrieved from server.

Figures 34, 35, 36:
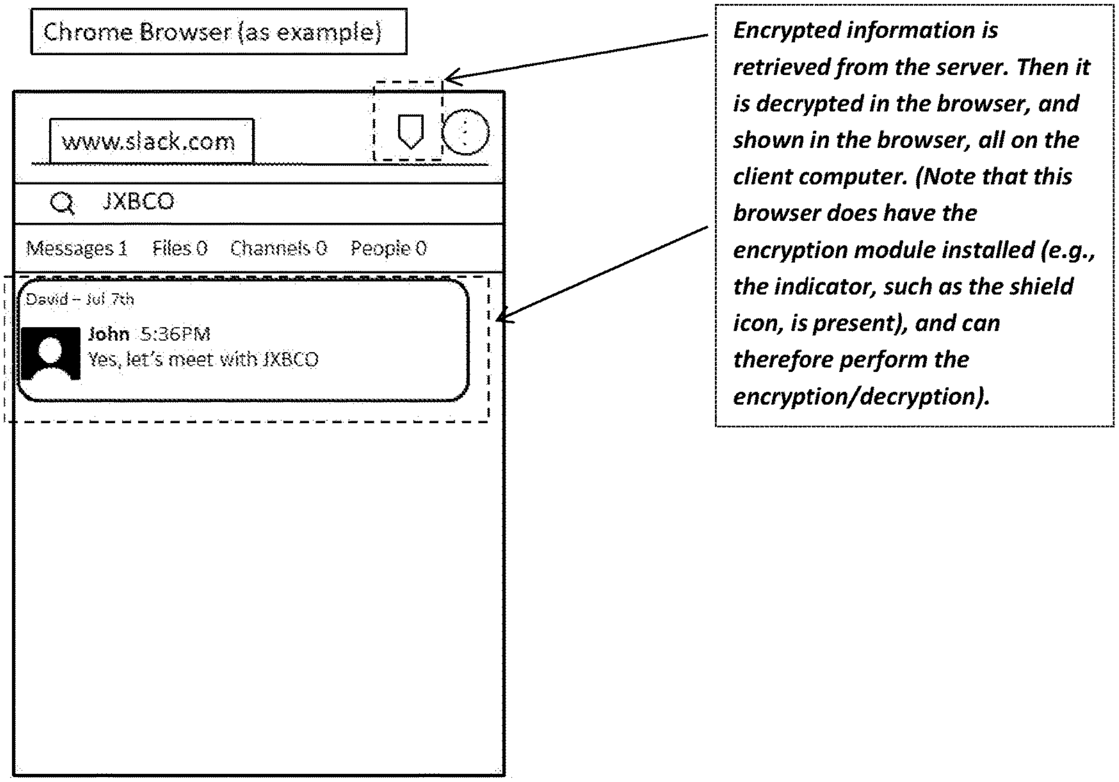
FIG. 34 is a depiction how the retrieved encrypted information is decrypted in the browser and then shown in the browser.
FIG. 35 is a depiction how to encrypt string "abcdefh" by breaking up the bits into their bigrams and section Pz.
FIG. 36 is a depiction how to convert the original bigrams and sections Pz into their encrypted values.

A.5.c. FIG. 34 shows how the retrieved encrypted information is decrypted in the browser and then shown in the browser.

EXAMPLE B

Preparing Data to Facilitate Encrypted Search

Description: This example describes novel ways to structure data to facilitate encrypted search.

Problem Domain: Various encryption techniques exist in the Information Technology industry but they usually perform poorly in robust data search scenarios. Normally—if search is permitted in an encrypted system—deterministic encryption is used to encrypt both the words of original messages as well as the search arguments. Deterministic encryption converts identical strings, plaintexts, into the identically encoded strings, ciphertexts, each time. In this case, the encrypted search arguments can be "searched for" by comparing the encrypted message words to the encrypted search arguments, looking for equality. If plaintext message words equal to plaintext search arguments, ciphertexts search arguments would equal as well. Problems arise with this approach, however, when the application permits more robust searching. Suppose the application ignores the case of characters during searches (as is often the case), allowing for words to be found regardless of whether they, or the search argument, have capital letters. In this case, standard deterministic encryption would not work. A one bit difference in plaintexts creates a significant difference in ciphertexts under deterministic encryption. And because capital letters are at least a few bits different from lower-case letters—in ASCII and in some other character representations—, ciphertexts for words containing capital letters would be significantly different from the same words containing only lower-case letters. Ciphertext equality would no longer hold.

Similar problems arise in other search areas. If the search sub-system permits multiple endings of a search argument to be found (another common search feature), a deterministic encryption approach also would not work. Suppose the original plaintext is "lasting". When searching for "last", a search sub-system might allow for messages containing "lasting" to be found—e.g., the word only differs from the word 'root' of the search argument by the "ing" suffix. But because "lasting" differs from "last" in several characters, deterministic encryption would again create very different ciphertexts, and these ciphertexts would not match (i.e., be equal) during search. This problem also arises if a search sub-system permits substring search, another common search characteristic. Suppose a message contains the last name "Jones". If a user wants to find all last names starting with "Jo", then "Jo*" (the "*"can indicate this is a "starts with" search) could be the search argument. The "*" could be removed from the search argument to clarify what string to search for. But since "Jones" and "Jo" are different words, simply comparing the "Jones" and "Jo" ciphertexts will result in a non-match as deterministic encryption would again produce two different ciphertexts. A similar problem arises when leading or trailing special characters of message words (or in rare cases even the search argument itself) are ignored by the search sub-system, which is also typical. Here is an example. Imagine some plaintext word is succeeded by a comma or period (such as "apples" in the sentence "I bought apples."); or preceded by a dollar sign (such as "I have $120"). If the deterministic encryption looks for word delimiters as spaces, it will encrypt the special characters on the front and/or end of the word as part of the word. But because the search sub-system ignores these characters during search, the search argument will never look for and thus not contain those special characters. (Indeed, it's not possible to construct search arguments for the numerous combinations of special characters that can precede or succeed given search arguments). Therefore a ciphertext search argument will not match a ciphertext message word that included those special characters.

Assumptions: This document will present a solution to the four issues above. We first describe our assumptions about the overall system in which our solution will live. The system is a client-server environment, where the client, such as a browser, a database client, etc, is making requests to a server—such as a website, a database, etc. One or more users are creating new messages and sending them to the server for storage. They can also subsequently search for those messages. Deterministic encryption is installed on the client. Before a message is sent to the server, all its words, delimited by spaces, are encrypted. Any user can therefore search for messages by entering a keyword on the client, which is encrypted on the client. Then the ciphertext is sent to the server for searching. If any messages are found they are retrieved. The messages are decrypted on the client before being presented to the user. Moreover, we also assume that the search sub-system, implemented on the server, supports the four business rules above: ignoring case, allowing search to find words with different word endings, permitting substring search, and ignoring leading and trailing special characters during search. It's also assumed that messages created by users do not fill the maximum size permitted by the application. For example, in a chat application, the chat window might allow users to send say 2000 characters per message—but users only typically send, for instance, 20-700 characters. Similarly, there could be a records system whose records contain a free-form text field. The field itself might allow a maximum input of 6000 characters, but users may only fill in perhaps 1000-2000 characters when creating new records. Still—at the end of the document, we will discuss how to potentially overcome this assumption—to permit messages to be considerably larger.

Under the above assumptions, we propose the following solution.

Solution: The solution utilizes the deterministic encryption already on the client, but introduces a prefix area in the message structure when encrypting a message. This extra area—for example, placed in front of the message—will hold specially structured information that will allow messages to be searched under the four requirements above. The prefix area will also be encrypted using the same deterministic encryption, so as to not reveal any secrets about the message. Here is how the prefix area is constructed, to handle the four search issues above.

B.1. Ignoring Case. To permit finding a message when one of its words, or the search argument itself, has capital letters in it, proceed as follows. When originally encrypting the message, before sending it to the server, convert every word in the message to all lowercase characters. And record in the prefix area each numerical position in the overall message where the capital letters were found. Then all words in the message—along with all the components of the prefix area (other components of the prefix area will be discussed below)—will be encrypted using the client's deterministic encryption, and sent to the server. When searching for a keyword, the client would convert the search argument to all lower-case, too, deterministically encrypt the argument, and send it to the server for searching. If the plaintext message word equals the plaintext search argument, then the search sub-system on the server should find the messages containing the encrypted search argument, as the ciphertexts of lower-case message words would match the ciphertexts of the lower-case search argument. Note that when matching messages are retrieved, decrypted, and are about to be presented to the user, the prefix area—also retrieved and decrypted with each message—will assist with message reconstruction. The prefix area will be parsed, and all letters of all message words that were capital letters will be restored based on the capital-letter indices that were recorded in the prefix area. We will see an illustration of this process later in the document.

B.2. Different Word Endings. To find message words that have slightly different endings from that of the search argument, we again utilize the prefix area. During the initial encryption of the message before sending it to the server, every word in the message is checked. If the word ends in any one of the special endings—such as "ness", "ing", "s", "ed", "ful"—or other endings, depending on what endings the search sub-system allows searched words to have—then that word, minus its ending, is copied into the prefix area. When the message is encrypted on the client, the words of the message, and all the components of the prefix area, including the section of words without these special endings, are encrypted and sent to the server. When searching for a keyword, we first check whether the search argument has one of these endings. If yes, the ending is removed. If no, the search argument is left as is. In either case, just the remaining search argument is deterministically encrypted and the ciphertext is sent to the server. Under this search process—if either the plaintext words, or the search argument, or both, had special endings, and their plaintext word "roots" match, then their ciphertexts would also match, because the plaintext roots are the same when the endings are removed. Once all matching messages are retrieved, they are decrypted and presented to the user.

B.3. Substring Search. When searching for substrings, we can again utilize the prefix area. Before initially encrypting the message, we parse every message word into all possible substrings that the search sub-system can find. For example, if the plaintext word is "apple" and the search sub-system supports "starts with" search, we would break up "apple" into the following substrings that "apple" can 'begin with'—i.e., "appl", "app", "ap", and "a". If the search sub-system supports "contains" searching, then we would break up "apple" into all possible substrings that "apple" 'contains'—e.g., "a", "p", "p", "l", "e", "ap", "pp", "pl", "le", "app", "ppl", "ple", "appl", and "pple". All the relevant substrings are placed into the "substrings" section of the prefix area. (We can optionally also scan the "substrings" section and remove all the duplicate substrings, to potentially save space. The search sub-system only needs to find one of the identical substrings to retrieve the message). Next, deterministically encrypt all the words in the original message, along with the entire prefix area, including all the substrings in the substrings prefix area section—and send the full construct to the server. Now, when a user requests to find all messages that contain some substring, we can deterministically encrypt and send the search argument to the server. Because all possible substrings for all the message words have been separately encrypted—if a message plaintext substring equals the plaintext search argument substring, the search system will find a ciphertext substring from the prefix area section equaling the encrypted search argument. The messages containing the substrings can be retrieved as the response to the user's query, and decrypted for the user to see.

B.4. Special Character Delimiters. The prefix area will also be used to handle the case when special characters directly leading or trailing message words need to be ignored during search. Our system will remove these punctuation, leading monetary symbols, and other special characters from message words, and record their locations (the absolute index in the overall message where they are found) in a different section of the prefix area. Next, we will deterministically encrypt the words of the message, along with the rest prefix area (including the sections discussed in steps B.1-B.3 above), and send this construct to the server. When searching for a word, we first check the search argument if it's bounded by special symbols; if it's bounded on either side the symbols are removed. If it's not, then the search argument is left as is. Then, the search argument is deterministically encrypted and sent to the server for searching. Because leading and trailing special symbols are not part of the ciphertexts message words, or of the search argument, if one or more of the plaintext words equal the plaintext search argument, the ciphertext search argument will match the same one of more ciphertext message words. Once any messages are found and retrieved, they are decrypted. During the decryption process, we would also decrypt the prefix area and identify the positions of any special characters in the message using the recorded indices. The special characters would be restored to those recorded positions—and the original message(s) could finally be presented to the user.

Example: Here is an illustration how the prefix area is constructed and how it facilitates search under the four business rules above. Suppose a user initially creates the following message: "Bill was singing." The below explains how the prefix area is constructed as part of initial message encryption, and how that construct is subsequently used to find that message on the server.

B.a. To handle the issue when the search sub-system ignores case, before initially encrypting the message and sending it to the server, we traverse the message once, to look for any capital letters. In our message, we see that the first character position is a capital "B". The letter is converted to lower case—and its index, 1, is stored in the prefix area. This is illustrated below. (In the below illustrations we show more metadata/descriptions to better explain the construction of the prefix area. During the actual implementation of our system, less meta-data can be used to represent the same information. Also, for clarity, any indices stored in the prefix area representing character positions in the message start at position 1 rather than 0).

Prefix area:

CAPITAL LETTERS AT INDICES: 1

Message: bill was singing.

We will see in step B.f how to use the above construction to do search when the search sub-system ignores case.

B.b. Assume that when searching for a word, the search sub-system will find words that also have the following word endings: "ness", "ing", "s", "ed", and "ful" (as was described in #2 in the Solution section above). To handle searching when message words, as well as the search argument, can have any of these endings—when processing the message before encrypting it and sending it to the server—, we traverse the message again to look for these endings. In our message, we see that "was" and "singing" have these endings ("s" and "ing" respectively). We copy these words, without their endings, into the prefix area. We now have the following structure:

Prefix area:

CAPITAL LETTERS AT INDICES: 1

WORDS WITHOUT SPECIAL ENDINGS: wa sing

Message: bill was singing.

We will see in step B.g how to use this construct to do search when the search sub-system allows multiple word endings.

B.c. Next we show to prepare data for substring search. Suppose the search sub-system allows for "starts with" search. Before initially encrypting the message and sending it to the server, we traverse the message again to find all the substrings that each word in the message can "begin with"—and record them in the prefix area. There are three words in our sentence, "bill" (after converting the first letter to lowercase given step B.a above, "was", and "singing" (we will show in step B.d below how to remove the period after "singing"). After computing all the substrings of these words, the prefix area will now look like:

Prefix area:

CAPITAL LETTERS AT INDICES: 1

WORDS WITHOUT SPECIAL ENDINGS: wa sing

START-WITH SUBSTRINGS: b bi bil w wa s si sin sing singi singin

Message: bill was singing.

(We can also scan the substrings in the START-WITH SUBSTRINGS section and remove the duplicates. However, there are no duplicates in this example. But, if we wanted to conserve more space, we could also scan for duplicates across all the sections of the prefix area, and for example, remove the "sing" word in the WORDS WITHOUT SPECIAL ENDINGS section since there is already a "sing" word in the START-WITH SUBSTRINGS section).

We will see in step B.h below how to use the above construct to do search when the search sub-system supports substring search.

B.d. We finally augment the prefix area to handle search when special characters that lead or trail words are not taken into account during search. During initial message processing, we traverse the message once more to find all cases when there are special characters immediately in front of or behind words. We see in our sentence we have one instance where there is a period at the end of a word, i.e. "singing." (e.g., at end of sentence). We remove the period from the word and place its position into the prefix area—along with the label of the special character ("period") that was removed. Here is an example of the overall construct now:

Prefix area:

CAPITAL LETTERS AT INDICES: 1

WORDS WITHOUT SPECIAL ENDINGS: wa sing

START-WITH SUBSTRINGS: b bi bil w wa s si sin sing singi singin

SPECIAL CHARACTERS:

PERIOD AT INDICES: 17

Message: bill was singing

We will see in step B.i below how to use the above construct do search when the search sub-system ignores leading or trailing special characters in words.

B.e. Finally we deterministically encrypt each of the components in the prefix area, along with all the individual words of the message, on the client—and send the full construct to the server. The bellow is an illustration of the encrypted construct, using E( )to designate the deterministic encryption function:

E(Prefix area:)

E(CAPITAL LETTERS AT INDICES: 1)

E(WORDS WITHOUT SPECIAL ENDINGS:) E(wa) E(sing)

E(START-WITH SUBSTRINGS:) E(b) E(bi) E(bil) E(w) E(wa) E(s) E(si) E(sin) E(sing) E(singi) E(singin)

E(SPECIAL CHARACTERS:)

E(PERIOD AT INDICES: 17)

E(Message:) E(bill) E(was) E(singing)

(Note that, if needed, we can have further special or unique leading letters or symbols for each of the main sections above so that an encrypted search argument only finds actual message data rather than for example accidentally finding the encrypted meta-data).

Given the above set up of the prefix area, now we can examine how to perform search.

B.f. We begin with the business rule of ignoring case. Imagine a user wants to find all messages containing "Bill", and the search sub-system ignores case. Our methodology would intercept the search argument and first convert its capital "B" to lower-case "b". Then it would deterministically encrypt the search argument and send it to the server for search. Because one of the ciphertexts in our message is E(bill) (see step B.e for the full construct), that ciphertext would match with the ciphertext search argument E(bill), and our message would be retrieved. When decrypting the message to present to the user, in addition to decrypting the message words themselves, our methodology would also decrypt the prefix area. It would see the following metadata:

CAPITAL LETTERS AT INDICES: 1

The index '1' means we have to take the temporary decrypted message of "bill was singing." (how the period is appended to this sentence will be covered in section B.i below), and convert the "b" in the $1^{st}$ position to capital "B". Then the message "Bill was singing." can be presented to the user, as is desired.

B.g. Next imagine the user wants to search for a keyword, and the search sub-system matches on different word endings. Suppose the user wants to find all messages containing "sings". Our system would scan the typed-in search argument "sings" and see that "s" is one of the endings that can be "ignored' so that only its "root" is searched. (Recall from step B.b, the endings that can be ignored are "ness", "ing", "s", "ed", and "ful"). After removing "s", E(sing) is sent to the server. The server would scan all its stored messages. For our message, it would see that the search ciphertext E(sing) matches E(sing) in the prefix area in the WORDS WITHOUT SPECIAL ENDINGS section. Because of the match, our message would be retrieved. It can be decrypted on the client (including restoring the capital "B" as per step B.f above, and restoring the period as will be described in step B.i. below), and presented to the user.

B.h. Next suppose the user wants to find all messages that contain at least one word starting with "si", and the search sub-system supports "starts with" search. The user types in, for example, "si*" into the client (where "*" indicates this search is "starts with"). Our system intercepts the search argument and recognizes the "*" to signify "starts with" search. Our system removes the "*" encrypts the actual substring as E(si), and sends it to the server for searching. Because one of the strings in the prefix area START-WITH SUBSTRINGS section is also E(si), the ciphertexts will match, and our message will be retrieved. On the client, the message will be decrypted and presented to the user (with its capital letter restored as in step B.f and the period restored as will be described in step B.i).

B.i. Finally suppose the user wants to search for keywords, and the search sub-system ignores the leading or trailing special characters of message words, and of the search argument. Imagine the user wants to find the word "singing". Quite likely he will type in this word without special characters, although perhaps on rare occasions he might type in this search argument with a special character, such as "singing," or "singing." Our system would intercept the argument. If it's surrounded by special characters, they would be removed; otherwise, it would be left as is. In either case, the system would encrypt just the word, and the ciphertext—in this case E(singing)—would be sent to the server for searching. Since we removed the period trailing the word "singing" when originally encrypting the message, the server will find the encrypted search argument among the original ciphertext message words in our message construct, and our message will be returned. Then the message and the prefix area will be decrypted (and the letter "b" will be capitalized as in step B.f above). During the decryption process, our methodology will see this meta-data in the prefix area:

SPECIAL CHARACTERS:

PERIOD AT INDICES: 17

Seeing index 17 for the character "PERIOD", our methodology will find the $17^{th}$ position within the intermediate decrypted sentence, "Bill was singing"—and add a period to the $17^{th}$ position. The final sentence returned to the user is "Bill was singing.", as is desired.

Reducing Space: We can now discuss how to counter our original assumption, that user messages need to be considerably smaller than the maximum message size allowed by the application (to allow the prefix area to fit within the message construct for example). We explain how to reduce the space required for the prefix area and the message words, which will permit larger user messages. The first optimization to do is to compress each of the components of the prefix area and the message words using any number of standard data compression algorithms. This needs to be done before encrypting the data—although this can also be done after data encryption, too. Overall, such compressions will make the resulting encrypted text smaller. A second mechanism is to rely upon Unicode. Many storage systems and applications utilize the UTF-8 (Unicode) character representation to store their data. UTF-8 effectively allows for over 1 million different Unicode characters and symbols of multiple languages and symbol systems to be encoded in a single character position in a string. Because languages like English are expressed using one-byte ASCII characters—our methodology/system can construct a table in memory that maps two English ASCII characters into one UTF-8 Unicode character. A one byte character takes on 256 values, so that two characters take on 256*256 or 65,536 values. Since 65,536 is less than one million, we can effectively replace two regular ASCII characters with one UTF-8 Unicode character. After such a two-for-one substitution, the resulting text will take about 50% less space as the number of actual "characters" in a (UTF-8) string has been effectively halved. Such an approach can also be used in some other languages (Spanish, French, etc.) which also use one byte to represent one character in a word. Converting to Unicode representation can be done after the data compression—to further reduce text size.

During the decryption process, we'd reverse the above flow. We would convert the UTF-8 Unicode characters into compressed text by using reversed Unicode-to-ASCII mapping tables in memory. Then we can decompress the resulting text before decrypting it, or after decrypting it (or both)—to finally re-create the original plaintext message, which can be returned to the user.

Using compression and Unicode representation can therefore allow users to store larger size messages within the application.

EXAMPLE C

New encryption approach

Referring now to FIGS. 35 through 49, a new encryption approach is provided.

An encryption method—such that even a one-bit difference in plaintext values would create very different ciphertexts is provided herein.

Difference from prior encryption approaches: This scheme is different from our prior approaches in this disclosure. They relied upon some existing encryption algorithms for certain parts of the functionality, the creation of overlapping groups, the calculations of monotonic functions across groups, the usage of fake rows, and the incorporation of random numbers when mathematically transforming numerical values into randomized encrypted values. The current technique incorporates randomized lookup tables as well as bit manipulation to encrypt any alphanumeric value, e.g. any string of bytes.

Note: The below discussion assumes encryption of English text. But the approach will work for any language (Spanish, Russian, Chinese, etc.) as characters in all languages are typically represented in the computer by one or more bytes. And the encryption methodology below works at the byte level.

Setup: To encrypt data, we first generate a private encryption key. This key consists of four sub-keys: Sub-key1, Sub-key2, Sub-key3, and Sub-key4. Sub-key1 is a matrix with values 0-255 on the X axis and values 0-255 on the Y axis. The matrix cells consist of numbers 0-65535 (256*2−1), randomly dispersed throughout the matrix—with each number 0-65535 used exactly once. Sub-key2 is a simple 2-column array; the first column lists numbers 0-255, while the second column is a random permutation of the numbers 0-255. Sub-key3 is set up just like Sub-key1—it's another matrix—, but has a different random distribution of the values 0-65535. Sub-key4 is set up just like Sub-key2, but has a different permutation of 0-255 values in the second column.

Encryption: To encrypt a plaintext string S into ciphertext string C, proceed as follows:

C.1. Consider S to be an array of continuous bits. Break up the array into mutually-exclusive 'bigrams', i.e., 16-bit substrings, S1 . . . Sn. Note that the last part of S, Sz, will only be 8 bits long, if S has an odd number of bytes. (Note, because our assumption is that we are encrypting bytes, S can always be broken into zero or more 16-bit substrings, as well as zero or one 8-bit substring. If the string is not of a length that is a multiple of 8, the below scheme can still work. It's just that the definition of "bigram" will not be 16 bits, but maybe 10 bits or 6 bits, and the Sz section may only be 7 bits long or 3 bits long, for example).

C.2. Randomize each Si bigram value using Sub-key1. Using the first 8 bits of the bigram as the X coordinate, and the second 8 bits of the bigram as the Y coordinate, replace Si with the random value found in the (X,Y) cell of the Sub-key1 matrix. If there is an Sz section, convert it into its random value using Sub-key2 by looking up the value of Sz in Sub-key2's first column and replacing Sz with the value in the same row from Sub-key2's second column.

C.3. Record the bits of the randomized Si's vertically, in the columns of a new temporary matrix, in the same sequence as the Si's in the original S. That is, for each i=1 . . . n, create a new column in a temporary matrix, and write the bits of the corresponding Si vertically in the column (writing the column from top to bottom while reading the Si from left-to-right). If there is a Sz—it will be the last column in the temporary matrix, written vertically in the same manner.

C.4. Create a blank string C with the same length as S.

C.5. Reading the temporary matrix above horizontally (left to right)—and starting with the first row, then moving to the second row, then to the third row, etc.—start to fill out the bits of string C from C's beginning to its end. (Any blank cells from the Sz section (because Sz only has 8 rather than 16 bits), will be skipped, and C will be filled out from the next cell in the next matrix row).

C.6. Break up C into its bigrams C1 . . . Cn, including its section Cz, if one exists.

C.7. Using the same process as in step 2 above, convert sections C1 . . . Cn to their random values using the Sub-key3 matrix; and convert any section Cz into its random value using the Sub-key4 array.

C.9. If desired, C can now be converted into its ASCII form by simply printing each of its bytes as an ASCII or extended-ASCII character (each byte of C will clearly have a value from 0-255. Of course, if desired, C can also be left in bit form).

C.9. String C is the encrypted string of the plaintext string S.

Decryption: The decryption of string C into plaintext string S follows the same process as in steps 1-9 in the Encryption section, just in reverse order. The same private key (with its Sub-key1, Sub-key2, Sub-key3, and Sub-key4 components) is used—potentially using reverse matrices and arrays to make lookups faster. The below are the overall steps:

C.a. Break up C into its 16-bit bigrams C1 . . . Cn, including a final 8-bit Cz section (if exists).

C.b. For C's 16-bit bigrams, look up the current Ci value in the Sub-key3 matrix and find the X,Y coordinates associated with it. The Ci value is replaced by the 8-bit X coordinate followed by the 8-bit Y coordinate. If there is a Cz value, then use Sub-key4 to look up the Cz value in the second column of Sub-key4 and replace Cz with the value from Sub-key4's first column from the same row.

C.c. Create a temporary matrix that will be used to re-position C's bits. The width of the matrix will be the number of bigrams C has, including any Cz section. The length of the matrix will be 16.

C.d. Reading C from left to right, and starting from the top of the matrix and moving gradually downwards—start to fill in each row of the matrix, from left to right, with the bits of C. For each matrix row, read from C m bits, where m is the number of columns in the matrix. If there is a Cz section, then beginning with matrix row 9, the number of bits read from C will be n−1, where n is the number of bigrams in C, including any Cz section (as per step 1 above).

C.e. Create a blank string S with the same length as C.

C.f. Examining one column of the temporary matrix from step 4 at a time, and moving from left to right, read each matrix column from top to bottom and fill in 16-bit sections of S from left-to-right with the read bits. If there is a Cz section—then for the last matrix column, only 8 bits will be read, and subsequently written into S.

C.g. With S written out, proceed as in step 2 above. Break S into its bigrams S1 . . . Sn, including any Sz section. For each Si, look up its value in Sub-key1 and replace Si with the 8-bit X coordinate and 8-bit Y coordinate associated with the found value within Sub-key1. For the Sz section, look up the Sz value in the second column of Sub-key2 and replace Sz with the value found in Sub-key1's first column from the same row.

C.h. The resulting string S is the original plaintext of ciphertext C.

Example: Here is an illustration of how to encrypt strings.

C.i. Suppose we want to encrypt strings P="abcdefh" and Q="abcdefi". Note that "abcdefh" differs from "abcdefi" by one bit (e.g., the last byte of string P—letter 'h'—is decimal 104 (ASCII value); while the last byte of string Q—letter 'i'—is decimal 105 (ASCII value)).

C.ii. We first generate the random private key. It will look similar to the below. (The below are partial diagrams for illustration. The actual Sub-keys will be much larger in size).

Sub-key1

| | 0 | 1 | 2 | 3 |
|---|---|---|---|---|
| 0 | 42091 | 2899 | 10427 | 48 |
| 1 | 22809 | 60391 | 48922 | 15883 |
| 2 | 57320 | 38632 | 506 | 3280 |
| 3 | 904 | 18342 | 4239 | 179 |

Sub-key2

| | |
|---|---|
| 0 | 30 |
| 1 | 201 |
| 2 | 99 |
| 3 | 8 |
| 4 | 154 |
| 5 | 49 |
| 6 | 212 |
| 7 | 87 |

Sub-key3

| | 0 | 1 | 2 | 3 |
|---|---|---|---|---|
| 0 | 890 | 6742 | 40881 | 23 |
| 1 | 8738 | 58932 | 17855 | 3783 |
| 2 | 12 | 34289 | 5773 | 4409 |
| 3 | 26733 | 47623 | 52300 | 24241 |

Sub-key4

| | |
|---|---|
| 0 | 241 |
| 1 | 6 |
| 2 | 67 |
| 3 | 82 |
| 4 | 173 |
| 5 | 25 |
| 6 | 228 |
| 7 | 141 |

C.iii. To encrypt "abcdefh", look at all of the string's bits. Break up the bits into their bigrams and section Pz. (Step C.1 per the Encryption section above). This is illustrated in FIG. 35.

C.iv. Now (step C.2 from the Encryption section), for each bigram, using its first 8 bits as the X coordinate, and second 8 bits as the Y coordinate—look up the bigram's (X,Y) cell value in the Sub-key1 matrix. Replace the bigram value with the cell value. Also replace the value in section Sz with its random value from Sub-key2 by looking up the Sz value in the first column of Sub-key2 and replacing Sz with the value found in Sub-key2's second column from the same row. For example, using bigram P1 from the above example, we can look up the cell value at its (a=97,b=98) coordinates in the Sub-key1 matrix, and replace the value of bigram P1 with that value, say 48932. Overall, for instance, string P can now look as in FIG. 36.

C.v. Next, the bigrams of P, and its section Pz, are recorded vertically in a temporary matrix. FIG. 37 is the illustration of this, continuing to use the transformed string P from step C.iv as the example.

C.vi. We now start to create ciphertext C by creating a blank string of the same length as P (step C.4 from the Encryption section).

C.vii. Next we start reading the lines of bits left to right from the matrix above—beginning with the top row and proceeding to subsequent rows. The bits fill array C from its beginning. This is illustrated in FIG. 38.

C.viii. Next C is broken up into its bigrams C1 . . . Cn and section Cz. (This is step C.6 as per the Encryption section. FIG. 39 illustrates this, and the bits have also been appropriately sectioned in the Figure to better illustrate byte groupings).

C.ix. Now we transform C using the random values of Sub-key3 and Sub-key4. For example, using the above diagrams, if we find that for bigram C1, at its (X=1000 0100=132, Y=1010 1100=172) coordinates in Sub-key3, we find the value 56119—this value would replace the bigram C1 value. After all the transformations (and continuing with the example from step C.viii) string C may look like as illustrated in FIG. 40.

C.x. Now we can convert string C into its ASCII representation—for better visualization. (Step C.8 in the Encryption section). This is illustrated in FIG. 41.

C.xi. Therefore, the encryption of string P="abcdefh" is string C—with the ASCII representation as in FIG. 41.

C.xii. Now let's encrypt string Q="abcdefi"—to see the difference.

C.xii.a. First, we break up Q into its bits and bigrams. This is illustrated in FIG. 42.

C.xii.b. Next we convert the Q array into random values using Sub-key1 and Sub-key2. (This is step C.2 in the Encryption section. Note that all values, except for section Qz, will be the same, since all of Q's bits are the same as P's, with the exception of one Qz bit). This is illustrated in FIG. 43.

C.xii.c. Now we create a temporary matrix, by lining up the Q1 . . . 3 bigrams and section Qz vertically. FIG. 44 illustrates this.

C.xii.d. Next we begin to create ciphertext D by creating a blank string of the same length as Q.

C.xii.e. Next, we start to fill in string D by reading the bits left to right from the temporary matrix above, beginning with the top row, and moving down the rows. We write the read bits into array D from the string's beginning. (This is illustrated in FIG. 45. Note, and just for illustration, the bits in boxes show the difference between the initial ciphertext C in step g and the current ciphertext D here).

C.xii.f. Now we convert string D into its bigrams (step C.6 in the Encryption section). This is illustrated in FIG. 46 (again demonstrated by sectioning the bits).

C.xii.g. Next we transform string D using Sub-key3 and Sub-key4 (step C.7 in the Encryption section), just like we did for C in step C.ix above. This is illustrated in FIG. 47.

C.xii.h. Now we can convert string D into its ASCII representation, for visualization and comparison purposes. This is illustrated in FIG. 48.

C.xii.i. The encryption of string Q="abcdefi" is string D—with ASCII representation as above.

C.xii.j. Notice the difference between ciphertexts C and D, illustrated in FIG. 49. Half of the ASCII characters in string D (boxed off individually) are different from those of string C. (And the underlying bytes are quite different as well as can be seen in steps C.x and C.xii.h above).

Conclusion: Therefore, a one bit difference in original strings has created, in this example, ciphertexts which have half of their ASCII representation being different (and underlying bytes are quite different as well). But the reason this will work more generally, is that by using random Sub-key1 and Sub-key2, a one-bit difference creates a different random number selection in step C.2 in the Encryption section. Then we write the resulting random values vertically and create new values from them by reading the bits from left to right; and the various random bits introduced are dispersed throughout the resulting ciphertext string. This finally creates completely new random value selections when using Sub-key3 and Sub-key4 in step C.7 of the Encryption section, as the single bit differences used for lookups in random tables yields very different looked-up values. The overall effect is that the original one-bit plaintext difference has been considerably amplified.

Note, if desired, we can make ASCII values of ciphertexts (and their bit values more generally) even less similar (and, therefore, more secure) if we have several rounds of transformation following step C.1-C.7 in the Encryption section, and have a larger private key (with additional Sub-keys, e.g., Sub-key5, Sub-key6, etc). Independently of this, we can also repeat various sub-groups of steps C.1-C.7, such as steps C.3-C.5, multiple times, too, if desired, which would also improve security.

The invention claimed is:

1. A computer-implemented method of encrypting data, where the encryption and decryption of data happens in the web browser on a client computer where anonymizing data or a database and querying said data or database comprises the steps of:

(a) anonymizing data or a database on a server computer or client computer, (b) hosting said database on the server computer of step (a) or another server computer, (c) generating a query on a client computer, (d) encrypting the query on the client computer to form an encrypted query, (e) transmitting the encrypted query to the server computer, (f) operating on the encrypted query at the server computer, without decryption, to produce an encrypted result, (g) returning the encrypted result to the client computer, (h) post processing the encrypted result on the client computer, without decryption, to produce a post processed encrypted result, and (i) decrypting the post processed encrypted result at the client computer to produce a decrypted result and presenting the decrypted result to the user;

wherein the encryption and decryption on the client computer is done within the browser installed on the client computer.

2. The method of claim 1 wherein an encryption module, such as a browser extension, is installed in the browser to perform the encryption and decryption as required.

3. A computer-implemented method of anonymizing data or a database and querying said data or database comprising:

(a) anonymizing data or a database on a server computer or client computer, (b) hosting said database on the server computer of step (a) or another server computer, (c) generating a query on a client computer, (d) encrypting the query on the client computer to form an encrypted query, (e) transmitting the encrypted query to the server computer, (f) operating on the encrypted query at the server computer, without decryption, to produce an encrypted result, (g) returning the encrypted result to the client computer, (h) decrypting the encrypted result at the client computer to produce a decrypted result, (i) post processing the decrypted result on the client computer to produce a result and presenting the result to the user;

wherein the encryption and decryption on the client computer is done within the browser installed on the client computer.

4. The method of claim 3 wherein an encryption module, such as a browser extension, is installed in the browser to perform the encryption and decryption as required.

5. A computer-implemented method of anonymizing data or a database and querying said data or database comprising:

(a) anonymizing data or a database on a server computer or client computer, (b) hosting said database on the server computer of step (a) or another server computer, (c) generating a query on a client computer, (d) encrypting the query on the client computer to form an encrypted query, (e) transmitting the encrypted query to the server computer, (f) operating on the encrypted query at the server computer, without decryption, to produce an encrypted result, (g) returning the encrypted result to the client computer, (h) post processing the encrypted result on the client computer, without decryption, to produce a post processed encrypted result, (i) decrypting the post processed encrypted result at the client computer to produce a decrypted result and presenting the decrypted result to the user;

wherein the anonymization on the client computer or the server computer includes:

(i.1) creating encrypted metadata when encrypting each individual data record, and said metadata includes the indices of the capitalized letters in the data record; the lexical roots of all individual words in the data record; the substrings of all words in the data record; and indices of special characters leading or trailing any word in the data record, along with labels indicating what the special characters actually are, (i.2) changing each word in each data record to only have lower case characters; and removing any special characters leading or trailing any word in the data record.

6. The method of claim 5 wherein when encrypting the query on the client computer to form an encrypted query, if the query contains a search component with a search argument, the encrypted query converts any letters in the said search argument to lower case, removes any leading or trailing special characters from the search argument, and converts the search argument to its lexical root if appropriate, unless the search argument is a sub string search, in which case the substring is not converted to its lexical root and kept as is.

7. A computer-implemented method of anonymizing data or a database and querying said data or database comprising:

(a) anonymizing data or a database on a server computer or client computer, (b) hosting said database on the server computer of step (a) or another server computer, (c) generating a query on a client computer, (d) encrypting the query on the client computer to form an encrypted query, (e) transmitting the encrypted query to the server computer, (f) operating on the encrypted query at the server computer, without decryption, to produce an encrypted result, (g) returning the encrypted result to the client computer, (h) decrypting the encrypted result at the client computer to produce a decrypted result, (i) post processing the decrypted result on the client computer to produce a result and presenting the result to the user;

wherein the anonymization on the client computer or the server computer includes:

(i.1) creating encrypted metadata when encrypting each individual data record, and said metadata includes the indices of the capitalized letters in the data record; the lexical roots of all individual words in the data record; the substrings of all words in the data record; and indices of special characters leading or trailing any word in the data record, along with labels indicating what the special characters actually are, (i.2) changing each word in each data record to only have lower case characters; and removing any special characters leading or trailing any word in the data record.

8. The method of claim 7 wherein when encrypting the query on the client computer to form an encrypted query, if the query contains a search component with a search argument, the encrypted query converts any letters in the said search argument to lower case, removes any leading or trailing special characters from the search argument, and converts the search argument to its lexical root if appropriate, unless the search argument is a sub-string search, in which case the substring is not converted to its lexical root and kept as is.

9. A computer-implemented method of anonymizing a database and querying it comprising:

(a) anonymizing a database on a server computer, (b) hosting said anonymized database on the server computer of step (a) or another server computer, (c) generating a query on a client computer, (d) encrypting the query on the client computer to form an encrypted query, (e) transmitting the encrypted query to the server computer, (f) operating on the encrypted query at the server computer to produce an encrypted result, (g) returning the encrypted result to the client computer, (h) post processing the encrypted result on the client computer, without decryption, to produce a post processed encrypted result, (i) decrypting the post processed encrypted result at the client computer to produce a decrypted result and presenting the decrypted result to the user wherein the database is anonymized by using secure encryption and decryption methods to encode each rational number value within numeric columns, wherein the encryption method is defined by $$D(x)=\lambda * x+r\xi\_x,\ x \text{ in } R$$

where λ is a random constant (the same for all x), and rξ_x is a random number individually selected for each x; the decryption method is defined by $$x=(D(x)-r\xi\_x)/\lambda$$

and division between encrypted numbers is defined by $$D(x1/x2)=D(x1)*D(1/x2) \text{ and } D(1/x2)=D(1)/D(x2)$$

where $$D(x1)=\lambda * x1+r\xi\_x1$$

$$D(x2)=\lambda * x2+r\xi\_x2$$

$$D(1)=\lambda * 1+r\xi\_1 \text{ (the encryption of the number 1)}$$

$$D(1/x2)=\lambda *(1/x2)+r\xi\_1/x2$$

and $$r\xi\_1/x2=\lambda *(r\xi\_1-r\xi\_x2*[D(1)/D(x2)])/(D(x2)-r\xi\_x2).$$

10. A computer-implemented method of anonymizing a database and querying it comprising:

(a) anonymizing a database on a server computer, (b) hosting said anonymized database on the server computer of step (a) or another server computer, (c) generating a query on a client computer, (d) encrypting the query on the client computer to form an encrypted query, (e) transmitting the encrypted query to the server computer, (f) operating on the encrypted query at the server computer to produce an encrypted result, (g) returning the encrypted result to the client computer, (h) decrypting the encrypted result at the client computer to produce a decrypted result, (i) post processing the decrypted result on the client computer to produce a result and presenting the result to the user;

wherein the database is anonymized by using secure encryption and decryption methods to encode each rational number value within numeric columns, wherein the encryption method is defined by $$D(x)=\lambda * x+r\xi\_x,\ x \text{ in } R$$

where λ is a random constant (the same for all x), and rξ_x is a random number individually selected for each x; the decryption method is defined by $$x=(D(x)-r\xi\_x)/\lambda$$

and division between encrypted numbers is defined by $$D(x1/x2)=D(x1)*D(1/x2) \text{ and } D(1/x2)=D(1)/D(x2)$$

where $$D(x1)=\lambda * x1+r\xi\_x1$$

$$D(x2)=\lambda * x2+r\xi\_x2$$

$$D(1)=\lambda * 1+r\xi\_1 \text{ (the encryption of the number 1)}$$

$$D(1/x2)=\lambda *(1/x2)+r\xi\_1/x2$$

and $$r\xi\_1/x2=\lambda *(r\xi\_1-r\xi\_x2*[D(1)/D(x2)])/(D(x2)-r\xi\_x2).$$

* * * * *